United States Patent
Peleg et al.

(10) Patent No.: US 12,204,871 B2
(45) Date of Patent: Jan. 21, 2025

(54) CONTROLLABLE READING GUIDES AND NATURAL LANGUAGE GENERATION

(71) Applicant: AI21 LABS, Tel Aviv (IL)

(72) Inventors: Barak Peleg, Givatayim (IL); Dan Padnos, Tel Aviv (IL); Amnon Morag, Tel Aviv (IL); Gilad Lumbroso, Kfar Saba (IL); Yoav Shoham, Tel Aviv (IL); Ori Goshen, Tel Aviv-Jaffa (IL); Barak Lenz, Tel Aviv (IL); Or Dagan, Tel Aviv (IL); Guy Einy, Tel Aviv (IL)

(73) Assignee: AI21 LABS, Tel Aviv (IL)

( * ) Notice: Subject to any disclaimer, the term of this patent is extended or adjusted under 35 U.S.C. 154(b) by 0 days.

(21) Appl. No.: 18/153,583

(22) Filed: Jan. 12, 2023

(65) Prior Publication Data

US 2023/0186017 A1    Jun. 15, 2023

Related U.S. Application Data

(63) Continuation of application No. PCT/US2021/041428, filed on Jul. 13, 2021.
(Continued)

(51) Int. Cl.
*G06F 17/00* (2019.01)
*G06F 3/0482* (2013.01)
(Continued)

(52) U.S. Cl.
CPC ............ *G06F 40/56* (2020.01); *G06F 3/0482* (2013.01); *G06F 40/166* (2020.01);
(Continued)

(58) Field of Classification Search
CPC ...... G06F 40/166; G06F 40/289; G06F 40/30; G06F 3/0486; G06F 40/56; G06F 3/0482;
(Continued)

(56) References Cited

U.S. PATENT DOCUMENTS 6,181,342 B1    1/2001    Niblack
7,107,204 B1    9/2006    Liu et al.
(Continued)

OTHER PUBLICATIONS

Lin, Bill Yuchen, et al. "CommonGen: A constrained text generation challenge for generative commonsense reasoning." arXiv preprint arXiv: 1911.03705 (2019) (Year: 2019).*
(Continued)

*Primary Examiner* — Andrew T McIntosh
(74) *Attorney, Agent, or Firm* — Finnegan, Henderson, Farabow, Garrett & Dunner, LLP

(57) ABSTRACT

Disclosed embodiments include a computer readable medium that includes instructions that when executed by one or more processing devices cause the one or more processing devices to perform a method. The method includes: receiving from a user an identification of different text segments; receiving from the user an indication of a type of document to generate based upon the plurality of different text segments; analyzing the plurality of different text segments; identifying concepts conveyed by the plurality of different text segments; determining an ordering for the identified concepts to be used in generating an output text; generating the output text based on the determined ordering for the identified concepts, wherein the generated output text conveys each of the identified concepts and includes one or more text elements not included in any of the plurality of different text segments; and causing the generated output text to be shown on a display.

29 Claims, 99 Drawing Sheets

Related U.S. Application Data

(60) Provisional application No. 63/187,170, filed on May 11, 2021, provisional application No. 63/187,162, filed on May 11, 2021, provisional application No. 63/086,254, filed on Oct. 1, 2020, provisional application No. 63/084,500, filed on Sep. 28, 2020, provisional application No. 63/051,288, filed on Jul. 13, 2020.

(51) Int. Cl.
| | |
|---|---|
| *G06F 40/166* | (2020.01) |
| *G06F 40/211* | (2020.01) |
| *G06F 40/274* | (2020.01) |
| *G06F 40/289* | (2020.01) |
| *G06F 40/30* | (2020.01) |
| *G06F 40/56* | (2020.01) |
| *G06F 40/58* | (2020.01) |
| *G06F 3/0486* | (2013.01) |

(52) U.S. Cl.
CPC .......... *G06F 40/211* (2020.01); *G06F 40/274* (2020.01); *G06F 40/289* (2020.01); *G06F 40/30* (2020.01); *G06F 40/58* (2020.01); *G06F 3/0486* (2013.01)

(58) Field of Classification Search
CPC ...... G06F 40/211; G06F 40/274; G06F 40/58; G06F 3/04847; G06N 3/084; G06N 3/048
See application file for complete search history.

(56) References Cited

U.S. PATENT DOCUMENTS

| | | | |
|---|---|---|---|
| 7,571,177 B2 | 8/2009 | Damle | |
| 7,689,431 B1 | 3/2010 | Carmel | |
| 7,788,262 B1 | 8/2010 | Shirwadkar | |
| 7,945,600 B1 | 5/2011 | Thomas et al. | |
| 8,135,699 B2 | 3/2012 | Gupta et al. | |
| 8,161,325 B2 | 4/2012 | Calman et al. | |
| 8,195,594 B1* | 6/2012 | Bryce | G16H 15/00 706/47 |
| 8,566,360 B2 | 10/2013 | Chen | |
| 8,645,825 B1 | 2/2014 | Cornea et al. | |
| 8,903,719 B1 | 12/2014 | Landry et al. | |
| 9,552,354 B1 | 12/2017 | Seligman et al. | |
| 10,339,218 B1 | 7/2019 | Lakshmanan | |
| 11,157,684 B2 | 10/2021 | Chiba et al. | |
| 11,232,140 B2 | 1/2022 | Wang et al. | |
| 11,258,734 B1* | 2/2022 | Shevchenko | G06N 20/00 |
| 11,429,779 B2 | 8/2022 | Li et al. | |
| 11,537,783 B2 | 12/2022 | Tsu | |
| 11,568,148 B1* | 1/2023 | Nichols | G06F 40/295 |
| 2003/0014216 A1 | 1/2003 | Lebow | |
| 2003/0212545 A1 | 11/2003 | Kallulli | |
| 2005/0203970 A1 | 9/2005 | McKeown et al. | |
| 2008/0270119 A1 | 10/2008 | Suzuki | |
| 2010/0049709 A1 | 2/2010 | Ravikumar | |
| 2010/0070908 A1 | 3/2010 | Mori et al. | |
| 2010/0306185 A1 | 12/2010 | Smith et al. | |
| 2010/0313118 A1 | 12/2010 | Acquaviva | |
| 2011/0119593 A1 | 5/2011 | Jacobson et al. | |
| 2011/0161073 A1 | 6/2011 | Lesher et al. | |
| 2011/0246182 A1* | 10/2011 | Allen | G06F 40/56 704/E11.001 |
| 2011/0289105 A1 | 11/2011 | Hershowitz | |
| 2012/0297294 A1 | 11/2012 | Scott et al. | |
| 2013/0124964 A1 | 5/2013 | Viegas et al. | |
| 2013/0191735 A1 | 7/2013 | Kumar et al. | |
| 2013/0218909 A1 | 8/2013 | Chu | |
| 2014/0149132 A1* | 5/2014 | DeHaan | G16H 70/20 705/2 |
| 2015/0269153 A1 | 9/2015 | Fink et al. | |
| 2016/0103841 A1 | 4/2016 | Zupancic | |
| 2016/0196150 A1 | 7/2016 | Jing et al. | |
| 2016/0210355 A1 | 7/2016 | Krantz, III et al. | |
| 2017/0177649 A1 | 6/2017 | Badrinarayanan et al. | |
| 2017/0277668 A1 | 9/2017 | Luo et al. | |
| 2017/0300477 A1* | 10/2017 | Long | G06F 16/22 |
| 2018/0210872 A1 | 7/2018 | Podmajersky et al. | |
| 2018/0211550 A1 | 7/2018 | Bellamy et al. | |
| 2019/0042551 A1 | 2/2019 | Hwang | |
| 2019/0147849 A1 | 5/2019 | Talwar et al. | |
| 2019/0377785 A1* | 12/2019 | N | G06F 40/20 |
| 2020/0053035 A1 | 2/2020 | Mukherjee et al. | |
| 2020/0059548 A1 | 2/2020 | Han | |
| 2020/0279556 A1 | 9/2020 | Gruber et al. | |
| 2020/0279621 A1 | 9/2020 | Degenaro | |
| 2020/0327189 A1* | 10/2020 | Li | G06F 40/56 |
| 2021/0004432 A1* | 1/2021 | Li | G06F 40/295 |
| 2021/0034705 A1 | 2/2021 | Chhaya et al. | |
| 2021/0149980 A1 | 5/2021 | Pavlini et al. | |
| 2021/0157978 A1 | 5/2021 | Haramati | |
| 2021/0209118 A1 | 7/2021 | Reuther et al. | |
| 2021/0365504 A1 | 11/2021 | Kuehne et al. | |
| 2021/0390001 A1 | 12/2021 | Walters et al. | |
| 2021/0397793 A1 | 12/2021 | Li et al. | |
| 2022/0375562 A1* | 11/2022 | Nakamura | G16H 30/40 |

OTHER PUBLICATIONS

Konstas, Ioannis, and Mirella Lapata. "A global model for concept-to-text generation." Journal of Artificial Intelligence Research 48 (2013): 305-346 (Year: 2013).*

Search Report and Written Opinion, dated Dec. 7, 2021, issued by the International Searching Authority in Application No. PCT/US2021/041428 (12 pages).

Sharir et al.; "The Cost of Training NLP Models a Concise Overview"; arXiv preprint; Apr. 19, 2020 (6 pages).

Sciforce; "A Comprehensive Guide to Natural Language Generation"; Medium; Jul. 4, 2019 (20 pages).

Power et al.; "What You See is What You Meant: direct knowledge editing with natural language feedback"; ECAI, vol. 98; Aug. 23, 1998 (5 pages).

Examination Search Report issued in European Patent Application No. 23196919.7-1203, dated Feb. 19, 2024 (9 pages).

"Rewrite in Word—Say it another way!," Office Insider Blog, Aug. 12, 2019, available at https://blog-insider.office.com/2019/08/12/rewrite-in-word-say-itanother-way/ (4 pages).

Xu et al: "ALTER: Auxiliary Text Rewriting Tool for Natural Language Generation", Cornell University Library, Sep. 14, 2019 (6 pages).

Office Action issued in U.S. Appl. No. 18/153,541, dated Apr. 26, 2023 (40 pages).

Office Action issued in U.S. Appl. No. 18/153,610, dated Apr. 26, 2023 (9 pages).

Office Action issued in U.S. Appl. No. 18/153,561, dated May 17, 2023 (27 pages).

Office Action issued in U.S. Appl. No. 18/315,628, dated Aug. 15, 2023 (24 pages).

Office Action issued in U.S. Appl. No. 18/153,610, dated Nov. 8, 2023 (9 pages).

Office Action issued in U.S. Appl. No. 18/315,628, dated Nov. 15, 2023 (11 pages).

Office Action issued in U.S. Appl. No. 18/315,654, dated Dec. 14, 2023 (37 pages).

Liao et al., Abstract Meaning Representation for Multi-Document Summarization, Proceedings of the 27th International Conference on Computational Linguistics, Aug. 20-26, 2028, pp. 1178-1190.

Https://www.merriam-webster.com/dictionary/reluctant, recovered from the internet archive with a page date of Jan. 19, 2018.

* cited by examiner

All Supersenses

■ Verb Supersenses   □ Noun Supersenses   ▦ Other (adv./adj.)

Noun Supersenses

▨ Abstract   ▨ Concrete   ▤ Concrete - Entities

Self-driving cars status

What started as a field of tech companies alone is now crowded with both tech giants and car manufacturers, the latters trying to stay relevant in a future world where people won't buy cars for driving. With regulators allowing more and more test drives, the amount of driven kilometers has increased dramatically over the past year.

In the US, Aptiv logged 100,000+ self-driving taxi rides in Las Vegas in collaboration with Lyft. In Europe, Audi got its flagship self-driving A8 model approved for street driving and will start experimenting soon.

Self-driving cars status

What started as a field of tech companies alone is now crowded with both tech giants and car manufacturers, the latters trying to stay relevant in a future world where people won't buy cars for driving. With regulators allowing more and more test drives, the amount of driven kilometers has increased dramatically over the past year;

In the US, Aptiv logged 100,000+ self-driving taxi rides in Las Vegas in collaboration with Lyft. Baidu's Apollo platform logs 1M+ autonomous miles driven. In Europe, Audi got its flagship self-driving A8 model approved for street driving and will start experimenting soon.

Self-driving cars status

What started as a field of tech companies alone is now crowded with both tech giants and car manufacturers, the latters trying to stay relevant in a future world where people won't buy cars for driving. With regulators allowing more and more test drives, the amount of driven kilometers has increased dramatically over the past year:

In the US, Aptiv logged 100,000+ self-driving taxi rides in Las Vegas in collaboration with Lyft. Baidu's Apollo platform logs 1M+ autonomous miles driven in Europe. Audi got its flagship self-driving A8 model approved for street driving and will start experimenting soon.

In the US, Aptiv logged 100,000+ self-driving taxi rides in Las Vegas in collaboration with Lyft while Baidu's Apollo platform logs 1M+ autonomous miles driven in Europe. Audi got its flagship self-driving A8 model approved for street driving and will start experimenting soon.

In the US, Aptiv logged 100,000+ self-driving taxi rides in Las Vegas in collaboration with Lyft. Baidu's Apollo platform logs 1M+ autonomous.

*FIG. 17*

Self-driving cars status

What started as a field of tech companies alone is now crowded with both tech giants and car manufacturers, the latters trying to stay relevant in a future world where people won't buy cars for driving. With regulators allowing more and more test drives, the amount of driven kilometers has increased dramatically over the past year;

In the US, Aptiv logged 100,000+ self-driving taxi rides in Las Vegas in collaboration with Lyft, and in China, Baidu's Apollo platform logs 1M+ autonomous miles driven. In Europe, Audi got its flagship self-driving A8 model approved for street driving and will start experimenting soon.

*FIG. 19*

Self-driving cars status

*What started as a field of tech companies alone is now crowded with both tech giants and car manufacturers, the latters trying to stay relevant in a future world where people won't buy cars for driving. With regulators allowing more and more test drives, the amount of driven kilometers has increased dramatically over the past year;*

*In the US, Aptiv* *100,000+ self-driving taxi rides in Las Vegas in collaboration with Lyft. In Europe, Audi got its flagship self-driving A8 model approved for street driving and will start experimenting soon.*

2402
2410
2412

1. In a typical year, flight attendants can log hundreds if not thousands more flight segments than a typical air traveler. *Webster's New World Dictionary.* — 2414

2. In the past, professional bicycle racers rarely logged more than a few training rides per month on an indoor trainer. *Bicycling Magazine.* — 2416

CONTROLLABLE READING GUIDES AND NATURAL LANGUAGE GENERATION

RELATED APPLICATIONS

This application is a continuation of International Application No. PCT/US2021/041428 filed on Jul. 13, 2021, which claims priority from U.S. Provisional Patent Application No. 63/051,288, filed on Jul. 13, 2020; U.S. Provisional Patent Application No. 63/084,500, filed on Sep. 28, 2020; U.S. Provisional Patent Application No. 63/086,254, filed on Oct. 1, 2020; U.S. Provisional Patent Application No. 63/187,162, filed on May 11, 2021; and U.S. Provisional Patent Application No. 63/187,170, filed on May 11, 2021. The entire disclosure of each of the above applications is hereby incorporated by reference in the present application.

BACKGROUND

The disclosed technology relates generally to controllable natural language generation from an automated computer-based system. Prior systems can generate text, for example, based on words a user has previously typed. These prior systems, however, often rely on probabilities associated with the user's typing habits, or they may rely on statistical models that analyze the probabilities of different words appearing next to or near one another. For example, in some cases, natural language can either be statistically generated to complete users' sentences by predicting highly probable repetitive and mundane short texts. In other cases, prior systems may generate text to resemble human-written texts, but with no effective control over the meaning of the text. That is, the text may appear structurally well-written, but to a reader would be understood as non-sensical, in whole or in part. More importantly, prior systems do not allow a user to control the meaning conveyed by the generated text in such situations and, as a result, while a prior system may generate text that appears structurally well-written, that text is unlikely to convey the meaning intended by the user. This problem is heightened by the fact that a given word form can possess multiple meanings. For example, the word "bass" can refer to a fish, a guitar, a type of singer, etc. Thus, the word itself is merely a surrogate of its actual meaning in a given context, which may be referred to as the word's sense. In many cases, a context of surrounding text may be needed to inform a word's sense. Prior systems tend to generate text based on surface level statistics without accounting for context, such as the context offered by user input or other available text in a document. As a result, while prior systems may generate text, without accounting for context or word sense, such systems may be useful only in generating simple, statistically formed word groups. There is no capability for generating more complex language based on the context dictated by surrounding text (e.g., text appearing before and/or after a text insertion point). And such systems fail to provide the user with control relative to the text generated and, therefore, the user is unable to predictably control the meaning of the generated text or to refine the meaning of generated text with further input to the system.

In still other cases, prior systems may generate language of apparent complexity, but such systems may be specially tailored to generate language that conveys information from predefined datasets, for predefined use cases, and/or in predefined ways. Certain systems may also automatically account for dictionary spellings of words and certain grammar rules, but, in general, these systems are limited to operating relative to short text segments and without the benefit of contextual analysis of surrounding text or of input provided by a user.

There is a significant need for automated natural language generation systems capable of robust generation of text beyond the limitations of prior systems. The disclosed embodiments provide methods and systems for general-purpose controllable natural language generation. The disclosed embodiments allow for the automatic generation of unique natural language that can express specific meaning, determined based on interaction with users, based on analysis of existing text, etc. The disclosed embodiments can generate unique language, such as sentences that may have never been written before, the meaning of which can be effectively controlled by users or by other parameters, for any desired meaning and context of the use of human language, with no need for tailored pre-configuration.

The disclosed embodiments also include semantically infused language models. Such models may include a neural network-based language model explicitly trained to contain contextual relations between abstract semantic features in text, in contrast with prior art, where models can only be trained to learn contextual relations between surface-level words. For example, the disclosed systems may enable a model to learn contextual relations between words and word senses and between words and the properties of the abstract concepts invoked by the text. To achieve this, the disclosed models may be trained to predict the semantic features of masked tokens in text conditioned by their surrounding context.

As described in the sections below, the disclosed language generation systems may provide a user with a significant level of control in generating language of an intended meaning that agrees with the context of user input text and other available text. For example, in some cases, the disclosed systems may generate text output options as semantic paraphrase substitutions for input provided by the user. In other words, the text output options may be generated to convey the meaning, information, concepts, etc. of textual input provided to the system by the user. Further, the disclosed systems, unlike prior systems, may offer a type of closed loop feedback where if text output options generated by the system do not quite match what the user intended, or if the user would like to supplement the generated text output options, the user can modify the input to the system (e.g., adding words, removing certain words, changing the order of words, etc.), and the system will automatically generate one or more refined text output options based on the modified input (and, in some cases, the context of text surrounding a document location where the generated text is to be inserted).

SUMMARY

Some of the presently disclosed embodiments may include a computer readable medium including instructions that when executed by one or more processing devices cause the one or more processing devices to perform a method. The method may include: identifying a location in an electronic document for at least one text insertion; automatically generating one or more text insertion options, based on a syntactic or semantic context of text in the electronic document before or after the identified location, and causing the one or more text insertion options to be displayed to the user; receiving, from a user, a selection of a text insertion option from among the one or more text insertion options;

and causing the selected text insertion option to be included in the electronic document at a location that includes the identified location.

Some embodiments may include a computer readable medium including instructions that when executed by one or more processing devices cause the one or more processing devices to perform a method. The method may include: identifying at least one reviewer-generated comment in an electronic document; based on analysis of the at least one reviewer-generated comment, generating one or more text output options each responsive to at least one aspect of the reviewer-generated comment; causing the one or more text output options to be displayed to a user; receiving an input from the user indicative of a selection of one of the one or more text output options; and automatically revising text implicated by the reviewer-generated comment in accordance with the selected one of the one or more text options.

Some embodiments may include a computer readable medium including instructions that when executed by one or more processing devices cause the one or more processing devices to perform a method. The method may include: detecting at least one user-identified text element within a text passage of an electronic document; analyzing the at least one user-identified text element to determine one or more usage characteristics of the at least one user-identified text element within the text passage; accessing one or more databases and acquiring, based on the one or more determined usage characteristics, at least one text example that includes the at least one user-identified text element or a variant of the user-identified text element; and causing the at least one text example to be shown on a display.

Some embodiments may include a computer readable medium including instructions that when executed by one or more processing devices cause the one or more processing devices to perform a method. The method may include: receiving from a user an identification of a plurality of different text segments; receiving from the user an indication of a type of document to generate based upon the plurality of different text segments; analyzing the plurality of different text segments; identifying concepts conveyed by the plurality of different text segments; determining an ordering for the identified concepts to be used in generating an output text; generating the output text based on the determined ordering for the identified concepts, wherein the generated output text conveys each of the identified concepts and includes one or more text elements not included in any of the plurality of different text segments; and causing the generated output text to be shown on a display.

Some embodiments may include a computer readable medium including instructions that when executed by one or more processing devices cause the one or more processing devices to perform a method. The method may include: receiving from a user an identification of a plurality of different text files; analyzing text from each of the plurality of different text files; identifying concepts conveyed by the text from each of the plurality of different text files; determining an ordering for the identified concepts to be used in generating an output text; generating the output text based on the determined ordering for the identified concepts, wherein the generated output text conveys each of the identified concepts and includes one or more text elements not included in the text of the plurality of different text files; receiving from the user an identification of a location in the generated output text for at least one text revision; receiving text input from a user; automatically generating one or more text revision options, based on a context of the generated output text before or after the identified location and also based on a meaning associated with the text input from the user, and causing the one or more text revision options to be displayed to the user; receiving, from the user, a selection of a text revision option from among the one or more text revision options; generating an updated output text by causing the selected text revision option to be included in the generated output text at a location that includes the identified location; and causing the generated updated output text to be shown on a display.

Some embodiments may include a computer readable medium including instructions that when executed by one or more processing devices cause the one or more processing devices to perform a method. The method may include: detecting, in a text editing window associated with an electronic document, a user selection of a text segment in the electronic document; in response to detection of the user selection of the text segment, causing a user interface element to be shown on a display, wherein the user interface element is configured to provide user access to one or more functions associated with an automated writing assistance tool; detecting user interaction with the user interface element and, in response, causing one or more re-write suggestions to be shown on a display, wherein each of the one or more re-write suggestions conveys a meaning associated with the selected text segment but includes one or more changes relative to the selected text segment.

Some embodiments may include a computer readable medium including instructions that when executed by one or more processing devices cause the one or more processing devices to perform a method. The method may include: causing a user interface element to be shown as part of a text editor interface on a display, wherein the user interface element is configured to provide user access to one or more functions associated with an automated writing assistance tool; detecting user interaction with the user interface element and, in response, causing a re-write suggestion window to be shown on the display; generating one or more text re-write suggestions as the user enters a text segment into the text editor interface, wherein the one or more text re-write suggestions are generated based on the text segment; and causing the generated one or more text re-write suggestions to be shown in the re-write suggestion window.

Some embodiments may include a computer readable medium including instructions that when executed by one or more processing devices cause the one or more processing devices to perform a method. The method may include: causing a text segment re-write suggestion window to be shown on a display as part of a text editor user interface; detecting entry of text into the text editor user interface; and in response to the detected entry of text into the text editor user interface, generating one or more text re-write suggestions associated with the entered text and causing the one or more text re-write suggestions to be displayed in the re-write suggestion window.

Some embodiments may include a computer readable medium including instructions that when executed by one or more processing devices cause the one or more processing devices to perform a method. The method may include: detecting, in a text editing window associated with an electronic document, a user selection of a text passage in the electronic document, wherein the text passage includes a plurality of sentences; in response to detection of the user selection of the text segment, analyzing each of the plurality of sentences and generating one or more re-write suggestions for each of the plurality of sentences; detecting user interaction with a user input device; and, in response, navigating among the plurality of sentences on a sentenceby-sentence basis and displaying the one or more re-write suggestions on a sentence-by-sentence basis in correspondence with the navigation among the plurality of sentences. The navigation may also occur on a phrase-by-phrase, multi-sentence-by-multi-sentence, and/or paragraph-by-paragraph basis.

Some embodiments may include a computer readable medium including instructions that when executed by one or more processing devices cause the one or more processing devices to perform a method. The method may include: detecting, in a text editing window associated with an electronic document, a user indication of a text passage in the electronic document to be analyzed for text re-write suggestions, wherein the text passage includes a plurality of sentences; in response to detection of the user indication, analyzing each of the plurality of sentences and generating one or more re-write suggestions for at least one of the plurality of sentences; causing, for the at least one of the plurality of sentences for which one or more re-write suggestions are generated, a display of at least one indicator that re-write suggestions are available with respect to the at least one of the plurality of sentences; and detecting user interaction with the at least one indicator and, in response, causing the one or more re-write suggestions generated for the at least one of the plurality of sentences to be displayed.

Some embodiments may include a computer readable medium including instructions that when executed by one or more processing devices cause the one or more processing devices to perform a method. The method may include: receiving an identification of at least one source text document; loading text of the at least one source text document; analyzing the text of the at least one source text document; generating, based on the analysis, at least one summary snippet associated with one or more portions of the text of the at least one source text document, wherein the at least one summary snippet conveys a meaning associated with the one or more portions of the text, but includes one or more textual differences relative to the one or more portions of the text of the at least one source text document; and causing the at least one summary snippet to be shown on a display.

Some embodiments may include a computer readable medium including instructions that when executed by one or more processing devices cause the one or more processing devices to perform a method. The method may include: receiving an identification of at least one source text document; loading text of the at least one source text document; analyzing the text of the at least one source text document; generating, based on the analysis, at least one summary snippet associated with one or more portions of the text of the at least one source text document, wherein the at least one summary snippet conveys a meaning associated with the one or more portions of the text, but includes one or more textual differences relative to the one or more portions of the text of the at least one source text document; receiving input text provided by a user; analyzing the input text and, based on the analysis of the input text and based on the generated at least one summary snippet, generating at least one of a text re-write suggestion or a text supplement suggestion relative to the received input text; and causing the at least one of a text re-write suggestion or a text supplement suggestion to be shown on a display.

Some embodiments may include a computer readable medium including instructions that when executed by one or more processing devices cause the one or more processing devices to perform a method. The method may include: receiving an identification of at least one source text document; loading text of the at least one source text document; analyzing the text of the at least one source text document; receiving input text provided by a user; analyzing the input text and, based on analysis of the input text and based on the analysis of the text of the at least one source text document, generating a text supplement suggestion relative to the received input text; and causing the at least one of a text re-write suggestion or a text supplement suggestion to be shown on a display, wherein the text supplement suggestion is based on both content and context associated with the text of the at least one source text document.

BRIEF DESCRIPTION OF DRAWING(S)

FIGS. 3a-3i provide diagrammatic representations of a writing assistant interface, according to exemplary disclosed embodiments.

FIGS. 4a-4g provide diagrammatic representations of a writing assistant interface, according to exemplary disclosed embodiments.

FIGS. 5a-5f provide diagrammatic representations of a writing assistant interface, according to exemplary disclosed embodiments.

Figure 6A:
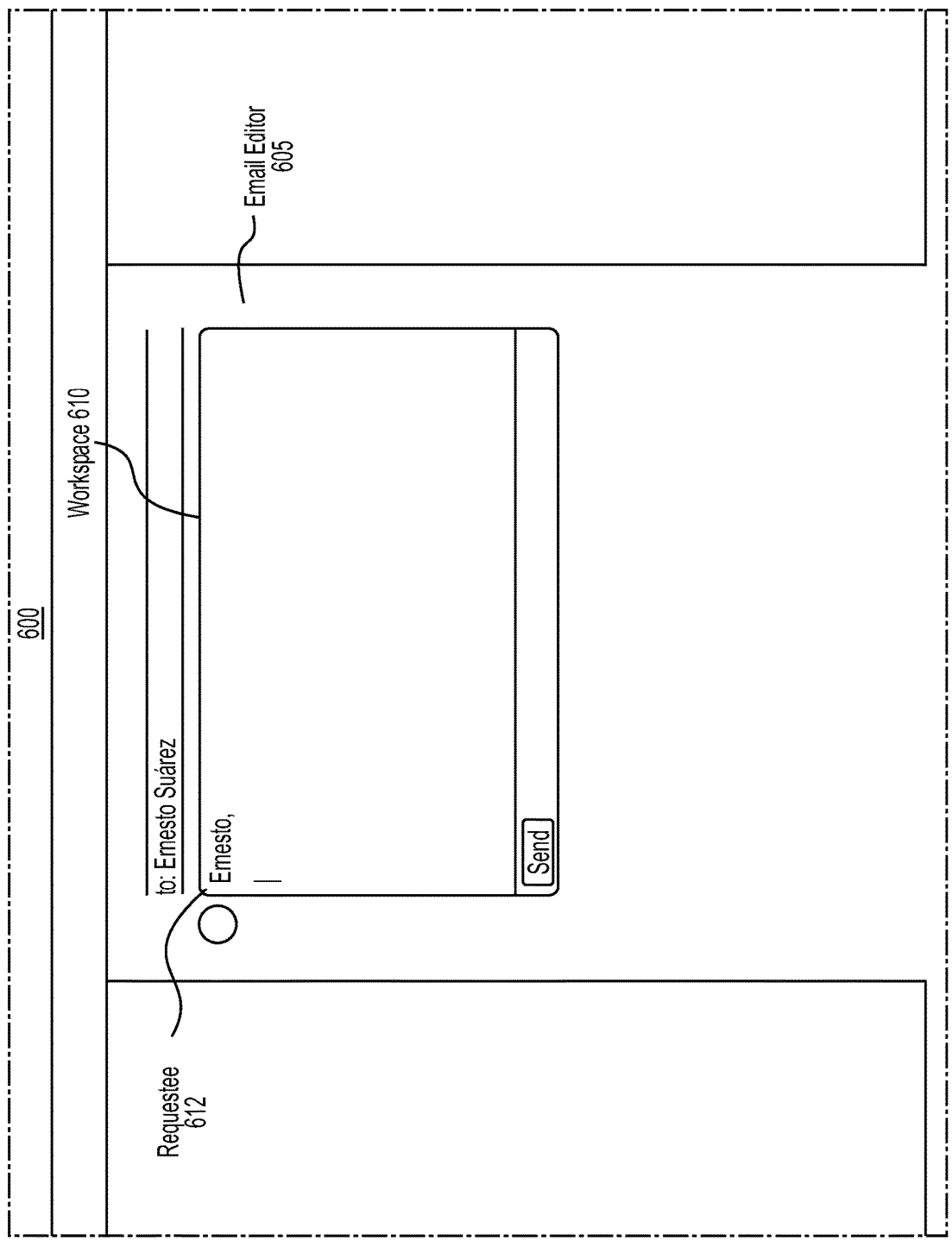
Figure 6B:
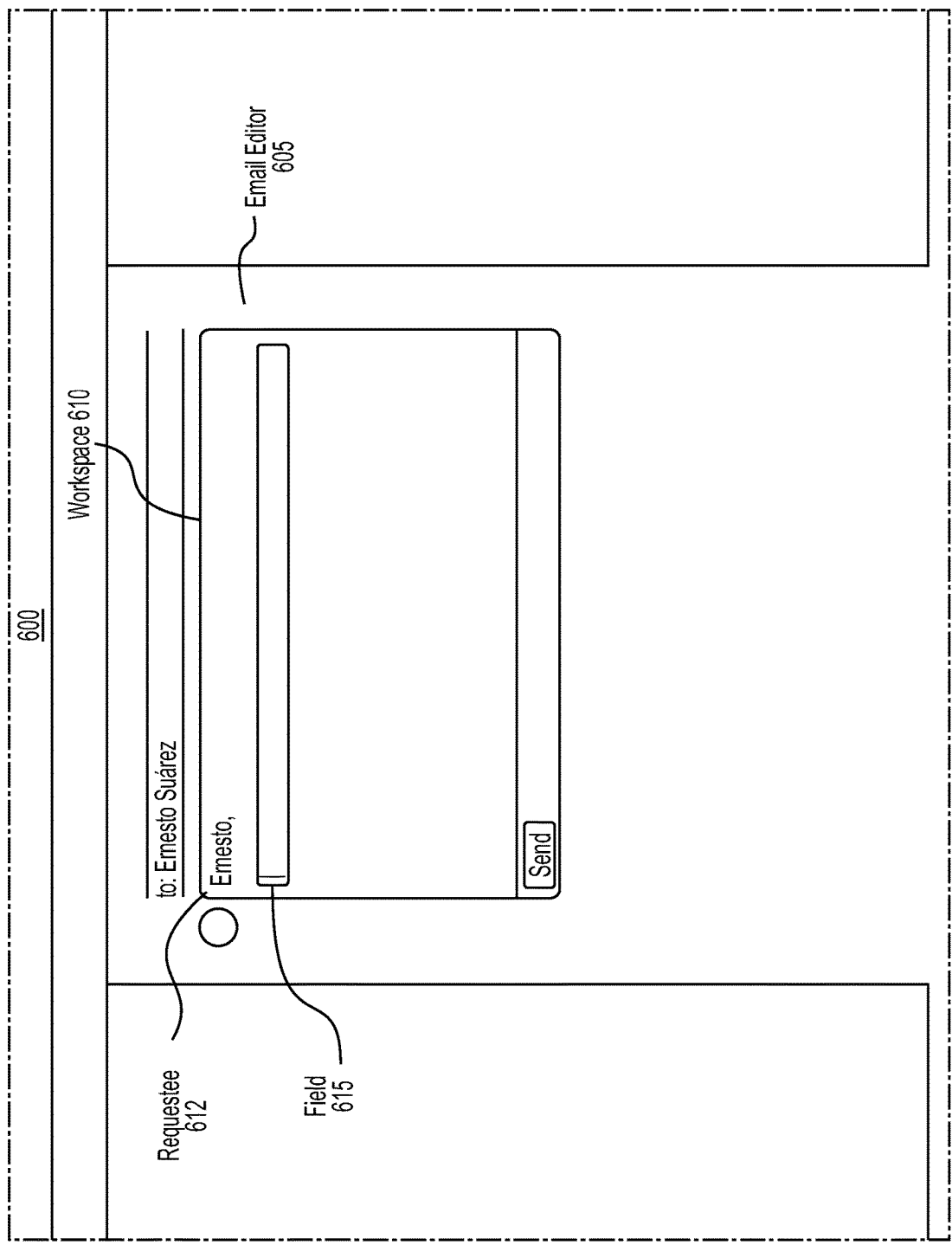
Figure 6C:
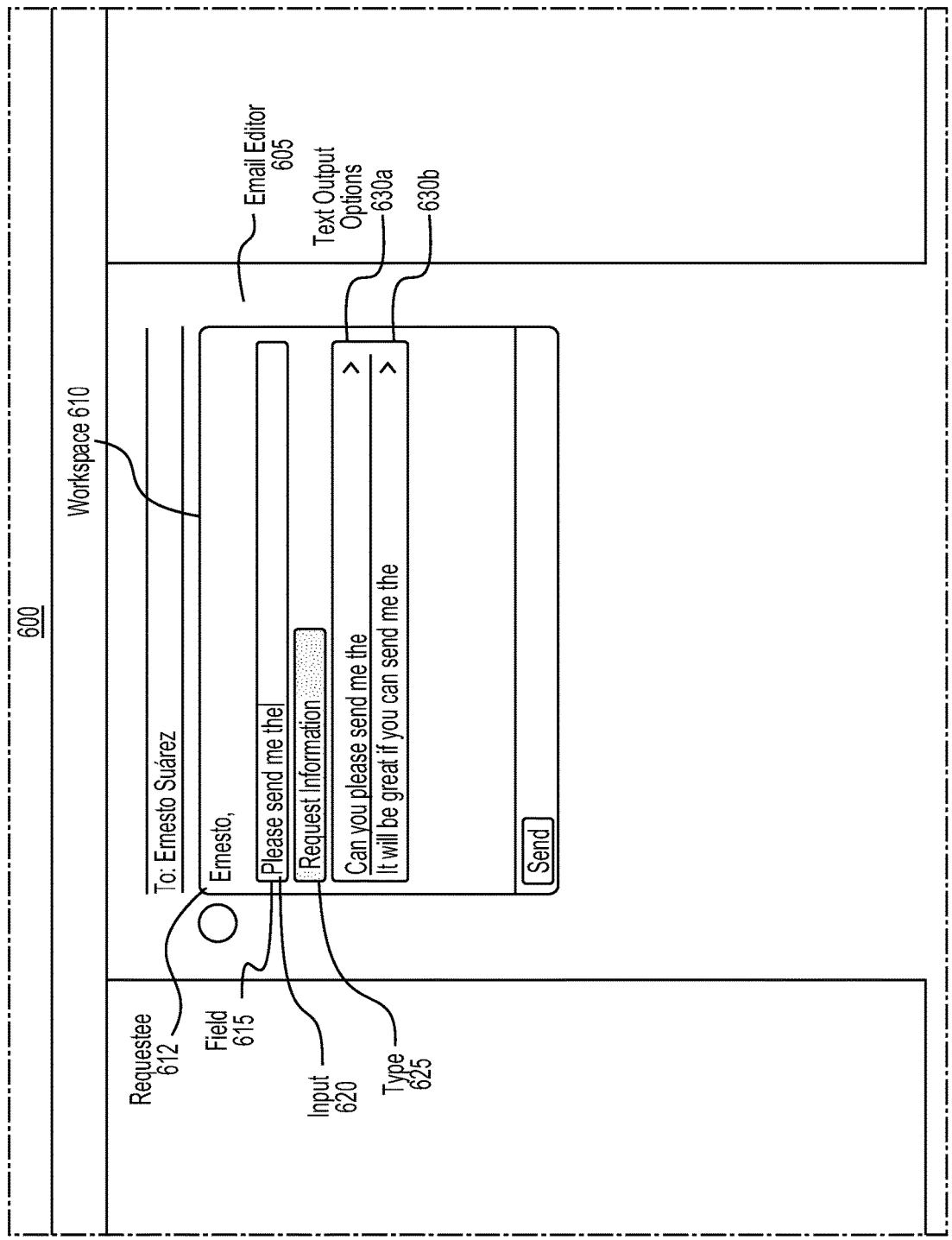
Figure 6D:
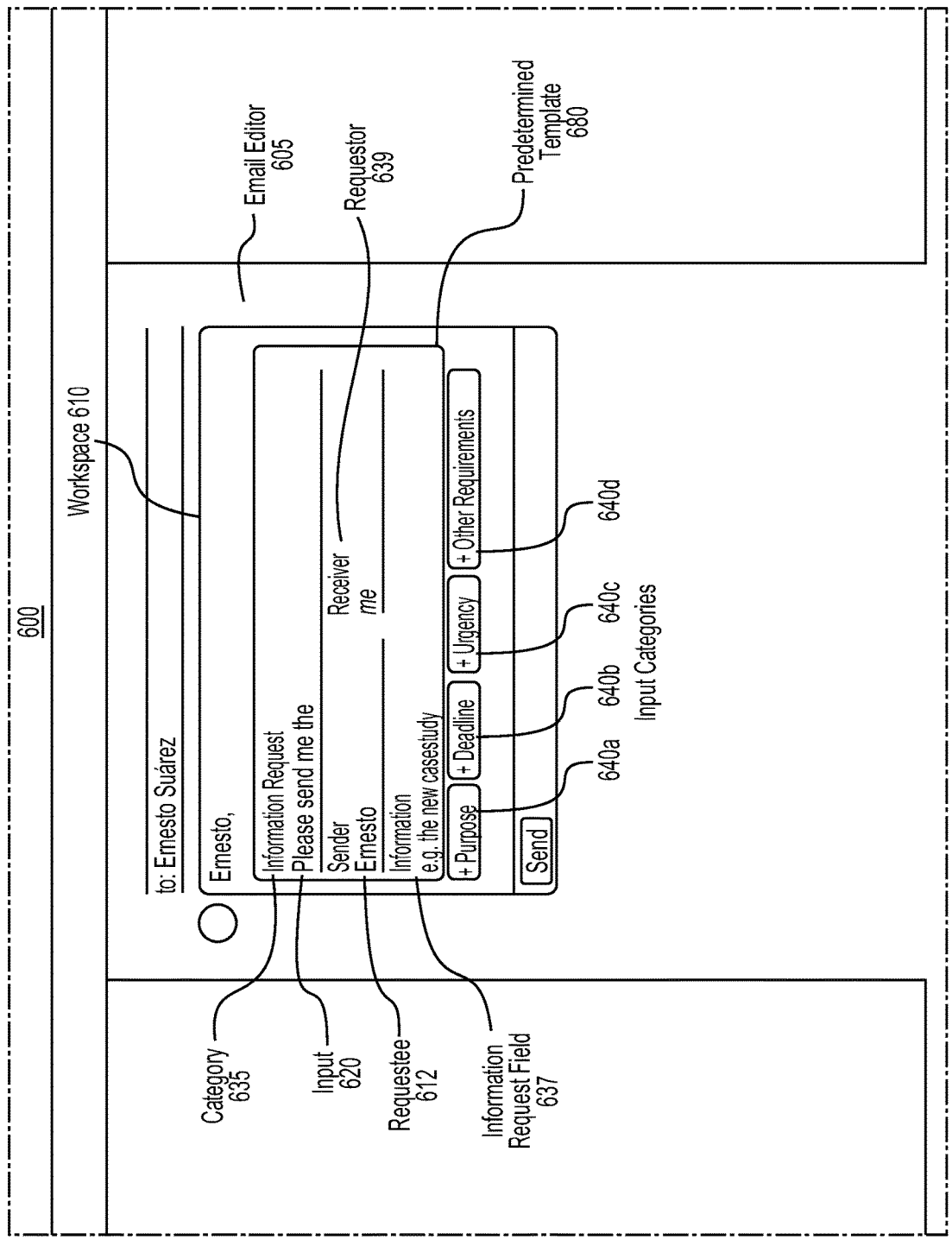
Figure 6E:
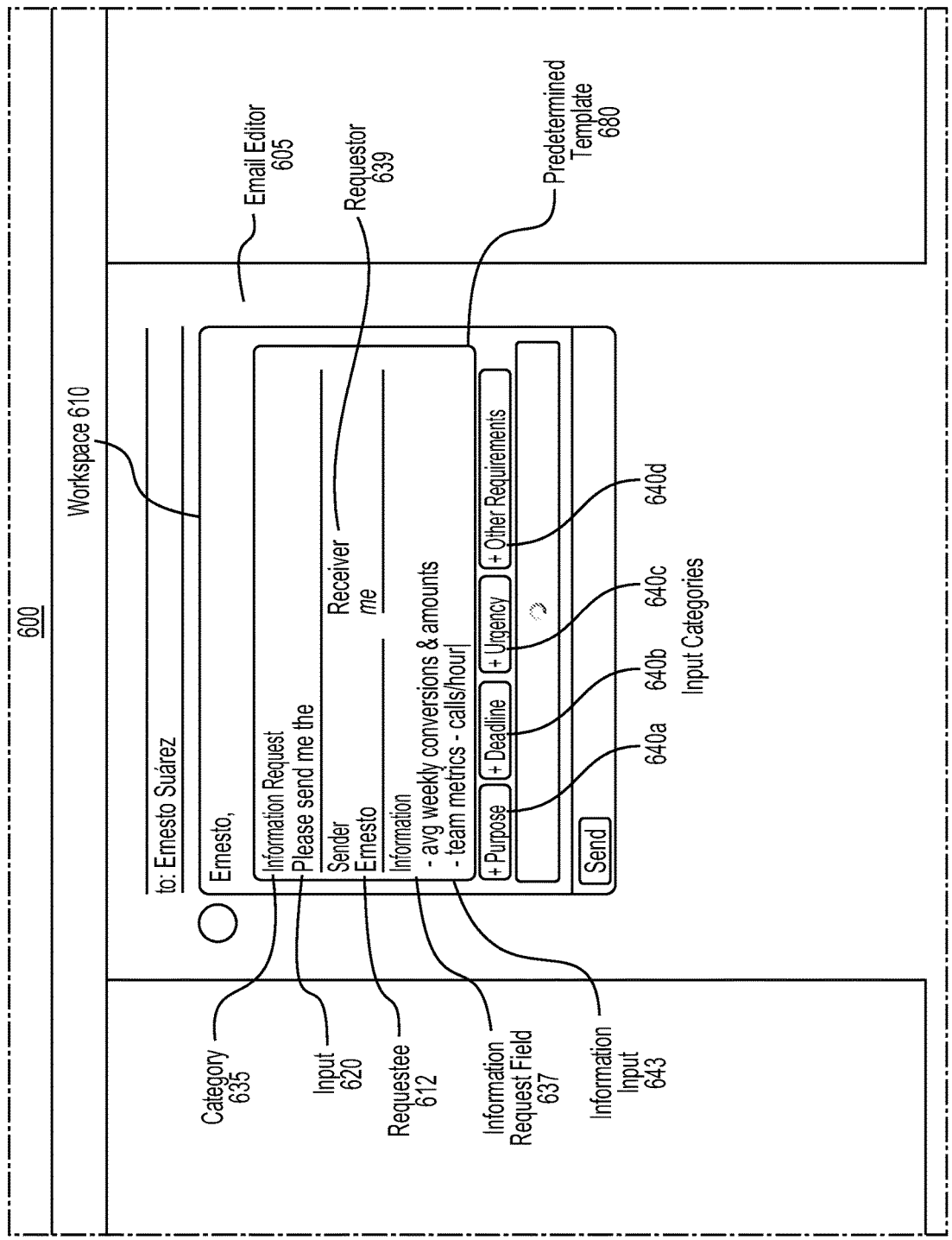
Figure 6F:
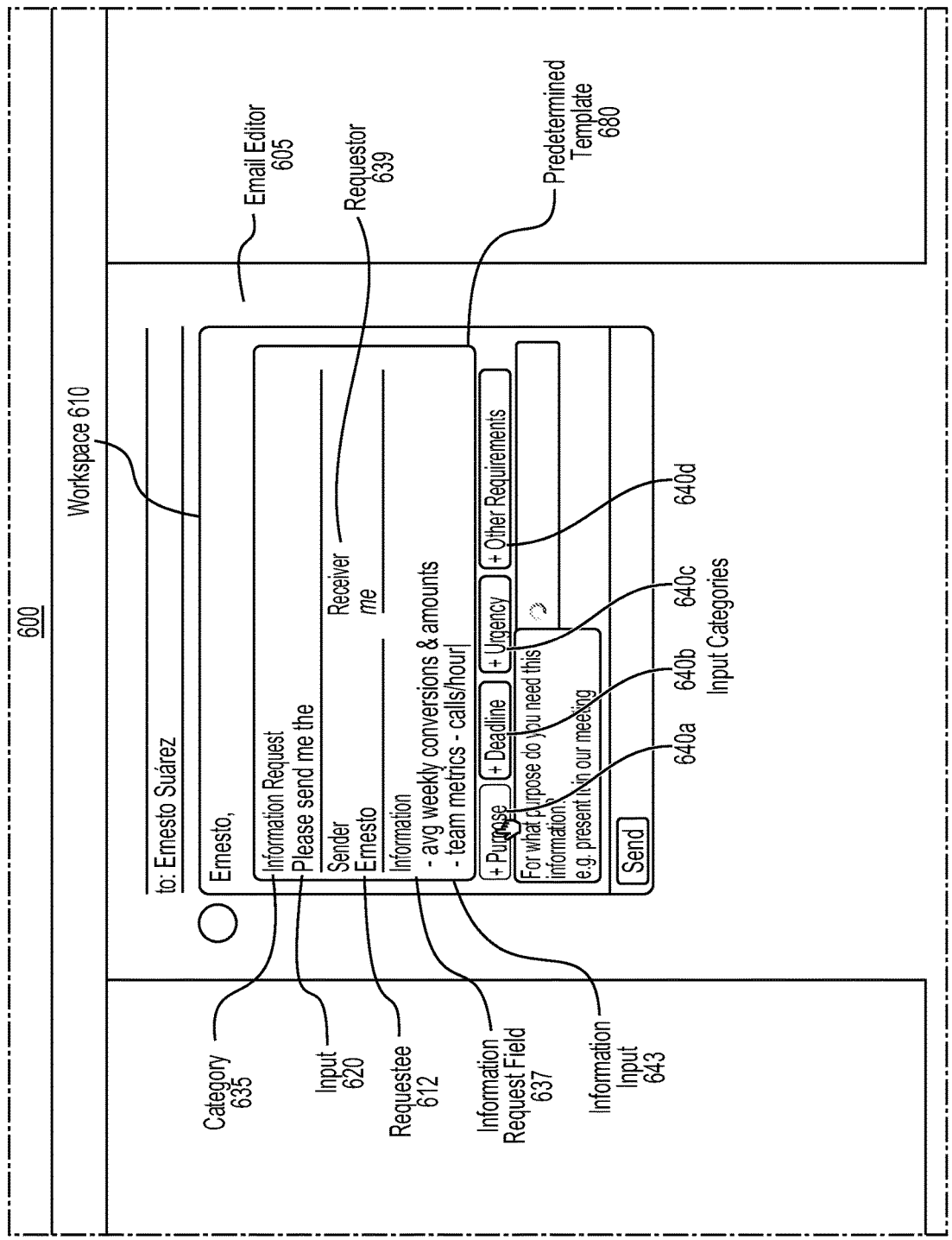
Figure 6G:
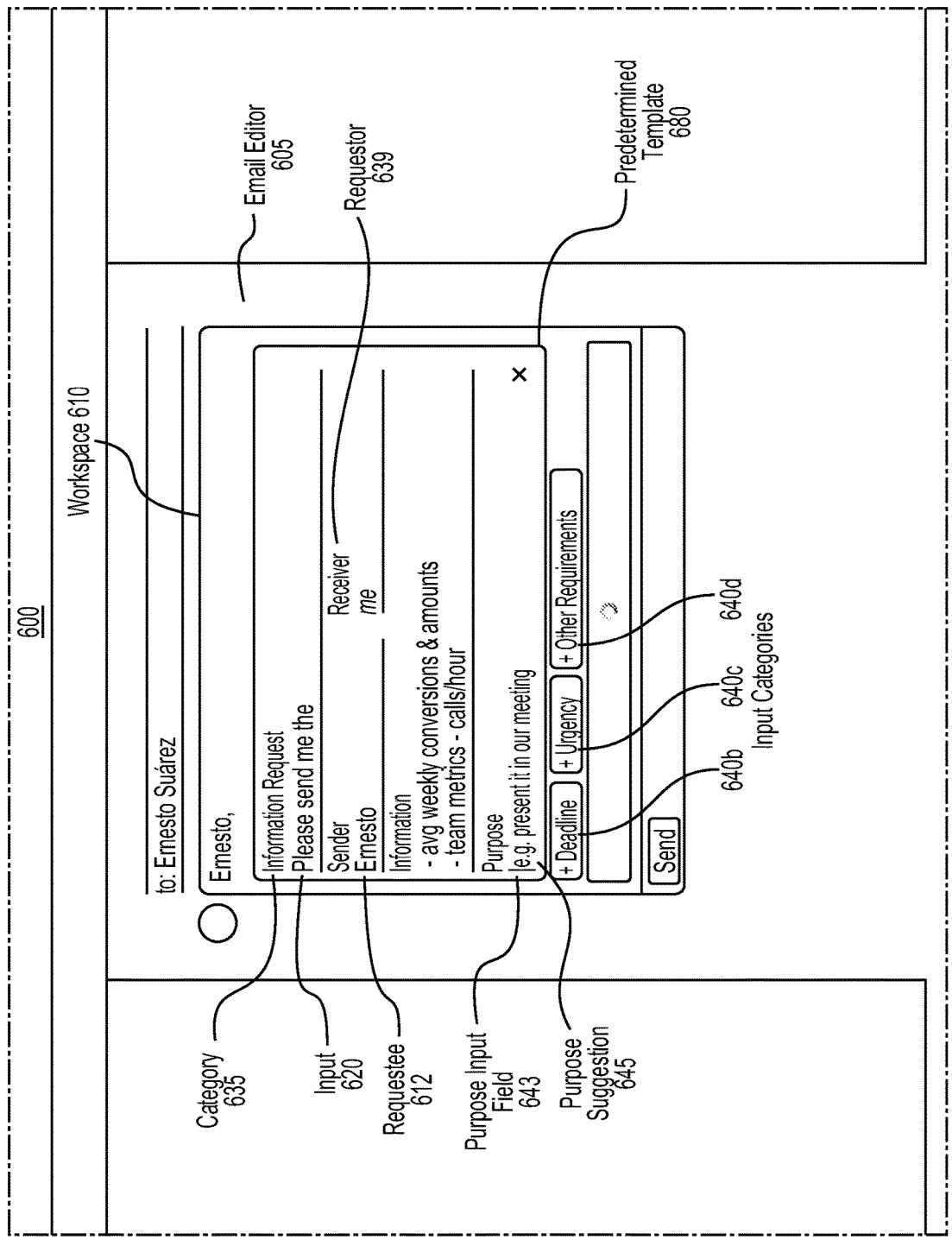
Figure 6H:
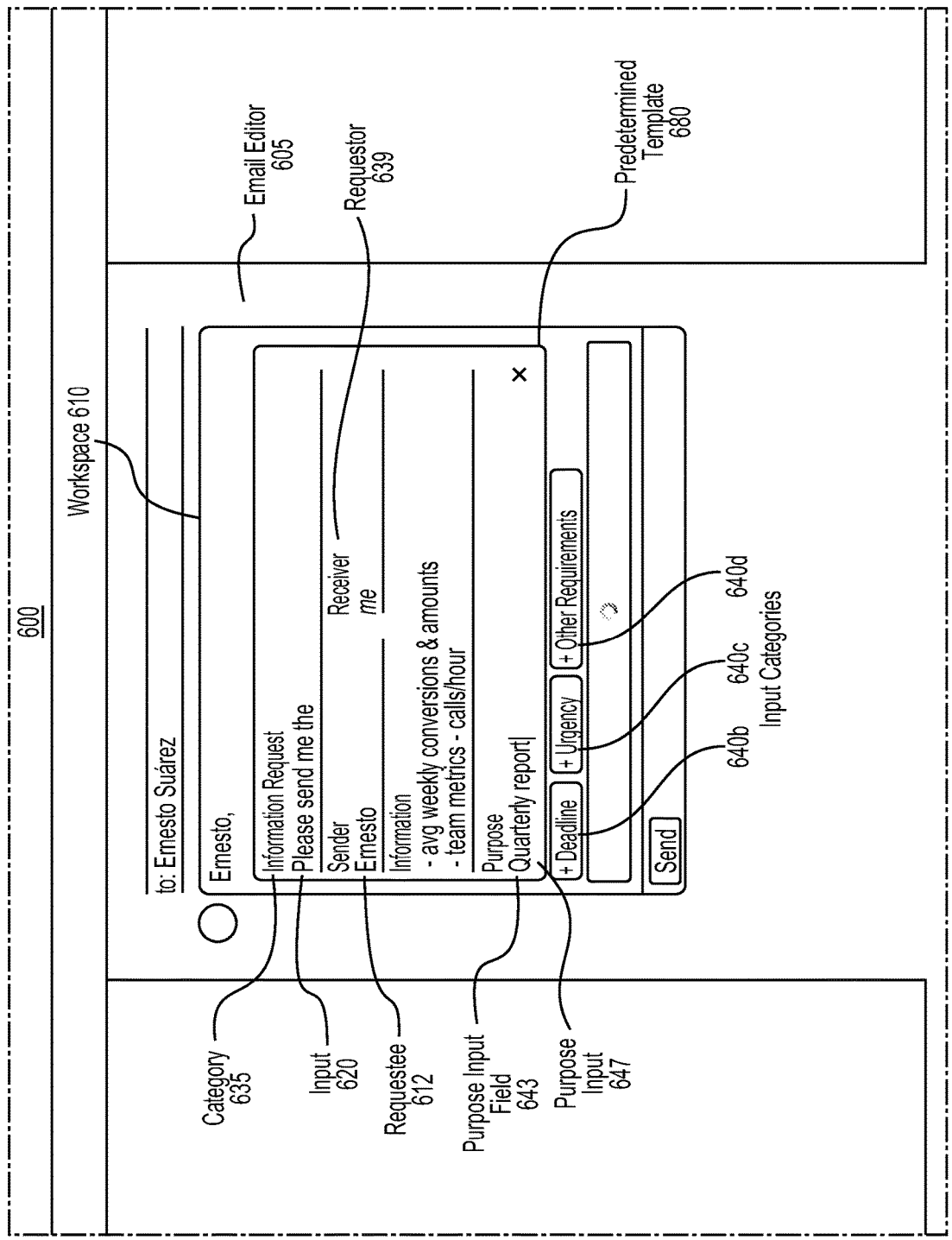
Figure 6I:
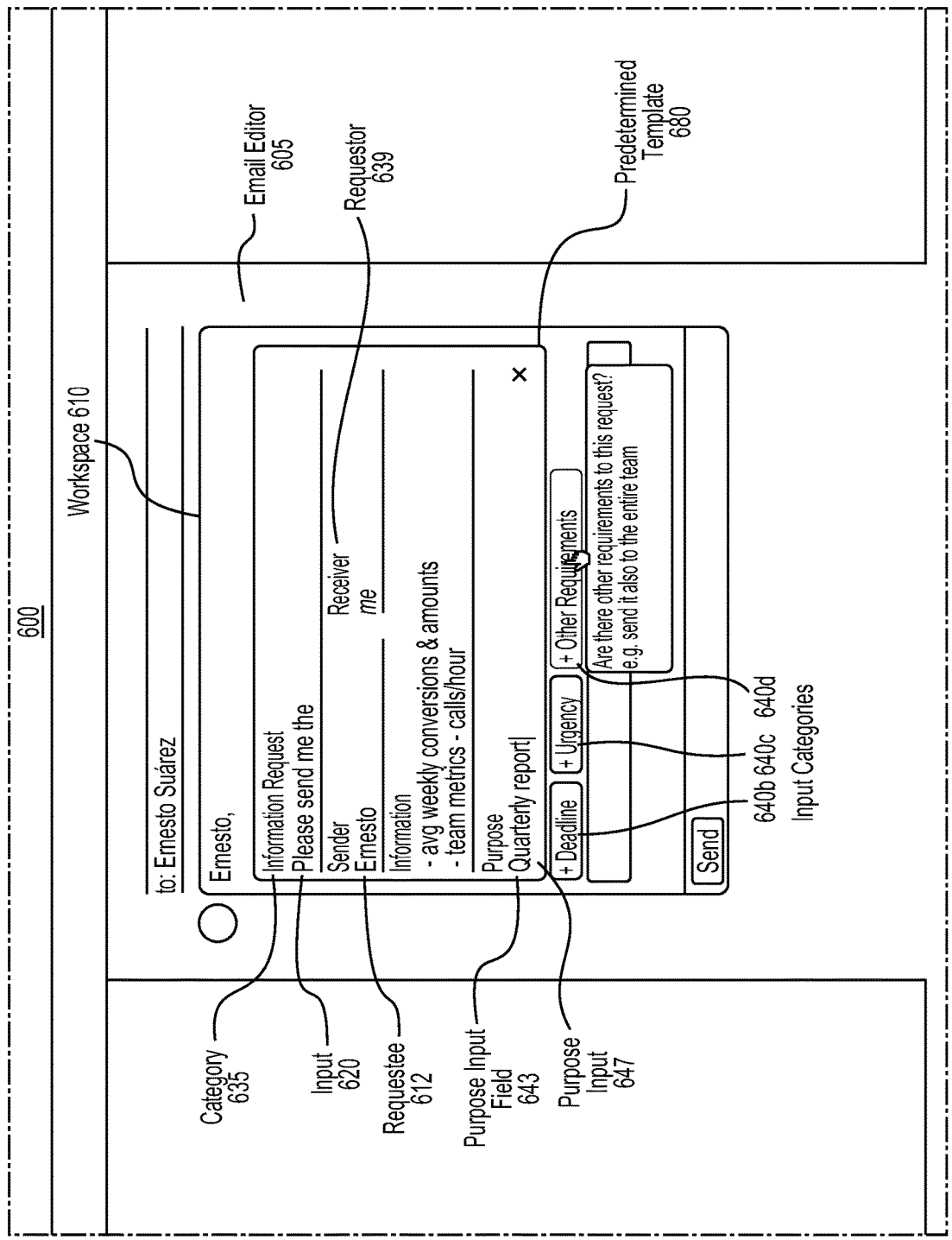
Figure 6J:
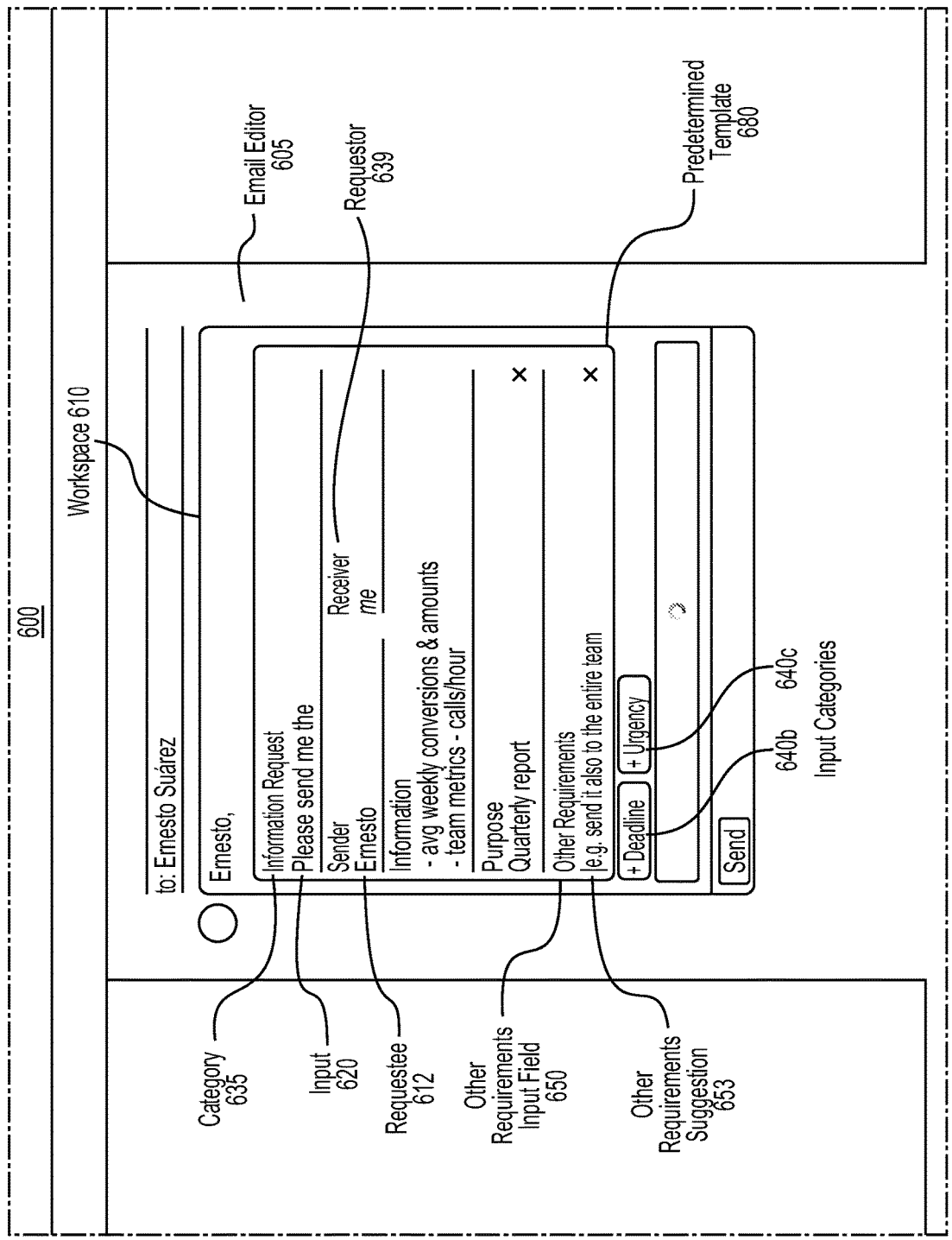
Figure 6K:
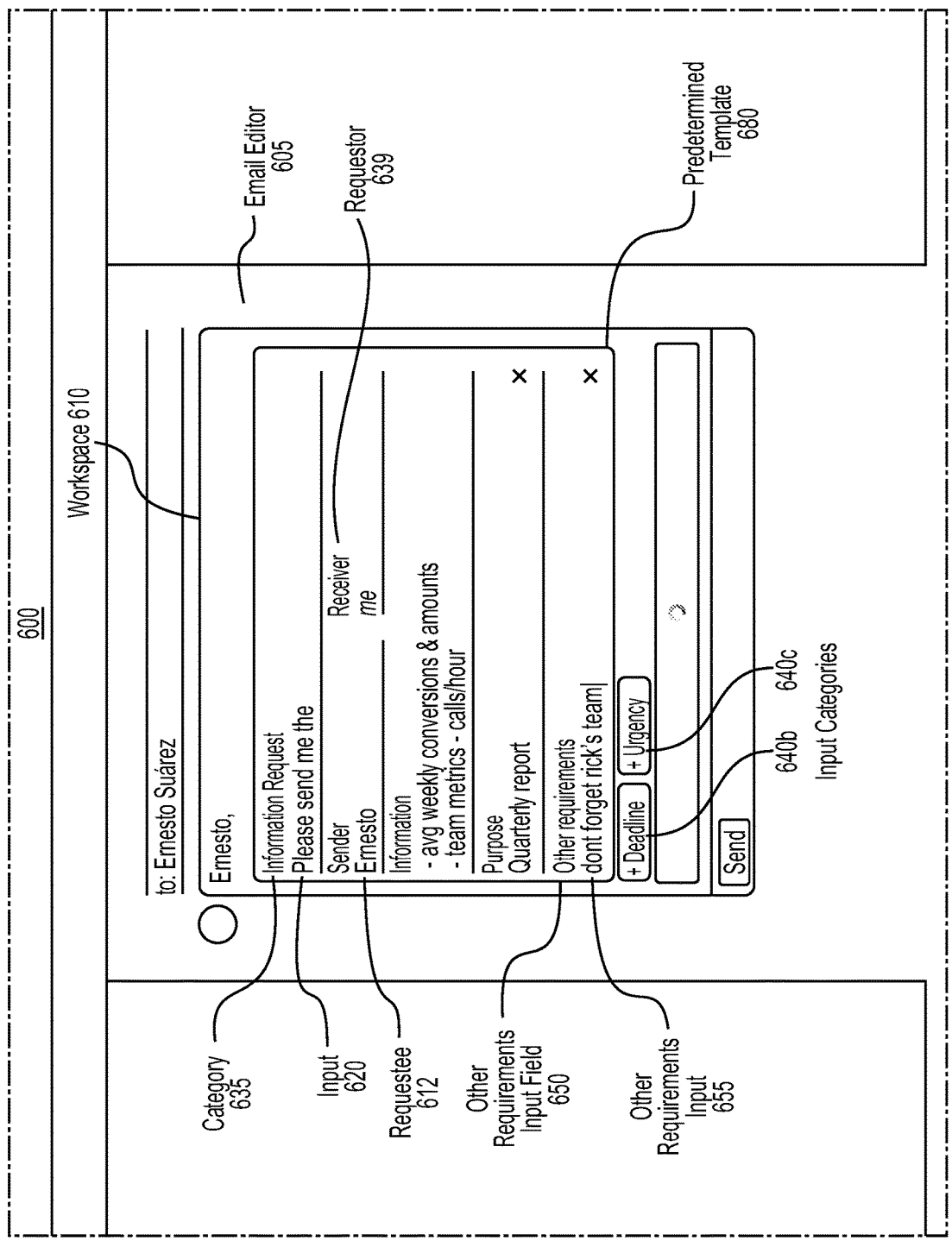
Figure 6I:
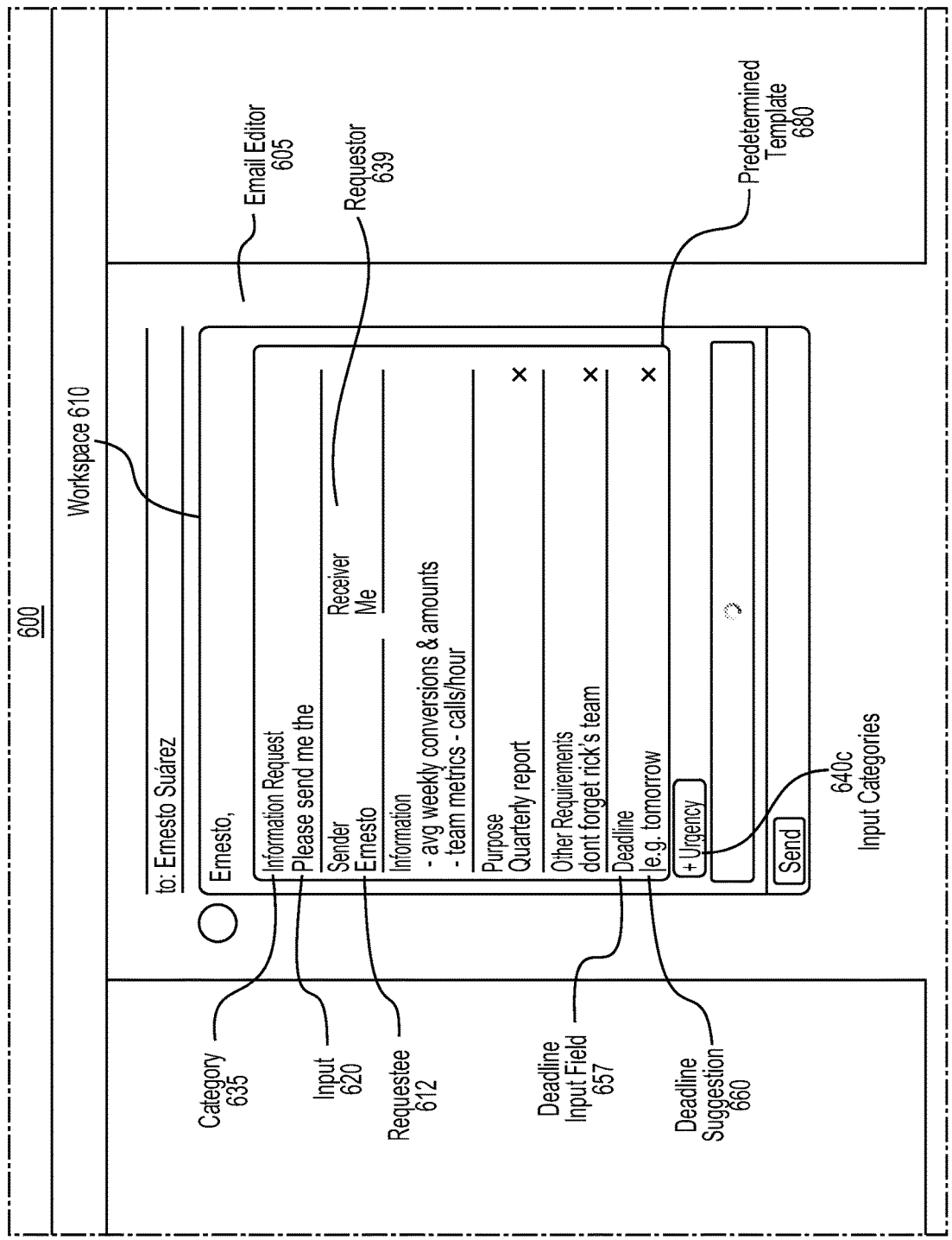
Figure 6M:
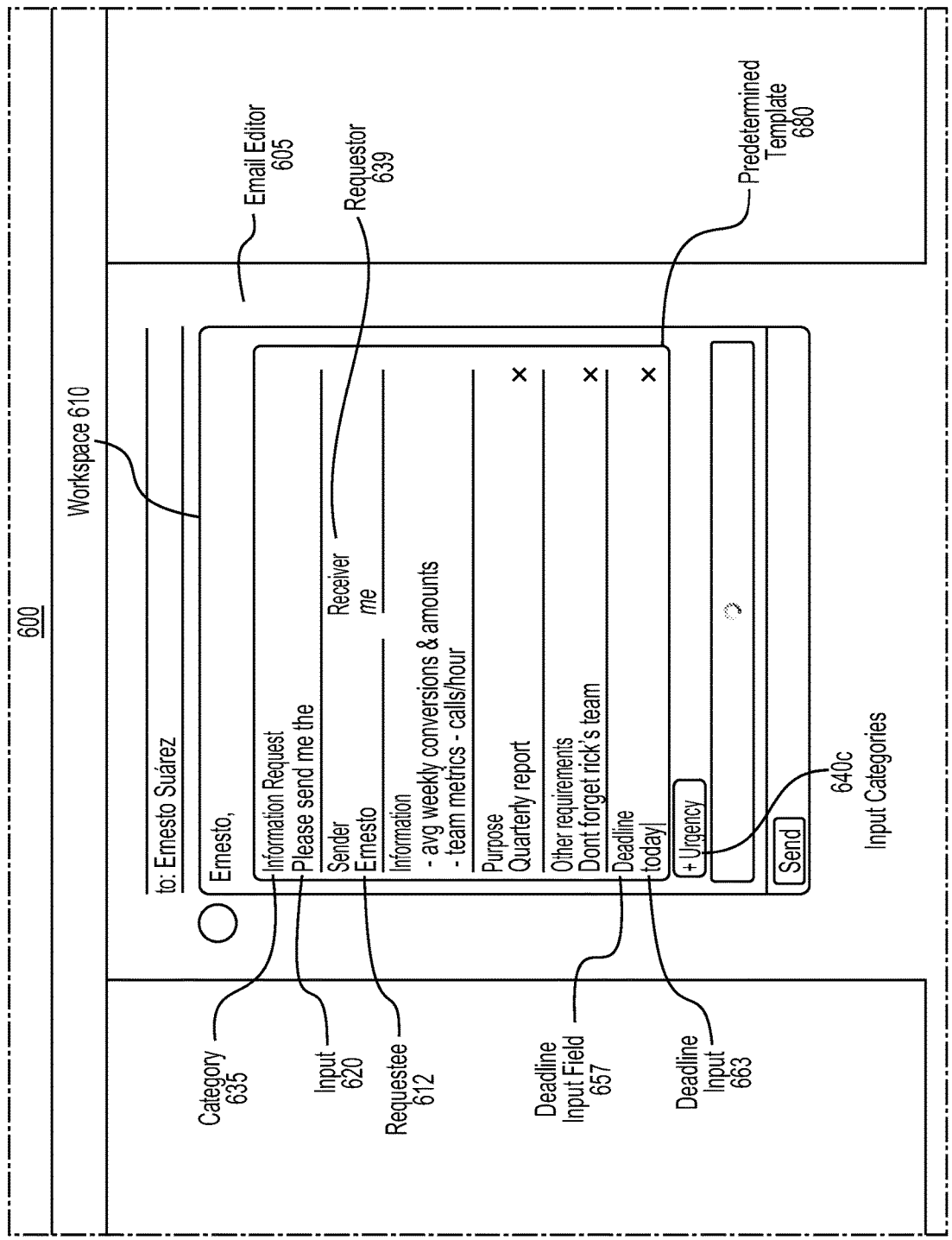
Figure 6N:
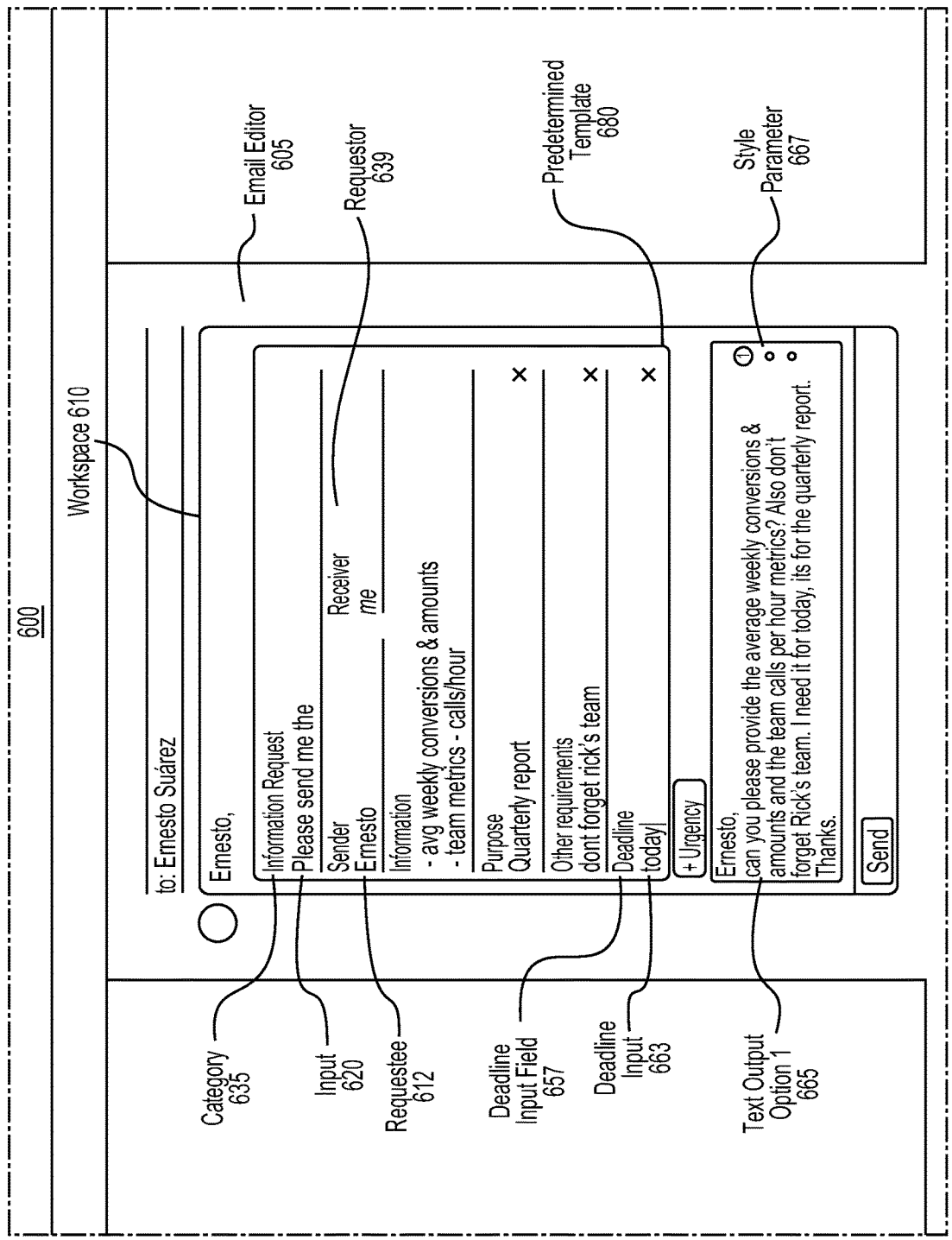
Figure 6O:
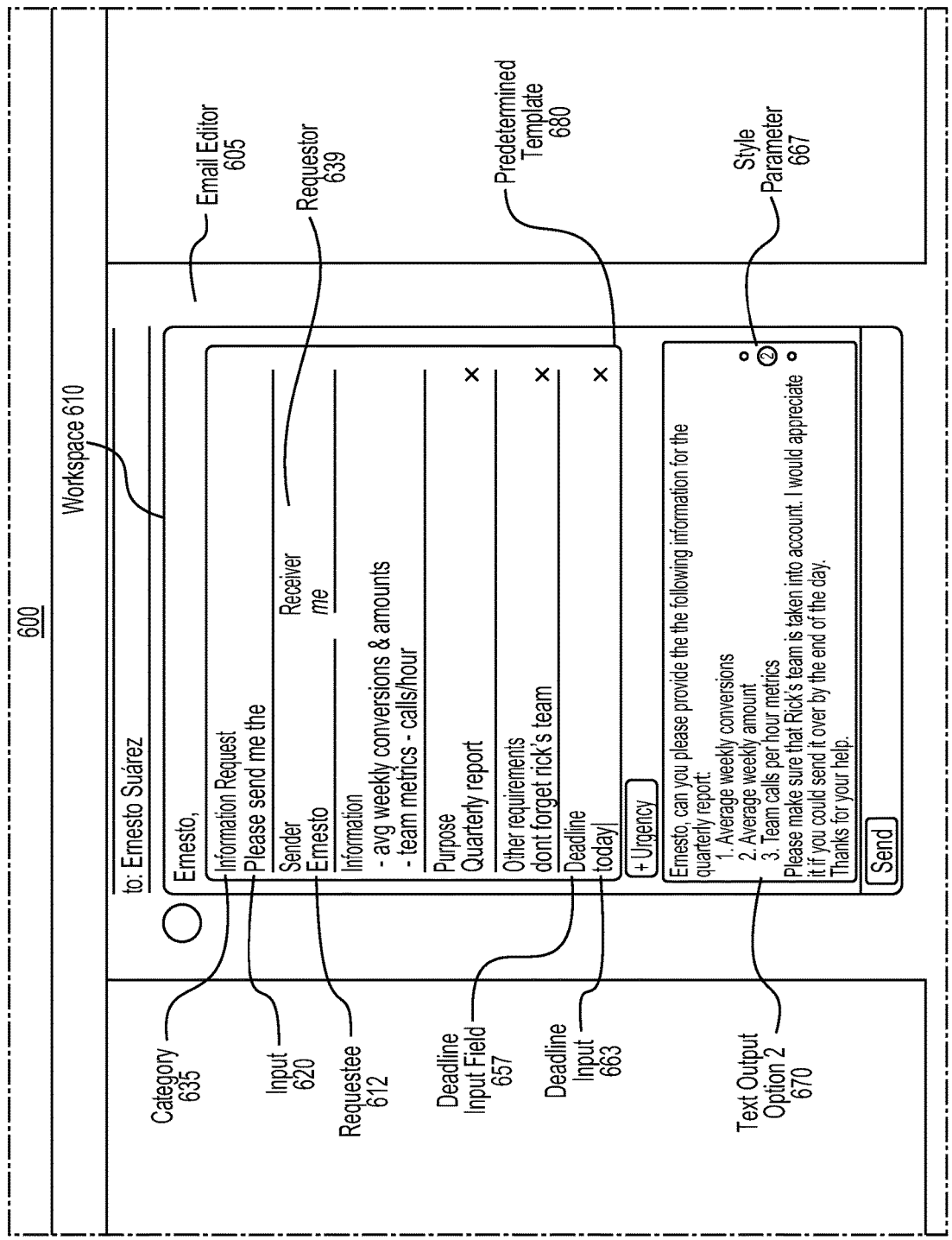

FIGS. 6a-6o provide diagrammatic representations of a writing assistant interface, according to exemplary disclosed embodiments.

FIGS. 7a-7f provide diagrammatic representations of a writing assistant interface, according to exemplary disclosed embodiments.

FIGS. 8a-8d provide diagrammatic representations of a writing assistant interface, according to exemplary disclosed embodiments.

Figure 9A:
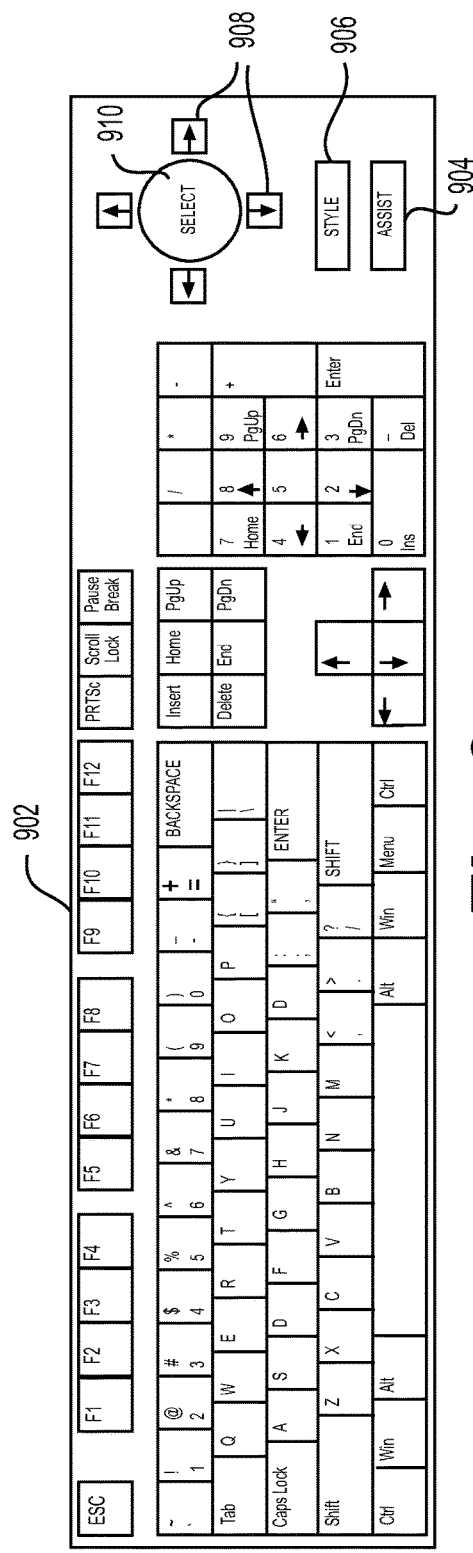

FIG. 9a illustrates an exemplary keyboard for use with the disclosed writing assistant.

Figure 9B:
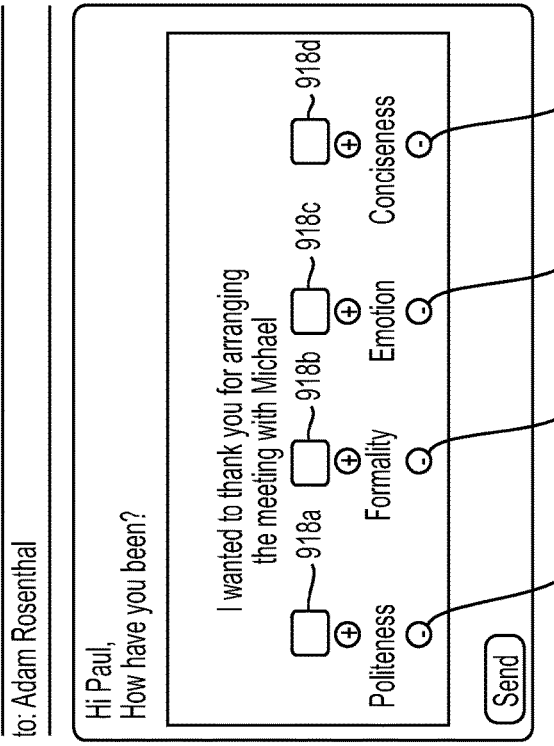
Figure 9C:
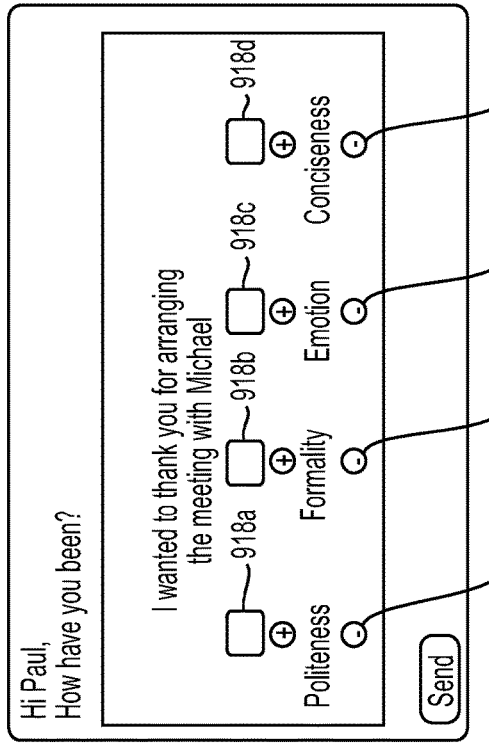

FIGS. 9b and 9c illustrate interface elements controllable using control features associated with the keyboard of FIG. 9a.

Figure 10A:
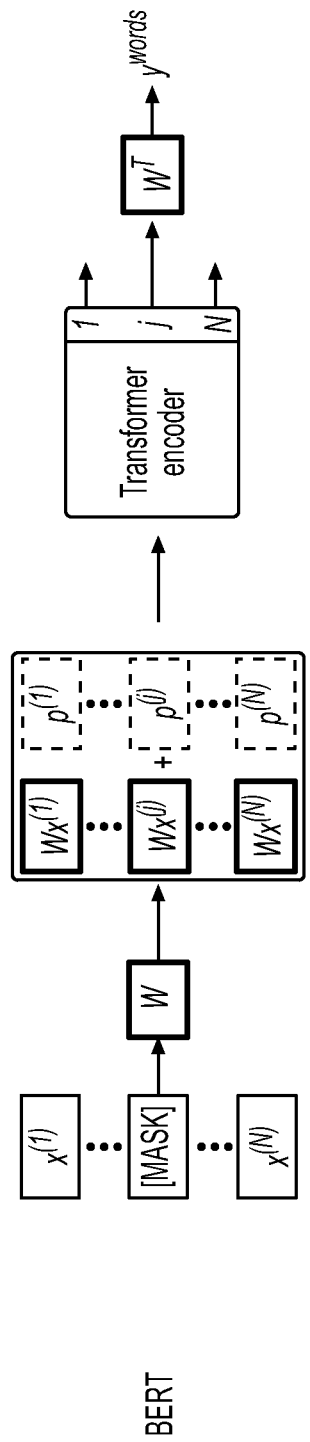
Figure 10B:
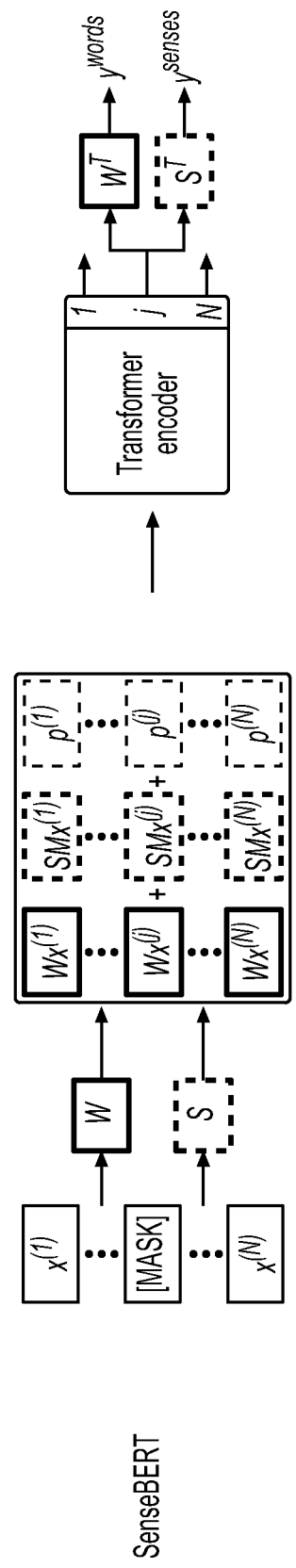

FIGS. 10a and 10b provide diagrammatic representations of a masked-word supersense prediction task, according to exemplary disclosed embodiments.

Figure 11A:
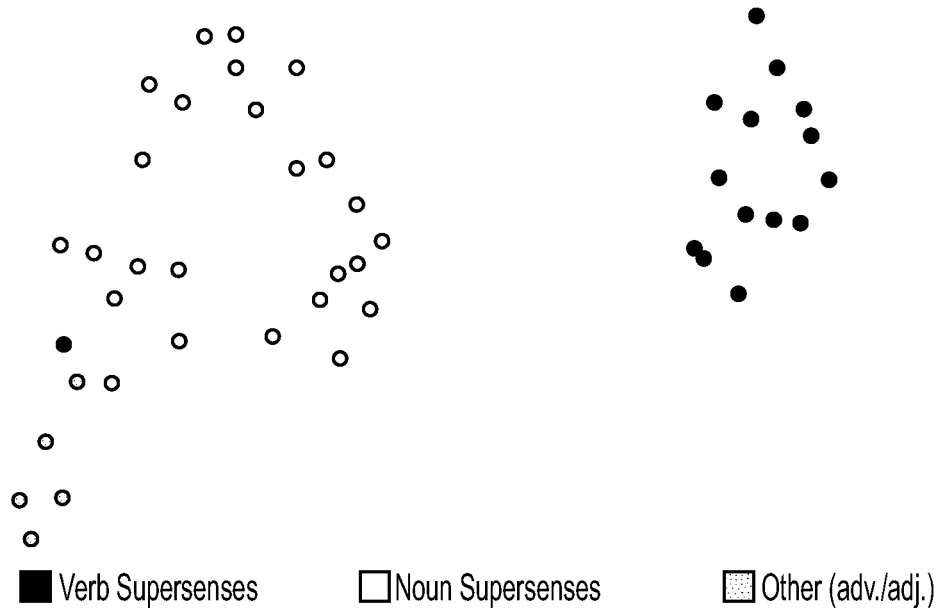
Figure 11B:
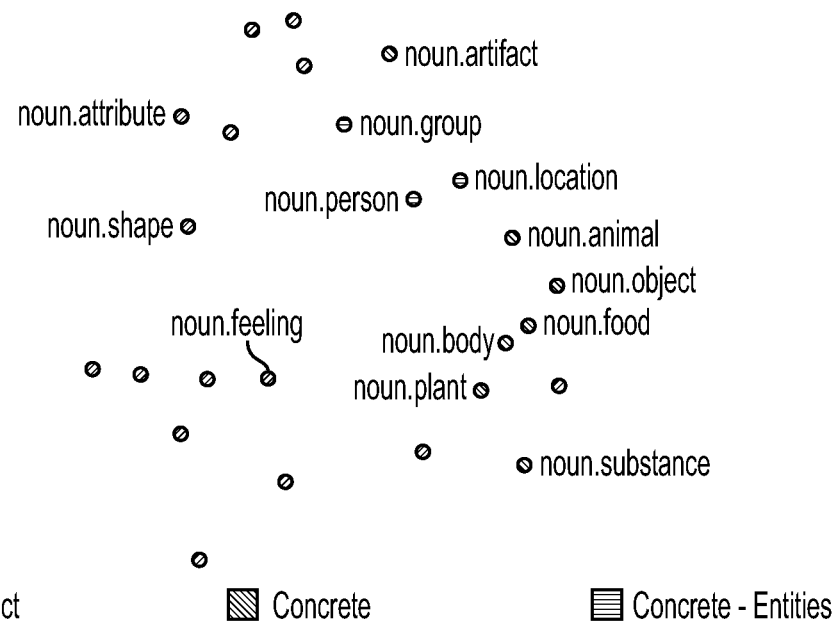

FIGS. 11a and 11b provide diagrammatic visualizations of exemplary supersense vectors learned by SenseBERT at pre-training.

Figures 12A, 12B:
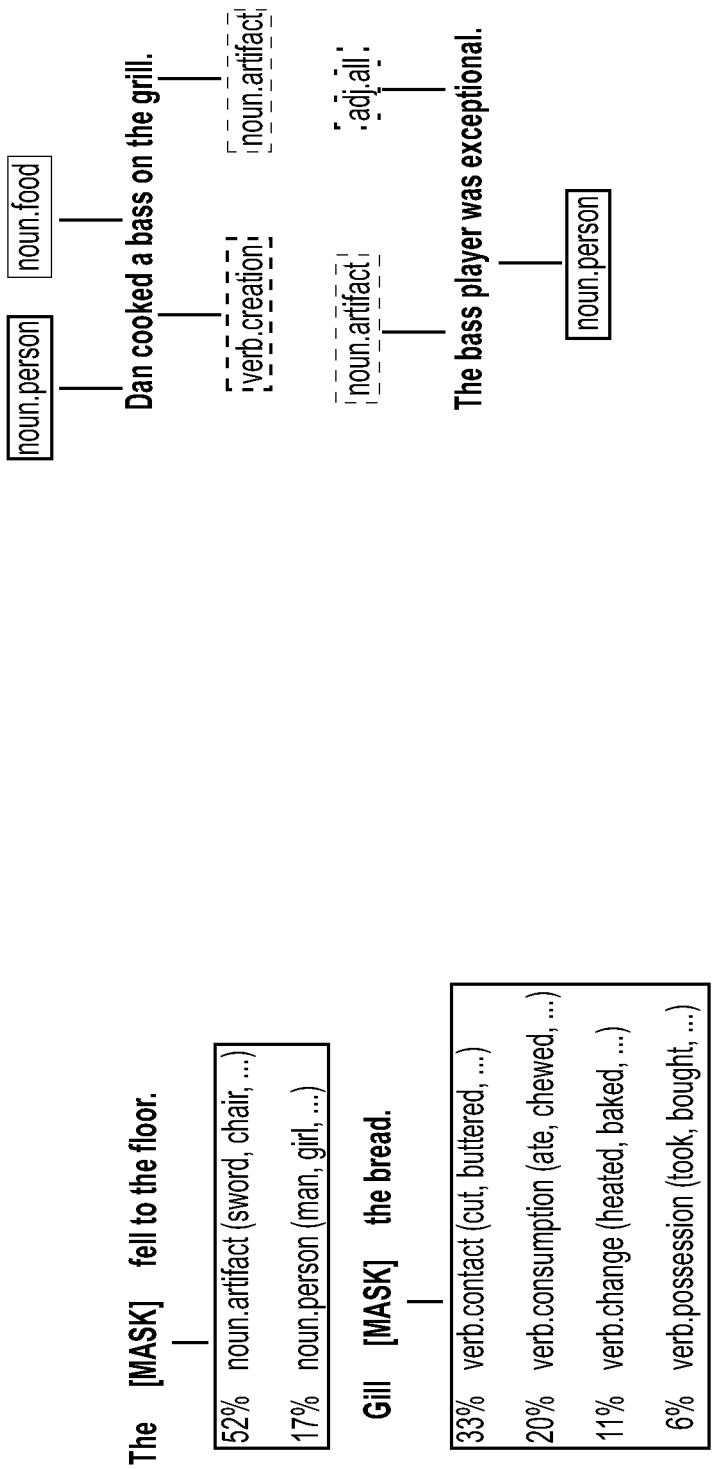

FIGS. 12a and 12b provide diagrammatic representations of supersense probabilities assigned to a masked position within context (part a) and examples of SenseBERT's prediction on raw text (part b).

Figure 13:
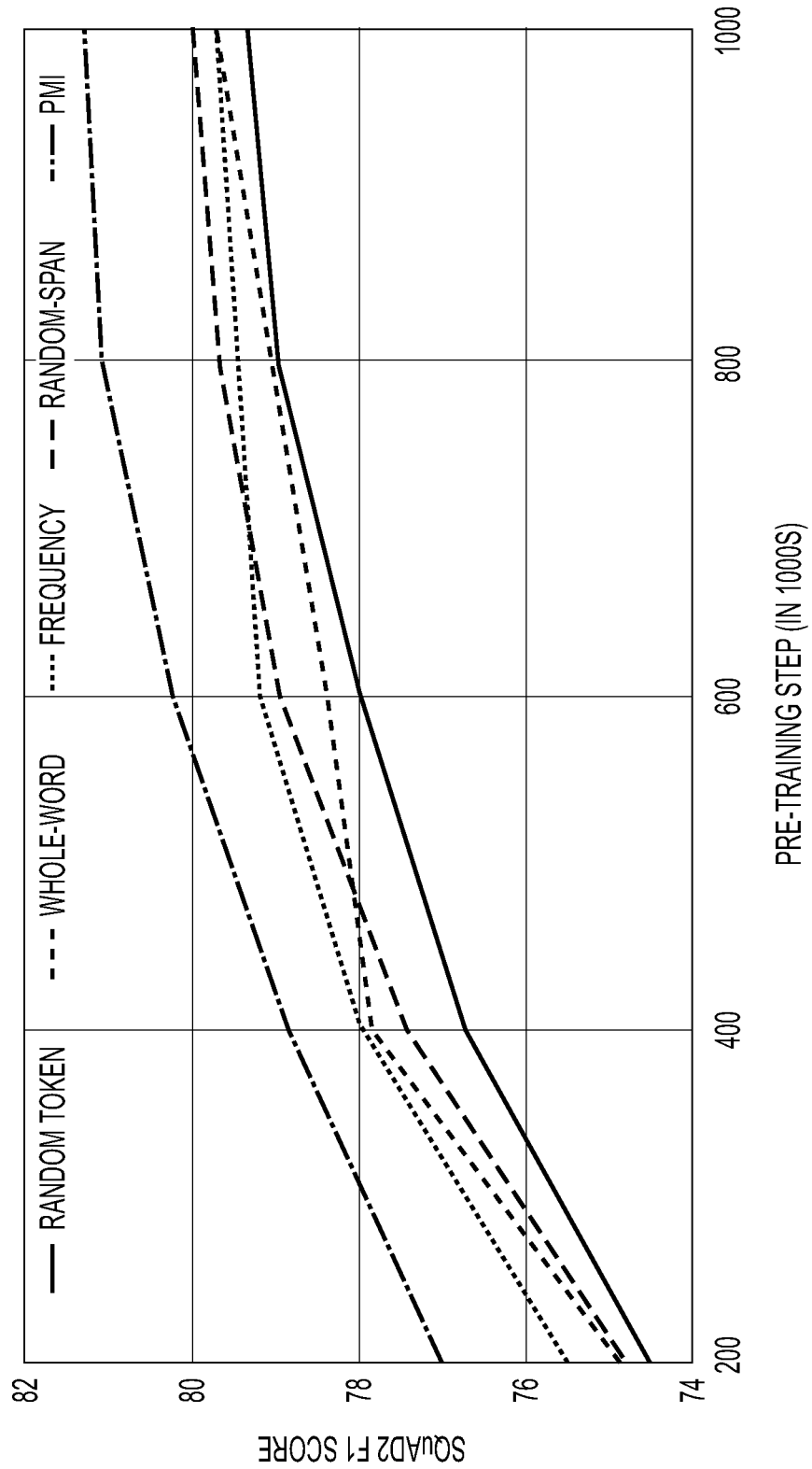

FIG. 13 provides a graphical representation of PMI Masking performance compared to performance offered by other types of masking.

Figure 14:
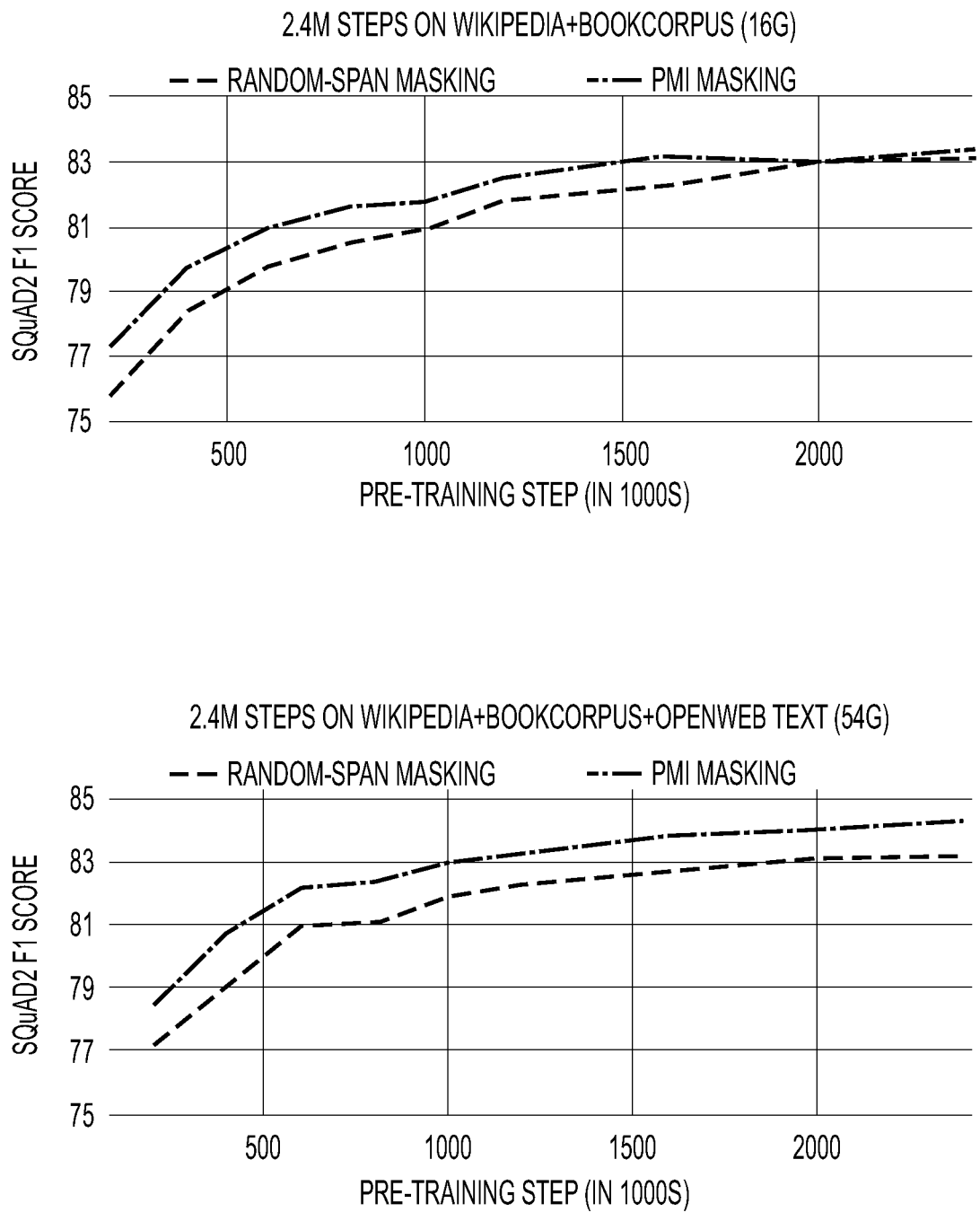

FIG. 14 provides a graphical representation of PMI Masking performance compared to Random-Span Masking performance.

FIGS. 15-19 represent certain aspects of the text insertion feature of the automated writing assistant tool according to exemplary disclosed embodiments.

FIGS. 19-23 provide illustrations associated with a representative example of the comment auto-resolution feature of the disclosed writing assistant tool.

FIG. 24 provides an example of the text usage validation functionality of the writing assistant tool according to exemplary disclosed embodiments.

Figure 25:
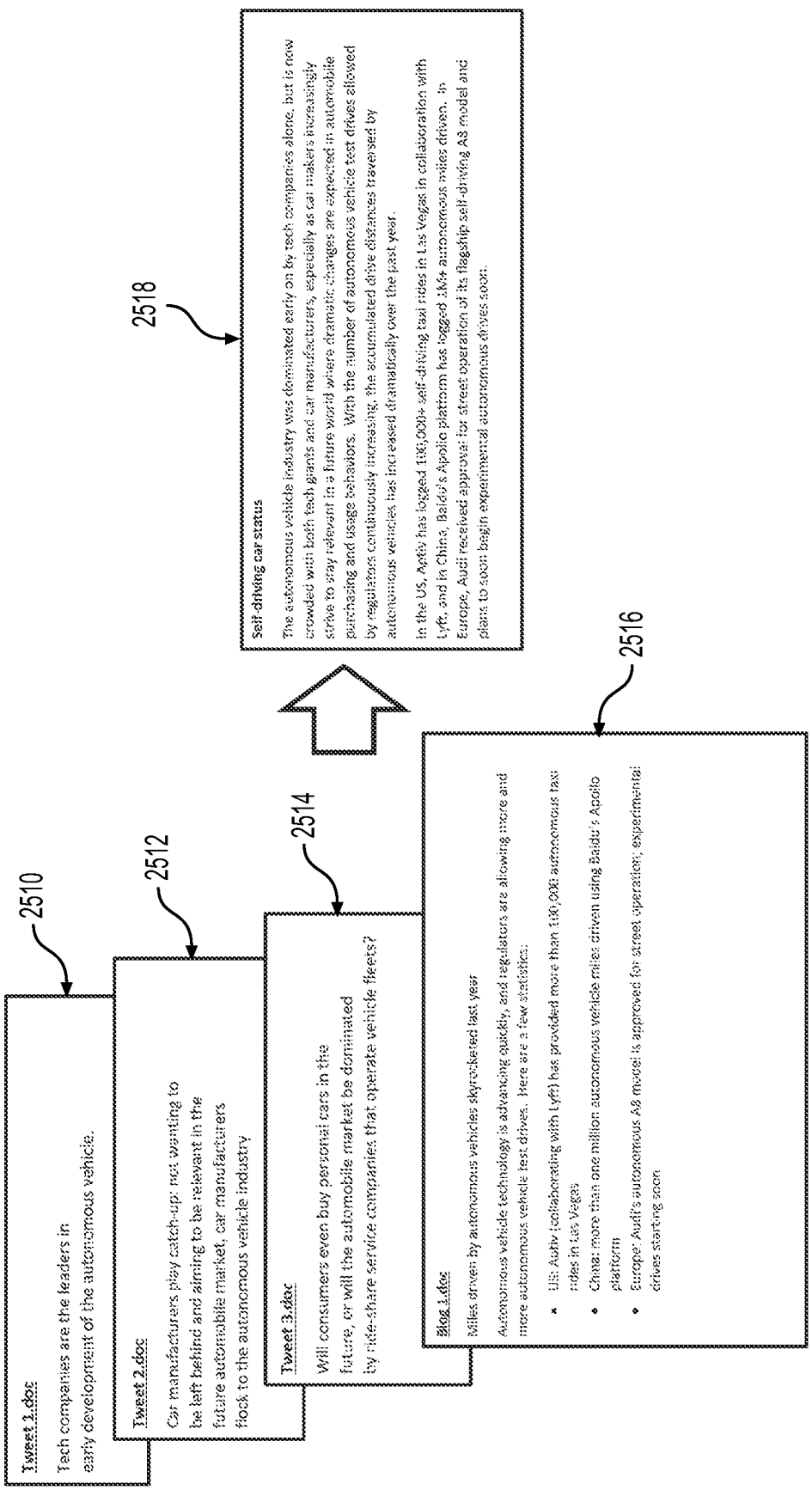

FIG. 25 illustrates an example of the document merging and re-purposing functionality according to exemplary disclosed embodiments of the writing assistant tool.

FIGS. 26-35 provide examples of user interfaces of the writing assistant tool according to exemplary disclosed embodiments.

Figure 36:
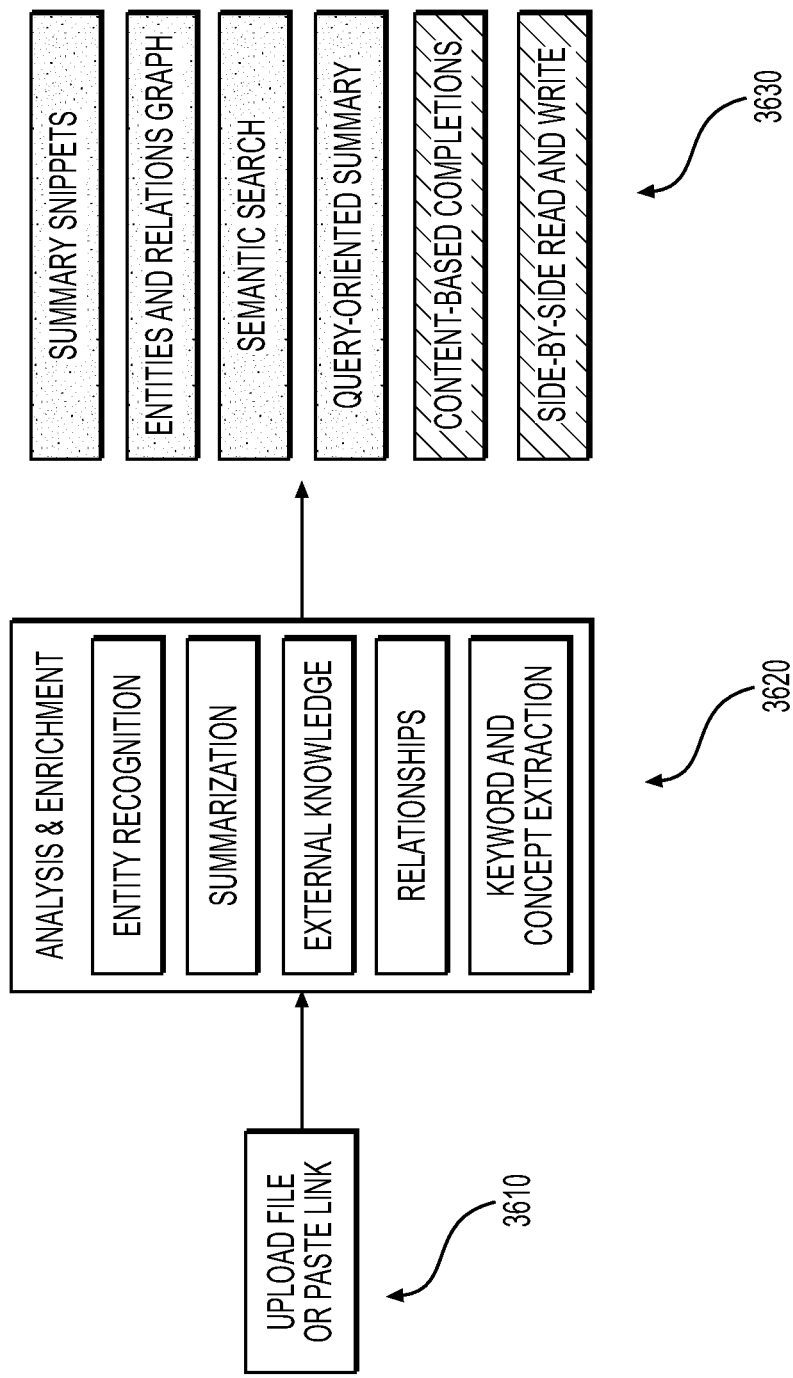

FIG. 36 represents an example operation flow associated with a reading assistant tool according to exemplary disclosed embodiments.

Figure 37:
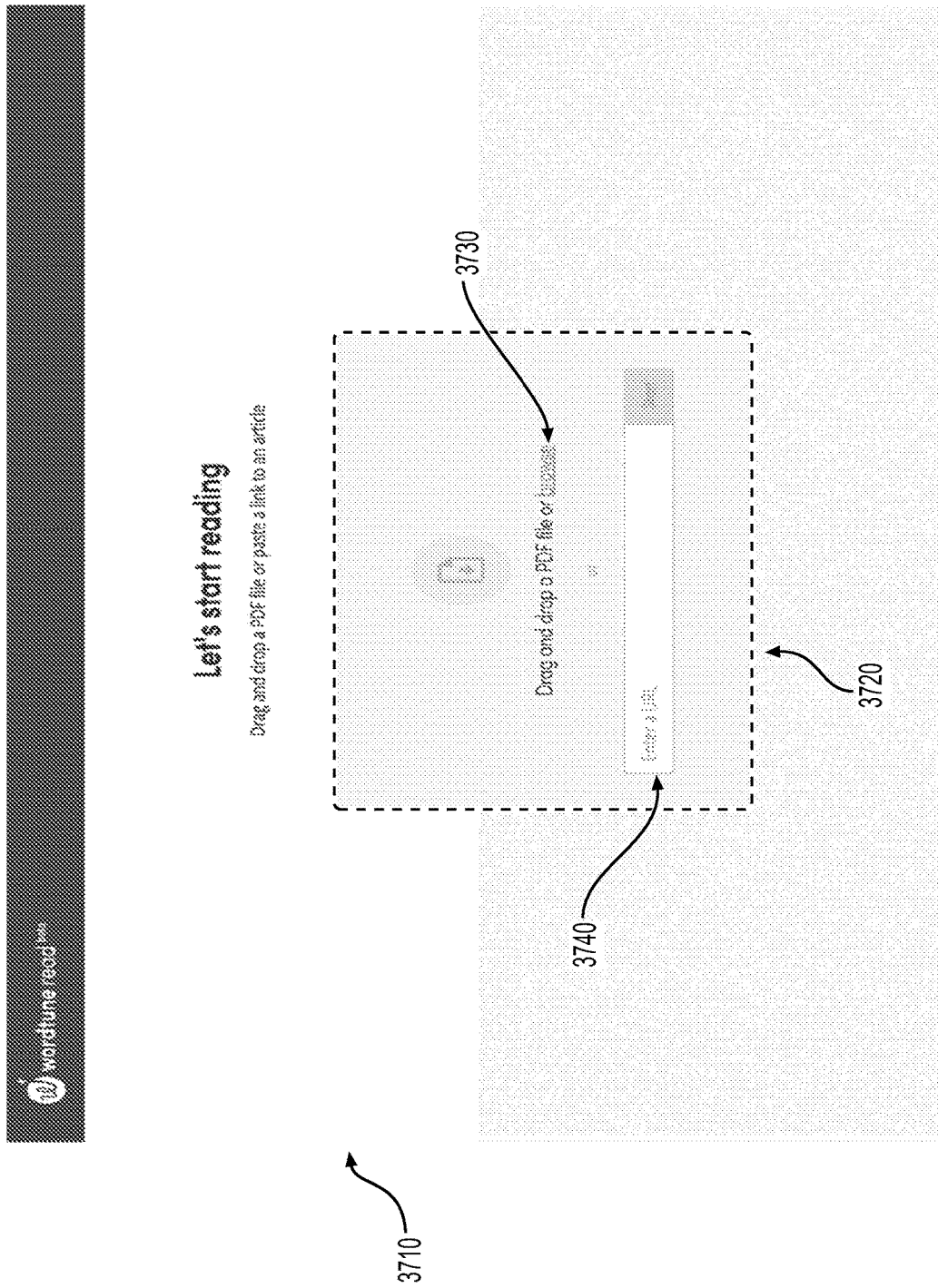

FIG. 37 represents an example of an initial document intake interface of a reading assistant tool according to exemplary disclosed embodiments.

Figure 38:
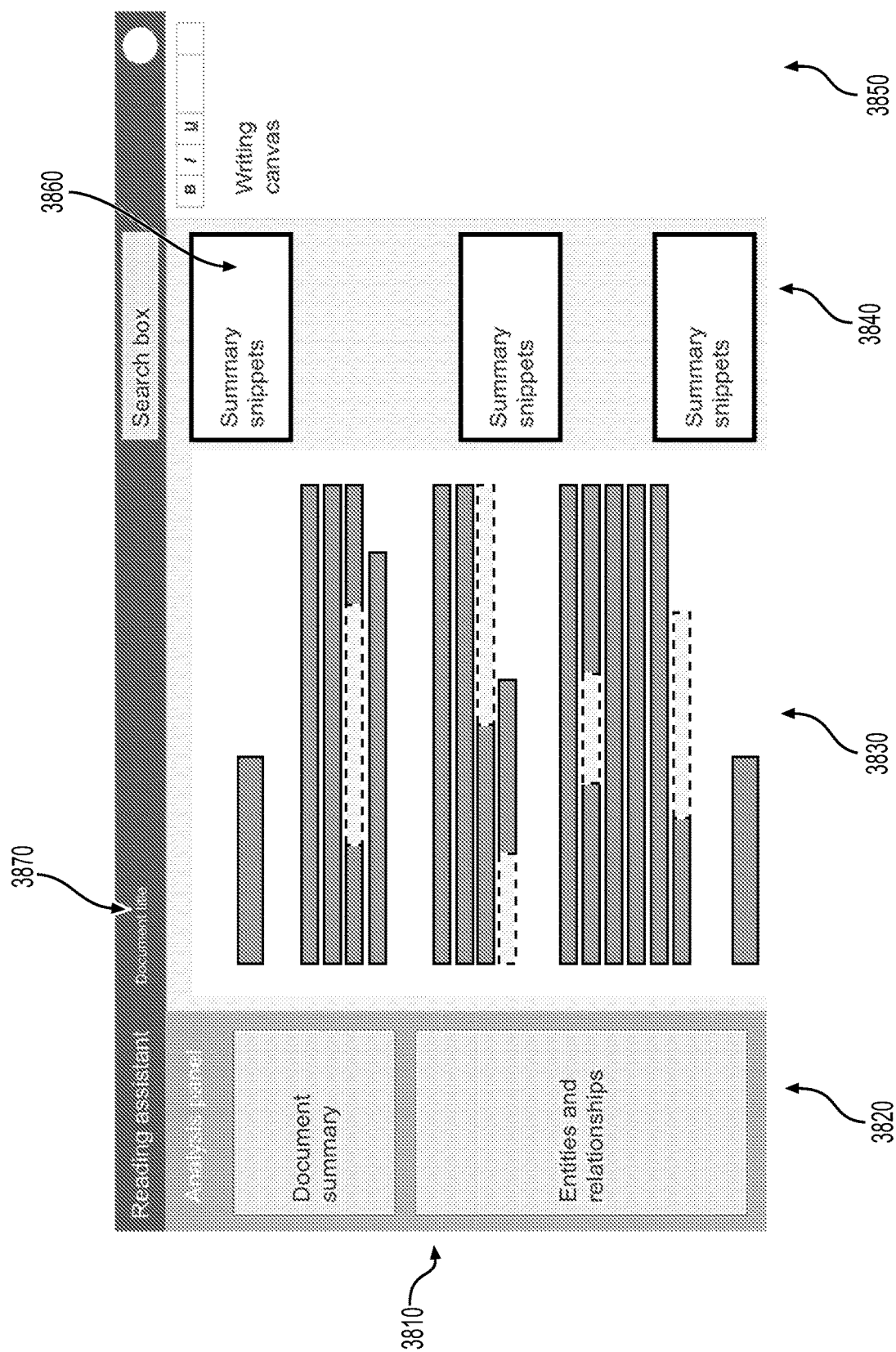

FIG. 38 represents an example of a generic summary window interface of a reading assistant tool according to exemplary disclosed embodiments.

Figure 39:
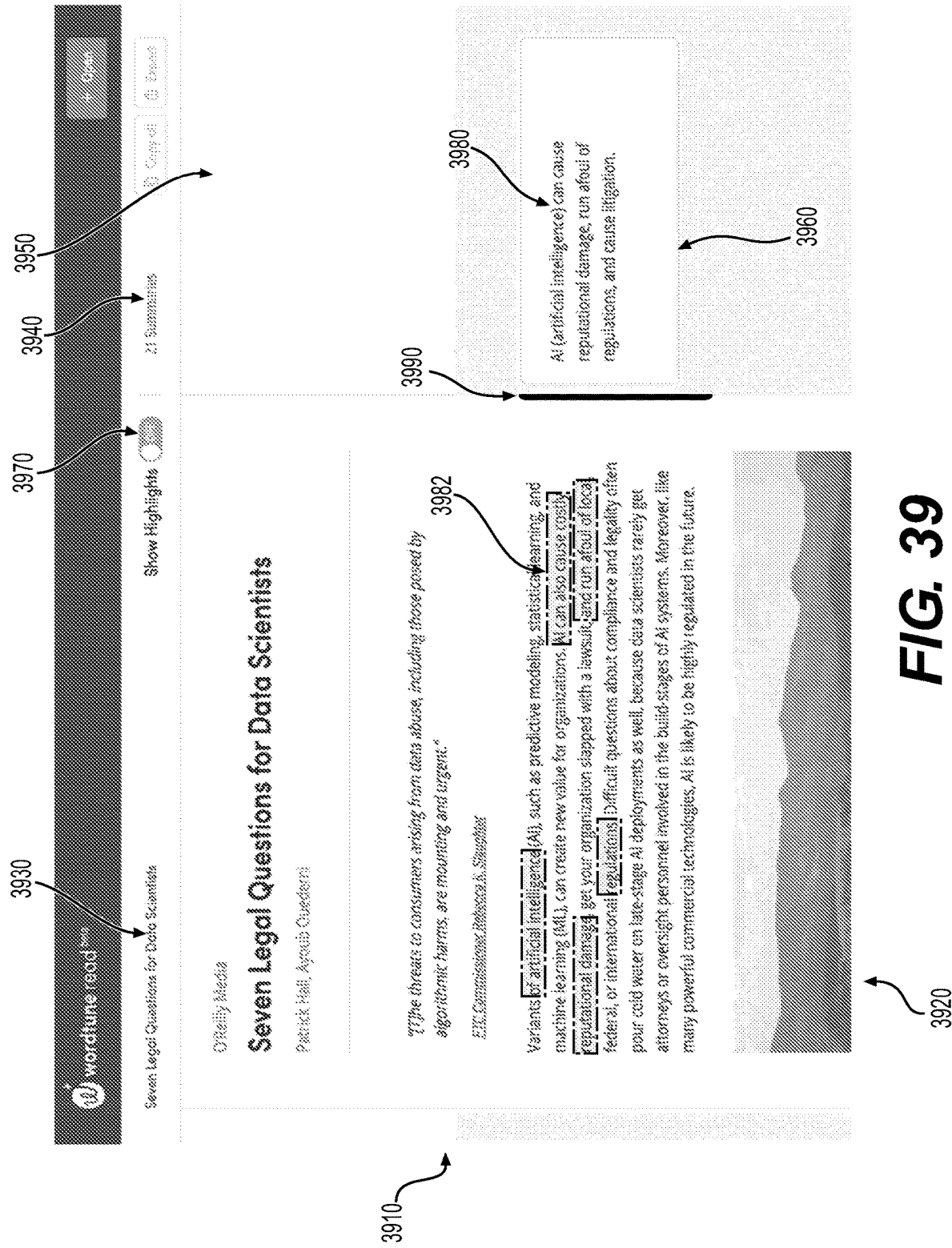
Figure 40:
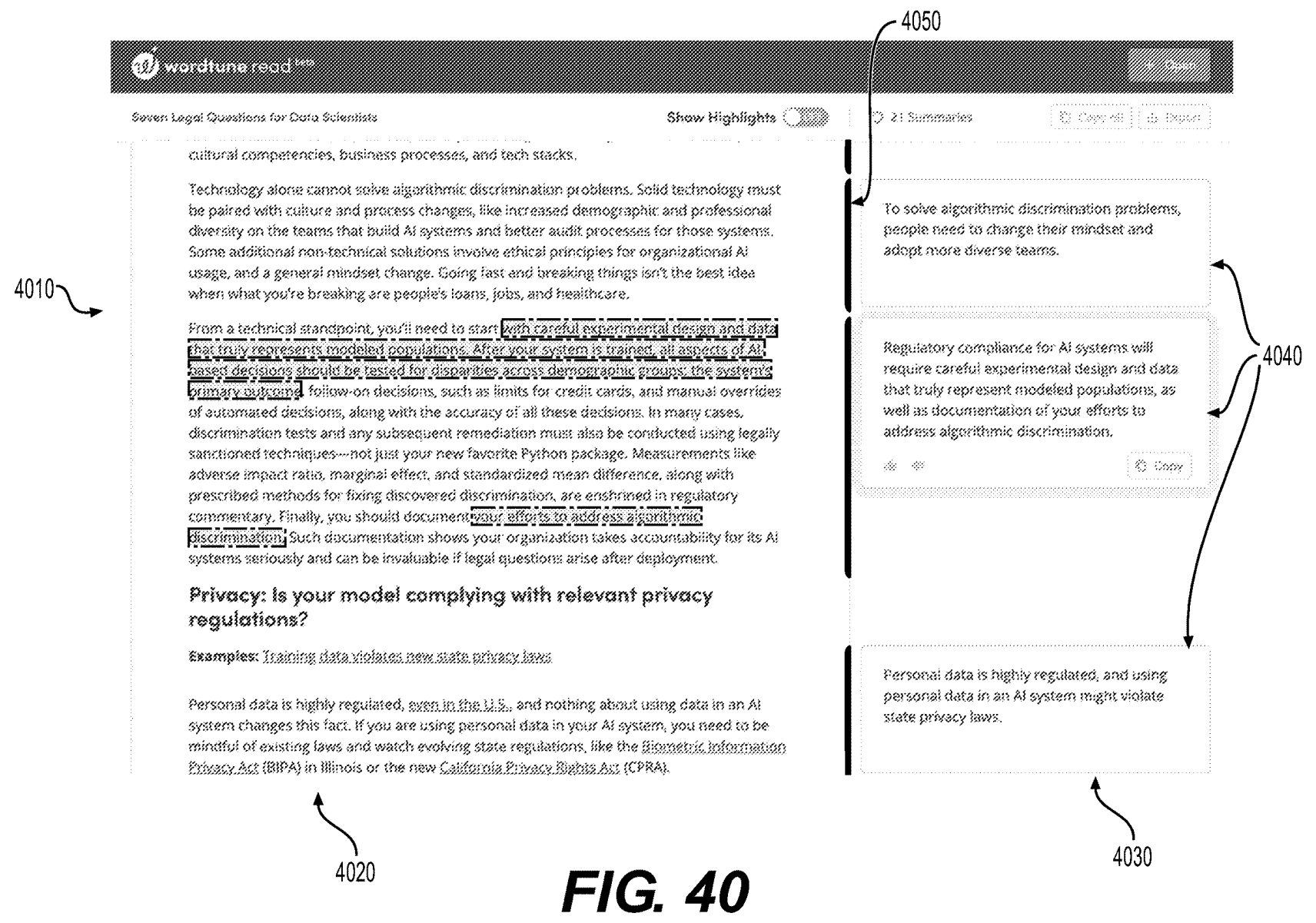

FIGS. 39 and 40 represent examples of a summary window interface of a reading assistant tool according to exemplary disclosed embodiments.

Figure 41:
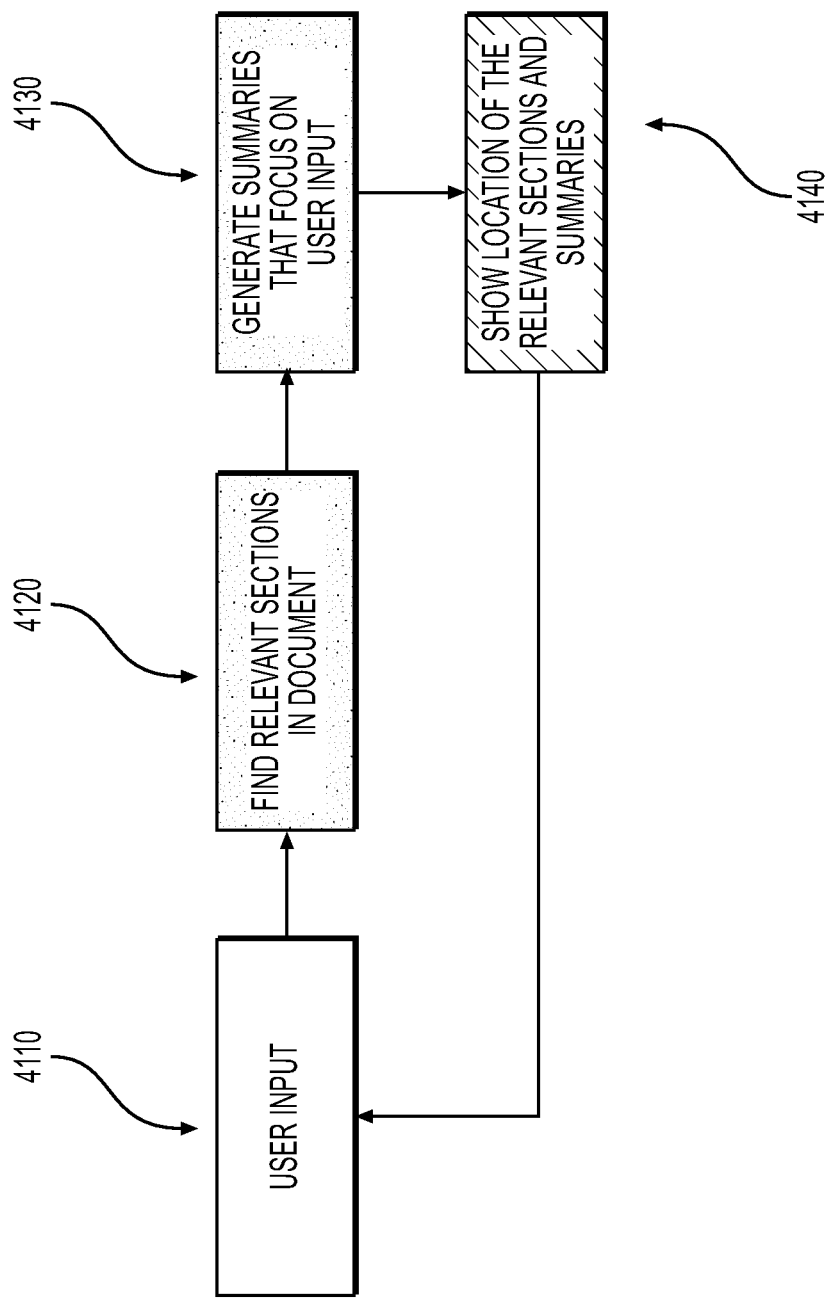

FIG. 41 provides a block diagram representation of the process flow of the guided summarization feature of the disclosed reading assistant tool.

Figure 42:
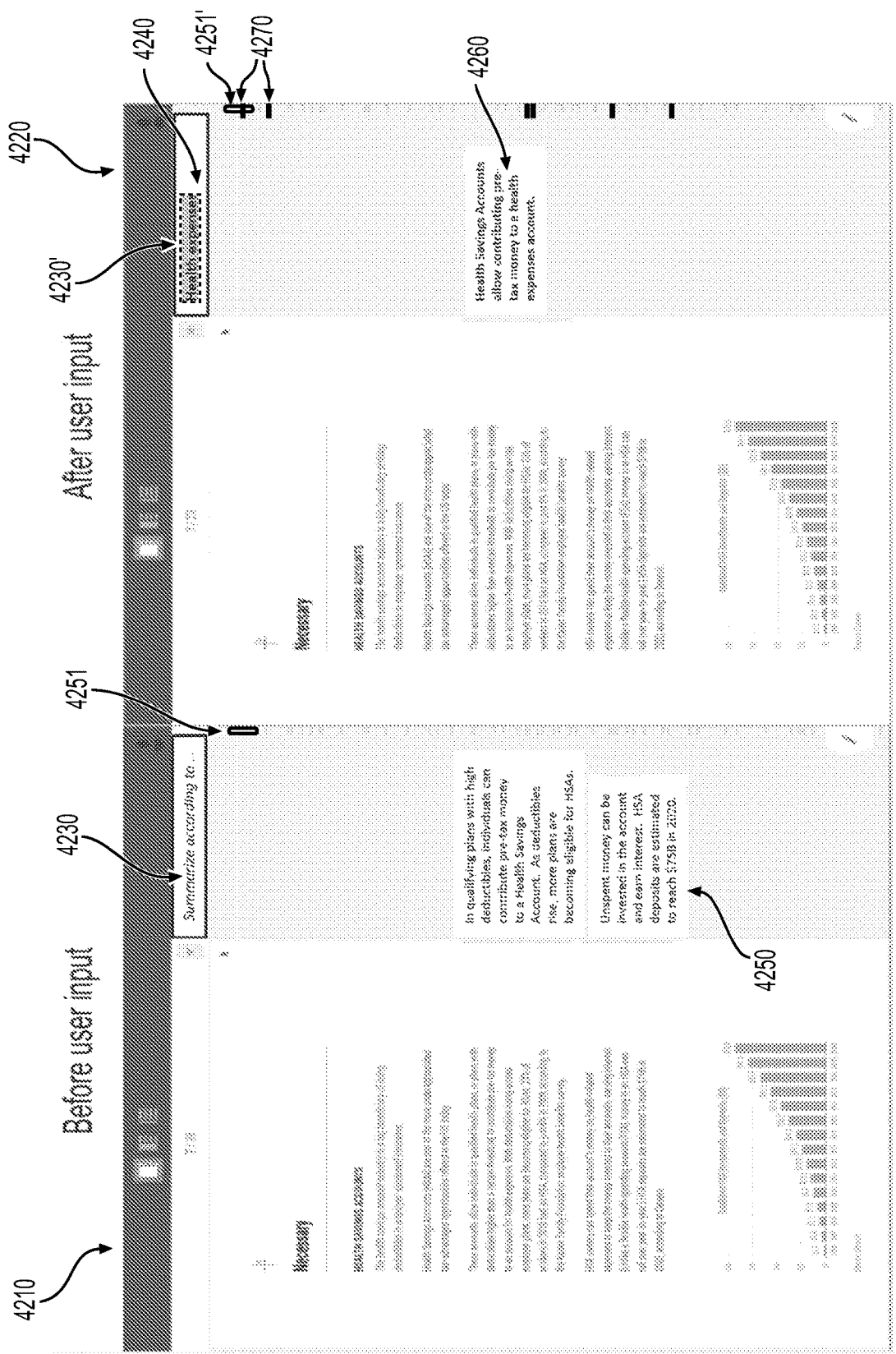

FIG. 42 illustrates an example of the guided summarization functionality of embodiments of the disclosed reading assistant tool.

Figure 43:
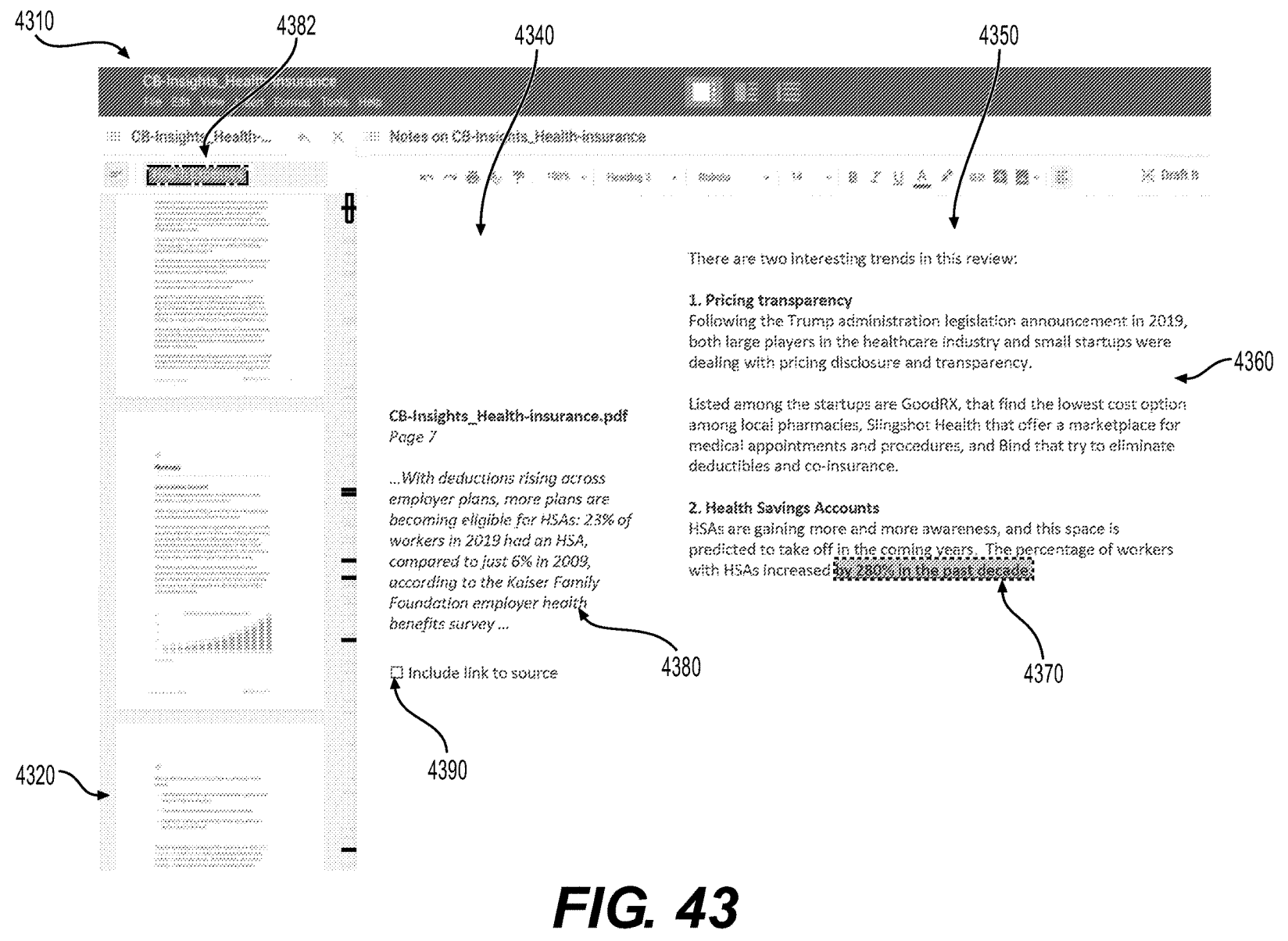

FIG. 43 illustrates an example of the content-based text completion functionality of embodiments of the disclosed reading assistant tool.

DETAILED DESCRIPTION

The disclosed embodiments relate to a writing assistant system designed to generate useful, natural language output in a variety of situations. For many, tasks associated with writing can be arduous and slow. In many cases, writing may involve or require the generation of sentences and/or text fragments that convey a particular meaning or concept, e.g., when crafting text in support of a particular topic sentence, hypothesis, or conclusion; when developing bridging text (including transition phrases, sentences, or entire paragraphs) that link one section of a document to another; when drafting text simply to convey various thoughts or information; or when generating any other forms of text.

Languages are complex, which can lead to added difficulties when writing. Each language has thousands of words, some of which may have similar meanings (e.g., synonyms) in certain contexts, subtle differences in meaning in other contexts, or quite different meanings depending on the context in which the words are used. In some cases, a phrase may be used to convey an idea that may also be conveyed by a single word, and vice versa. Sentence structure may also influence the meaning of text passages (e.g., order of clauses, proximity of a modifier relative to a subject, etc.). These are just a few of the many types of language variations that can lead to difficulties in developing well-functioning, automatic natural language generator systems.

There is a significant need for systems having enhanced natural language generation capabilities. For example, such systems may significantly alleviate writing-related burdens experienced by users of traditional systems. The disclosed embodiments, in some cases, may receive input from a user (e.g., a word, a phrase, or a grouping of words that may convey one or more ideas or bits of information) and may generate well-formed text that conveys the meaning or information associated with the user input. In view of the significant impact of context on the meaning of words or language, more generally, the disclosed systems seek to generate textual output that agrees with the context associated with other text, other user input, etc.

Such an operation may significantly increase the accuracy of generated text in conveying an intended meaning. For example, some statistics suggest that up to 80% of global commerce is conducted using at least some English language communications for information transfer. But, only about 20% of the world's population speaks English, and far fewer speak English as a native language. This can lead to significant difficulties or errors in conveying business information ranging from simple meeting details to complex agreement provisions or terms for negotiations, among many others. In some cases, the disclosed natural language generation systems may generate one or more words, phrases, sentences, and/or paragraphs in response to input received from a user. For example, one or more English language words entered into the writing assistant may prompt the writing assistant system to generate one or more text outputs that convey the idea and/or information associated with the user input. Such functionality may significantly ease the burden of non-native English language speakers in generating business communications (or any other communications) in the form of emails, term sheets, offer letters, supplier letters, contracts, among many others.

The disclosed writing assistant systems are also not limited to operation solely in the English language. The writing assistant system can be trained relative to any language to either receive user input (or any type of text input) in any language and output text generated in the same or different language. For example, in some cases, the disclosed writing assistant systems may receive user input (or text input) in a language other than English and may output text options in English.

The ability of the presently disclosed systems to generate text output (e.g., well-formed text conveying information and/or one or more ideas that may agree with a provided or determined context for the text) in response to input ranging from a single word, phrase, paragraph to a list of words, phrases, or paragraphs may also reduce the amount of time a user needs in drafting certain types of text. For example, a user of the writing assistant system may enter one or more key pieces of information, and in response, the system may generate one or more text output options that convey the information. In one scenario, a user may start an email with the words: meeting, my office, Tuesday at 11 am, and the writing assistant system may return one or more text output options, such as "John, please stop by my office for a meeting on Tuesday at 11 am," among other varied options in text output structure, formality, or context. In embodiments where the system offers multiple text output options, a user may select from among the options that best conveys the intended meaning. In some cases, the user can even select one of the output options that is closest to the intended meaning and have the writing assistant generate one or more additional text output options that are different from one another, but offer more refined options based on the selected text from the initial list of output options. In still other cases, the writing assistant system may update the output text options offered as a user enters additional input into the system or as additional input otherwise becomes available.

In other disclosed embodiments, the writing assistant may generate one or more words, phrases, or paragraphs, etc. that link together available text passages. For example, the writing assistant system may be provided with a specific location in a preexisting text (e.g., using a cursor in an electronic document, etc.) and may offer linking text that bridges between text appearing before and/or after the selected location. Such bridging text may include one or more words, phrases, or paragraphs, etc. that convey concepts consistent with the surrounding text and agree with one or more aspects of the context associated with the preexisting text. The bridging text may be generated with or without prompts from a user (e.g., with or without the user providing the system with entering additional words conveying information and/or ideas for insertion into a text). Such approaches to text generation (and many other described more fully in the sections below) may enable users to more effectively and efficiently generate well-written text in less time than traditional user-generated writing tasks may require.

The disclosed writing assistant systems may also offer significantly improved text output options relative to those offered by traditional language generation systems. For example, traditional systems tend to be highly rule-based and tied to probabilities relative to the appearance of words in sentences, etc. As a result, such systems lack the ability to provide text output options designed to account for available context, either provided by a user or informed by preexisting text. For example, some systems can generate synonym suggestions for selected words, but such systems do not limit their output to synonyms that fit the context of a document or surrounding text. Often, therefore, one or more output options offered may be inappropriate or inconsistent with the context of the user input and/or other text in a particular document.

Further shortcomings of prior word generators may arise from the statistical way in which words are predicted and/or generated. For example, in these types of statistical model-based systems, one or more words may be presented to a user as the user types into an interface. These words or phrases are typically presented to a user, for example, as an optional conclusion to a sentence being typed, and the few relatively simple words provided to the user generally are determined by the system as a statistically most probable grouping of words that typically follow the word or words entered by the user. These statistical systems do not offer text generated as a replacement for text input by the user that, for example, conveys ideas and/or information associated with the user's input. More importantly, such systems do not analyze context of the user input or other text associated with a document in generating a text output. As a result, a text output generated from such a system may be inconsistent with the context of a document text, especially text other than text immediately entered by a user.

In some cases, prior word generators may provide lengthy outputs based on one or more prompts. These systems produce text that may appear complex and well-structured. Indeed, some available systems can receive text input prompts and generate multiple sentences or paragraphs in response. These systems, however, lack the ability to generate text that agrees with or flows together with the information and context of text outside of the prompts provided. As a result (and as one example shortcoming), the text outputs, which may have the structural appearance of well-written text, typically read as nonsensical, randomly generated streams of sentences with little or no relationship to any surrounding text. For example, unlike the presently disclosed writing assistant, prior systems lack an ability to generate textual outputs based on text that follows a document location where a generated text output option is to be inserted. Such text generation systems often fall well short of generating text useful to a user or that matches a user's intended meaning for a communication.

Further, while prior systems may include a graphical user interface (GUI), such prior interfaces are often limited in their functionality and ability to interact with a user. The presently disclosed embodiments are designed to offer a high level of interaction with users, dependent on a particular application. For example, in some examples, the presently disclosed embodiments may provide multiple text output options in response to user input. The text output options, in some cases, may constitute complete sentences that incorporate and convey an idea, meaning, and/or information associated with the user input. Importantly, the text output options may also be generated by taking into account one or more contextual elements associated with the user input and/or other relevant, preexisting text, such that the generated text output options agree contextually with the user input and/or preexisting text. The text output options may be updated as the user continues to provide input such that the updated text output options offer refinements over initially provided text output options in conveying the meaning, and/or information associated with the user input. To insert any of the offered text outputs into a document, for example, the user can make a selection of one of the offered text outputs. Alternatively, the user can select one of the text output options as a prompt for the writing assistant system to generate one or more additional text output options that differ from one other, but may be more closely related to the selected text output options than to other non-selected text output options. Such interactive capabilities may significantly enhance a user experience and the efficiency by which the user can generate well-written text that conveys an intended meaning and agrees with the context of other relevant text.

The sections below describe in detail the functionality and features of the presently disclosed writing assistant systems. The sections also explain in detail how such systems may be constructed to include advanced capabilities such as generating text output that both conveys concepts and ideas included in user input (or other text) and agrees with contextual elements of the user input and/or other text. In some cases, the disclosed writing assistant system may be based on trained machine learning language models trained to recognize complex contextual elements in text. For example, as alluded to above, such models may be trained, for example, using large corpuses of text, masking different segments of text (e.g., tokens), and one or more reward functions that penalize the system during training for generating text replacements that do not match the masked text and reward the system for generating a text replacement that matches the masked text. Such trained systems when placed into use, for example, may offer significantly improved capabilities for generating well-written text that conveys an intended meaning while agreeing with the context of surrounding text or other relevant text. Additional details regarding training of the network(s) associated with the disclosed writing assistant are discussed in more detail in sections that follow.

Before turning to the details, it should be noted that the disclosed writing assistant systems and their associated GUIs may be employed together with any type of computer-based technology. For example, such systems may be incorporated into word processing software, email editors, presentation software, or any other type of computer application in which text is involved. Additionally, the disclosed systems may be operated on a PC, server, tablet, mobile device, laptop, heads up display unit, or any other type of hardware system capable of executing an application including text-based functionality.

Reference will now be made in detail to exemplary embodiments, examples of which are illustrated in the accompanying drawings and disclosed herein. The systems and methods are described below in no particular order and can be performed in any order and combination. Additionally, various embodiments of the disclosed writing assistant technology may include some or all of the disclosed features and functionality in any combination.

Figure 1:
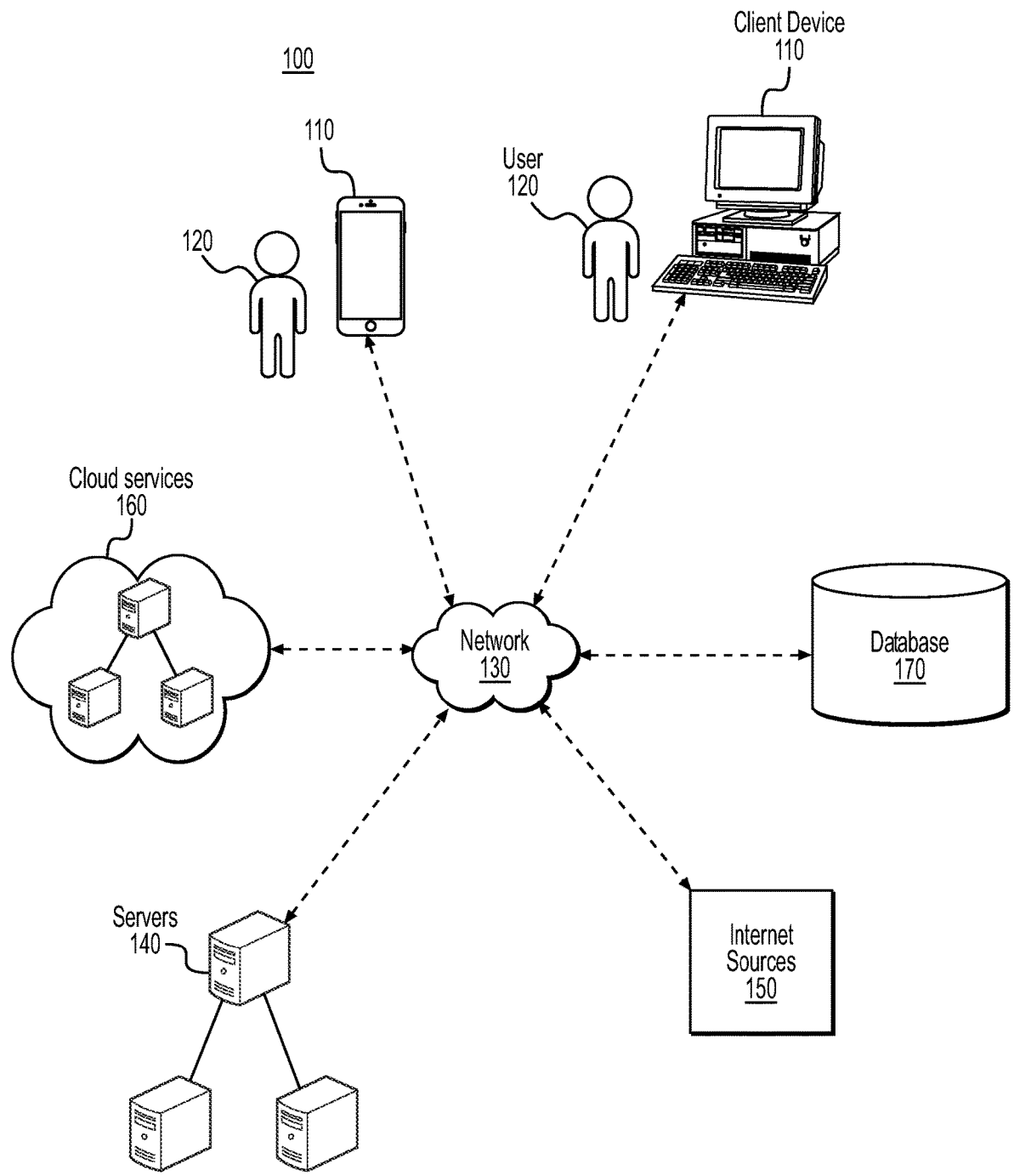
FIG. 1 is a diagram illustrating an exemplary system environment in which the disclosed writing assistant may be used, consistent with disclosed embodiments.

FIG. 1 is a schematic diagram of an exemplary system environment in which the disclosed writing assistant may be employed. For example, system 100 may include a plurality of client devices 110 operated by users 120. System 100 may also include a network 130, server 140, internet resources 150, cloud services 160, and databases 170. The components and arrangement of the components included in system 100 may vary. Thus, system 100 may include any number or any combination of the system environment components shown or may include other components or devices that perform or assist in the performance of the system or method consistent with the disclosed embodiments. The components and arrangements shown in FIG. 1 are not intended to limit the disclosed embodiments, as the components used to implement the disclosed processes and features may vary. Additionally, the disclosed writing assistant system may be implemented on any single component shown (e.g., a single mobile device or single PC included in client devices 110) or may be implemented in a network architecture (e.g., one or more features of the disclosed writing assistant systems and methods being implemented on a server 140, associated with one or more cloud services 160, etc. and having connectivity established with one or more client devices 110 via network 130 (e.g., a WAN, LAN, Internet connection, etc.).

As shown in FIG. 1, client devices 110 may include a variety of different types of devices, such as personal computers, mobile devices like smartphones and tablets, client terminals, supercomputers, etc. Client devices 110 may be connected to a network such as network 130. In some cases, a user 120 may access the writing assistant and its associated functionality via the client device 110 which can display the user interface of the writing assistant. For example, the writing assistant may be operated as a standalone application on a client device 110, or the writing assistant may be incorporated into any text editing application that may be operated on a client device 110 (or other types of computing devices). In some cases, the writing assistant may be incorporated with applications including, but not limited to, email editors, word processing programs, presentation applications, spreadsheet applications, PDF editors, etc.

Network 130, in some embodiments, may comprise one or more interconnected wired or wireless data networks that receive data from one device (e.g., client devices 110) and send it to another device (e.g., servers 140). For example, network 130 may be implemented to include one or more Internet communication paths, a wired Wide Area Network (WAN), a wired Local Area Network (LAN), a wireless LAN (e.g., Bluetooth®, etc.), or the like. Each component in system 100 may communicate bidirectionally with other system 100 components either through network 130 or through one or more direct communication links (not shown).

As noted, the writing assistant may be implemented and run using a variety of different equipment, such as one or more servers, personal computers, mobile devices, supercomputers, mainframes, or the like, connected via various types of networks. In some embodiments, the writing assistant may be configured to receive information from client device 110, database 170, server 140, cloud service 160, and/or Internet sources 150 (among others) and send or return information to the same. The writing assistant can be incorporated into client devices 110 and run locally or be run on a server 140 or from a cloud service 160 accessed by the client device 110 via network 130.

As previously described, the writing assistant can be operated as a standalone application offering its own GUI or may be incorporated into another application (e.g. a parent application) and may offer one or more GUI interface components to the parent application. For example, the writing assistant GUI (or parent application GUI supplemented with writing assistant features) may provide a location to receive user input (e.g., at the cursor in editors, etc.). GUIs associated with the disclosed writing assistant can also provide one or more windows or fields for receiving user input and one or more additional windows or fields for providing text output options in response to received user input. The windows, fields, and/or functions of the writing assistant may be selectively activated or deactivated. The user input may consist of words or text that can be extracted from a document or inputted by the user using a keyboard or other appropriate input method, including dictation by the user using voice recognition software. Multiple embodiments and examples of the writing assistant GUI along with various features associated with the disclosed writing assistant are discussed in the sections below.

In the disclosed embodiments, the writing assistant may allow users to express their ideas simply, for example, through simple natural language, with no regard for correctness, grammar, style, clarity, etc. In response, the writing assistant may generate and provide to the user one or more suggestions (in some cases, several suggestions) for unique, well-written, and context-fitting texts that express the specified meaning of the user input, and which may be inserted into the document that is being drafted. In contrast with existing grammar error correction applications, for example, the disclosed writing assistant can provide text options for the users ex-ante rather than correcting mistakes or making local suggestions ex-post. For example, while drafting initial text in a word processing user interface, a user may call the writing assistant and write "lets make phone call, when is good time for you." In response, the assistant would generate well-written sentences that express the same meaning, such as "When are you free for a quick phone call," "What times are you available for a phone call," or "Can we schedule a phone call? What times are you available?"

Figure 2A:
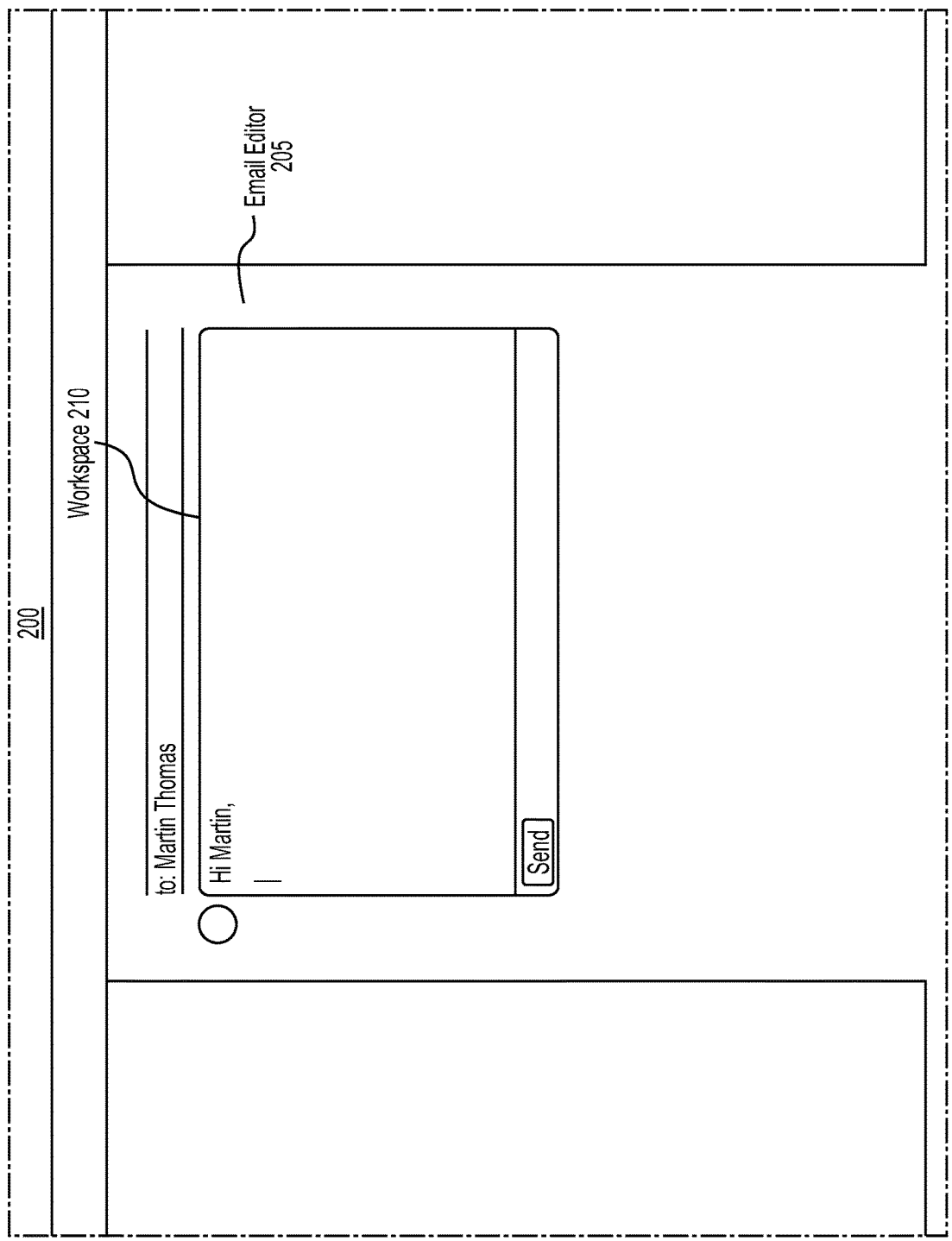
FIGS. 2a-2p show an embodiment of the writing assistant interface, according to exemplary disclosed embodiments.
Figure 2B:
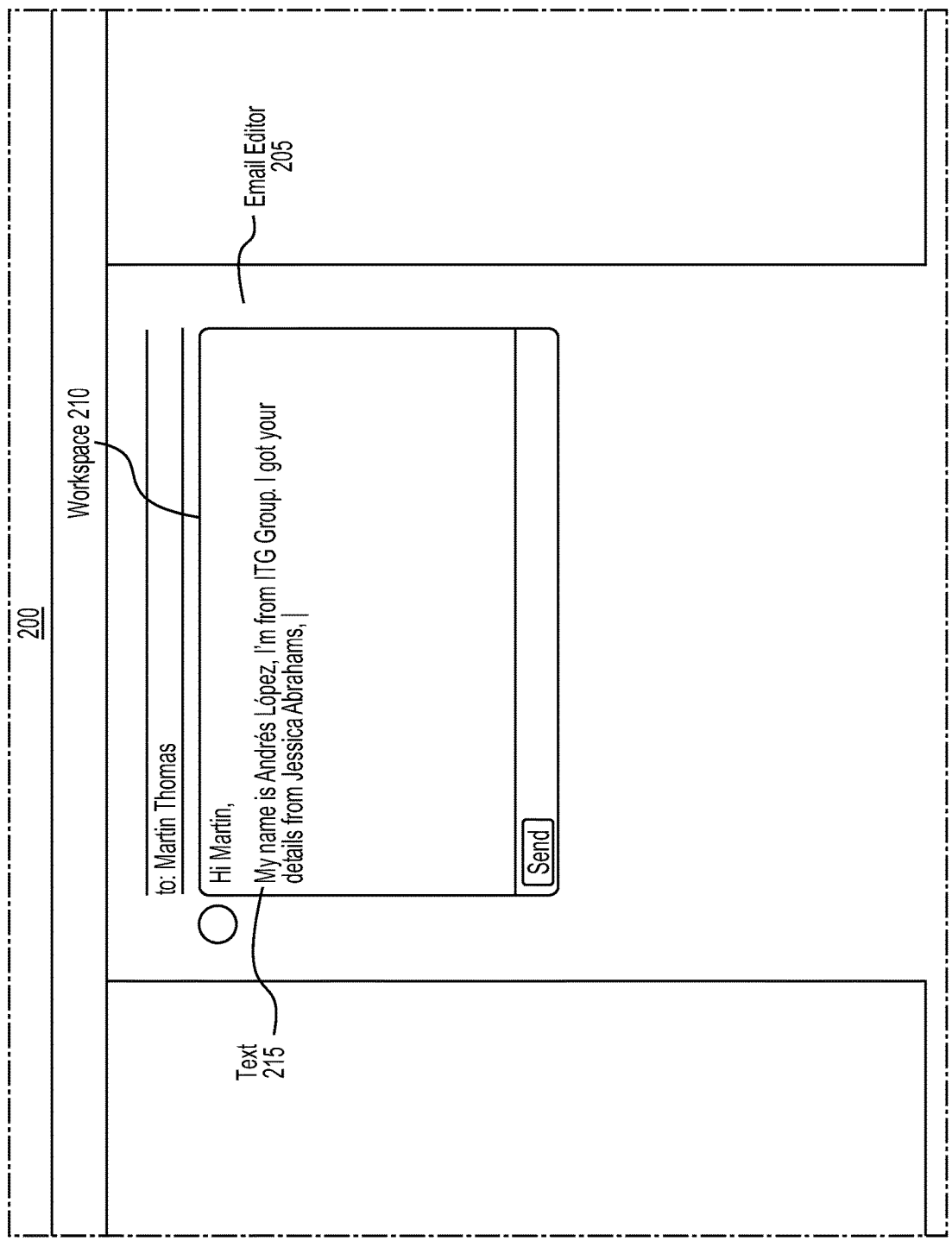
Figure 2C:
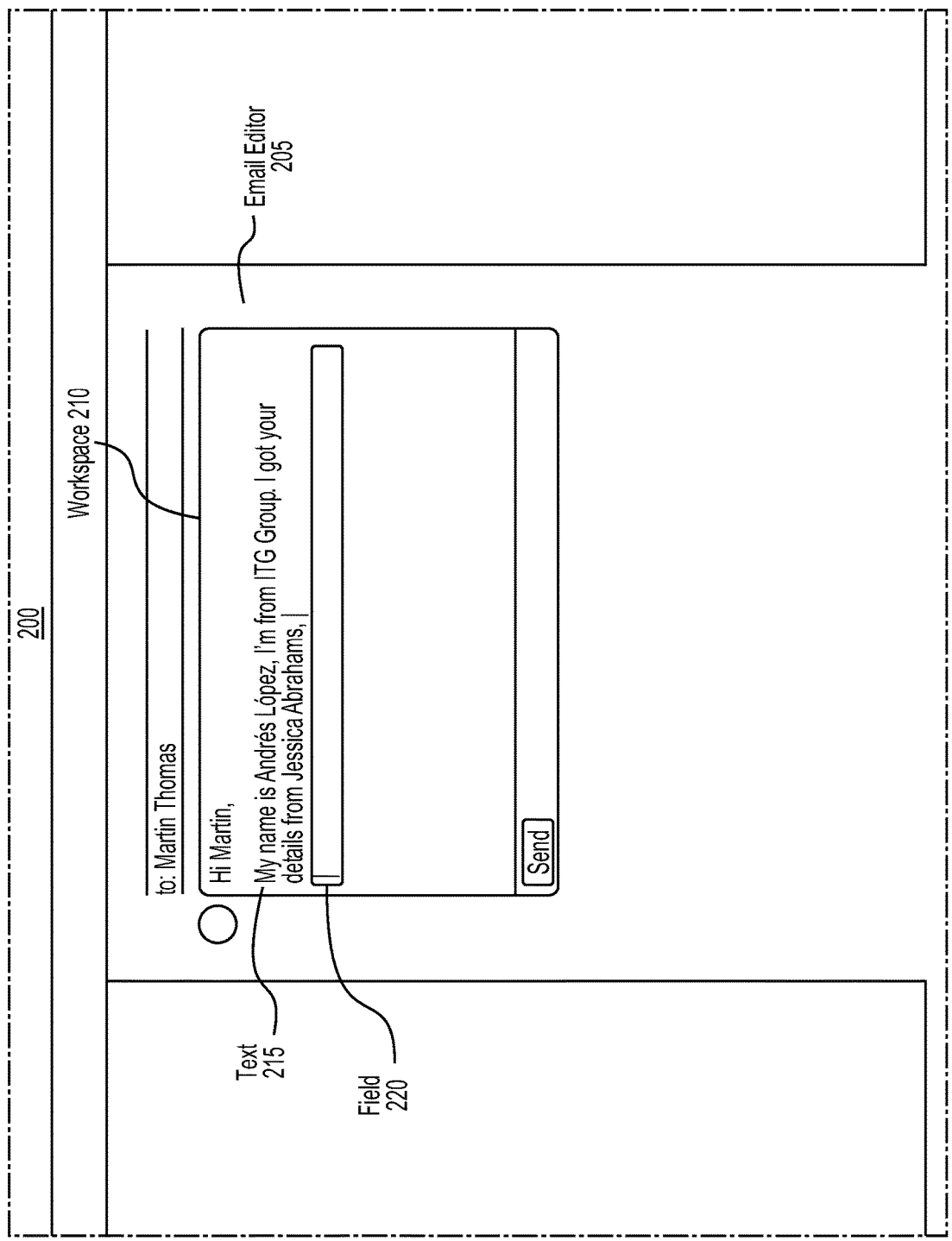
Figure 2D:
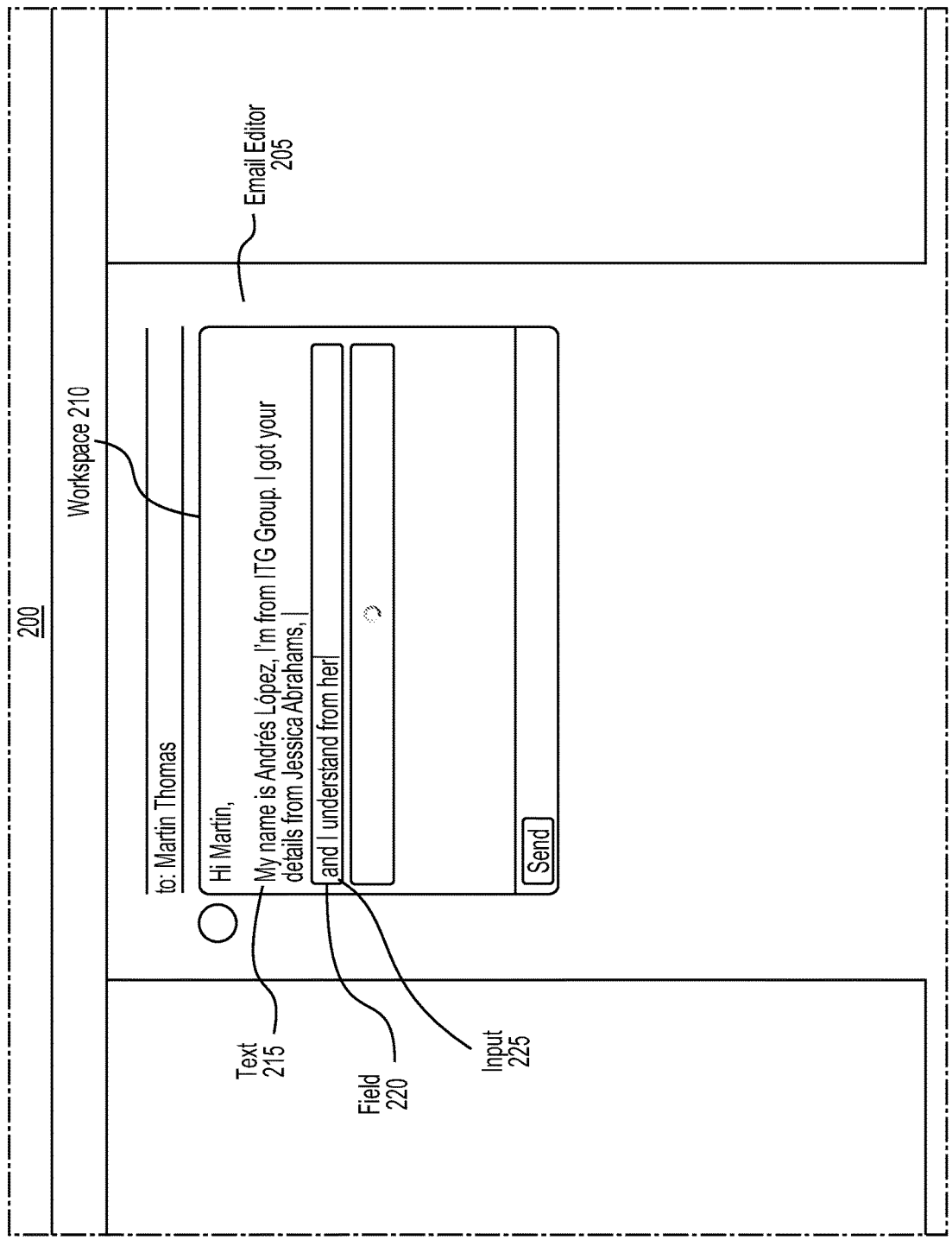
Figure 2E:
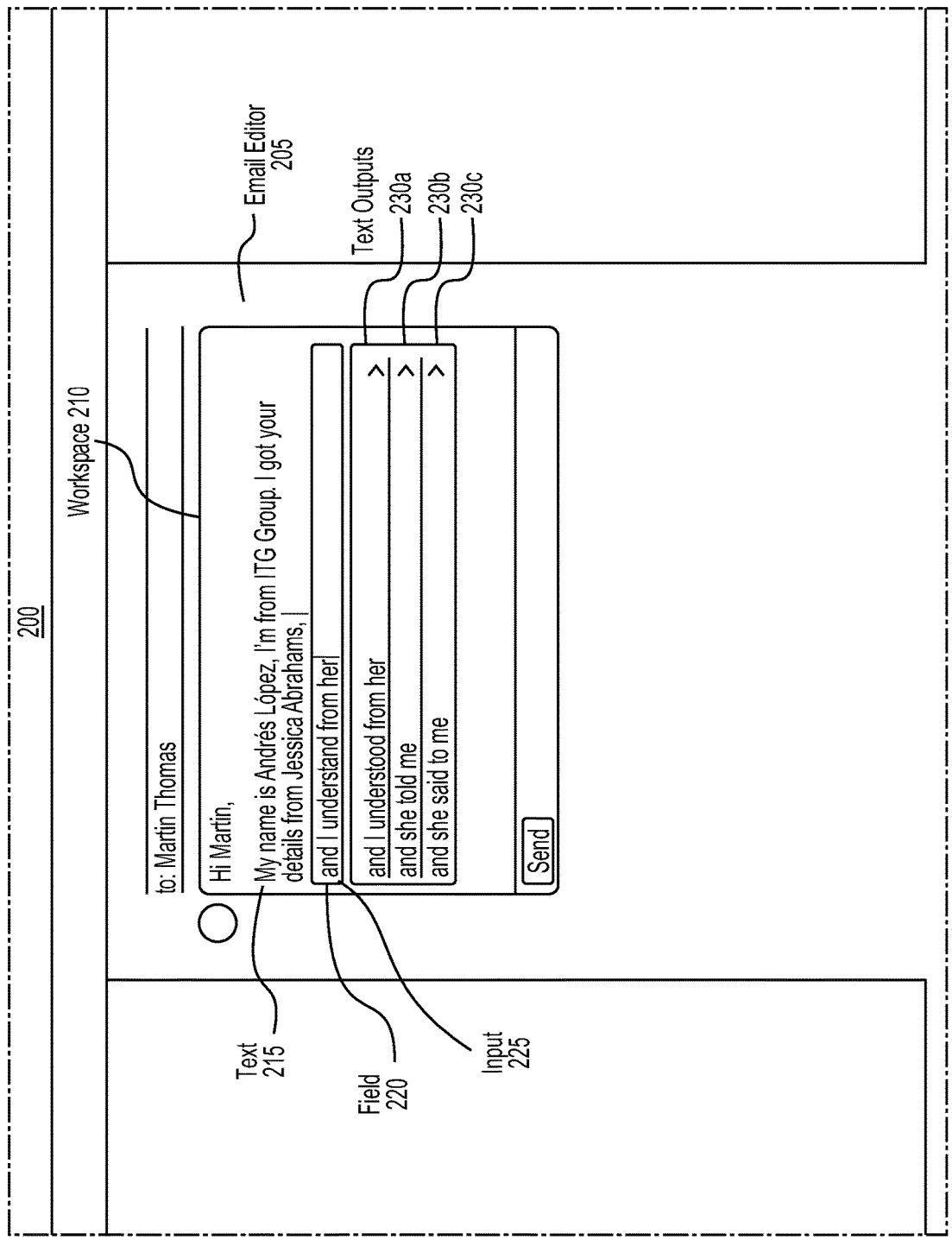
Figure 2F:
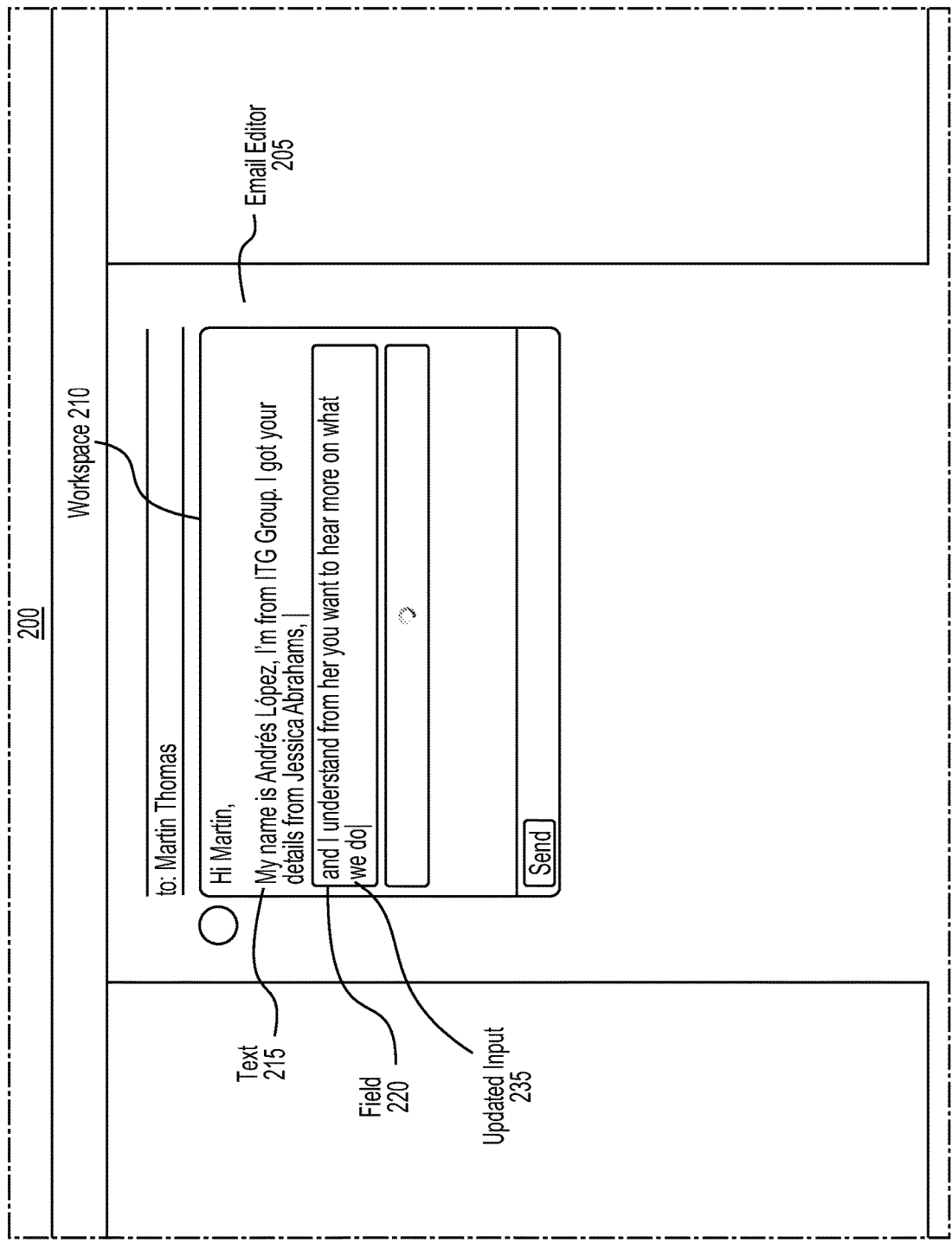
Figure 2G:
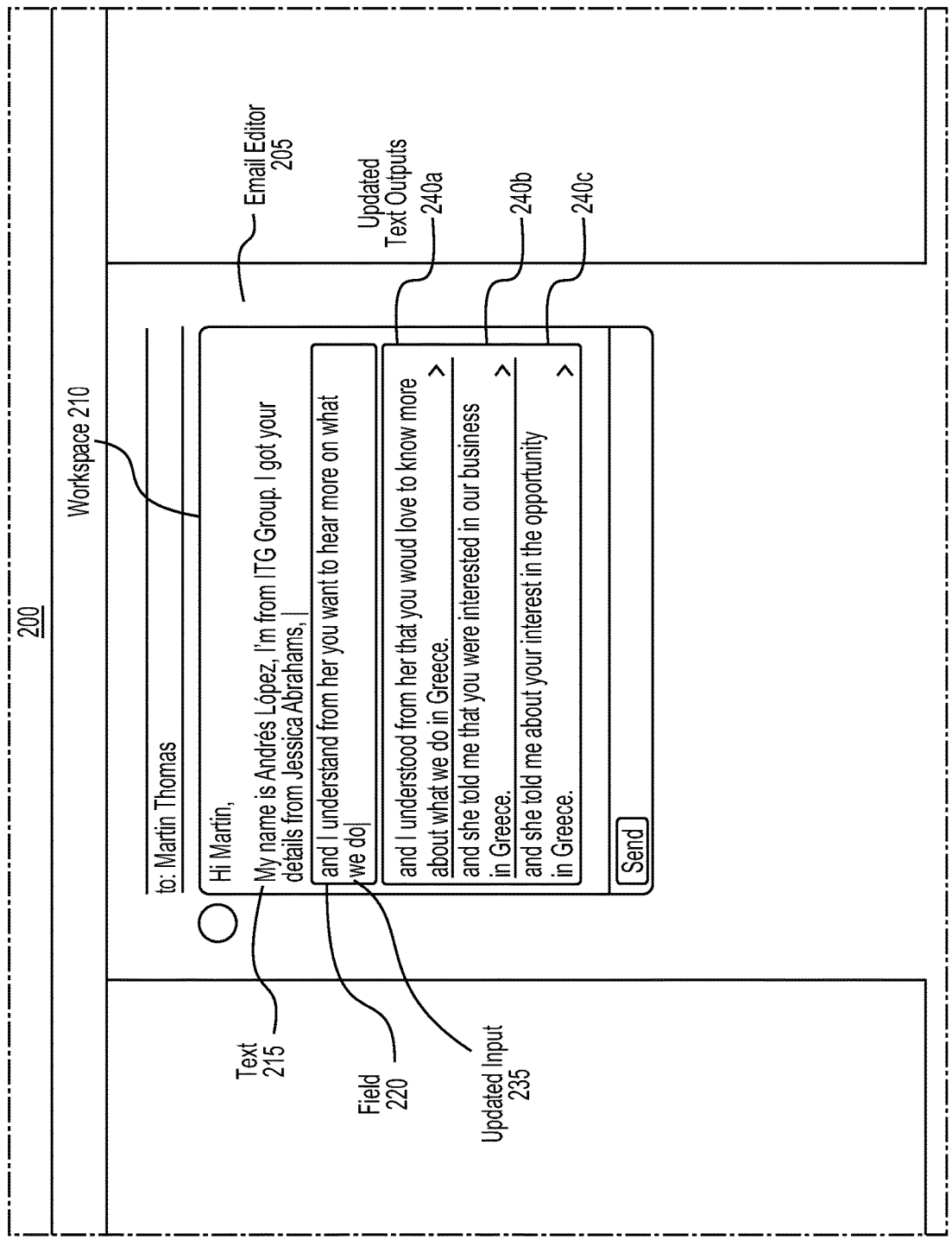
Figure 2H:
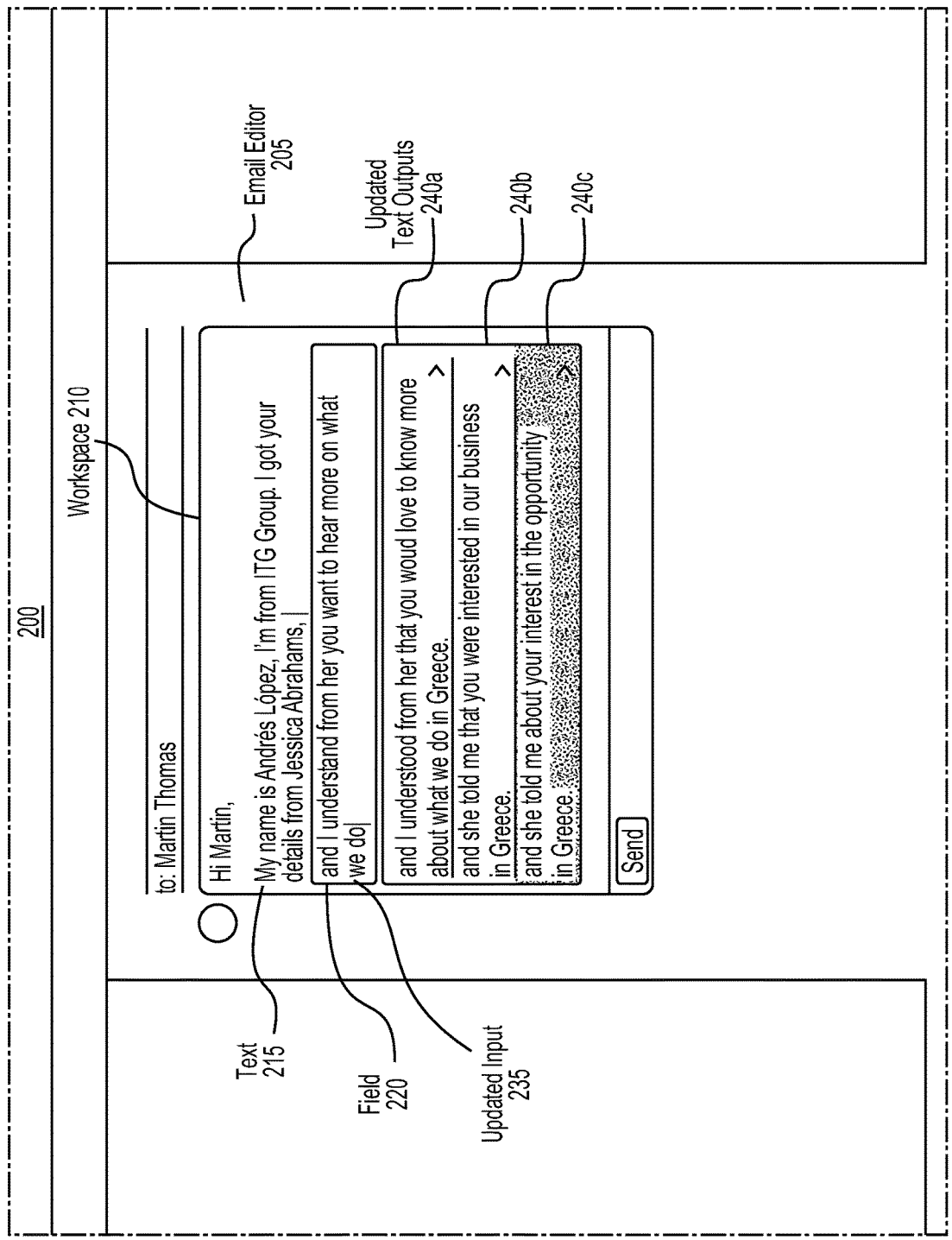
Figure 2I:
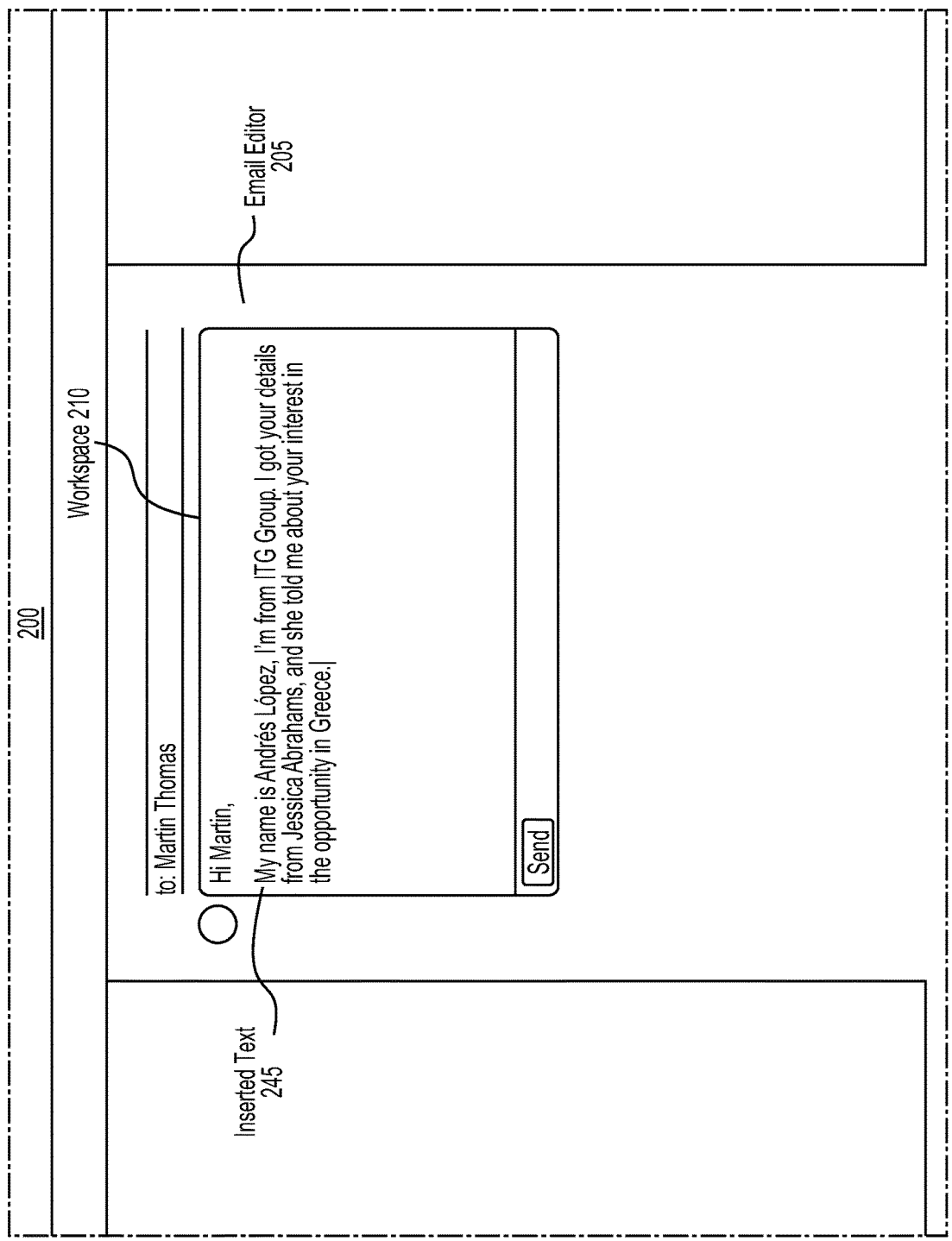
Figure 2J:
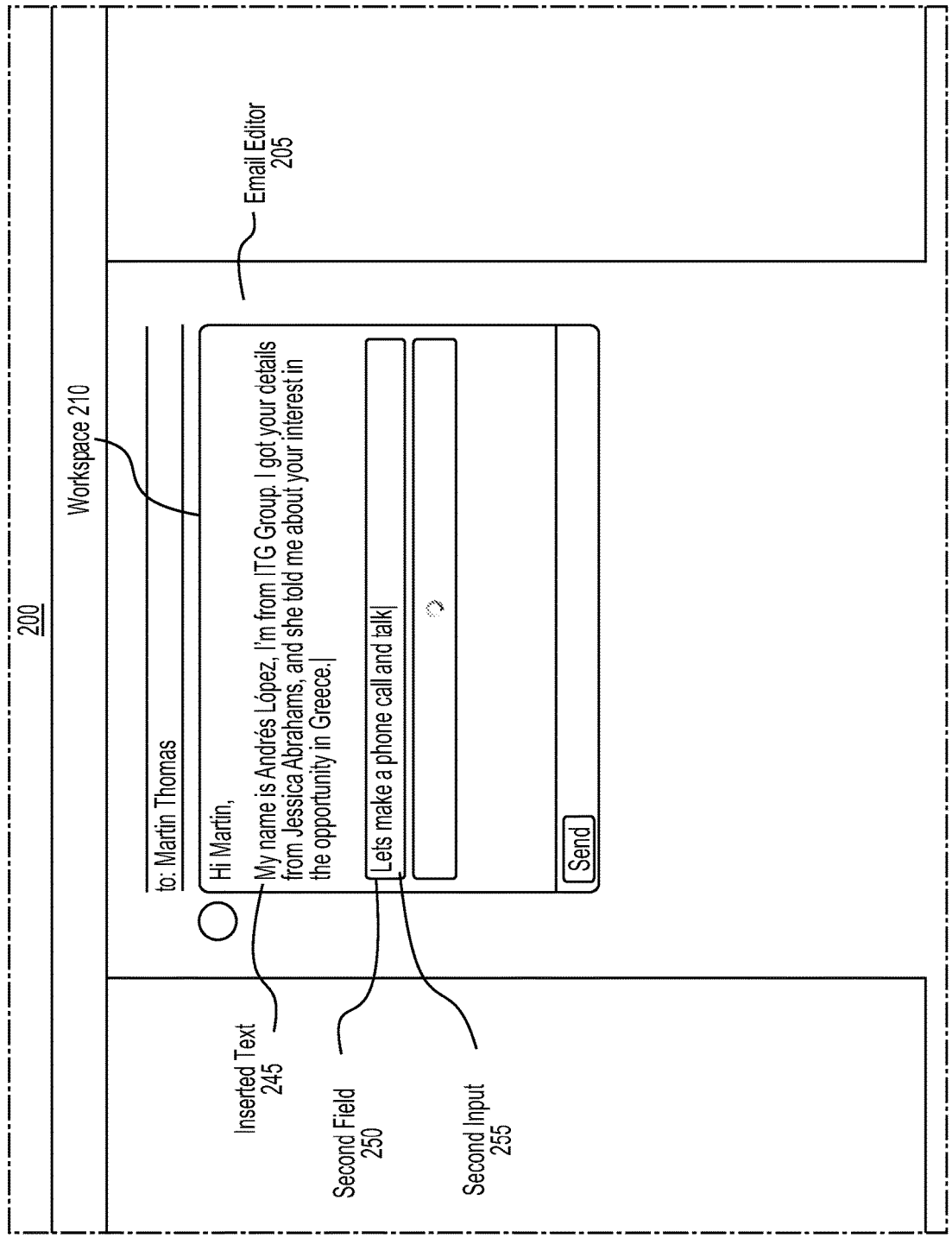
Figure 2K:
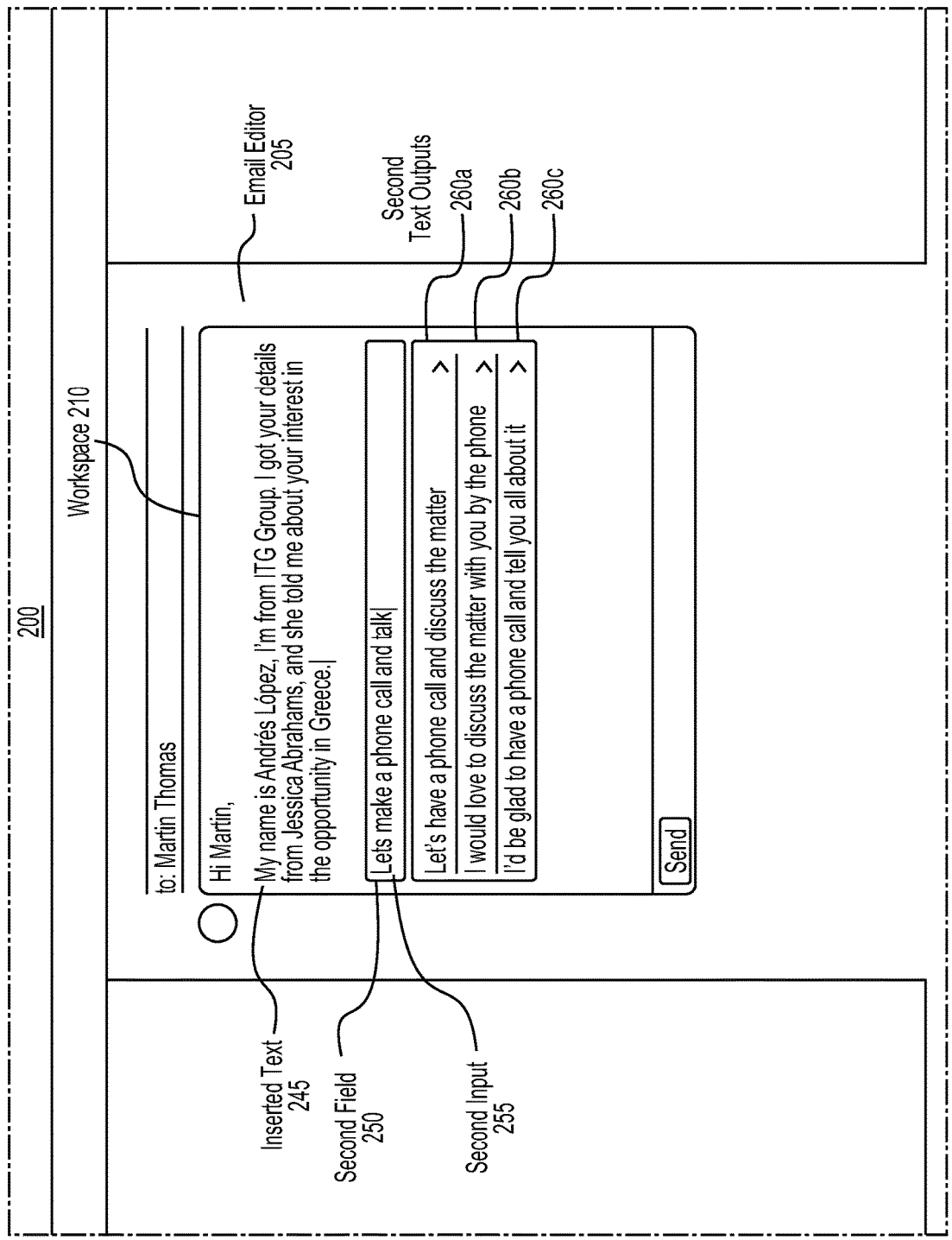
Figure 2I:
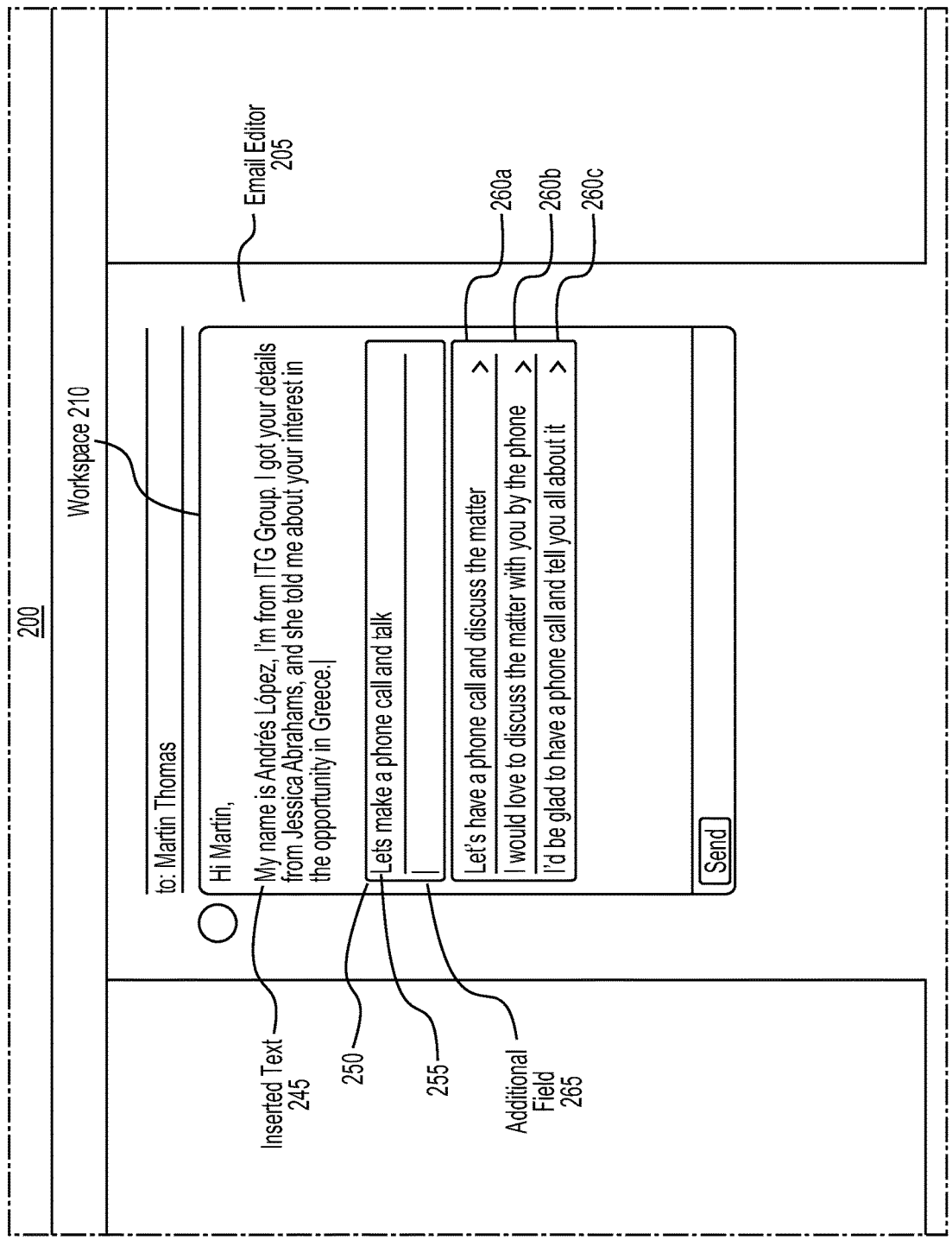
Figure 2M:
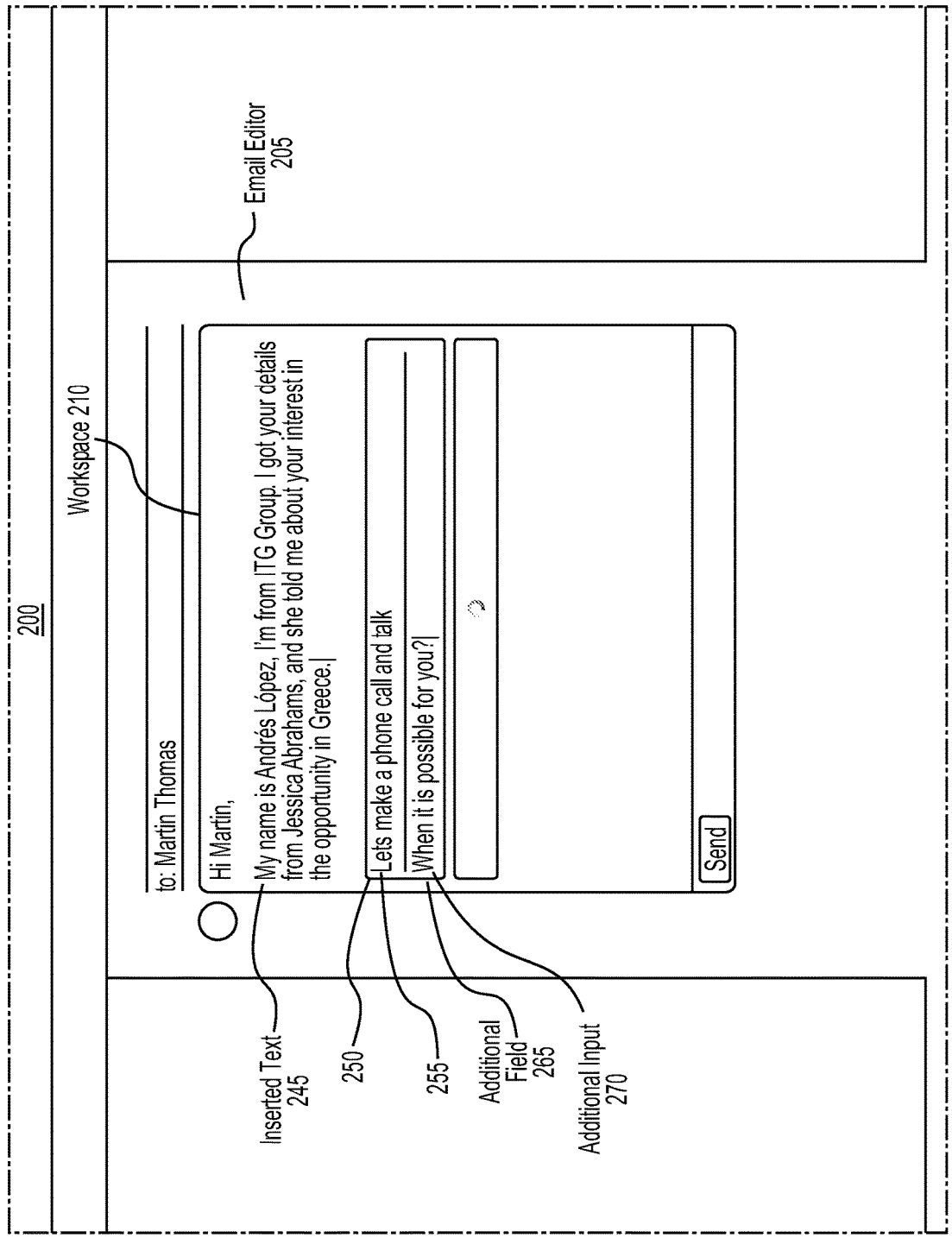
Figure 2N:
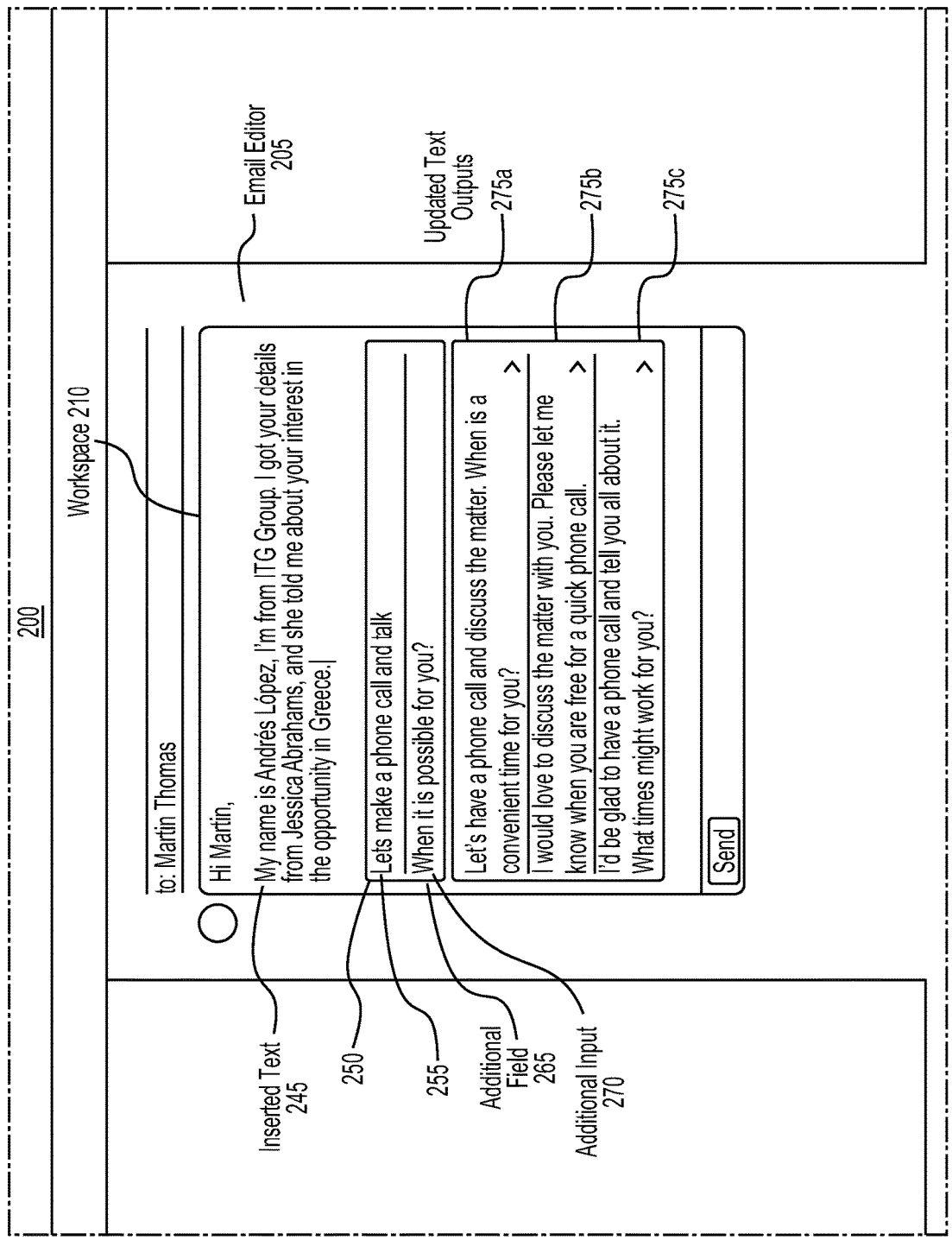
Figure 2O:
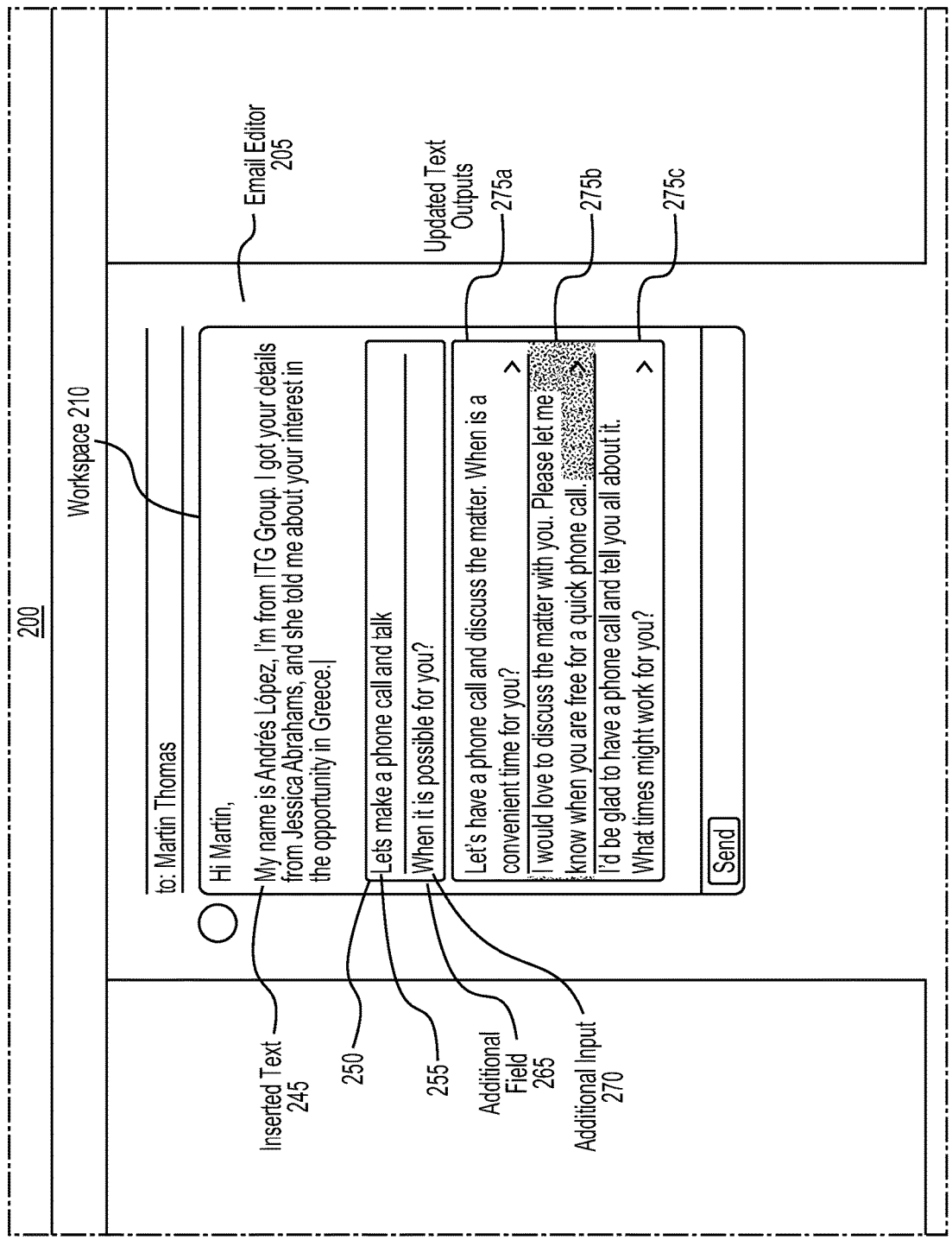
Figure 2P:
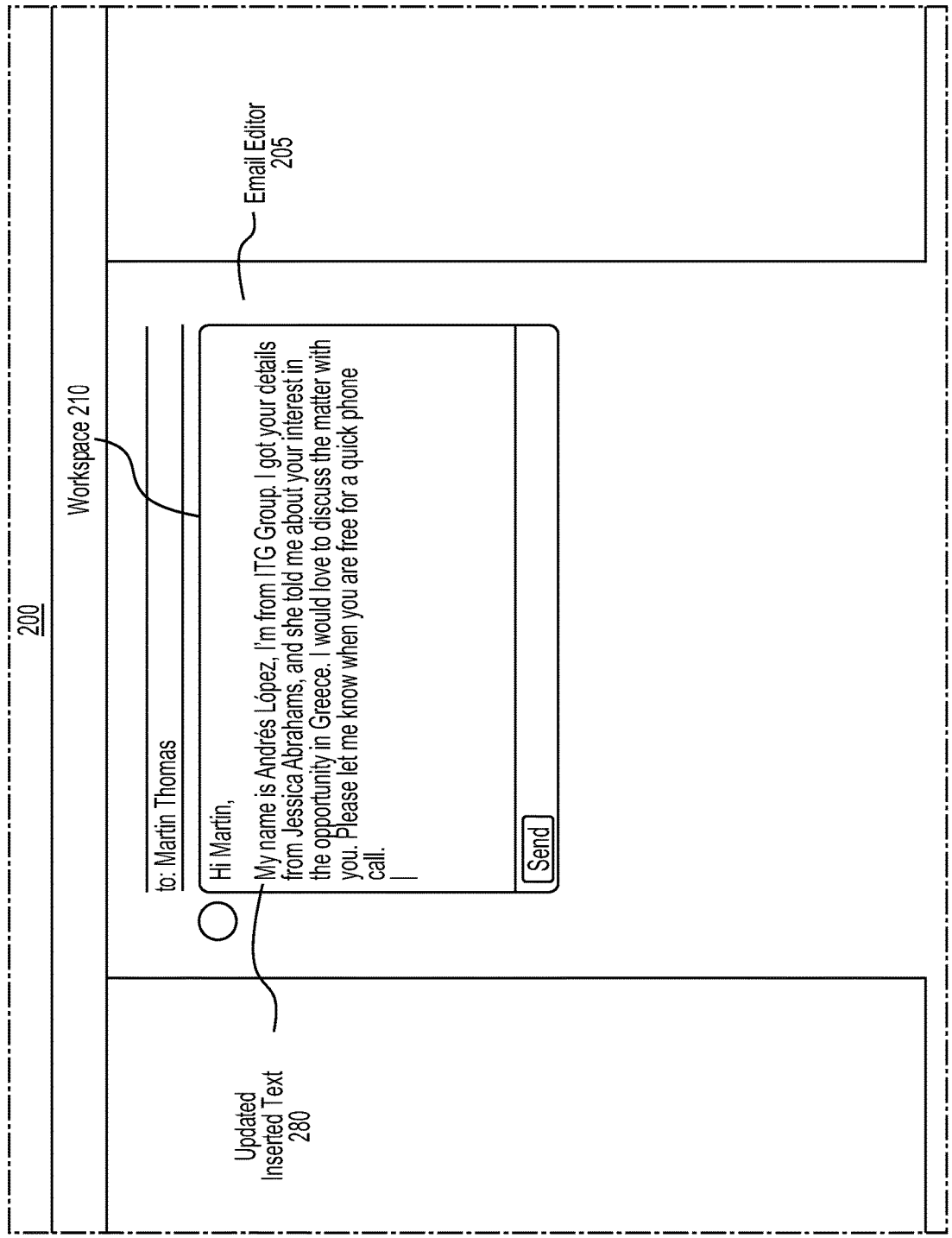

FIGS. 2a-2p show a user interface that may be included with exemplary embodiments of the disclosed writing assistant system. FIGS. 2a-2p show an exemplary GUI 200 that may be associated with certain disclosed embodiments. In the example shown starting at FIG. 2a, GUI 200 may be associated with an email application and may include an email editor GUI 205, which in turn, may include a workspace 210. In some cases, a user may draft email text simply by entering text into workspace 210 without relying upon features of the disclosed writing assistant. In some cases, however, entering text into workspace 210 may automatically trigger certain functionality associated with the disclosed writing assistant including, for example, the generation of text output options generated by the writing assistant as possible replacements for the text entered in workspace 210.

FIG. 2B illustrates an example in which the user enters text into workspace 210 prior to initiating the writing assistant. For example, as shown in FIG. 2B, the user has entered, "My name is Andres Lopez, I'm from ITG Group. I got your details from Jessica Abrahams,". In embodiments where the initiation of the writing assistant features are not automatic, the user can select a GUI element, for example, to initiate the functionality of the writing editor. Such GUI elements may include, for example, menu items, virtual buttons, icons, etc. (not shown) that the user may select via a touchscreen, using a pointing device, or in any other suitable manner.

FIG. 2c shows an example user input field 220 that may be presented on the GUI in response to initiation of the writing assistant by the user. For example, a user can summon field 220 in the writing assistant, where field 220 is configured to receive text input from the user in the form of characters, words, sentence fragments, phrases, sentences, paragraphs, punctuation, etc. As shown in FIG. 2d, a user can type input 225 into the field 220 (such as "and I understand from her"). In response to user input provided to field 220 by the user, the writing assistant can generate various text output options as possible replacements for the input received at field 220.

For example, as shown in FIG. 2e, in response to receiving the user input, "and I understand from her," the writing assistant can generate one or more text output options, such as text outputs 230a-230c, that convey a meaning or information associated with the user input, but may use different words relative to input 225.

The generated text output option(s) may be provided to the user in any suitable format. In some cases, the generated text output options may be provided to the user via output fields 230a-230c as shown in FIG. 2e. Each of the provided text output options may appear in an individual field 230a, 230b, or 230c, for example. The individual fields may be individually selectable and may provide the user with an option to select from among the provided text output options for substitution into the draft document in place of the text entered in field 220. For example, the selected text output option may be appended to text 215.

As shown in FIG. 2e, the writing assistant can generate multiple output options that each differ from one another. Despite the differences, however, all convey the idea associated with the user input (e.g., that Jessica Abrahams conveyed information to the user, Andres Lopez). Additionally, the text output options all agree with one or more contextual aspects of the preexisting text (a partial sentence) in workspace 210. For example, the phrase "and I understood from her" is similar to the input, but changes "understand" to "understood" for consistency with the tense of the preexisting text (i.e., the word "got" appears in the past tense in text 215). This phrase also indicates that the writing assistant detected that Jessica Abrahams is a female either based on the user input, on the preexisting text 215, or a combination of both. As a result, the writing assistant substituted the pronoun "her" for the name of the person that gave Martin's details to Andres Lopez. Option 2 (i.e., "and she told me"), while including different words from Option 1, conveys a similar meaning and replaces Jessica Abrahams with the pronoun "she" to indicate a recognition that Ms. Abrahams is female in agreement with the preexisting text. Option 3 includes yet another organization of words conveying a similar meaning as the user input and also showing agreement with the context of the preexisting text by substituting Jessica Abrahams with the pronoun "she." Options 2 and 3 also use the past tense in agreement with the preexisting text, despite the use of the present tense in the user input. Notably, while option 1 (field 230a) uses the phrase "understood from her," which is similar to the words appearing the user input, options 2 (field 230b) and 3 (field 230c) include very different words, but still convey a similar meaning as the user input. That is, option 2 includes the phrase "she told me," and option 3 includes the phrase "she said to me," which both indicate that Jessica Abrahams conveyed information to Andres Lopez. While the phrases in options 2 and 3 are not synonymous with the phrase in option 1 or with the user input, they all convey similar meanings, especially when considering that speaking is a primary form of communication and one often associated with a characterization of whether a recipient of spoken words understands what the words of the speaker conveys to the recipient.

In some embodiments, the text output options are not static, but rather, can be updated as a user continues to provide input to field 220, for example. In FIG. 2f, the user types updated input 235 that adds the phrase "you want to hear more on what we do" to the originally entered user input, "and I understand from her." In response to receiving the updated user input, as shown in FIG. 2g, the writing assistant will generate a set of updated text output options 240a-240c, which may or may not include the originally generated text output options. In the example shown in FIG. 2g, the writing assistant generates the output option "and I understood from her that you would love to know more about what we do in Greece" (field 240a). In addition to changing "understand" to "understood" for consistency with the tense of the preexisting text, the writing assistant changes "you want to hear more" to "you would love to know more," which indicates that the writing assistant detected the context of the additional text and suggested, among several changes, using "love to know" instead of "want to hear" in this context. This is an example of the writing assistant's ability to use a word or phrase that conveys a similar meaning in the particular context of the user input despite the words/phrases used in the text output option not being recognized synonyms for the words/phrases of the user input. In some cases, however, the writing assistant can also offer text output options that include words that are recognized as synonyms to words of the user input (e.g., word pairs that may be found in a standard thesaurus, such as the Historical Thesaurus of the Oxford English Dictionary).

Returning to FIG. 2g, option 2 (i.e., "and she told me that you were interested in our business in Greece") 240b also conveys a similar meaning to the user input, but uses a different phrase (i.e., "that you were interested in") from the input or the other text output options. Option 3 (i.e., "and she told me about your interest in the opportunity in Greece") 240c, again, conveys a similar meaning but with a different phrase (i.e., "about your interest in").

Notably, all three options reference the detail that the activities are occurring in Greece, despite there being no reference to Greece in either the user input in field 220 or in the preexisting text 215. For example, the writing assistant, as evidenced by the text output options, was able to determine that ITG Group is a real estate group operating in Greece. The writing assistant is able to pull contextual information not only from the words of the user input and/or the words of the preexisting text, but also from other available sources of information (e.g., Internet-accessible databases, among others). The feature is discussed in depth later in this disclosure.

Once the text output options provide the user with suitable text, the user can select one of the text options. For example, a user may select text output 240c, as shown in FIG. 2h. In response, as shown in FIG. 2i, the writing assistant can insert the user-selected text output option 240c into the workspace 210 with the initial text 215, creating a coherent and context fitting paragraph (e.g., inserted text 245).

The drafting process can continue with the user entering additional user input (e.g., via a second field 250, which may be a newly displayed field or a continuation of user input field 220), as shown in FIG. 2j. Similar to the description above, the writing assistant can use the inserted text 245 (e.g., preexisting text) and additional input included in field 250 to generate additional context-fitting text output options. As shown in FIG. 2j, after the inserted text 245 is inserted into workspace 210, the user can summon a second field 250 (e.g., a window, text box, etc.) that may be visible when the writing assistant is active and not visible when the writing assistant is inactive. As noted, in some cases, field 250 may be the same as field 220. Or, in some cases, field 250 may appear if the user hovers over a predetermined region of the GUI in order to activate field 220/250. In the embodiment of FIG. 2j, the user may provide second input 255 into second field 250. The user input may include a collection of words (e.g., one or more words, phrases, etc.) that convey at least one idea or piece of information. The collection of words may include a word, a sentence fragment, a complete sentence, or clauses that can each convey a unique idea. The collection of words may also identify a subject and at least one attribute of the subject, for example, a name of person, a name of an organization, a time associated with an event, a name of a place, or a place associated with an event. The subject itself may identify an entity that is a person, a place, a thing, an organization, a corporation, an event, or some other appropriate identifier.

In response to input received from the user (e.g., text entered into second field 250), the writing assistant may generate any number of text output options and may provide those text output options in one or more second text output fields 260a-260c, as shown in FIG. 2k. In some cases, the assistant may generate one text output option in response to the user input. In other cases, two or more text output options may be provided, where the two or more text output options each express at least one idea and where the text output options differ from one another in at least one respect. Offering multiple text output options may enable the user to select the generated text output option that most closely conveys an intended idea or that most closely fits with the context of the document.

As shown in FIG. 2j, a user may begin to type a second input 255 in a second field 250 ("Lets make a phone call and talk"). The writing assistant, as shown in FIG. 2k, may generate second text outputs 260a-260c that, like the text outputs described above, are intended to convey the same meaning as the user input, but with well-written, context-fitting text. But, instead of choosing a second text output, a user may, as shown in FIG. 2l, prompt the generation/display of an additional field 265. As shown in FIG. 2m, a user could enter additional input 270 in the additional field 265 ("When it is possible for you?"). In response, the writing assistant may generate updated text output options 275a-275c (FIG. 2n) that take into account the information from inserted, preexisting text 245, second input 255, and the additional input 270. As shown in FIG. 2o, the user can select any of the generated text output options included in fields 275a-c. It should be noted that text output options included in fields 275a-c may have been generated as the user began entering text input into field 250, and the writing assistant may have updated the text output options one, two, or more times as the user continued entering text into field 250 and further as the user entered text into field 265.

In the example shown, the user selects text output option 275b (FIG. 2o), and as shown in FIG. 2p, the writing assistant may automatically insert the selected updated text output 275b into the workspace 210, creating a well-written, grammatically correct email (i.e., updated inserted text 280). In some cases, the use of two different input fields 250 and 265 may indicate to the writing assistant that two different sentences are intended, and, as a result, the text output options may be presented with multiple sentences (e.g., each corresponding to the concepts conveyed in a separate user input field).

Figure 3A:
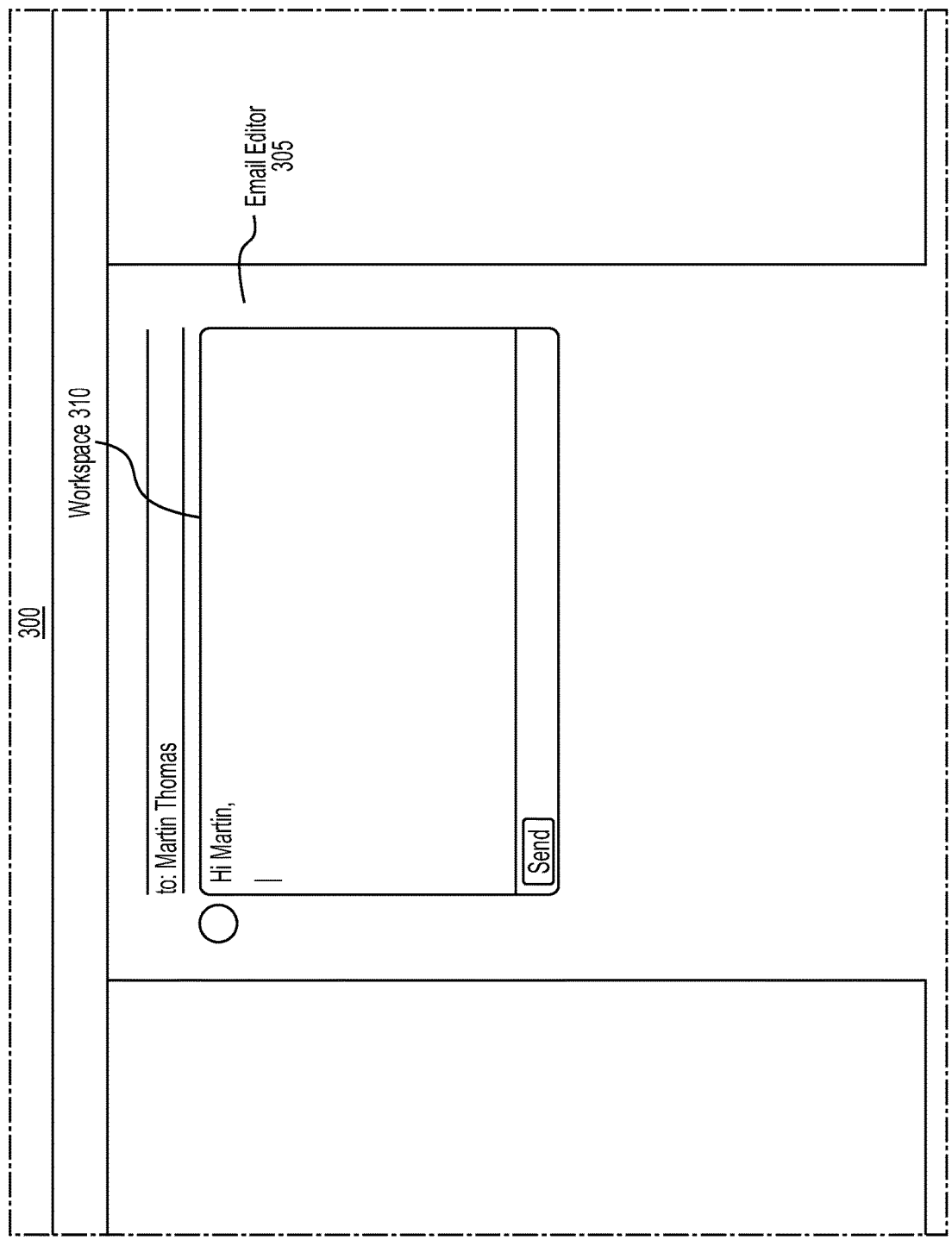
Figure 3B:
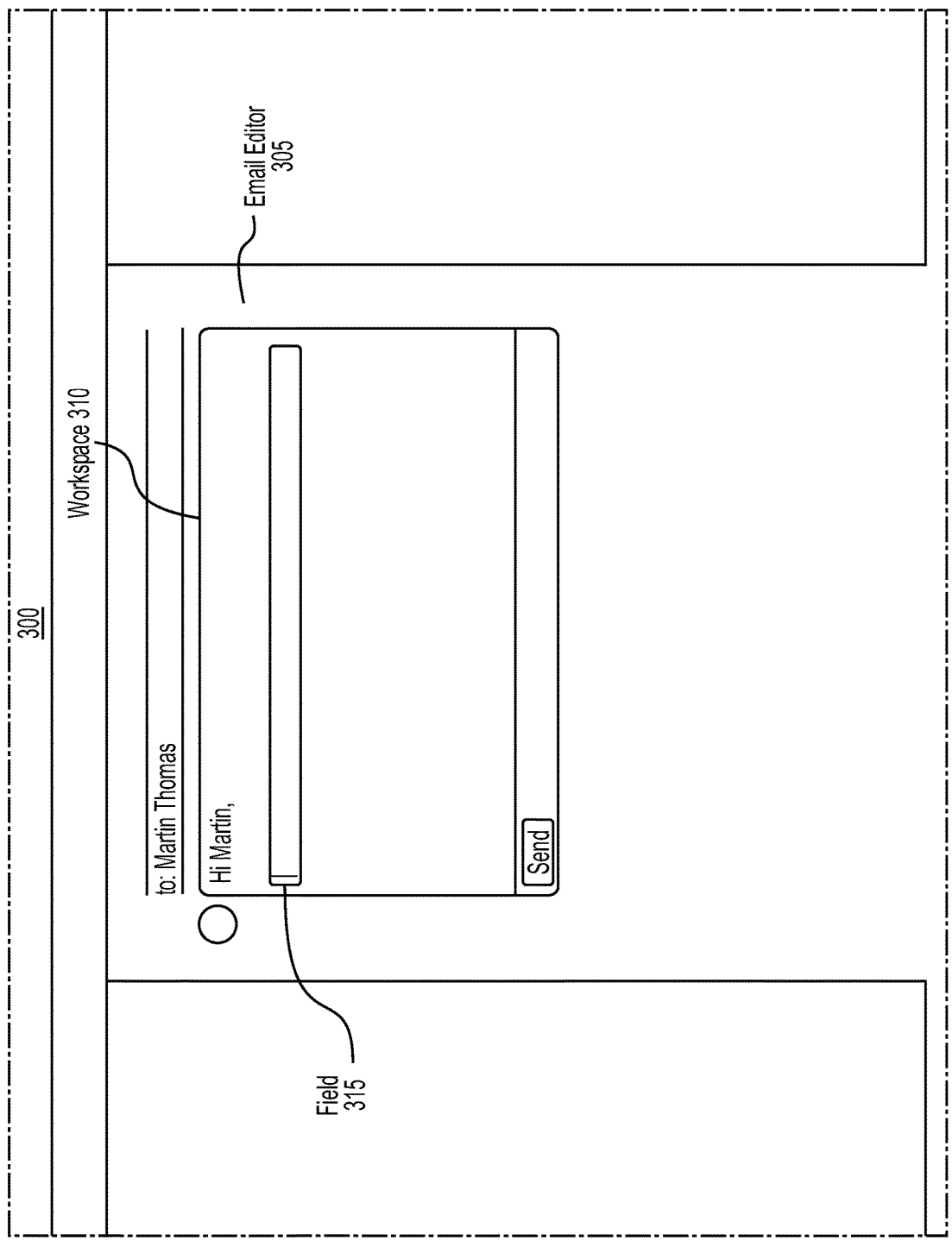
Figure 3C:
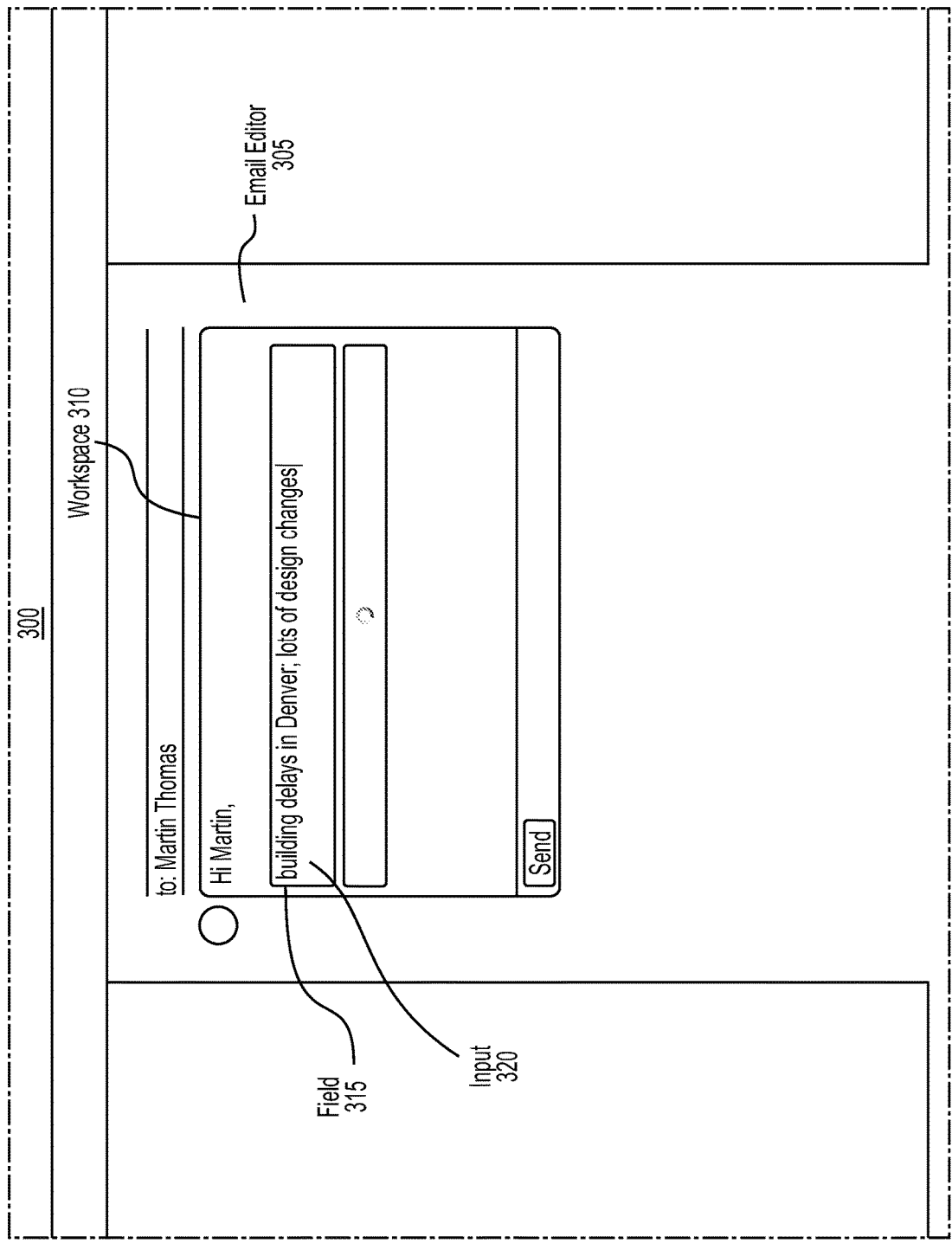
Figure 3D:
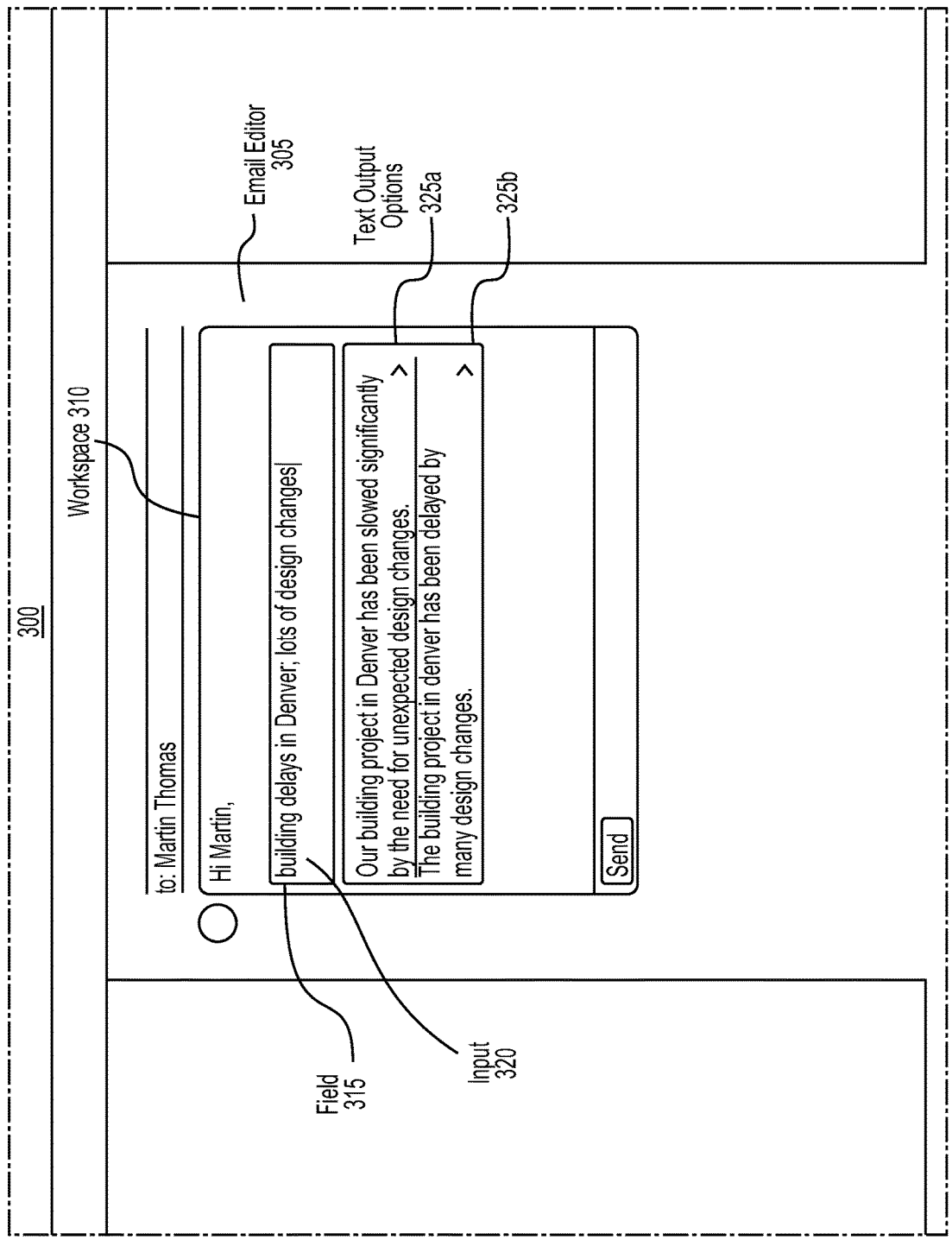
Figure 3E:
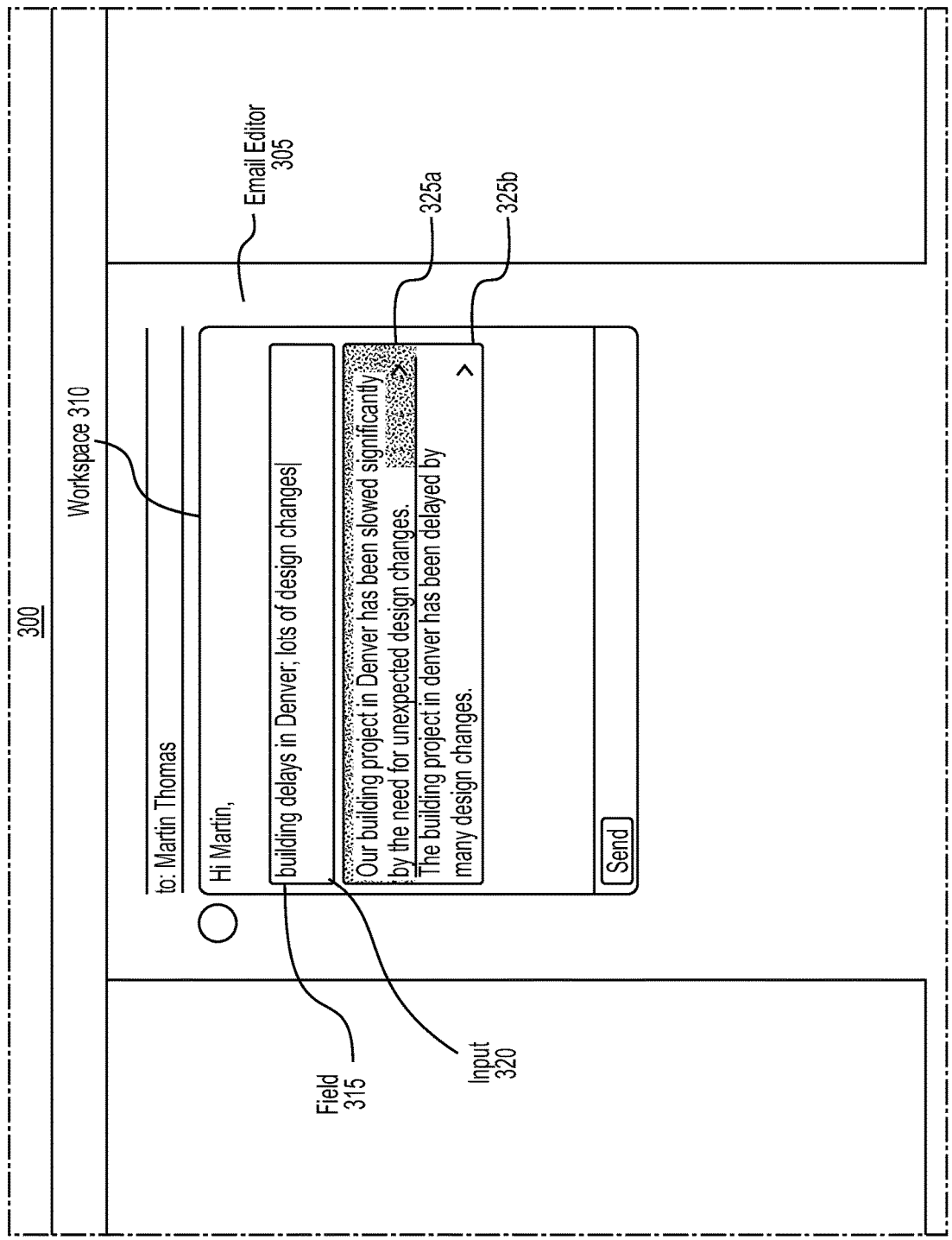
Figure 3F:
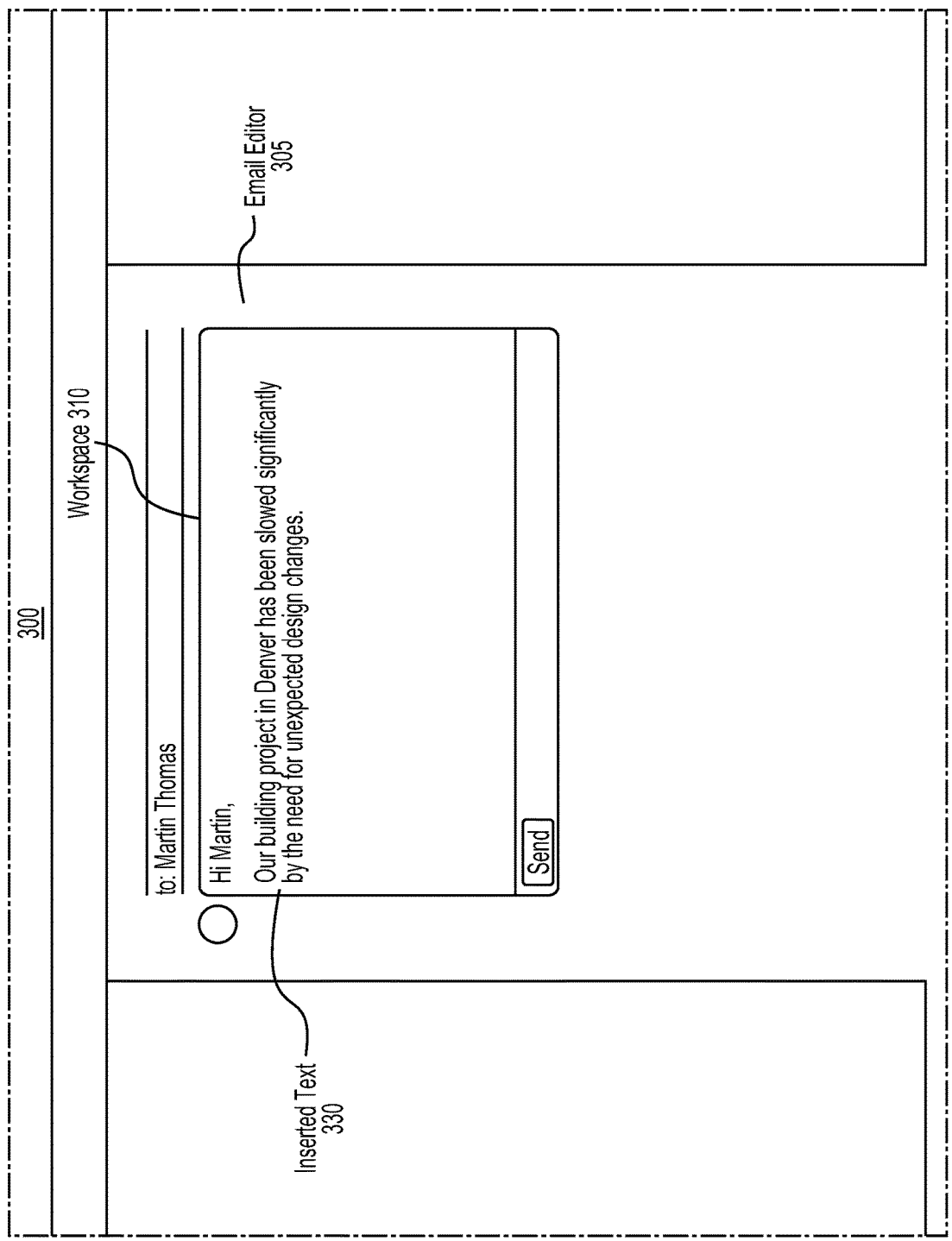

In addition to text output options that include phrases or sentence fragments, as shown in FIG. 2e, the disclosed writing assistant system can provide text output options in various other forms. In some cases, based on the received user input, the writing assistant can automatically construct multiple text output options that each express at least one idea associated with the received user input and where the text output options are provided in the form of complete sentences, multiple complete sentences, full paragraphs, multiple paragraphs, etc. For example, as shown in FIGS. 3a-3i, in response to received user input, the disclosed writing assistant may generate one or more text output options in the form of complete sentences that may convey an idea or information attributed to the received user input. The complete sentence options, as with other text output options of the disclosed writing assistant, may also agree with one or more contextual aspects of the received user input or other relevant text (e.g., preexisting text in a document being drafted by the user). For example, GUI 300 may be associated with an email editor 305 (or stand-alone writing assistant application or any other computer application that allows for text entry) and may include a workspace 310. As shown in FIG. 3b, a user can summon a field 315 in the writing assistant (e.g., by initiating typing in workspace 310, positioning a cursor relative to workspace 310, hovering a cursor over a designated area associated with the GUI, selecting a menu item associated with the writing assistant, clicking on a virtual button to initiate the writing assistant, or any other suitable technique for initiating the writing assistant application). Similar to the example above, the writing assistant may function relative to text the user enters directly into workspace 310 and/or may function in response to text entered by the user into input field 315, as shown in FIG. 3b. As shown in FIG. 3c, a user can enter text input 320 into field 315. Text input 320, provided in field 315, for example, may include one or more words, phrases, sentence fragments, sentences, clauses etc. with which the user may use to convey ideas, information, and/or to indicate context, etc. In the example shown in FIG. 3c, text input 320 includes the phrases, "building delays in Denver; lots of design changes." As shown in FIG. 3d, the writing assistant create full-sentence text outputs options 325a and 325b based on these inputted phrases included in text input 320. While two text output options are shown in FIG. 3d, the disclosed writing assistant may generate more or fewer text output options. As shown in FIG. 3e, the user can select from among the generated text output option. In this case, the user selects the text output option 325a, which reads, "Our building project in Denver has been slowed significantly by the need for unexpected design changes." Next, as shown in FIG. 3f, the writing assistant can insert the selected text output option into workspace 310 as inserted text 330.

Figure 3G:
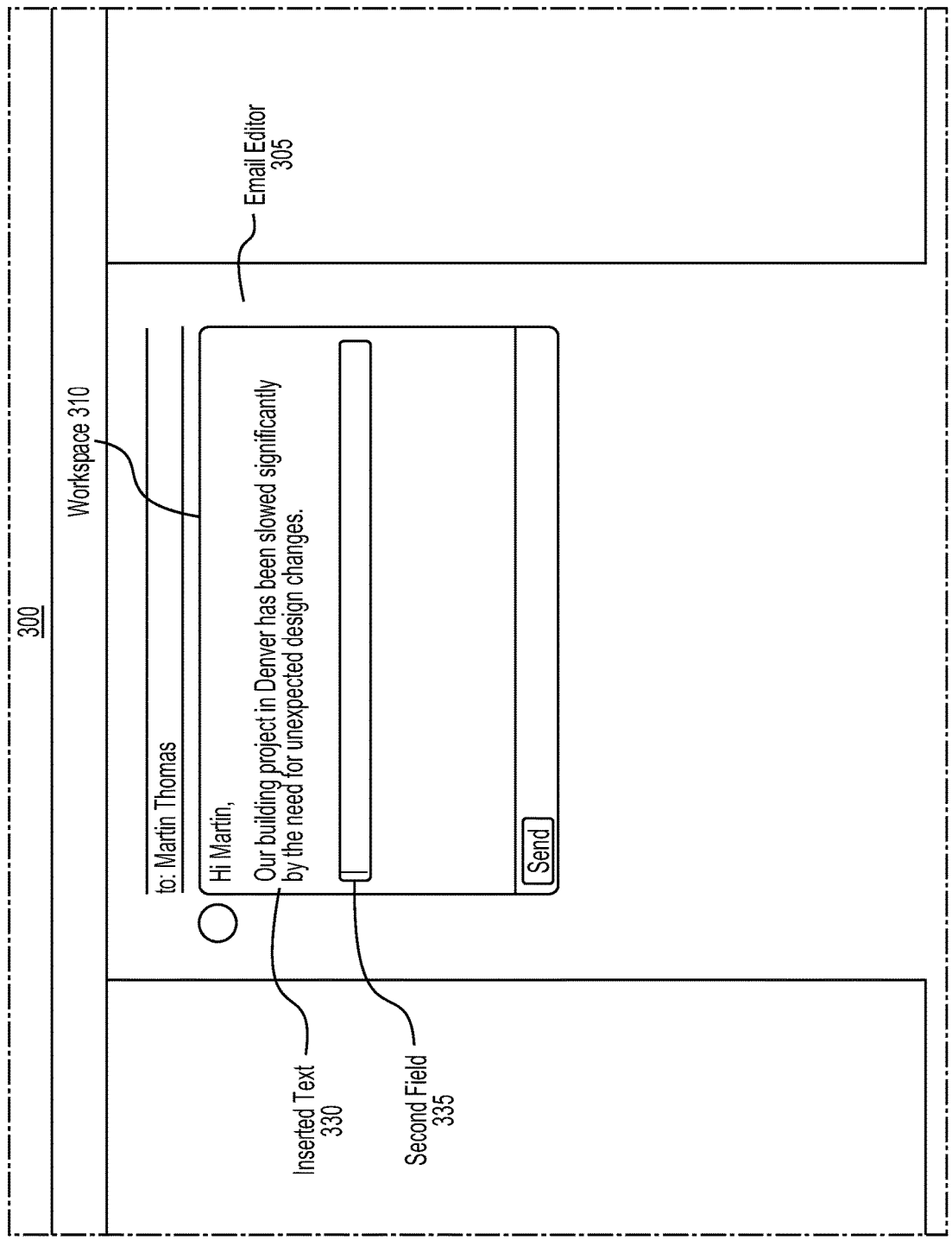

This drafting process, augmented by the writing assistant application may continue as long as the user has additional concepts or information to convey. For example, as shown in FIG. 3g, the writing assistant GUI 300 may include a field 335 for receiving user input. As in the example described above, field 335 may constitute a newly generated field (e.g., a second field initiated by activation of a writing assistant control element). In other cases, however, field 335 may be the same as field 315, once emptied of any previous user input, such as input 320. In some cases, selection by the user of a generated text output option (e.g., one of text output options 325a or 325b) may automatically result in field 315, 335, etc. being cleared of text input by the writing assistant application in order to prepare for the entry of additional user input into field 315, 335, etc.

Figure 3H:
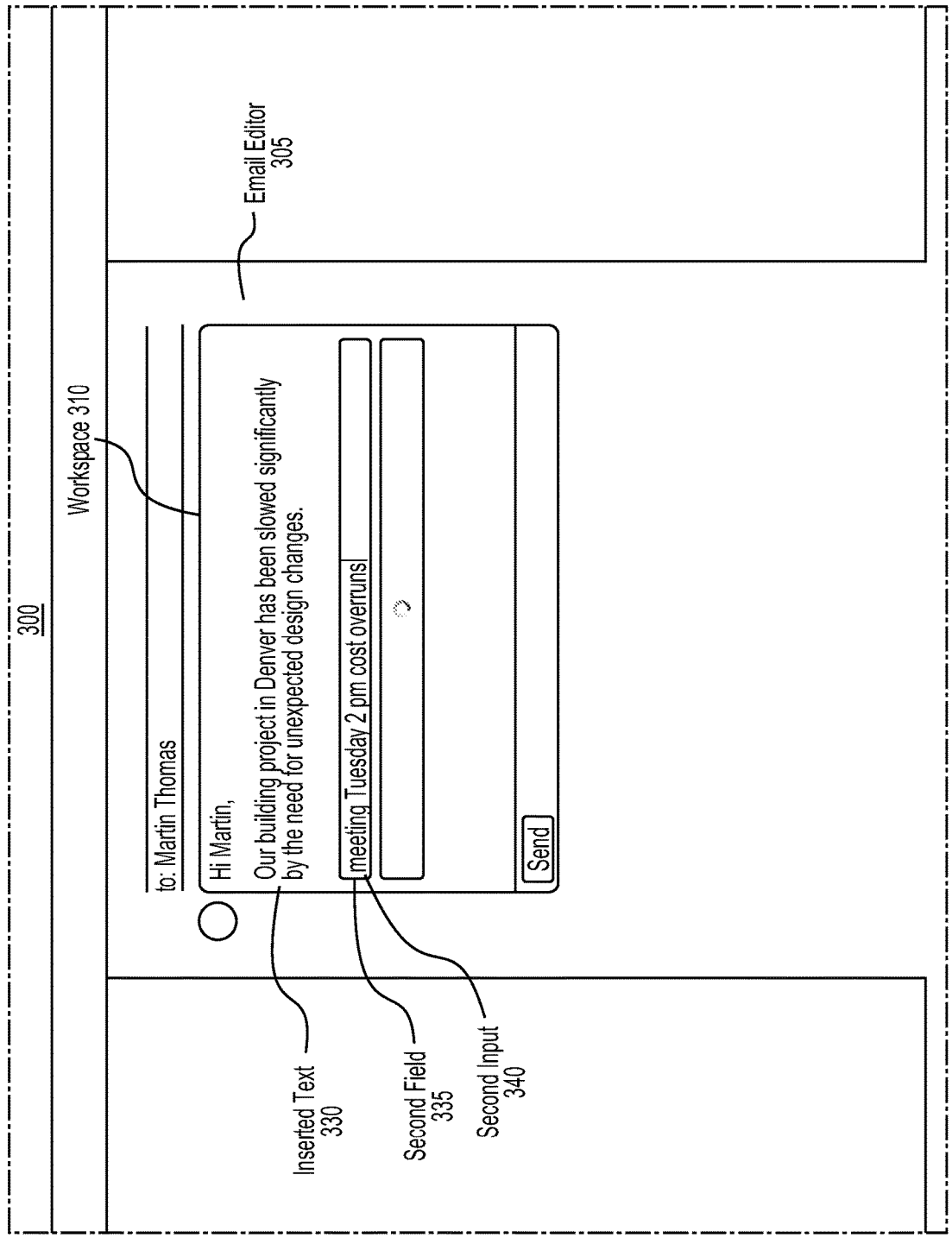
Figure 3I:
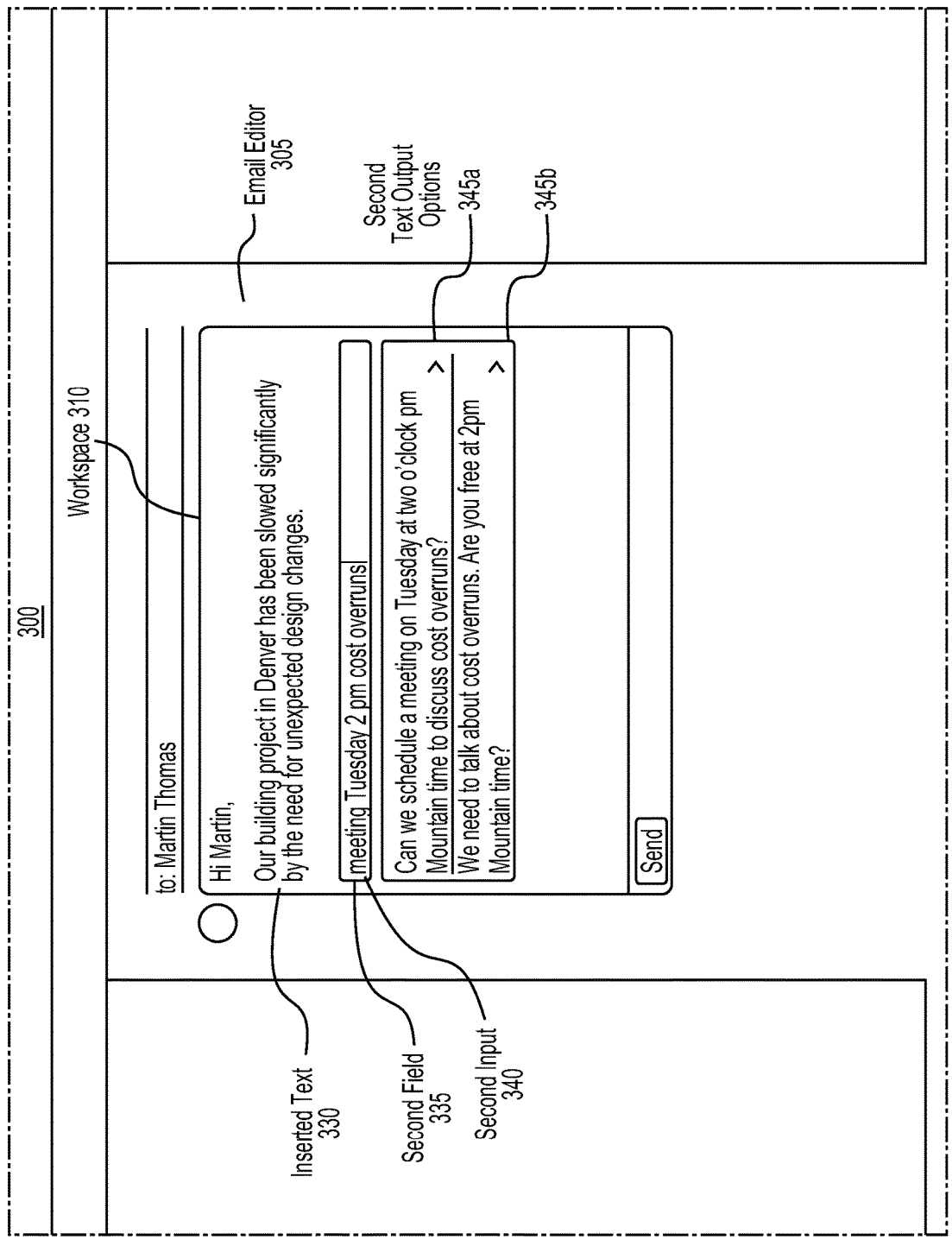

To generate a second sentence for the document, the user can provide input to field 335, and the writing assistant can generate text output options in response. As shown in FIG. 3h, the user may provide to the system, as input 340, the group of words: "meeting Tuesday 2 pm cost overruns." In response, the writing assistant may populate one or more (e.g., two or more) text output fields 345a and 345b (which may take the form of windows, text boxes, etc.) with the text output options generated by the writing assistant based on the user input 340. The writing assistant may also base the text output options upon text already existing in the document workspace 310. For example, as shown in FIG. 3i, the document being drafted includes inserted text 320 (e.g., text inserted into workspace 310 by the user's previous selection of the text appearing in field 325a) that reads, "Our building project in Denver has been slowed significantly by the need for unexpected design changes."

The writing assistant can use both the user input 340 and the inserted text 330 in generating the text output options provided in fields 345a and 345b. In some cases, contextual information may be determined by the writing assistant analyzing inserted text 330 and/or user input 340. The writing assistant may also generate the text output options to convey the same or similar ideas or information detected as included in user input 340, even where user input 340 does not include complete sentences. That is, despite not representing a complete or grammatically correct sentence or grammatically correct sentence fragment, the writing assistant can determine an idea and/or information associated with the user input 340 (in this case, that the user would like to request a meeting on Tuesday at 2 pm to discuss cost overruns associated with the building project). In response, the writing assistant can automatically generate one, two, or more complete sentence options that convey the meaning and/or information associated with the user input 340. For example, as shown in FIG. 3i, a first complete sentence options shown in field 345a may read, "Can we schedule a meeting on Tuesday at two o'clock pm Mountain time to discuss cost overruns?" Another text output option, shown in field 345b may read, "We need to talk about cost overruns. Are you free at 2 pm Mountain time?" Notably, both text output options convey the idea and information that the user is interested in a meeting at 2 pm on Tuesday regarding cost overruns. Notably, as the example of FIG. 3i shows, the writing assistant text output options may be complete sentences, despite the user input constituting less than complete sentences. Further, the text output options may include two or more complete sentence options even where the user input includes less than a single complete sentence.

As in the previous examples, the writing assistant can also generate the text output options included in fields 345a and 345b such that they agree with contextual aspects of other relevant text, such as the user input 340 and/or the inserted text 330. For example, both text output options shown in FIG. 3i, include a clarification that the time requested for the meeting is relative to the Mountain time zone. The system may include such a clarification, for example, by recognizing that the preexisting sentence related to a building project in Denver, which the system automatically recognized/determined as located in the Mountain time zone of the United States.

The text output options generated by the disclosed writing assistant systems may convey any conceivable ideas or information that may be included in or associated with a user input. For example, in some common examples, the expressed ideas of the text output options may include, but are not limited to, a time for a meeting, a request for a meeting, a purchase request, or various ideas/information conveyed by one or more entered clauses (e.g., when a delivery is expected to arrive, when a last meeting occurred, an indicator of an attribute associated with certain goods or services, among hundreds of thousands of other types of clauses).

The text options automatically generated by the writing assistant may be similar to the received user input (e.g., compare the input in field 335 of FIG. 3i to the first text output option provided in output field 345a). In other cases, however, the generated text output options, whether representing complete sentences or not, can differ significantly from the user input. In fact, in some cases, the text output options generated by the writing assistant may include none of the words from the user input and, instead, may convey the ideas, meaning, and/or information associated with the user input using entirely different words than those included in the user input.

The text output options automatically generated by the writing assistant may differ from the user input in various other ways. For example, the text output options may include a re-ordering of the subject, verb, adjectives, pronouns, or any other attributes from a collection of words associated with or included in the user input. And, as described above, the writing assistant can extract at least one higher-level attribute associated a subject associated with the user input. For example, such higher-level attributes associated with the subject may include, but are not limited to, a gender of the subject, a relation of the subject to the user, an education level indicator of the subject, or a relation of the subject to another entity. An example of this type of extraction of higher level attributes associated with the subject of a user input is shown in FIG. 1b where the writing assistant automatically determined that Jennifer Abrahams likely identifies as a female and, therefore, replaced her name in the text output options with the pronouns "her" or "she." This is a subtle, but especially powerful feature, as the text output options provided in FIG. 1b all sound more natural to a reader than if the name "Jessica Abrahams" was repeated again in the same sentence.

It should be noted that while the embodiments of FIG. 2 and FIG. 3 include fields (e.g., field 315 in FIG. 3b) for entering user input, the disclosed embodiments of the writing assistant are not limited to receiving user input via such text entry fields. Rather in some cases, and as noted above, the writing assistant may monitor text entered in workspace 210/310, for example, and may generate text output options based on text that a user may enter directly into the workspace. For example, in some cases, the writing assistant may focus on subsegments of text provided in workspace 210/310 and use those subsegments as the user input for generated text output options. Such text subsegments may include, for example, text that a user inputs in workspace 210/310 after a preceding period or other sentence ending punctuation. In other words, for each new sentence that a user wishes to include in a new document, the user may enter one or more words, sentence fragments, group of words, etc. that convey an idea, meaning, or piece of information. In response to the enter words, etc., the writing assistant can provide text output options (e.g., in the form of complete sentences, etc.) that convey a meaning, idea, and/or information of the user input and that agree with preexisting text. The user can select from among the provided options such that the selected text output option is appended to the document in place of the current user input. The user then moves on to constructing a new sentence by providing another series of words, etc. that trigger the writing assistant to generate another series of text output options associated with the newly received user input (e.g., newly entered after a period or other sentence-ending punctuation, after a carriage return, etc.). In addition to supplying user input via typed text, any other suitable input methodology may be employed for providing user input. In some cases, for example, user input may be provided via voice recognition applications.

When automatically constructing the complete sentence options (or other types of text output options), the writing assistant can use predetermined style parameter values or selected user-selected style parameter values n constructing the text output options. These style parameter values may be used to generate an initial set of text output options. Alternatively, or additionally, the writing assistant may use the style parameter values to further refine certain text output options (e.g., options selected or indicated by a user).

FIGS. 4a-4g illustrate another example of possible interaction between the writing assistant and a user during generation of text for a document. Again, an email editor 405 is shown as the environment in which the writing assistant is employed, but any other text-related computer application may also be used. In the example, of FIG. 4a, the user can summon a field 420 in a workspace 410 using any suitable technique, such as those described above. In some cases, workspace 410 may include preexisting text 415 already entered by the user (or which may already appear as part of a preexisting document, such as a Word file, etc.). As show in FIG. 4b, the user can enter text input 425 ("Thanks for the meeting with Michael") into user input field 420. In response, similar to the examples described above, the writing assistant can automatically generate text output options 430a-430c.

In this example, the text output options may be included together with various control elements, such as icons 435 and/or icons 436 in GUI 400. Such control elements may be used by the user to control various interactions with the writing assistant. For example, in order to select one of the text output options and to cause the selected text output option to be inserted into the workspace (as described in the examples above), the user may click on or otherwise select an icon 436 that corresponds with the desired text output options. In response, the writing assistant may cause the selected text output option to be inserted into the workspace.

Figure 4A:
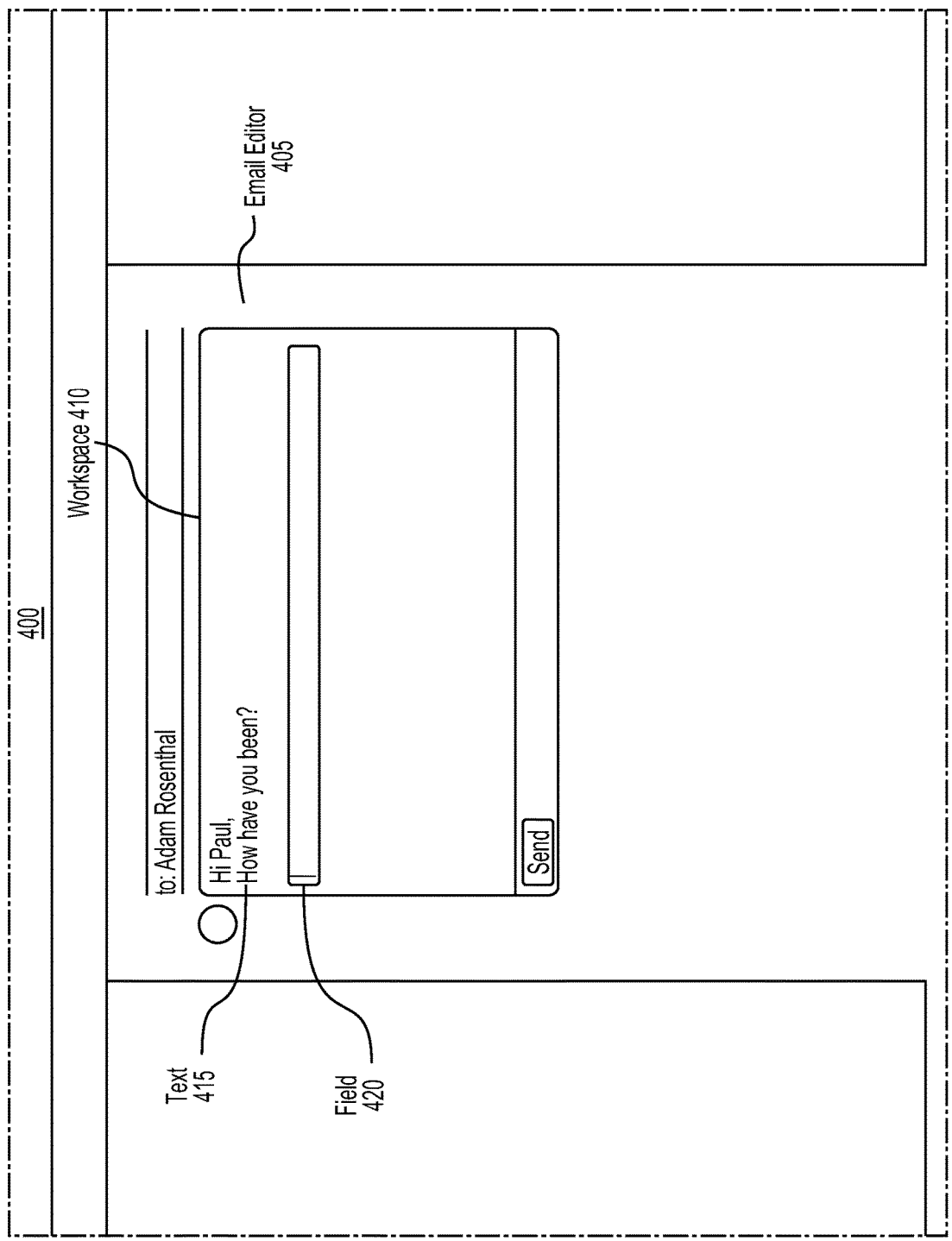
Figure 4B:
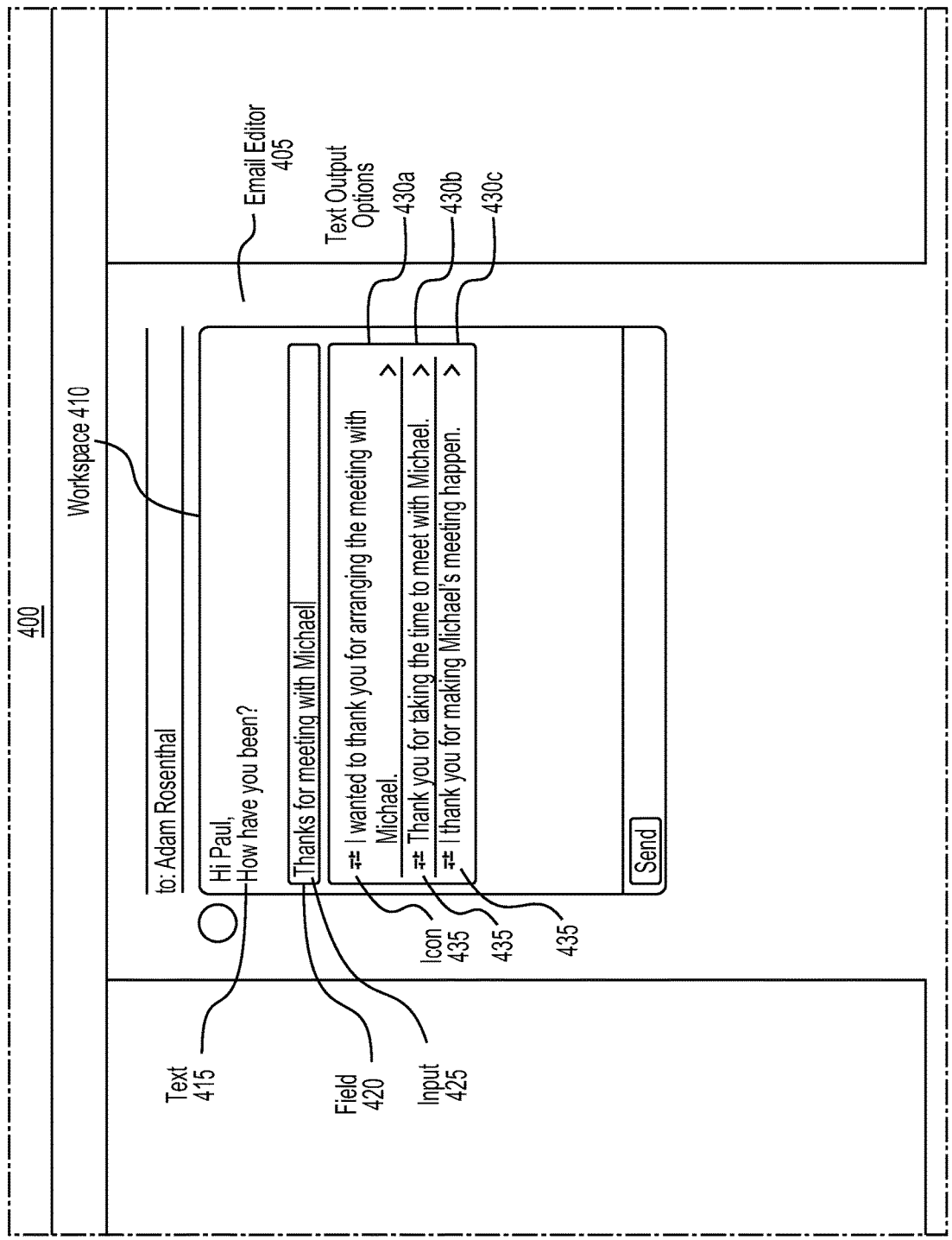
Figure 4C:
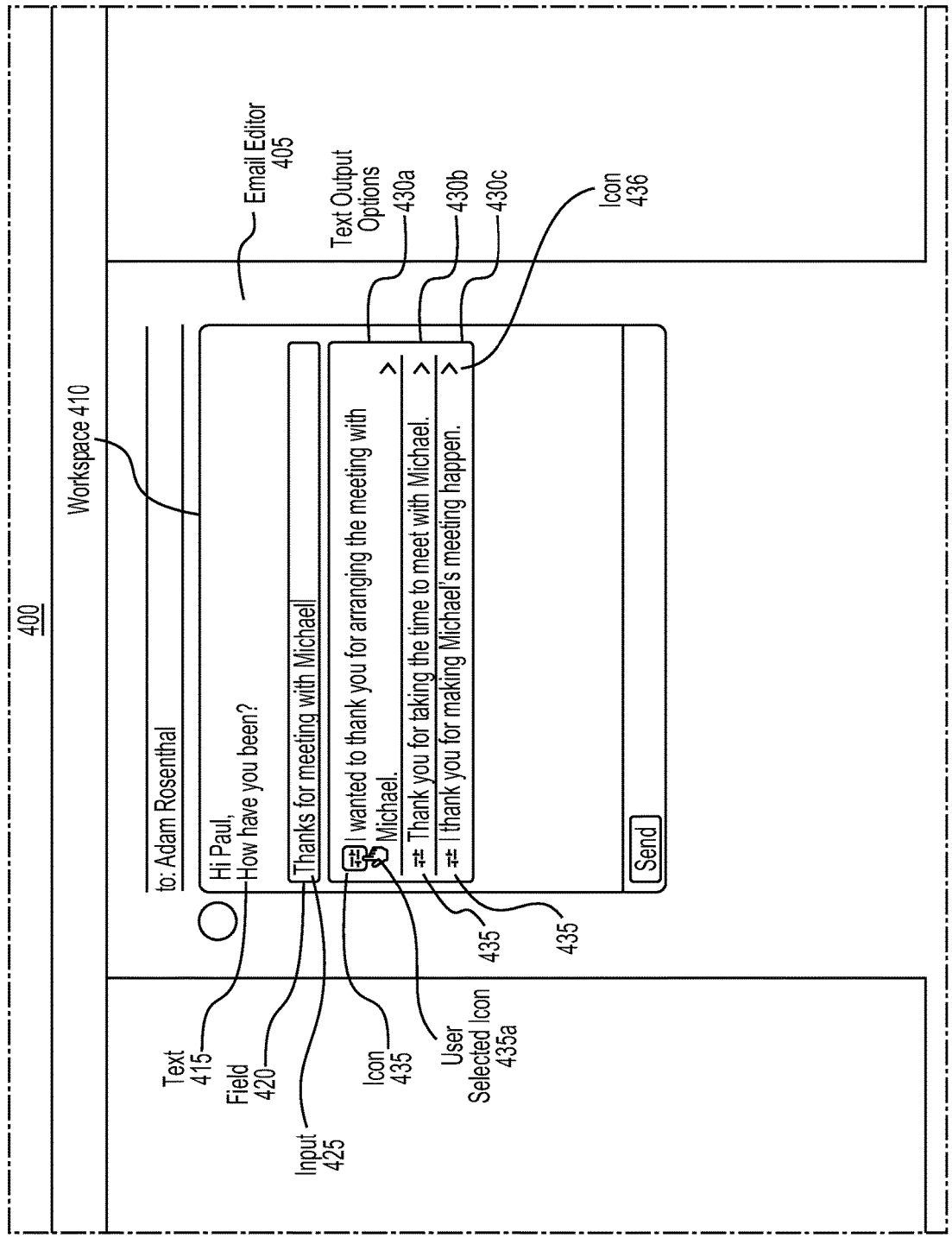
Figure 4D:
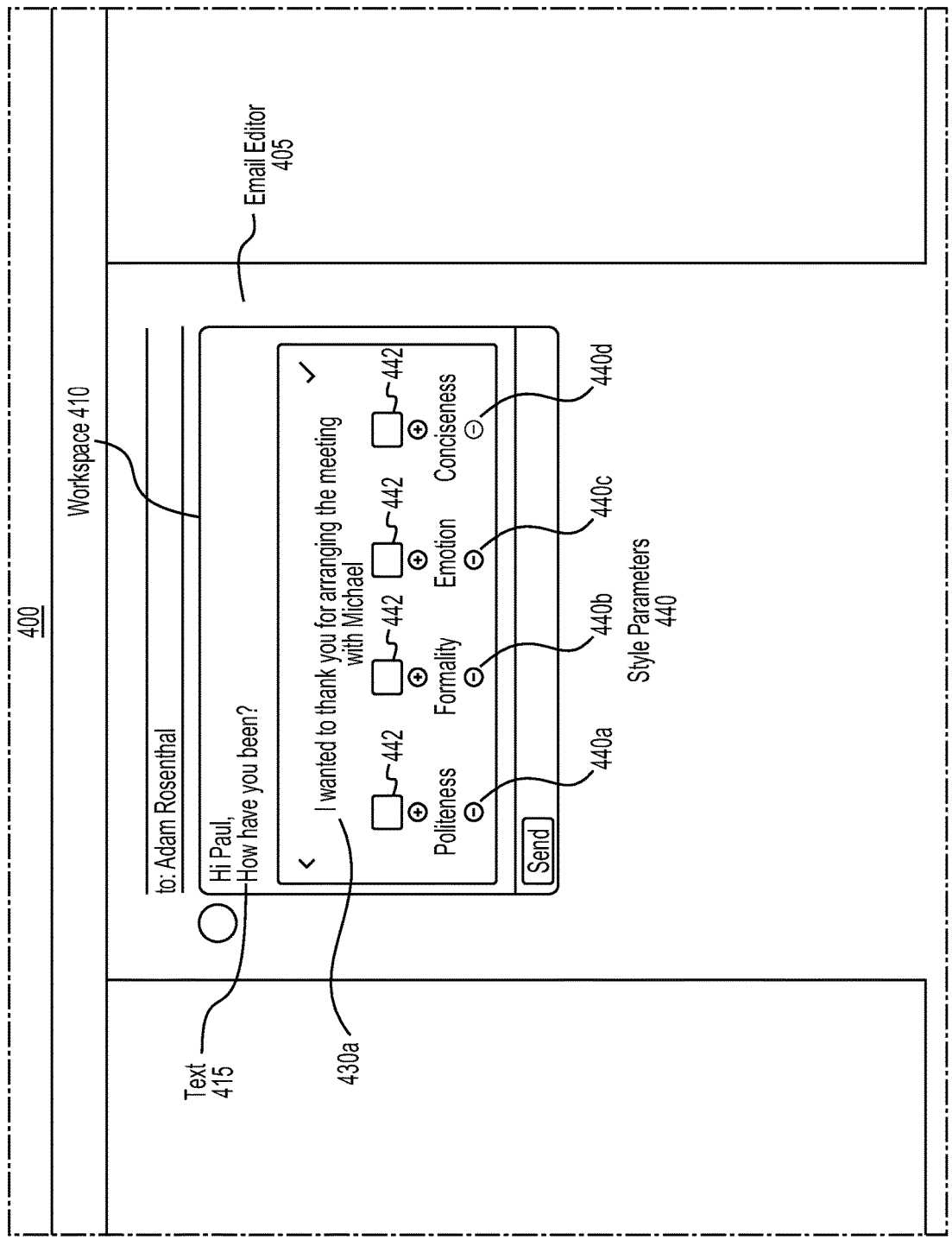

Other control elements may be included as well. For example, as shown in FIG. 4c, the user can select any of the icons 435 to initiate one or more functions associated with the selected icon. In the example shown, a user may select icon 435a (denoted by gray highlighting over icon 435a) that corresponds with a particular text output option 430a. In response to selection of icon 435a, and as shown in FIG. 4d, the writing assistant GUI 400 can display another window (e.g., a style parameter control window) that identifies style parameters 440 (e.g., parameters 440a-d) for which values may be selected by the user. The values for the predetermined style parameters (which, in some cases, can be built into the writing assistant or which may be user-selectable) may specify a level of formality, conciseness, emotion, politeness, or a level associated with any other parameter type that may be relevant to the document. For example, in some cases, the user may control the length of the text output options (e.g., complete sentences or otherwise) using the conciseness control. Alternatively or additionally, a text output option length selector (not shown) may be included to enable a user to specify a desired maximum length (e.g., 8 words, 12 words, 20 words, etc.) for the generated text output options or to specify a desired length range for the generated text output options (e.g., between 5-10 words, 11-20 words, etc.).

Figure 4E:
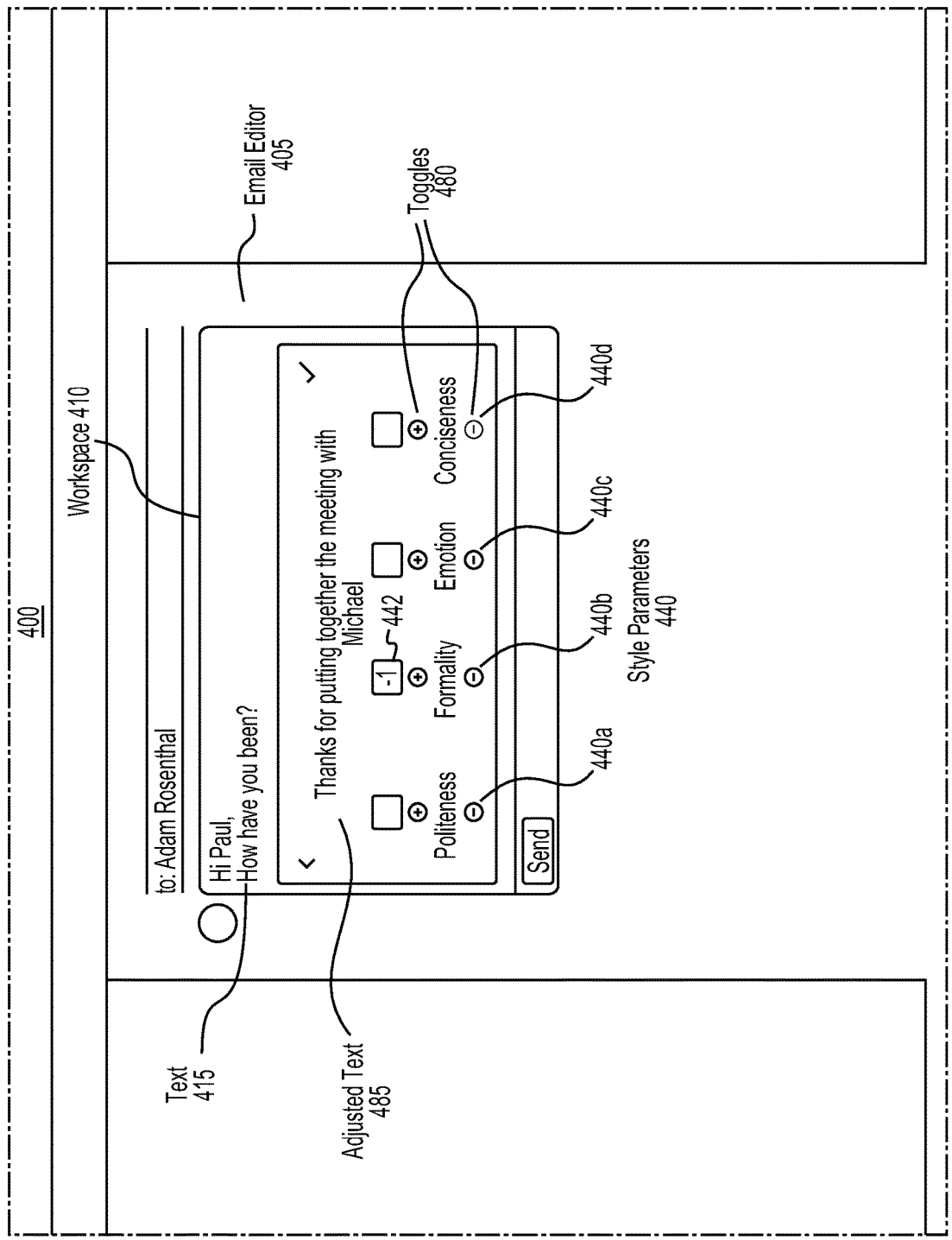

As shown in FIG. 4e, the user can edit the level of the style parameters using the displayed toggles 480 (or any other suitable GUI control elements) or by manually typing entering the adjustment herself via the modifier windows 442. For example, as shown in FIG. 4e, the user has adjusted the level of formality 440b down to "−1" (e.g., to a lower level of formality using toggles 480 or modifier window 442). This change may cause the writing assistant to automatically update the text associated with selected text output option 430a according to the change in parameter value. For example, as shown in FIGS. 4d and 4e, the reduction in level of formality may cause the writing assistant to change the selected text output option ("I wanted to thank you for arranging the meeting with Michael") to the adjusted text 485 ("Thanks for putting together the meeting with Michael").

The adjusted text 485 is less formal than the original selected text 430a. For example, as FIGS. 4d and 4e show, in response to the change in formality level, the writing assistant makes several changes, such as changing "thank you" to "thanks" and "arranging the meeting" to "putting together the meeting" to lessen the level of formality.

The user may continue to adjust the level of formality up or down, and in response, the writing assistant may continue to generate updated text for the text output option to reflect the user's change in formality level. Of course, other available parameter values may also be changed. In the example shown in FIG. 4d, the user can make adjustments to the politeness, emotion, and conciseness parameter levels (e.g., using toggles 480. And in response to a change in value of any of the available parameters, the writing assistant may generate updated text for the text output option to reflect the user's changes.

Figure 4F:
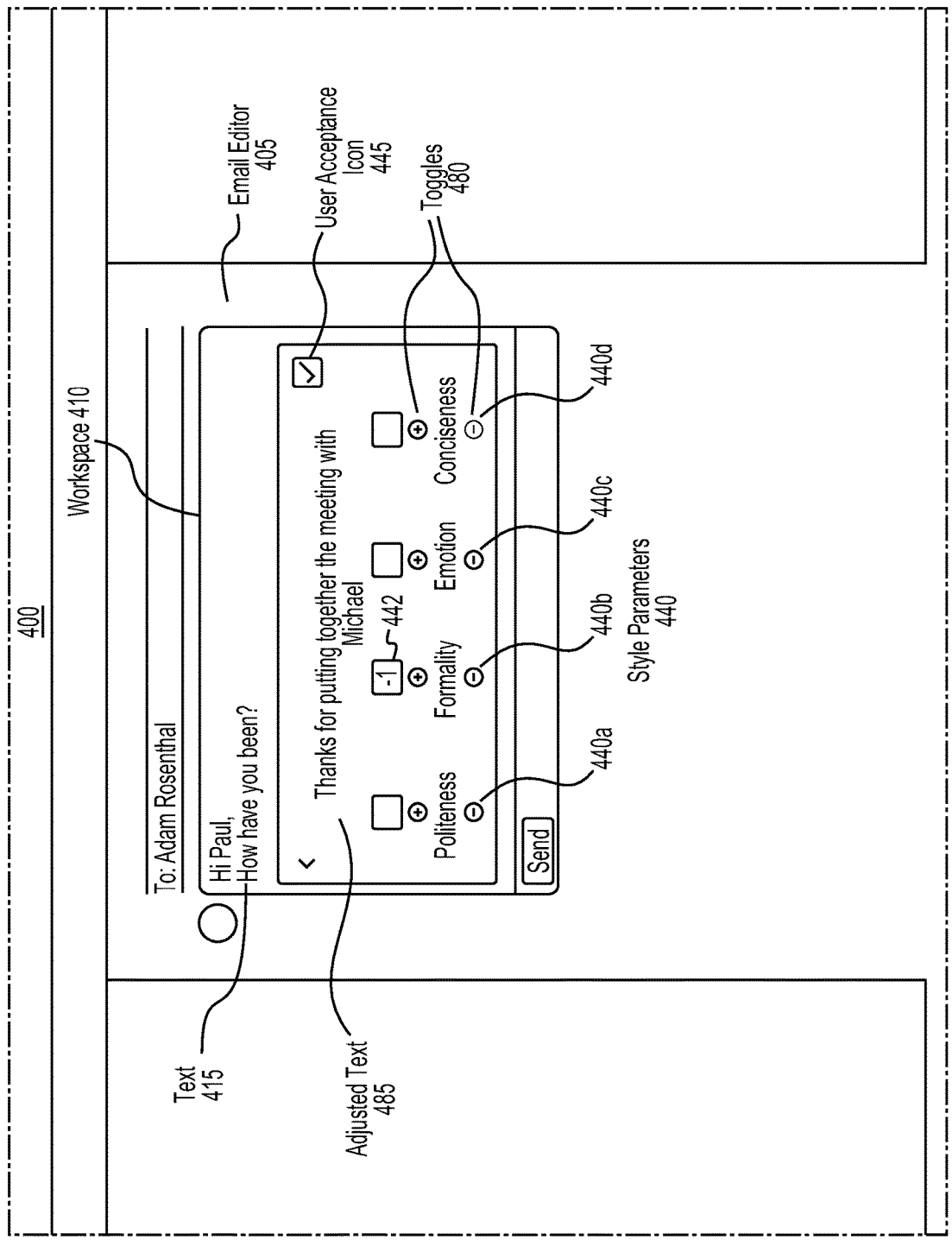
Figure 4G:
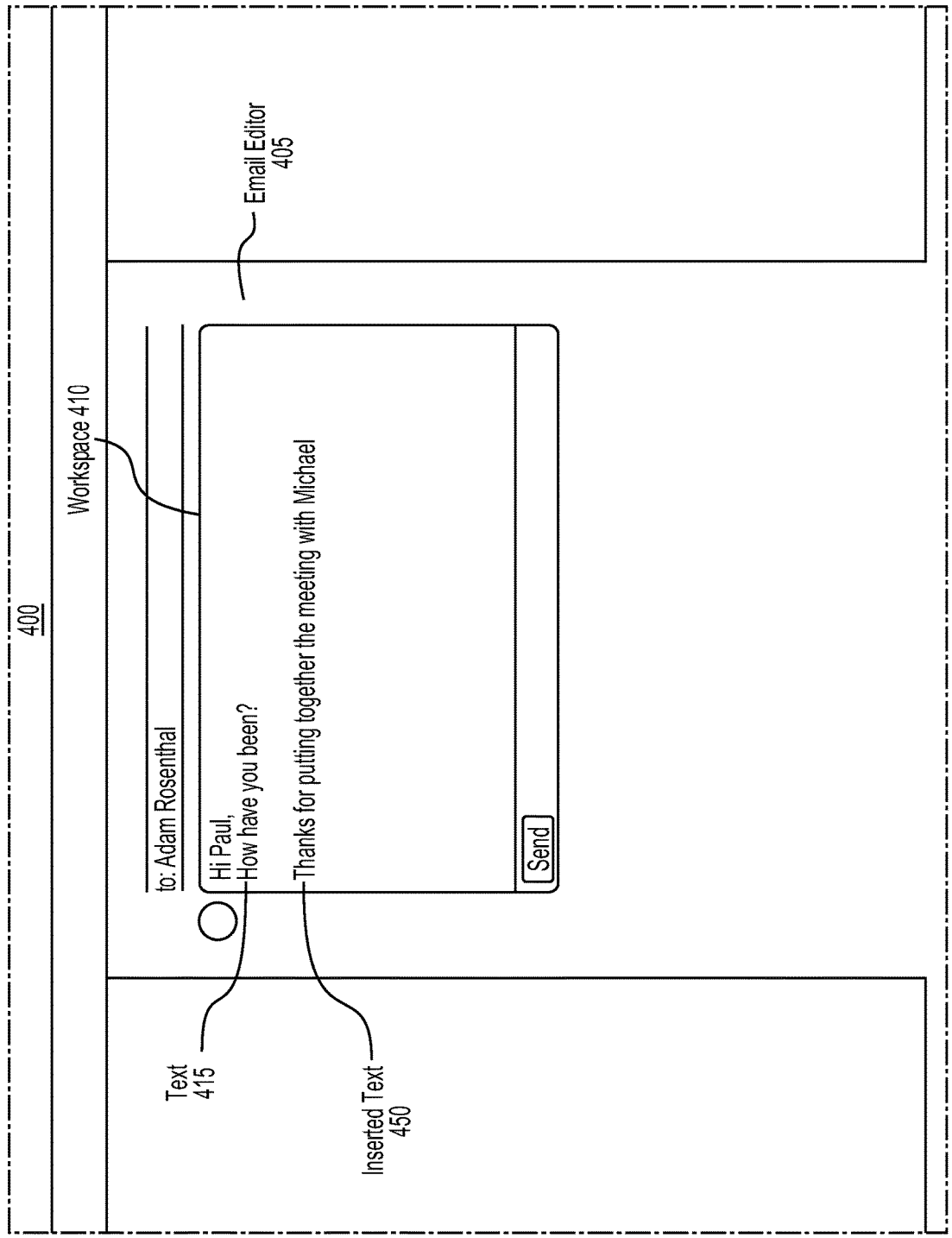

As shown in FIG. 4f, once the user is satisfied with the adjusted text 485, the user can select the adjusted/refined text output by selecting the user acceptance icon 445. As shown in FIG. 4g, the writing assistant can automatically insert the adjusted/refined text into the document or email workspace 410 as inserted text 450. This feature is not limited to style parameters such as politeness, formality, etc. The user may also specify other aspects of the text output options, such as a text output length, as described above. Further, a user-specified length for the text output options can be expressed numerically, as described above, or may be expressed more generally as short, medium, or long. For example, in the parameter level control window, the writing assistant may show the options short, medium, and long on the display for the user to choose. In another example, the writing assistant may include toggles similar to those in FIG. 4f that may allow the user to incrementally increase or decrease the number of words provided in a text output option (including a selected text output option, such as text option 430a. For example, selected text output option is 11 words long, but if a user wished to shorten or limit the length of the text output option to 10 words, the user could enter "10" in a length style parameter modifier input field (by toggle, typing, voice recognition, etc.). In response, the writing assistant would automatically refine the selected text output option to adhere to the user-imposed length limitation. For example, the writing assistant could change the selected text output option 430a to "Thank you very much for arranging the meeting with Michael." to convey the original meaning of text output option, but within the 10-word limit.

As described above, the writing assistant can automatically construct textual output options that differ from the user input in at least one respect, express a meaning, idea, or information associated with the user input, and also agree with a context associated with text elements either found in the user input or within text (e.g., preexisting text in a document workspace) that is different from the user input. Contextual agreement may have various meanings. In some cases, however, an agreement between two or more text elements may refer to grammatical agreement (e.g., the insertion of the generated text output option does not result in a grammar error relative to the preexisting text). In other cases, agreement between text elements may be achieved by the generated text output options being generated to include in the same or similar style as the text around it (e.g., preexisting text in a document workspace). Another contextual agreement may exist where a generated text output option connects coherently to the text around it once inserted into a document workspace. This form of agreement may include, but is not limited to, the generated text being related to the same general subject as the context and/or events or facts referenced in a generated text output options being consistent with events or facts referenced by preexisting text in a document workspace, for example. The consistency may be relative to a relationship (e.g., temporal, causal, teleological, explanatory, etc.) existing between generated text output options and preexisting text or user input. Contextual agreement may also exist where facts implied by generated text output options are consistent with facts implied by the preexisting text; where temporal and causal relations between facts or events referenced in generated text output options and in the preexisting text are not implausible in light of real-world constraints (e.g., a person can't perform an action after he dies, an event cannot start after it ends, a person cannot be located in two different locations at the same time, etc.). A possible test of contextual agreement between preexisting text and text output options generated by the writing assistant may include whether more than seventy percent of human evaluators are not able to discern that a generated text output option, once inserted into the preexisting text, was generated by a machine rather than by a human. In addition to controlling text style using style control parameters, the disclosed embodiments of the writing assistant may also be configured to apply a default style that is predetermined or learned based on usage. For example, the writing assistant may learn the personal style of the user or the style of a particular organization, in different contexts (e.g., based on internal business documents, external business email, personal email, etc.). In this way, the writing assistant may generate suggested text output options in a style that resembles that personal or organizational style in the specific context of the document.

Further, in addition to enabling the modification of individual text output options, the writing assistant may also be configured to enable users to modify the desired style of entire document. In response to such a selected action, the writing assistant may automatically rephrase the existing document text and all text generations in that document going forward in accordance with one or more selected style parameter values to be globally applied. Similar to other described examples, such style parameters may include formality, conciseness, politeness, emotion, sentence length, etc.

Additionally or alternatively, the writing assistant may enable users to select any piece of text, e.g., in the document being written or in another source, and choose to copy that text's style. For example, the writing assistant may detect at least one style attribute (politeness, emotion, formality, etc.) associated with the selected text and then may use or apply such a style attribute in modifying other text in the document. For example, a user may select any piece of text in the document and choose to 'paste' the copied style attribute. The assistant will then automatically rephrase the target text such that its style resembles that of the source text or the assistant may offer one or more text output options that rephrase one or more segments of the target text in the style of the source text.

Figure 5A:
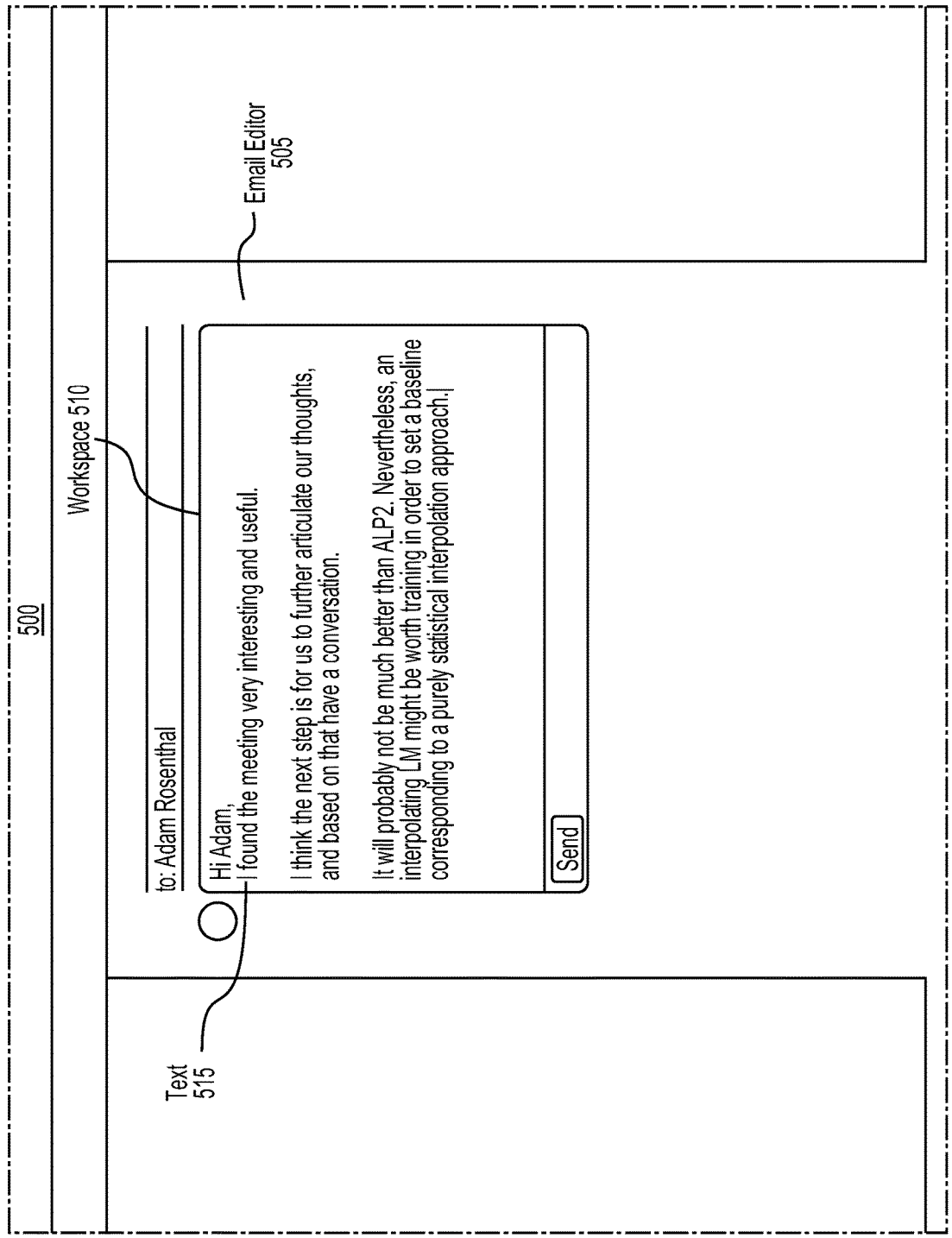

Disclosed embodiments of the writing assistant are not limited to the generation of text options based in response received text input from a user. For example, in some embodiments, various text segments (one or more words, sentence fragments, phrases, sentences, paragraphs, etc.) may be identified in an existing document (e.g., either automatically or based on user control), and in response, the writing assistant may generate one or more text output options relative to the identified text segments. FIGS. 5a-5f show one example of such functionality provided by the disclosed writing assistant applications. FIG. 5a shows an exemplary email editor 505 including a workspace 510 (although any other type of text-based computer application may be used in conjunction with the disclosed writing editor or the writing editor may be embodied as a stand-alone application). As shown in FIG. 5a, the email document includes preexisting text 515.

Figure 5B:
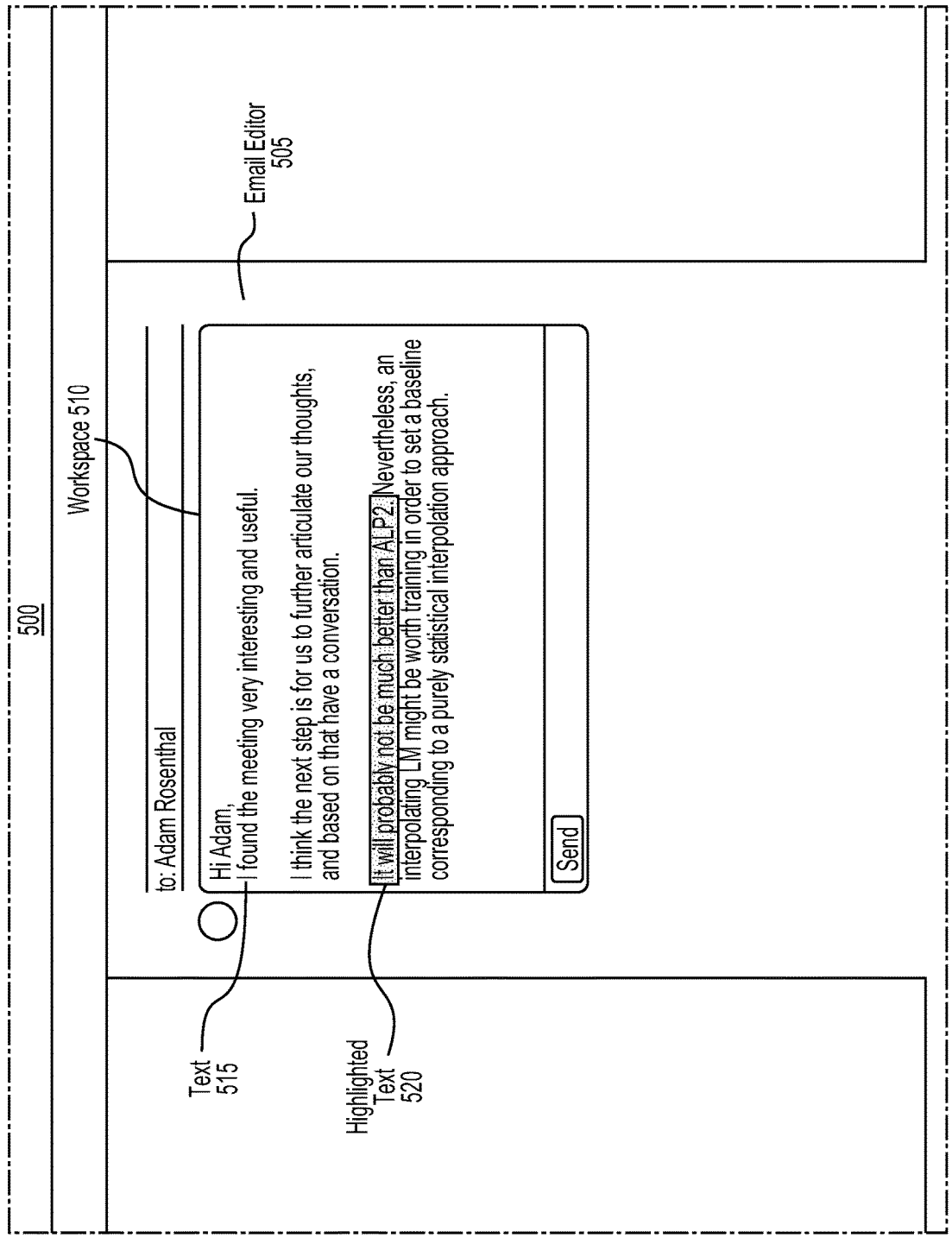

The presently disclosed embodiments of the writing assistant may automatically analyze preexisting text 515 and identify text elements for which the writing assistant may offer one or more text output options as alternatives. For example, as shown in FIG. 5b, the writing assistant may automatically analyze text 515 and identify text elements, such as highlighted text 520, for which the writing assistant may offer alternative text output suggestions. Such automatic analysis may be initiated as part of a routine called by the user so that the writing assistant scans the text and offers suggestions for fixes (e.g., two or more alternative text options for the user to consider as alternatives to the highlighted text 520).

It should be noted that there may be additional techniques for causing the writing assistant to analyze text within a preexisting document and offer suggested alternative text relative to identified text. For example, such functionality may be provided automatically as a user enters text into a workspace. That is, if a user enters a text element into a workspace that the writing assistant determines may be improved, the writing assistant may alert the user by highlighting the entered text or by any other suitable technique. In some cases, the writing assistant may automatically generate one or more alternative text output options for the user to consider. In other cases, the user may be required to confirm an interest in viewing alternative text output options for entered text by, for example, selecting a GUI interface element, etc. The writing assistant's analysis of entered text elements may be triggered by any suitable action, such as entry by the user of a period or other sentence-ending punctuation, entry of a carriage return, etc. Additionally, a user may select a GUI icon, menu entry, etc. to initiate review of drafted text by the writing assistant. Such a GUI icon may include any suitable type of virtual button, etc. Menu entries may be selected, for example, from a drop-down menu (e.g., a Review tab). The automatic analysis of preexisting text elements by the writing assistant may also be initiated by the user manually highlighting certain text elements, which may trigger the analysis by the writing assistant and the generation of text output options. In some cases, the user may initiate review of a text element by the writing assistant by highlighting a certain text element and then clicking on or otherwise selecting one or more GUI control elements, icons, buttons, or menu items.

Figure 5C:
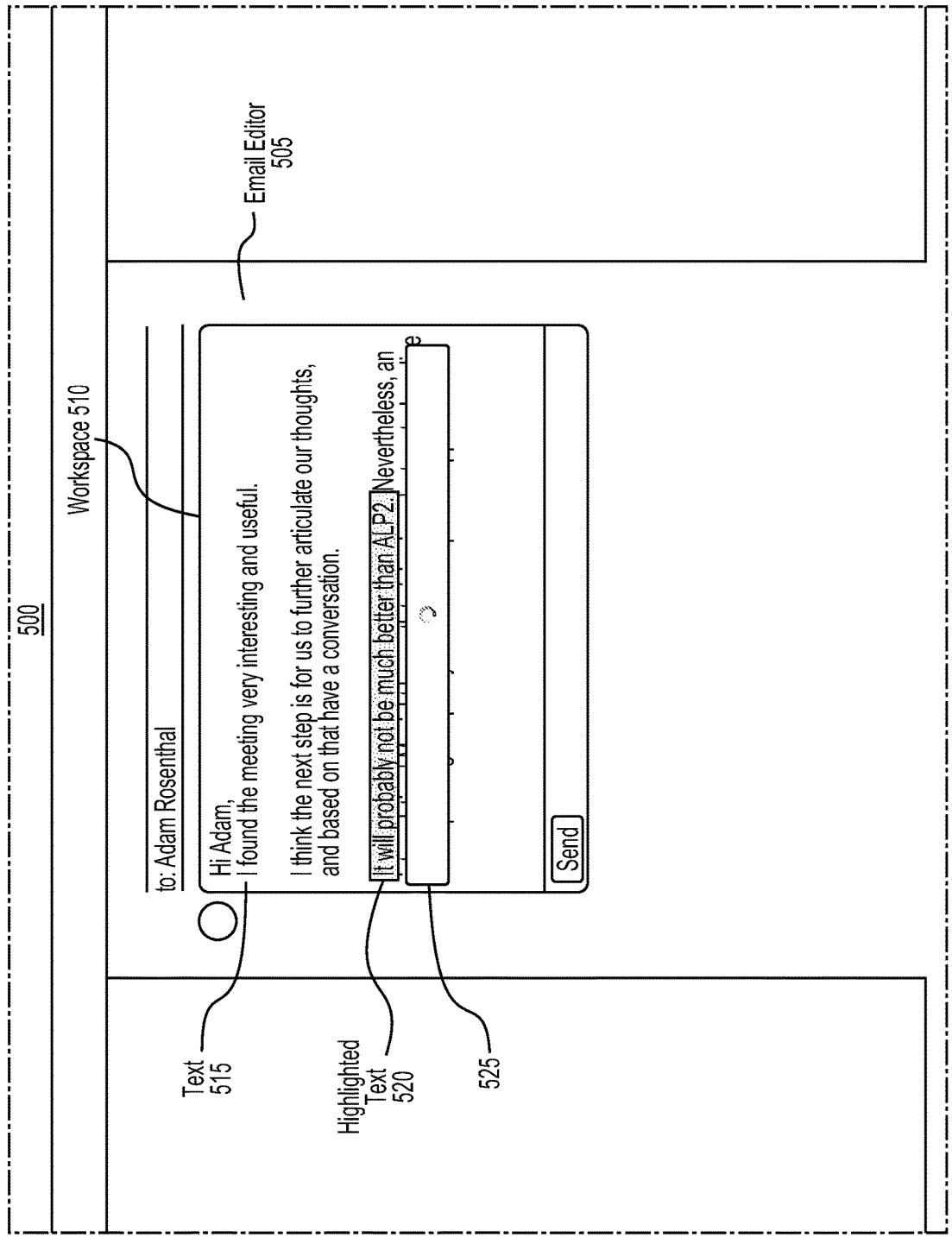

Returning to the example associated with FIGS. 5a-f, as shown in FIG. 5c, the assistant may automatically analyze the highlighted text 520 in response to any of the triggers described above or in response to any other suitable trigger for the review functionality. In some cases, an indicator 525 (e.g., a spinning wheel, hourglass, etc.) may indicate that the writing assistant is analyzing the highlighted text 520 together with text 515 (e.g., to determine context within which the generated text output options are to fit). As a result of the automatic analysis, the writing assistant can automatically generate text output options, such as text output options 530a-530c that the user may consider as possible replacements for highlighted text 520. As previously described, each of the generated text output options may differ from the text elements included in the highlighted text 520 in at least one respect, but may express a meaning associated with the text elements, while agreeing with contextual elements associated with text 515 and/or highlighted text 520.

Figure 5D:
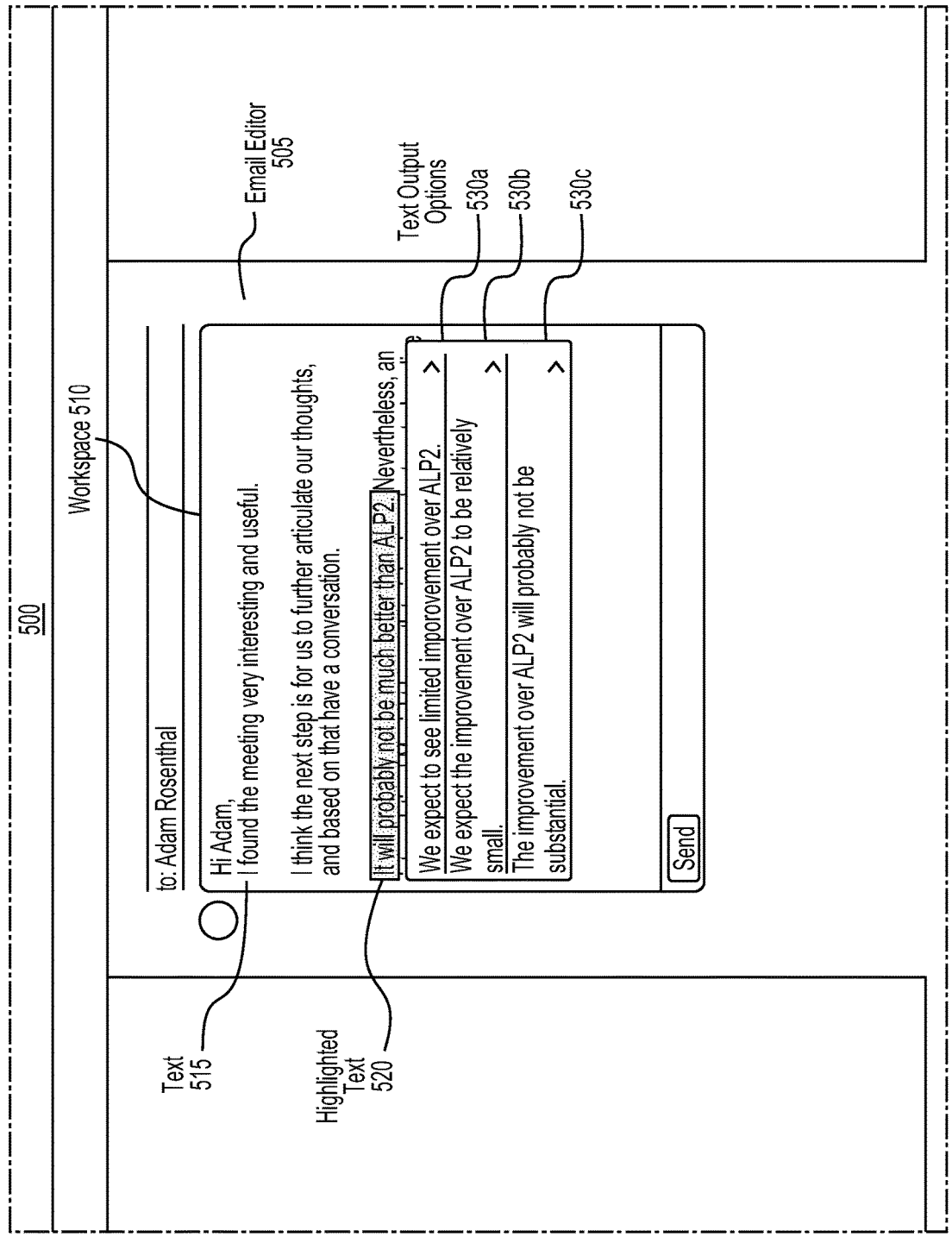

Moving to FIG. 5d, the writing assistant has generated three text output options 530a-c. Each conveys a meaning similar to meaning associated with the highlighted text 520 ("It will probably not be much better than ALP2"). Notably, however, as the generated text output options suggest, the writing assistant automatically determined that the term "It" in the highlighted text 520 may be unclear. In response, each of the generated text output options rectifies this potential confusion by clarifying that the drafter is likely referring to an expected improvement over the ALP2 system. Additionally, text output options use the pronoun "We," which agrees with the context of the preexisting text 515, which includes words such as "us" and "our," which suggest the drafter is referring to a group of people to which the drafter may belong. Additionally, each of the text output options further agrees with the context of the preexisting text 515 at least by offering a prelude of the "thoughts" that the drafter and the group to which the drafter belongs expect to later articulate to Adam Rosenthal during the proposed conversation (i.e., that the improvement over ALP2 is not expected to be significant or substantial).

Figure 5E:
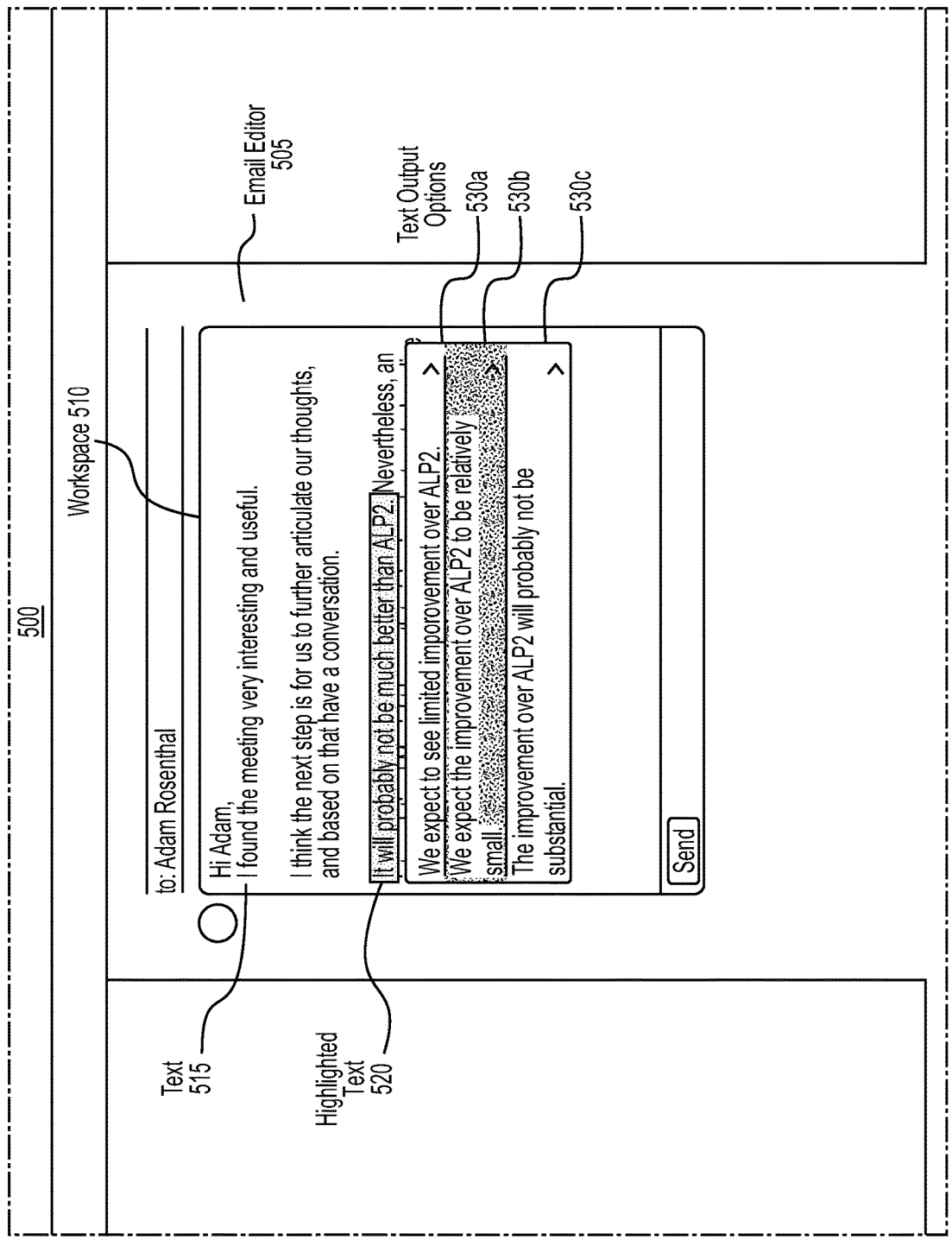

As shown in FIG. 5e, if any of the generated text output options better fits the meaning that the drafter intended to convey with the highlighted text (or that the user simply prefers over the highlighted text), the user can select one of the generated text output options as a replacement for the highlighted text. Any of the techniques and functions described above (e.g., techniques by which a selected text output option may be indicated, techniques by which a user may cause the writing assistant to further refine any of the generated text options, control of style parameters, etc.) may be incorporated into the embodiment represented by FIGS. 5a-f.

Figure 5F:
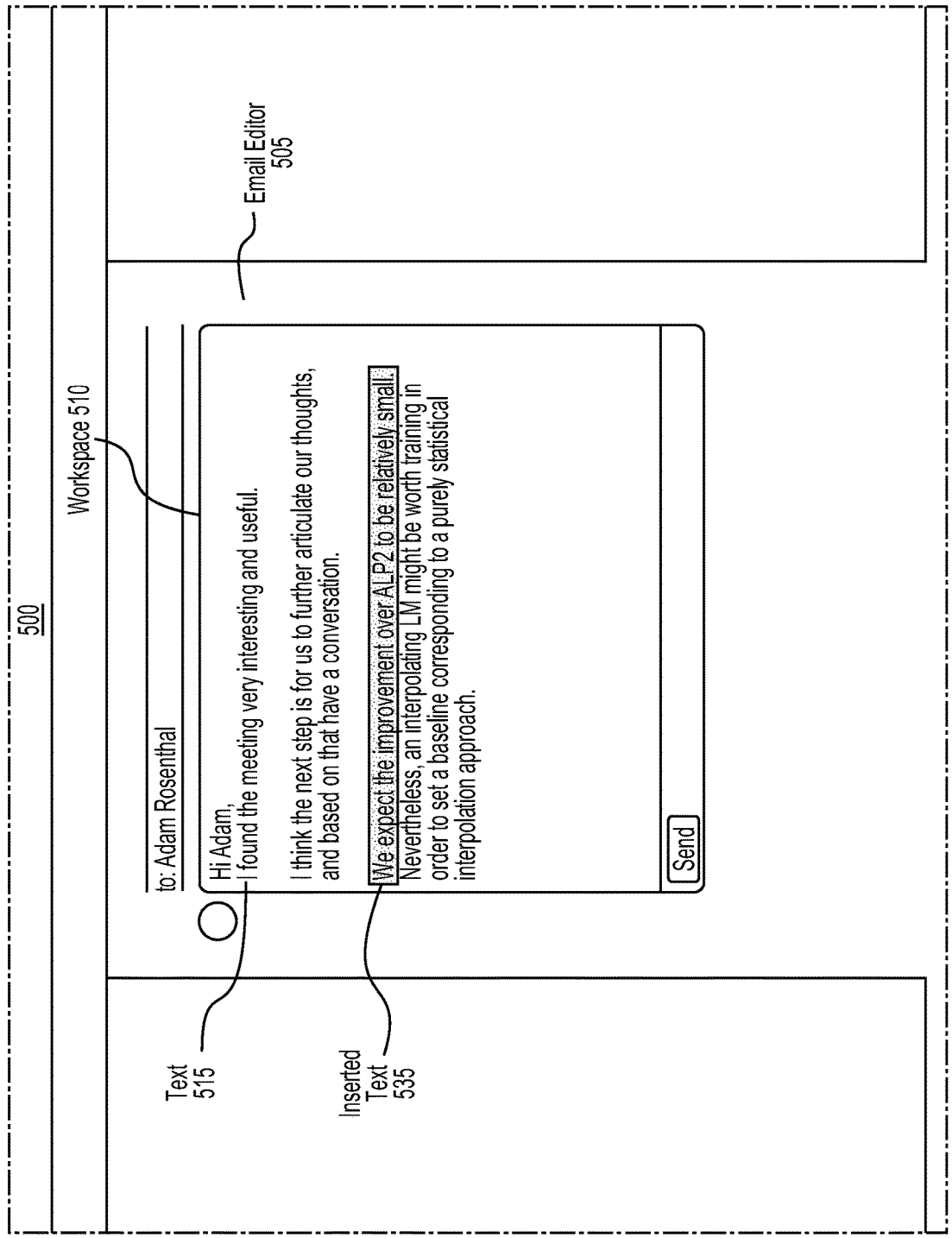

As shown in FIG. 5e, the user has selected text output option 530b. In response, the writing assistant can automatically substitute the selected text output option 530b for the highlighted text to provide inserted text 535 in workspace 510, as shown in FIG. 5f.

It is important to appreciate that the writing assistant can also analyze text in a document based on where that text is located in the document and in relation to other pre-existing text 515. For example, in some cases, highlighted text (or text for which the writing assistant as identified for potential substitution with a text output option) may appear at the beginning, middle, or end of a paragraph. In some cases, the highlighted text may appear in the middle of a sentence. In each case, the writing assistant may generate any of the text output options based on where the highlighted text (or text to be replaced) appears in the document. Sentences near the beginning of a paragraph may be framed as a topic sentence and/or may be more likely to identify subjects by name without use of pronouns. Sentences near the end of a paragraph may be framed as a conclusion, and sentences to appear in the middle of a paragraph may be framed as supporting of the a topic sentence and/or conclusion that may be included in the paragraph. These are just some examples of how the writing assistant may generate text output options based on the intended location in a document for the generated text output options.

In some cases, the writing assistant may generate text output options not as substitutes for text that already appears in a document, but rather as linking or bridging text. For example, a user may place a curser, for example, at a location in a document where the user would like the writing assistant to generate and insert text. In some cases, the user may place the cursor in the middle of a sentence. In other cases, the user may place the cursor between paragraphs, at the beginning of the document text, at the end of the document text, etc. In response, the writing assistant may generate one or more text output options for insertion at the cursor location. In such cases, rather than basing the text output options on highlighted text or user-entered text in a user input field, for example, the writing assistant may generate an original text output based on text that may precede or follow the cursor. For example, the writing assistant may draw subjects and information from the surrounding text and formulate linking or bridging text objects that synthesize those subjects and information into text that expands on or further modifies the existing text. Text appearing closer in proximity to the cursor location may have a stronger effect on the words or language elements that the writing assistant automatically selects for inclusion into the generated text output options. As a result, the generated text output options may offer text that flows with and connects naturally with the surrounding text, especially the text in close proximity to the insertion location.

Again, any of the functionality described elsewhere may be incorporated into or used with this particular example. For example, in some cases, generation of linking text by the writing assistant may be controlled with user-selected parameter values, similar to those shown in FIGS. 4a-4f. For example, if the user places a cursor at a certain location in the workspace, the user may be able to select or indicate the type of text to be inserted at the cursor location (e.g., a sentence, a paragraph, a figure caption, etc.). All of the other previously described parameter value options, among others, may also be available to the user in an embodiment in which the writing assistant automatically generates text based on a selected location in a document.

In another exemplary embodiment of the system, consistent with disclosed embodiments, the writing assistant can construct text output options based, at least in part, by accessing and relying upon sources of external information (e.g., outside of the document, outside of what the user inputs, outside of or remotely located relative to a device, such as a PC or mobile device, on which the writing assistant is implemented, etc.). As shown in FIG. 1, for example, the system may access internet sources 150, databases 170, or any other remotely located devices or data repositories, etc. via network 130.

In some cases, information retrieved or accessed from the remotely located devices or databases, for example, may be used by the writing assistant in various ways. In some instances, the writing assistant may use such information to verify aspects of preexisting text in a document and/or the generated text output options. For example, the writing assistant may use the externally available information to verify that the generated text output options do not contradict the externally available information. In other words, the writing assistant can compare facts to be included in generated sentences/text output options to verify that they are aligned with information from one or more external knowledge bases. As one example, an agent could be in Paris and France at the same time but not in Paris and England at the same time. In this example, the writing assistant may receive the location "Paris" from the user. The writing assistant can access the Internet and through search engines, social media, and/or some other type of data mining, and by using other contextual clues in the document (e.g., a company name referenced in an email, etc.), the writing assistant may automatically determine that Paris, as referenced by the user, must be a location and that it can be in Texas or France, but not in England.

Additionally or alternatively, the externally available information may also be used to augment the generated text output options. For example, when a user input refers to an entity, externally available information about that entity can be acquired and, where appropriate, incorporated into generated text output options to enhance the depth and quality of the generated text. Acquisition of information from external sources may be automatic as the user inputs information, or may be triggered by user input. For example, the inclusion of a wildcard symbol such as a "?" may prompt the writing assistant to acquire externally available information from an external source, generate text based on the acquired information, and insert the text in place of the wildcard symbol (or at least provide text output options to the user for potential selection and insertion at the site of the wildcard symbol).

The information available from external sources may also be used to ensure that the text output options generated by the writing assistant align with contextual aspects of preexisting text, user input, etc. For example, the external sources may be accessed to confirm the gender associated with an individual identified in the preexisting text or user input, to confirm facts about a referenced place name, to confirm chronology or dates, or (as previously mentioned) to verify the accuracy of facts or information. With the verification capability the writing assistant may generate text output options that may correct factual errors included in the user input or that exist in preexisting text, for example.

The external sources may be pre-selected by the user, be pre-set, or automatically selected based on the user input or the attributes associated with the user input. Relevant information in the external source can be identified automatically based on the attributes associated with the user input. For example, if the user does not want the writing assistant to access the Internet, the user may block that capability. In this case, the writing assistant may call on information that is stored locally on a personal computer, smart phone, or other client device. In another example, the user may type in a name such as "Tony Johnson," which the writing assistant will recognize as a name. Since the text includes a name, the writing assistant may access social media accounts and available search engines to retrieve information that may be relevant to Tony Johnson, especially in the context of a document being drafted. The writing assistant may, for example, find a "Tony Johnson" located in Paris, France (and may also use additional information determined from the input or written text) to determine that this is the Tony Johnson being referred to by the user input or preexisting text.

In some embodiments, the writing assistant may receive user input including one or more words and, in response, retrieve information from an external source based on attributes associated with the user input. The attributes associated with the user input can be, for example, a name of a person, a place name, or an entity name. This list of attributes is not meant to be limiting and could include any relevant attribute associated with the user input. The user input may also include a wildcard symbol. Common wildcard symbols include, but are not limited to an asterick (*), a question mark (?), etc.

The external source may be a local source or one that is housed on a remote network, another server, or another remote location. The external source could be, for example, a database containing geographical information, entity information, organizational information, demographic information, physical property information, ontological information, or event chronology information. The external source may also be a webpage or an electronic document accessible via the Internet.

The writing assistant may also receive user input including a collection of two or more words that together convey certain ideas or facts. As discussed above, the writing assistant may retrieve information from an external source based on the facts included in or implicated by the collection of words. The facts associated with the user input can include, for example, a name of a person, a place name, or an entity name (e.g., "Paris" or "Tony Johnson"). This list of facts is not meant to be limiting and could include any relevant facts associated with the user input. The user can include a wildcard symbol, such as ? or *, to trigger the system to collect information about the user input or relative to a certain portion of the user input preceding or following the symbol. For example, a user may type "Tony Johnson?" or "*Tony Johnson" to prompt the writing assistant to search for information about Tony Johnson. The writing assistant may, for example, search social media for entries corresponding to Tony Johnson and, once the system finds a relevant profile, pull information from the profile about Tony Johnson, such as his city of residence, the high school he attended, recent likes, etc. The writing assistant can use the information from Tony's profile to augment suggested text output options.

In another example, a user may call the writing assistant and write "Bono's age is ?", using the symbol '?' to specify where a piece of information should be retrieved and inserted in the sentence. In response, the writing assistant may generate sentences such as "Bono is 60 years old."

In addition to freeform input, such as a series of words, the writing assistant can receive input from a user via one or more structured input templates. Such structured input templates may facilitate entry of information important to certain types of communications. A user may manually select one or more templates to aid in information entry, or the templates may be automatically triggered based on analysis of words entered by the user. For example, the user may choose, or the assistant may detect and suggest, specific communicative intentions, such as "propose meeting" or "introduce someone." This may initiate a dedicated interaction where the writing assistant is shown on a display and a user can input the information or messages she wishes to convey in a structured or semi-structured manner.

FIGS. 6a-6o illustrate the template functionality that may be incorporated in or associated with the disclosed writing assistant. As described above, the user input may include words, phrases, sentences, etc. Within the user input, for example, the writing assistant may recognize certain words or phrases, for example, "meeting," "information," "request," "buy," "purchase," or "task" associated with an available/predetermined input template. In response to a detection of such keywords, the writing assistant may initiate one or more structured input templates to be shown on the display based on the detected word or phrase associated with a predetermined template. For example, as shown in FIG. 6a, a user may open an email editor 605 and enter the name of the email recipient (i.e., the requestee 612 from whom the user is requesting information). In this case, the user is composing an email to "Ernesto." As shown in FIG. 6b (and as described above), the user may prompt the writing assistant for a user input field 615. As shown in FIG. 6c, the user may enter input 620 ("Please send me the") into field 615. The writing assistant may recognize a type 625 associated with the input 620 (in this case a request for information). For example, the writing assistant may recognize that the phrase "Please send me the" most likely indicates that the user is sending the email to request information from the requestee 612. In response, the writing assistant may suggest a type 625 of email to compose and may automatically display one or more predetermined templates determined to relate to the type of document being drafted or may display an indication, such as a detected type 625, that the user may select in order to access available, relevant templates. In some cases, together with an indication of a detected type 625 of document, the writing assistant may generate text output options 630a and 630b. It should be appreciated that the writing assistant can simultaneously provide the indication of a detected document type 625 together with the suggested well-written, context-fitting text output options 630a and 630b.

As noted, the user can select the suggested type 625, prompting the writing assistant to display a predetermined template 680 associated with an information request, as shown in FIG. 6d. The writing assistant may auto-populate some of the information in predetermined template 680. For example, based on the email address and greeting already entered in the email, the writing assistant can determine that "Ernesto" (i.e., the requestee 612) will be the sender of the requested information. And, the writing assistant may also automatically determine that the user ("me") is to be the recipient (i.e., the requestor 639) of the information and, in response, may auto-populate the Receiver field. The input 620 may also be inserted into the predetermined template. The predetermined template, in anticipation that the user will input the information that he is requesting, also may include an information request filed 637 where the user can input the information that he wishes to receive from Ernesto.

As shown in FIG. 6e, the user can input the information (e.g., information input 643) into the information request field 637. The information can be inputted in a variety of different ways. For example, as shown in FIG. 6e, the user may enter "-avg weekly conversations & amounts" and "-team metrics—calls/hour" on separate lines. The writing assistant may analyze the information to determine the requested information, despite the incongruent formatting and incomplete sentences.

As shown in FIG. 6e, additional, available input categories 640a-640d may be displayed on the predetermined template 680. In this example, the additional input categories include purpose 640a, deadline 640b, urgency 640c, and other requirements 640d. However, it should be appreciated that these additional input categories may vary based on the type of request, etc. The examples shown here are not meant to be limiting and only display a subset of possibilities.

As shown in FIG. 6f, the user may select the input category purpose 640a. In response, as shown in FIG. 6g, the writing assistant may add a purpose input field 643 to the predetermined template 680 along with a purpose suggestion 645. The purpose suggestion may be based on the text of the email or some other information. For example, the writing assistant could present a purpose suggestion of "present it in our meeting" based off a future meeting invitation with the subject "Weekly Team Meeting" where the user and Ernesto are both attendees, among other relevant information—external and internal—as discussed previously. As shown in FIG. 6h, the user can enter his own purpose input 647 ("Quarterly report").

As shown in FIG. 6i, the user can select another input category, other requirements 640d. As shown in FIG. 6j, once the selection is made, another requirement input field 650 may be added to or displayed relative to the predetermined template 680 (e.g., unhidden). And, like the purpose input category, the writing assistant may display another requirements suggestion 653 based on a similar methodology. As shown in FIG. 6k, the user can add the other requirements input 655 ("don't forget rick's team") to the other requirements input field 655.

As shown in FIG. 6l, the user can select another input category, deadline 640b, prompting the writing assistant to add the deadline input field 657 to the predetermined template 680. And, like the purpose input category, the writing assistant may display a deadline suggestion 660 based on a similar methodology. As shown in FIG. 6m, the user can add the deadline input 663 ("tomorrow") to the deadline input field 657.

As shown in FIG. 6n, the writing assistant can use any or all of the information entered into the predetermined template 680 to create a well-written email that incorporates information entered into the template to automatically generate a text output option 665 (e.g., "text output option 1"). Like the text output options described elsewhere in this disclosure, the writing assistant may rely upon complete or incomplete sentences to create well-written text output options, which may be in the form of complete sentences. In this case, the text output option may include a greeting ("Ernesto,") and a closing
("Thanks.").

The user can modify or cause the writing assistant to refine text output option 665 in various ways. In some cases, the user may change a value associated with style parameter 667. For example, style parameter 667 may correspond to a level of formality, but it can also include any of the previously discussed style parameters. In FIG. 6n, the style parameter 667 is set to "1." As shown in FIG. 6o, the style parameter 667 can be changed to "2," which may increase a level of formality of a refined text output option 670 (text output option 2) relative to text output option 665 (text output option 1). For example, the refined text output option may list the requested information numerically, may include transitional phrases (e.g., from ("Also don't forget . . . ") to ("Please make sure that . . . ") and from ("I need it . . . ") to ("I would appreciate it . . . "), and may refine the closing (e.g., from "Thanks" to "Thanks for your help").

The writing assistant can also display additional structured input templates. For example, in some cases the writing assistant may display a secondary structured input template based on secondary user input received through the primary structured input template. And, through the secondary structured input template, the user may input tertiary information that conveys information with respect to a predetermined subject associated with the secondary structured input template. Such template generation may continue in a hierarchical or nested way such that additional templates may be displayed or made available to a user in response to any inputs included in a higher level template. In such embodiments, the writing assistant may automatically construct complete sentence options that reference a predetermined subject and include information conveyed by secondary user input. The complete sentence options may also be automatically constructed to reference a predetermined subject of the secondary input template and to include information conveyed by tertiary input. The complete sentence options may differ from one another in at least one respect. The user can also enter a user-specified length for the complete sentence options.

The writing assistant may also be configured to automatically identify information that may be missing from input that a user may provide to the system, whether via a structured template or any other input arrangement described herein. For example, the writing assistant may receive user input through a workspace. The user input can be a collection of words that convey at least one idea. Based on analysis of the user input, the writing assistant may detect the absence of information that is not conveyed by the input but that may be relevant or important to the text or document being drafted. In such cases, the writing assistant may prompt the user, through the writing assistant workspace for example, to enter additional user input (e.g., secondary user input) associated with the missing information. For example, the missing information may include details like a time of a meeting, a time of an event, a name of a person, a name of a place, a date associated with an event, a transaction amount, among many other possibilities. Through a structured input template or any other suitable interface element, the writing assistant workspace may receive the secondary user input that may include details associated with the missing information. The writing assistant may then construct complete sentence options or any other type of text output options that convey details included within the secondary user input. All of the features described in the preceding paragraphs with respect to the input methods, secondary inputs, etc. can apply to this automatic identification of information in any combination.

The writing assistant has the ability to iteratively interact with a user in order to refine or navigate through proposed text output options generated and displayed by the writing assistant. As shown in FIGS. 7a-7f and as described above, the writing assistant can receive user input and, in response, generate text output options. The writing assistant can display the text output options to the user who can select one of the text output options for insertion into the document (e.g., in workspace 710).

Figure 7A:
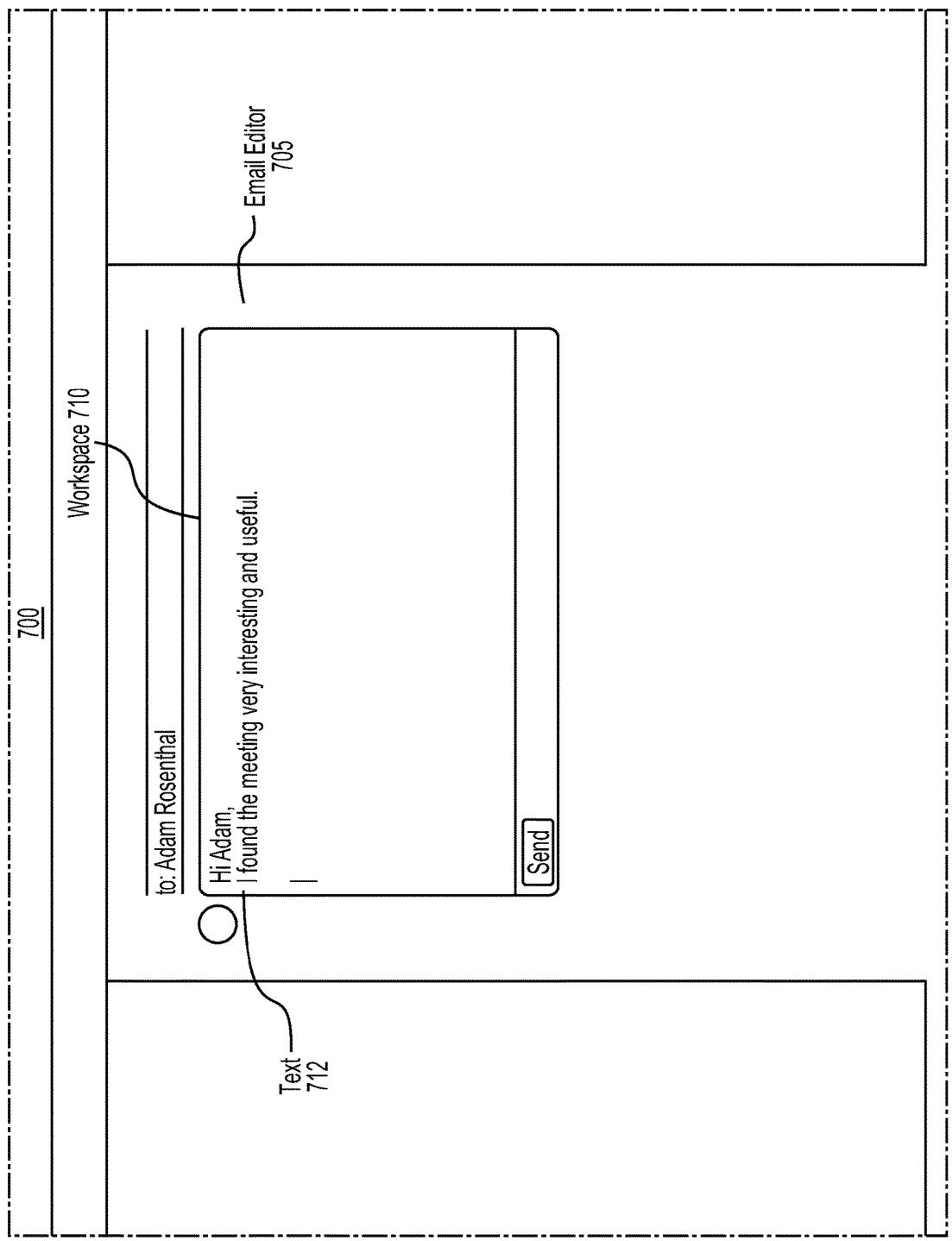
Figure 7B:
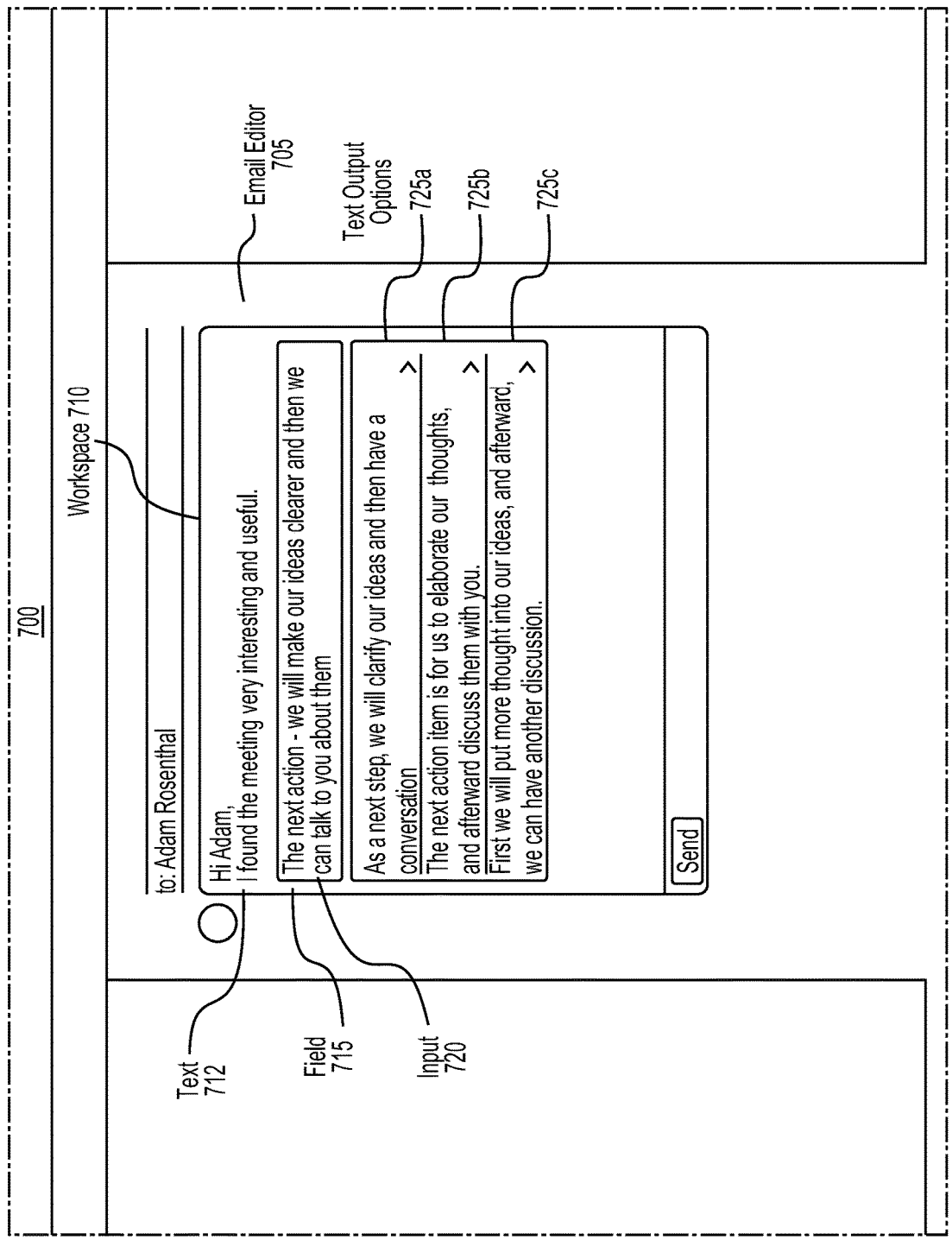
Figure 7C:
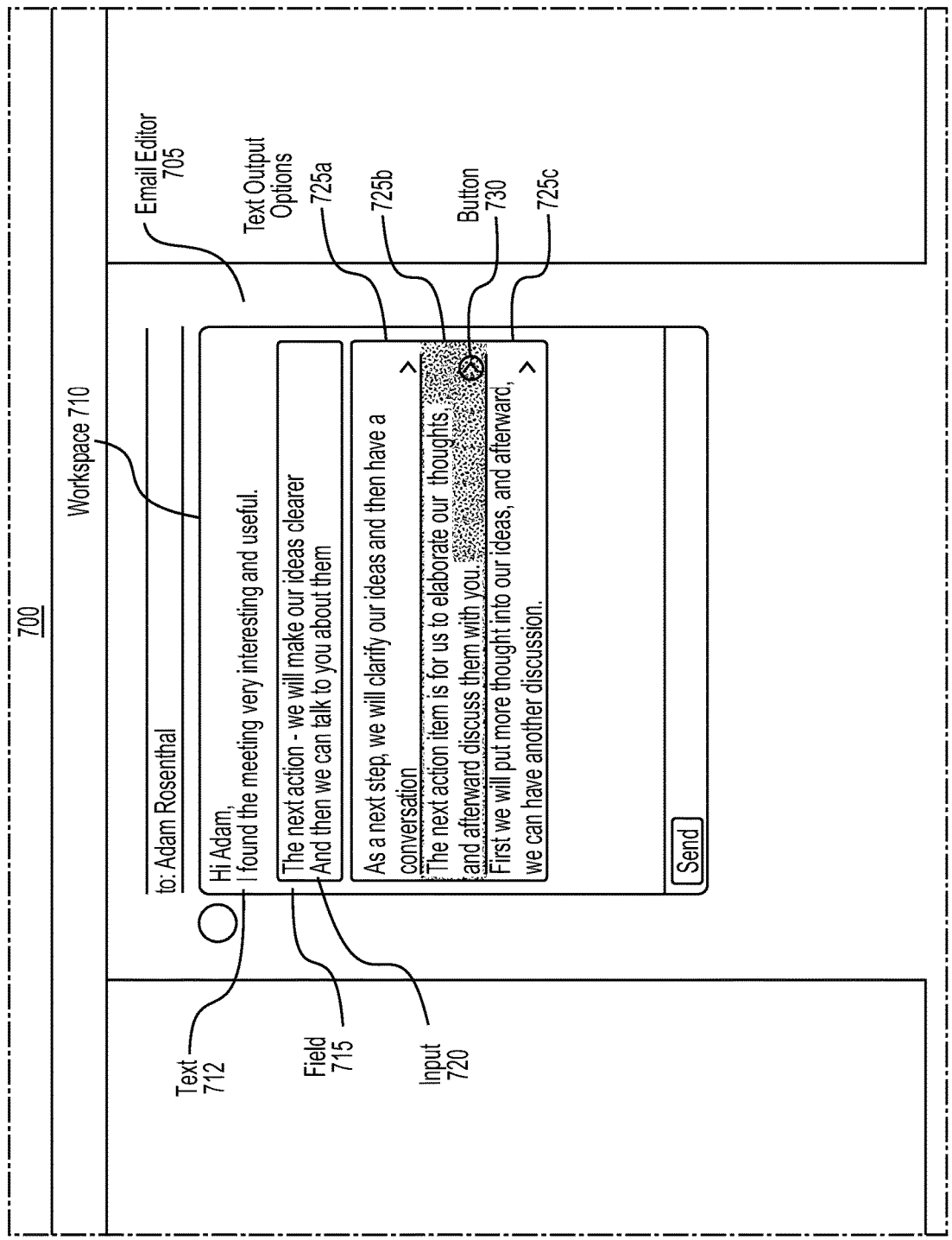
Figure 7D:
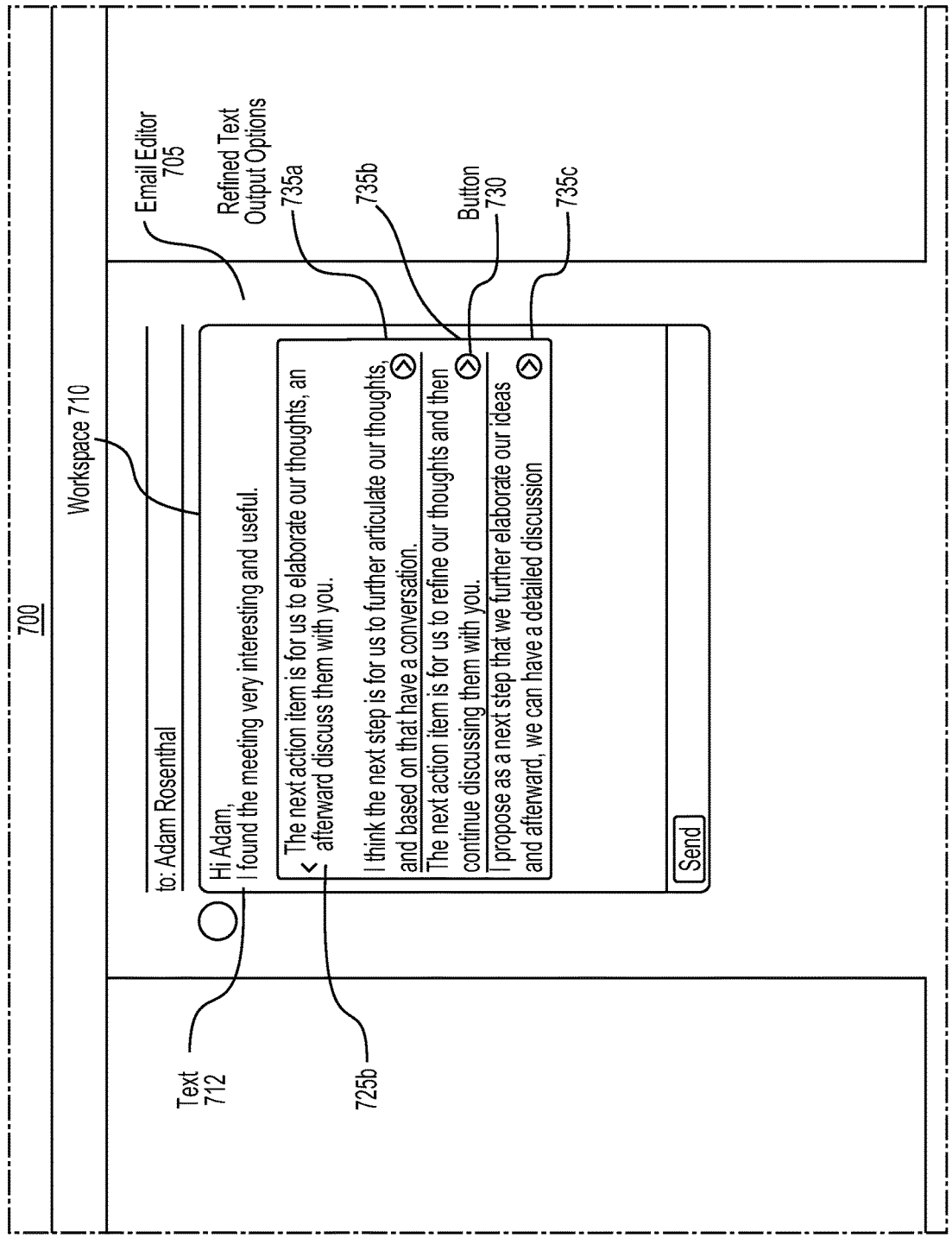

As For example, as shown in FIG. 7a, a user can type text 712 into workspace 710 within email editor 705. As shown in FIG. 7b, a user may also prompt the writing assistant to display a user input field 715 where the user can enter input 720. Similar to other embodiments disclosed herein, the writing assistant may generate well-written, context-fitting text output options 725a-725c. As shown in FIG. 7c, the user can further interact with the writing assistant to refine any of the generated text output options (e.g., by selecting virtual button 730 corresponding to text output option 725b). As shown in FIG. 7d, the writing assistant may use the selected text output 725b to generate one or more refined text output options. For example, as shown in FIG. 7d, the writing assistant can display the selected text output option 725b ("The next action item is for us to elaborate our thoughts, and afterward discuss them with you.") along with one or more refined text output options 735a-735c generated based, at least in part, on the selected text output 725b. In other words, In this example, if for some reason the user was not satisfied with any of text output 725a-725b, the user may select any of the initially generated text output options (e.g., text output option 725b) as the initially generated text output option closest to what the user envisioned for insertion into the document. In response, the writing assistant may generate one or more refined text output options (e.g., text output options 735a-c) based on the user's selection from among the initially generated text output options. This process may continue until the user finds suitable one of the generated, refined text output options.

In this example, the writing assistant may generate refined text output options 735a-735c that seek to convey the same or similar meaning as the selected text output 725b, but have several differences relative to text output option 725b. For example, the refined text output options may include different introductory language (e.g., from "The next action item is . . . " to "I think the next step is . . . " or "I propose as a next step . . . "), may include one or more synonyms (e.g., from "to elaborate . . . " to "to further articulate . . . " or "to refine . . . "), etc. As noted, this process may be iterative, and a user may continue request for refined text output options until he is satisfied with one of the options. For example, the user may select button 730 to prompt the writing assistant to generate further refined text output options and so on.

Figure 7E:
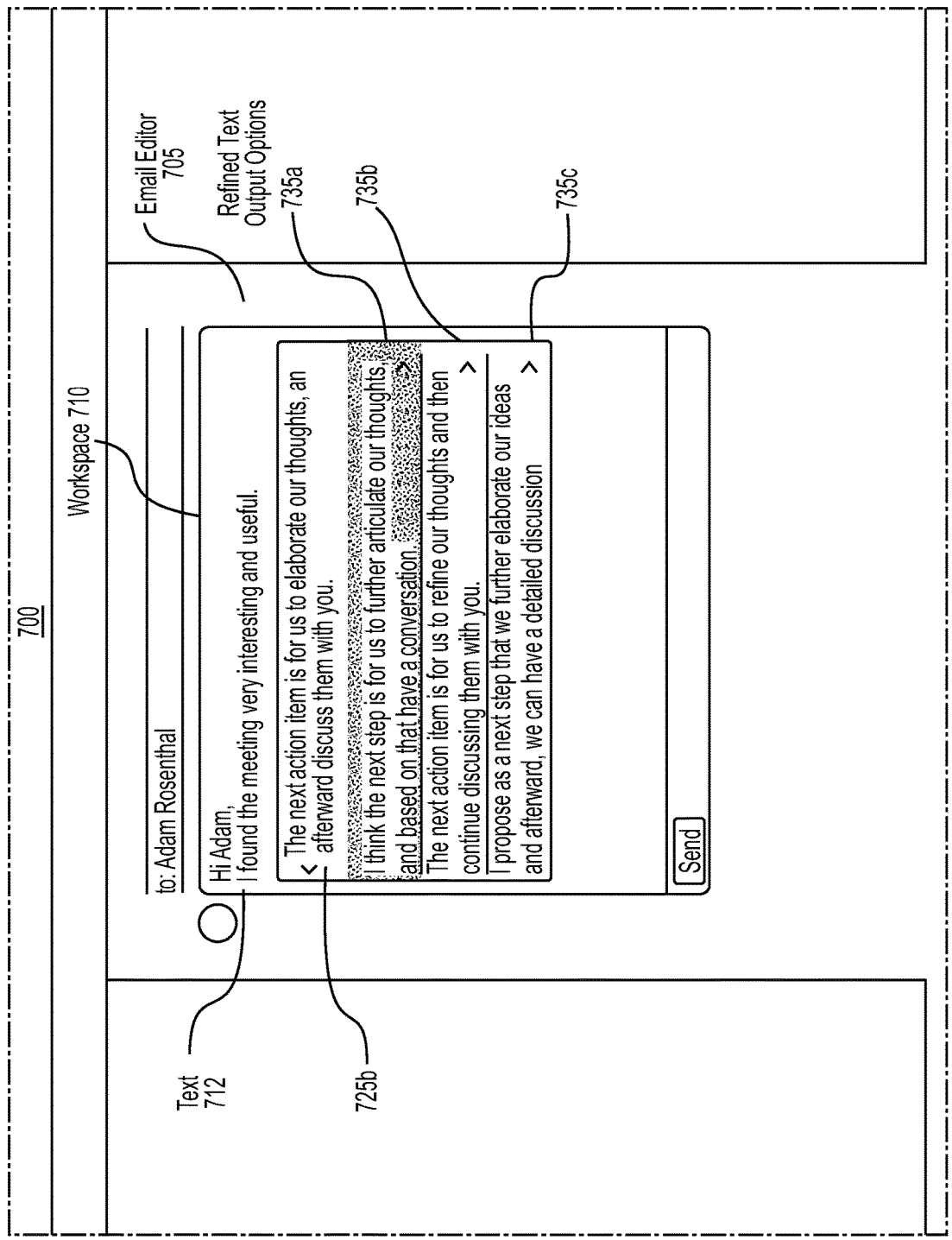
Figure 7F:
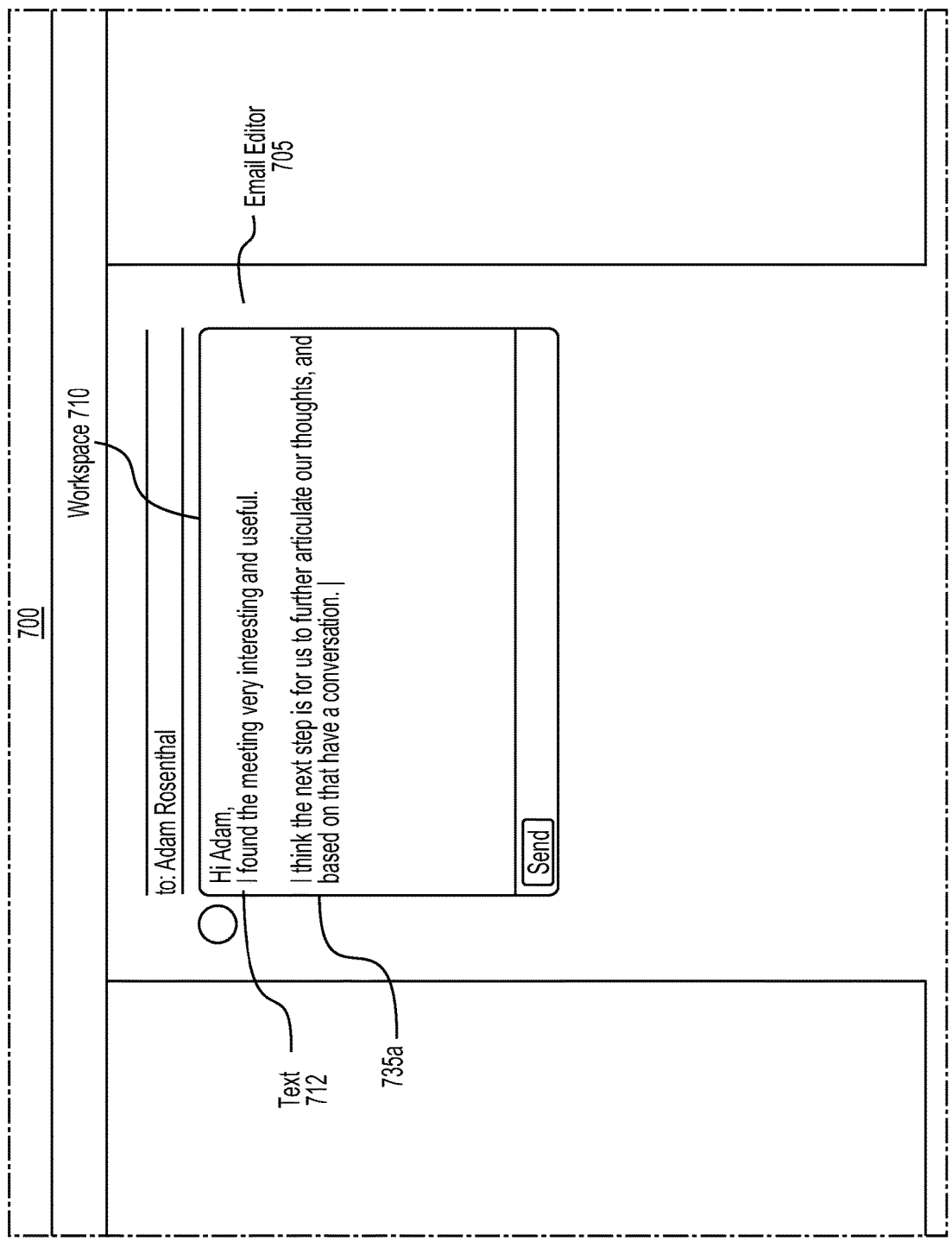

As shown in FIG. 7e, the user can select one of the refined text output options, such as text output option 735a. As shown in FIG. 7f, the writing assistant can automatically insert the selected refined text output option 735a into workspace 710, to create at least a portion of the email document.

The disclosed writing assistant may also assist a user in synthesizing multiple text elements or text passages, whether available in one or more preexisting documents or generated, in part, based on user input. In one example of such synthesis of text, and as described above, the disclosed writing assistant may offer text output options for insertion at a selected location within a text. Such text options may serve to bridge or link text that may appear prior to and after the selected insertion point. This feature may be triggered manually, for example, by a user indicating a text insertion location in a document. The text insertion location may be between two sentences, within a sentence, within a phrase, or between two paragraphs in the document. The generated text output options may be generated based solely on preexisting text appearing before and/or after the insertion location or may also be based upon textual input provided by the user.

The text output options generated by the writing assistant for incorporating into a document at a selected insertion location may link together one or more aspects of a first text element that precedes the text insertion location with one or more aspects of a second text element that follows the text insertion location. For example, a text output option may be generated in such a way that it fits into existing text in a coherent and natural way. The text output options can agree with a context associated with the first and/or second text elements and may, in some cases, be generated, in part, upon input provided by a user. For example, the generated text output options can include words, ideas, meanings, and topics conveyed by the user input, but may also agree with contextual elements associated with text preceding or following a designated insertion location in order to effectively bridge or link text surrounding the insertion location. The bridging text may include a complete sentence or, in some cases, may include sentence portions. For example, in some cases, the bridging text may include text to append to a preceding sentence, punctuation to end the augmented preceding sentence, one or more liking sentences, and/or text to append to a beginning of a sentence following the insertion point.

Contextual agreement between the generated text output options and surrounding text may have various meanings. In some cases, an agreement between two or more text elements may refer to grammatical agreement (e.g., the insertion of the generated text output option (the bridging or linking text) does not result in a grammar error relative to the preexisting text). In other cases, agreement between text elements may be achieved by the generated text output options being generated to include in the same or similar style as the text around it (e.g., preexisting text in a document workspace). Another contextual agreement may exist where a generated text output option connects coherently to the text around it once inserted into a document workspace. This form of agreement may include, but is not limited to, the generated text being related to the same general subject as the context and/or events or facts referenced in a generated text output options being consistent with events or facts referenced by preexisting text in a document workspace, for example. The consistency may be relative to a relationship (e.g., temporal, causal, teleological, explanatory, etc.) existing between generated text output options and preexisting text or user input. Contextual agreement may also exist where facts implied by generated text output options are consistent with facts implied by the preexisting text; where temporal and causal relations between facts or events referenced in generated text output options and in the preexisting text are not implausible in light of real-world constraints (e.g., a person can't perform an action after he dies, an event cannot start after it ends, a person cannot be located in two different locations at the same time, etc.). As previously noted, a possible test of contextual agreement between preexisting text and text output options generated by the writing assistant may include whether more than seventy percent of human evaluators are not able to discern that a generated text output option, once inserted into the preexisting text, was generated by a machine rather than by a human. In addition to controlling text style using style control parameters, the disclosed embodiments of the writing assistant may also be configured to apply a default style that is predetermined or learned based on usage. For example, the writing assistant may learn the personal style of the user or the style of a particular organization, in different contexts (e.g., based on internal business documents, external business email, personal email, etc.). In this way, the writing assistant may generate suggested text output options to serve as linking or bridging text in a style that resembles the personal or organizational style in the specific context of the document.

In some cases, the writing assistant may automatically insert bridging/linking text into a document at the insertion location. In some cases, however, the writing assistant may generate and display multiple text output options, and the user may select a text output option, from among the displayed text output options, to be inserted into the document at the text insertion location. In response, the writing assistant may insert the user-selected text output option at the insertion location.

Additionally or alternatively, the writing assistant may be configured to synthesize text for a document based on other types of triggering events. For example, in some cases, the writing assistant may automatically generate bridging or linking text for insertion into a document (or multiple linking or bridging text output options) based on detected movement of one or more text elements from one location of a document to another location. For example, in some cases, a user may select a portion of already drafted text to be moved from a first location in the document to a second location in the document. The user may drag and drop the selected text to the new location by highlighting the text and dragging the text (using a pointer tool, for example) to a new location in the document. Alternatively, the user may use a cut and paste function to cut text from one location in the document and paste that text at a new location in the document. In such cases, pasting of the text in a new location may trigger operation of the writing assistant to automatically generate bridging or linking text relative to the moved text and/or text surrounding the moved text. For example, one or more modifications (word additions, word re-ordering, word omissions, new text, etc.) may be suggested relative to the moved text, and/or relative to text preceding the moved text, relative to text following the moved text. In some cases the suggested bridging or linking text may not involve changes to any of the preceding, following, or moved text, but instead may constitute new text passages to be inserted into the document before or after the moved text.

In some cases, the writing assistant may automatically assist the user with a text move. For example, the writing assistant may include a built-in selection and move function that may be activated by, for example, highlighting and right-clicking on the text. In response to receipt of such input, the writing assistant may automatically identify a new location in the document for the selected text and may offer the user an option for moving the highlighted text to the suggested new location. After the move, or in conjunction with the move, the writing assistant may generate one or more bridging text options associated with the text move in the manner described above.

Thus, in response to any movement of text within a document, the writing assistant may automatically generate bridging or linking text output options recommended to accompany the text movement. For example, when text is transplanted from one document location to another, the transplanted text often may not flow well with text in the vicinity of the new location. For example, the moved text may not agree grammatically or contextually with surrounding text. To connect the moved text in a natural way, the writing assistant (in response to detected text movement within or between documents) may generate and offer one or more text output options for insertion before or after the moved text. In some cases, the one or more suggested text output options may include one or more modifications to the moved text to promote agreement between the moved text and surrounding text at the new location.

The writing assistant may also be configured to synthesize text, whether found in existing text or included in user input, into more complex text passages. For example, in some cases, a user may provide multiple sentences and/or sentence fragments as user input. The writing assistant may organize and/or rearrange the input sentences or sentence fragments into a logical order and may generate sentences, partial sentences, or paragraphs that convey ideas or information included in the input sentences/sentence fragments, and may arrange the generated text according to the determined logical order. The text output generated by the writing assistant may form a stand-alone text block that serve as the first text associated with a document or that may be inserted into existing text in a document (either as a monolithic block or at least partially interleaved with text existing in the document). Where fragments are received as input, the writing assistant may generate sentences based on the fragments and order the generated sentences to convey information associated with the input fragments in a logical order. In any of the examples, sentences generated by the writing assistant based on input fragments may flow together in a coherent way.

In some embodiments, the writing assistant can take several pieces of text, e.g., written by a user, or retrieved from other sources, and automatically synthesize them into one coherent, fluent, and grammatical piece of text with a consistent style. For example, in an electronic workspace associated with a document, the writing assistant may identify a first text passage, including a first plurality of words, and a second text passage, including a second plurality of words. The first or second text passage can be entered into the electronic workspace using a paste function initiated by the user, by the user typing on a keyboard or dictating using a voice recognition application, or by an electronic copy function applied to a source of text residing outside of the electronic workspace. In order to synthesize text from at least the first and second text passages, the writing assistant may change the order of content in the text passages, merge sentences, split sentences, add connections between sentences or other portions of text, modify style elements, etc. Additionally or alternatively, the writing assistant may analyze the first and second text passages to determine information conveyed by the first passage and information conveyed by the second passage and may use this information to automatically generate a third text passage that conveys the information conveyed by the first and second passages. The third text passage may include textual revisions relative to the first and second passages. For example, the third passage may exclude a exclude words from the first or second passages and/or may include words not included in either of the first or second passages. Words from the first and second passages may be, for example, reordered, merged, or substituted for new words in the third passage. The third passage may include new text bridging words. The third passage may change style elements that were included in the first and second passages. In some cases, the writing assistant may automatically insert the synthesized third passage into a document or may present the third passage to a user for approval and or refinement (e.g., using any of the interactive techniques described above).

In addition to a mode in which the writing assistant provides sentence options as a user provides input, the writing assistant can also be used to parse an existing document and offer text replacement options for one or more sub-sentence elements or one or more complete sentences in the document. For example, users can select any span of text in their document and call the writing assistant, which will automatically generate, in real-time, several variations of well-written texts that are paraphrases of the selected text. The user can choose any of the options and insert them to replace the selected text in the textbox or word processor. It should be noted that any or all of the features described elsewhere relative to functionality of the writing assistant may be used in the document parsing embodiments. For example, the writing assistant may generate text output options as potential replacements for text elements automatically identified during the parsing operation. The user can use any of the described controls to change various style parameter values associated with one or more of the generated options. The user can also select a particular text output option for insertion into the document in place of all or part of the identified text. Further, the user can select a generated text output option as a trigger for causing the writing assistant to generate one or more refined text output options based on the selected text output option (an interactive process that can continue until the user is satisfied with one of the generated text output options). Additionally, the user can enter additional input (e.g., one or more words) to help guide the writing assistant in generating text output options (or refined text output options) for potential substitution for text identified during the automatic parse operation.

In some cases, automatically, or after receiving input from a user, the writing assistant can analyze the text of a document. The analysis may proceed in several ways, including sentence by sentence, among other options. The parsing may be performed as part of a global search-and-suggest operation.

Users can choose to view suggestions for sentences in their document that should be rephrased. Suggestions may be presented where the assistant can generate a paraphrase of any sentence in the document which scores better in an automatic evaluation of metrics such as quality, clarity, grammatical correctness, etc.

The contextual paraphrasing feature of the writing assistant may help users refine their text by replacing words and phrases with substitutable alternatives—words or phrases that could substitute for given words or phrases such that the text remains fluent and its meaning is preserved (e.g., substitutable). The technology behind the feature may close major gaps that exist when using lexical knowledge bases such as thesauruses as sources for substitutable alternatives for words or phrases in text. For example, not all synonyms of a given word or phrase are substitutable in a given context, and not all words or phrases that can substitute for original words or phrases in a given context are synonyms. In particular, synonym knowledge bases such as thesauruses are limited in covering relations of semantic similarity between phrases. The contextual paraphrasing feature of the disclosed writing assistant may provide both synonyms and non-synonyms that are substitutable in the given context.

For example, the writing assistant may suggest, autonomously or upon invocation by the user, possible replacements of words or phrases in the text with alternative words or phrases that are substitutable in the particular context (such that after the substitution the text remains fluent and its meaning is substantially preserved). The assistant may also recommend such replacements if they are determined to make the text more fluent.

Replacements may include contextualized dictionary synonyms: words or phrases which are synonymous with the original word or phrase according to a lexical database, and are also found to be substitutable with the original word or phrase in its particular context. For example, in 'I forgot all of the material I learned yesterday', the assistant may suggest replacing the word 'material' with the synonym 'information' (I forgot all of the information I learned yesterday), because the two synonyms are substitutable in this particular context. However, the assistant will not suggest the words 'matter' or 'substance' as substitutions, because while they are synonyms of 'material', they are not substitutable in this particular context. In 'our brains prefer instant to long-term rewards', the assistant may suggest replacing the word 'rewards' with the synonym 'payoffs' (our brains prefer instant to long-term payoffs), but it will not suggest other synonyms such as 'bonuses' or 'prizes' because they are not substitutable in the particular context.

Replacements may also include contextualized possible substitutions that are not lexical synonyms: words or phrases which are not lexical synonyms* of the original word or phrase, but are found to be substitutable with the original word or phrase in a given corpus generally and in its particular context. For example, in 'I enjoy doing Yoga', the assistant may suggest replacing the word 'doing' with the word 'practicing' (I enjoy practicing Yoga) (even though the words 'doing' and 'practicing' are not recognized as synonyms). In 'The pilot was driving the airplane', the assistant may suggest replacing the word 'driving' with the word 'flying' ("The pilot was flying the airplane") even though the words 'driving' and 'flying' are not synonyms. In 'thank you for the good demo', the assistant may suggest replacing the word 'good' with the phrase 'super useful' ("thank you for the super useful demo"), even though they are not synonyms. For the purpose of this description, words or phrases are not lexical synonyms of each other if that relation is not listed in common thesauruses. For example, two words or phrases may be deemed non-synonymous if they are not related as synonyms in the following leading English thesauruses: Oxford Dictionary and Thesaurus, Oxford Thesaurus of English, Longman Thesaurus of American English, Thesaurus of English Idioms, Collins English Dictionary and Thesaurus Set, Webster's American English Thesaurus, Roget's Thesaurus of English Words and Phrases, www.thesaurus.com, www.macmillanthesaurus.com, and/or The Merriam-Webster Thesaurus.

Word or phrase substitution suggestions made by the disclosed writing assistant could be of different lengths from the original words or phrases. For example, the assistant may suggest replacing a word with a phrase, a phrase with a phrase of a different length, or a phrase with a word. For example, the assistant may suggest replacing 'All in all, I think we are ready' with 'Taking everything into account, I think we are ready'. The assistant may suggest replacing 'rights ought to be protected against infringement' with 'rights should be protected against infringement'. The assistant may suggest replacing 'If you work hard you can change things' with 'If you work hard you can make a difference'. Suggestions may sometimes include substitutions that are not synonyms (according to lexical knowledge bases) of the original text but can replace the original text in the particular context while substantially preserving the meaning of the sentence as a whole. The assistant may provide completely different substitution suggestions for the same word or phrase in different contexts or contextual situations.

The technical method may include two components. First, it may include a component that may curate a static list of possible replacements for words or phrases. Second, in a given call to provide paraphrasing suggestions, the writing assistant may include a component that presents only the words or phrases from the static list determined to constitute appropriate substitutes for the original word or phrase in the given context. Words or phrases deemed to not constitute appropriate substitutes in view of the context in which the original word or phrase appears may be omitted from the output results of the paraphrasing tool.

The curation of a static list of substitutable candidates may include collecting lexical synonyms for each word or phrase from a thesaurus or collecting possible corpus-dependent replacements for words or phrases, in the following ways: (1) extracting a plurality of sentences where the word appears in the corpus (e.g., each sentence may provide an example "context" for the word or phrase); (2) for these contexts, a Masked Language Model (e.g., BERT) may be used to mask the word and attempt to predict it; (3) keep X (in the 100 order of magnitude) contexts where the MLM successfully predicts the masked word or phrase according to a threshold; (4) for these disambiguating contexts, we may look at the other words or phrases which are predicted by the MLM; (5) we may ignore known antonyms of the given word or phrase, as they appear a lot in the same context ("I adore old films" or "I can't stand old films") but are not appropriate replacements of each other. These 100 contexts can then be seen as "disambiguating contexts," ones from which it is possible to deduce the correct word. We do this to avoid contexts of the form "I made a cake" for the word "cake"—a context where there are many words that could replace "cake", a negligible amount of which are actual replacement options for "cake". However, a context like "I baked a chocolate cake for the party" is one where "cake" would be a reasonable prediction, and other reasonable predictions are indeed similar ("pie,", "muffin," etc.). The words or phrases which are predicted together with the original word or phrase enough times are considered to be the corpus-dependent contextualized replacement candidates. In summary, the corpus-dependent replacement options may include words or phrases which often appear in similar disambiguating contexts as the original word or phrase, thus sharing some sense with the word.

Upon a given call to suggest replacements for a word or phrase, the system contextualizes the replacement suggestions (i.e., the system may present as text options only the suggestions from the static list that are determined to be substitutable with the original word or phrase in the particular context associated with the original word or phrase or the text in which the original word or phrase appears). To do this, we may use the paragraph written by the user as context which we feed into our MLM, masking the word or phrase that the user wishes to replace. Our MLM gives us a list of predictions for the masked word or phrase, which we then intersect with the static list of replacement suggestions. The intersection of these two lists are meaningful replacements for the given word that are also substitutable with the original word or phrase in the particular context, and these are the suggestions that are provided to the user.

Figure 8A:
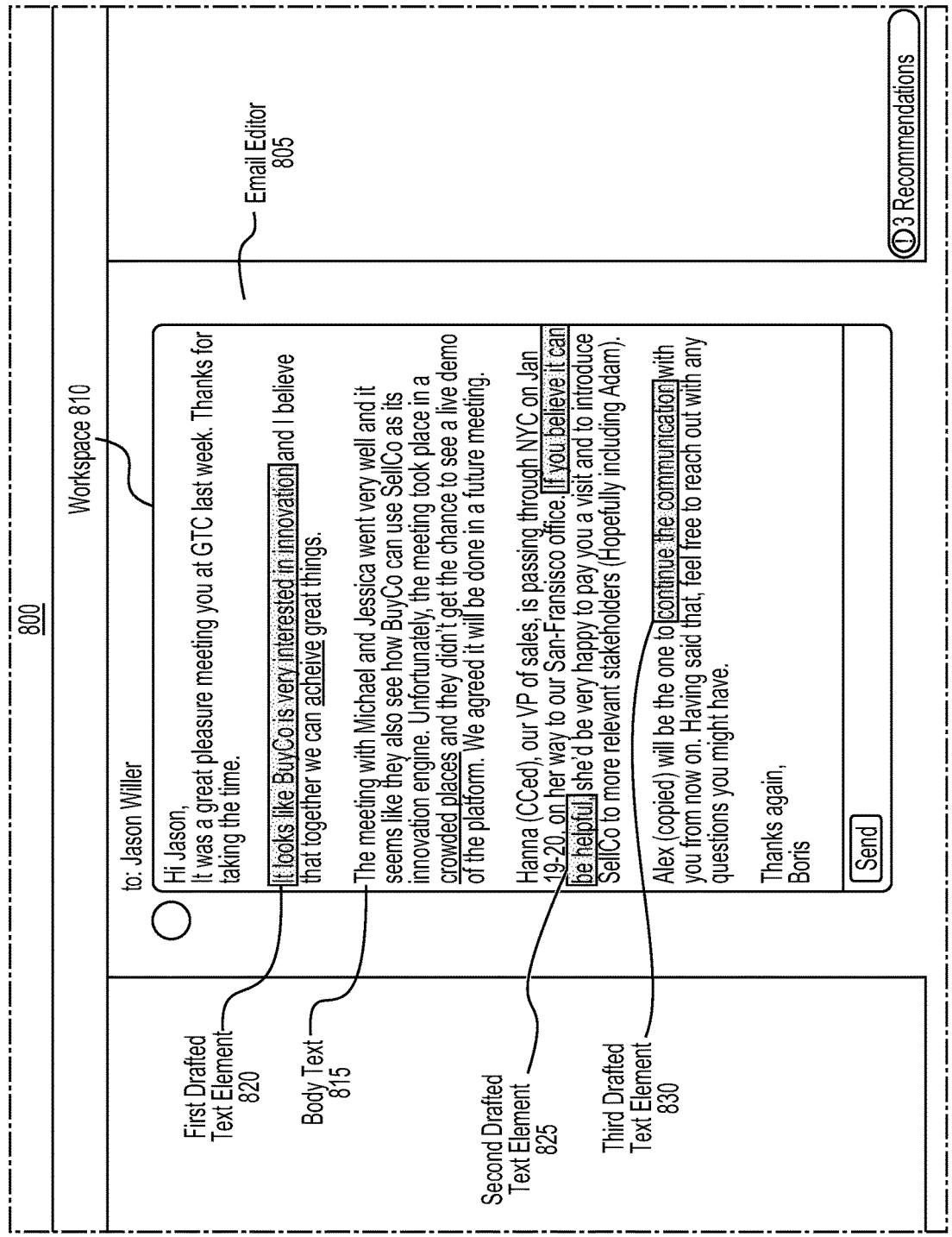
Figure 8B:
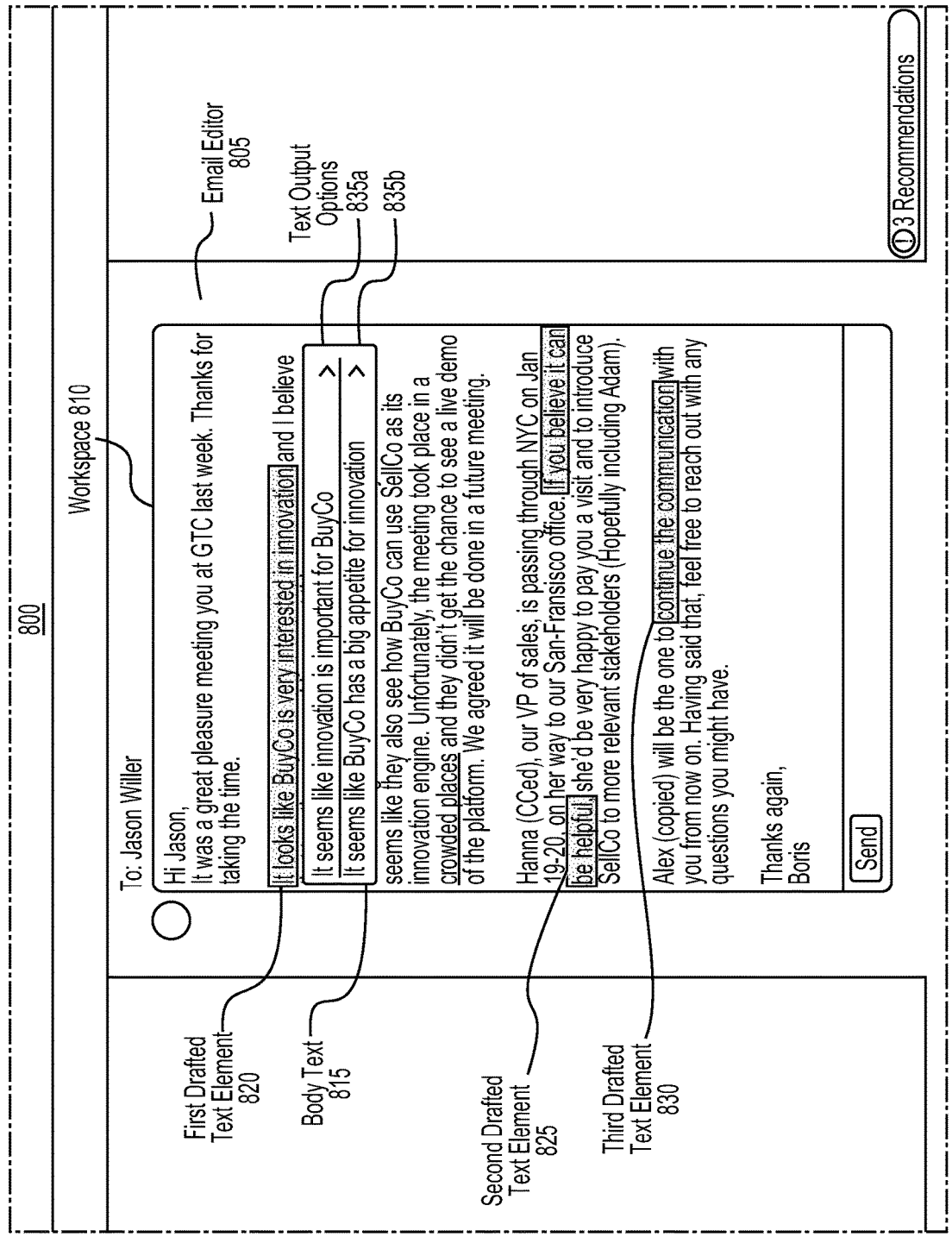
Figure 8C:
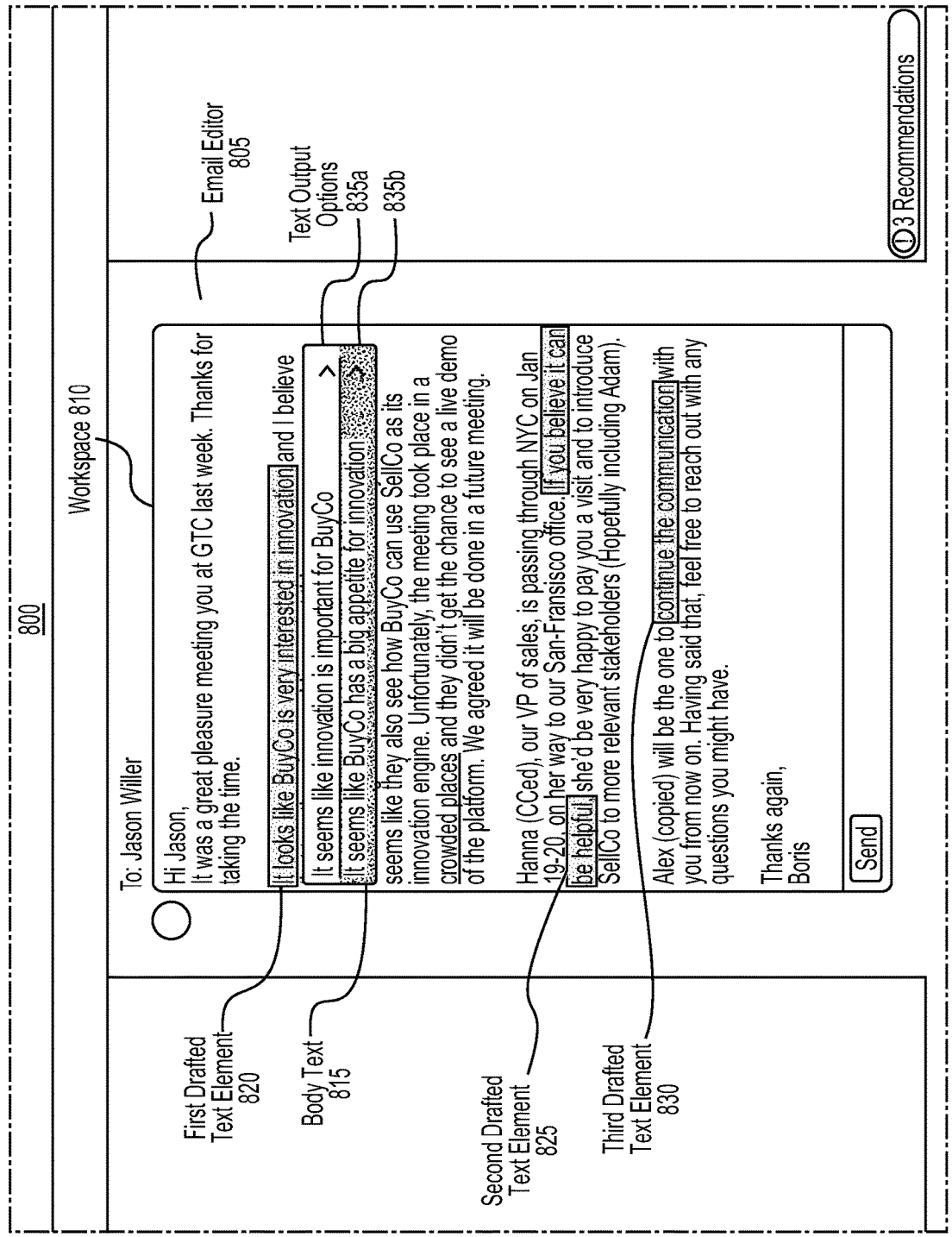
Figure 8D:
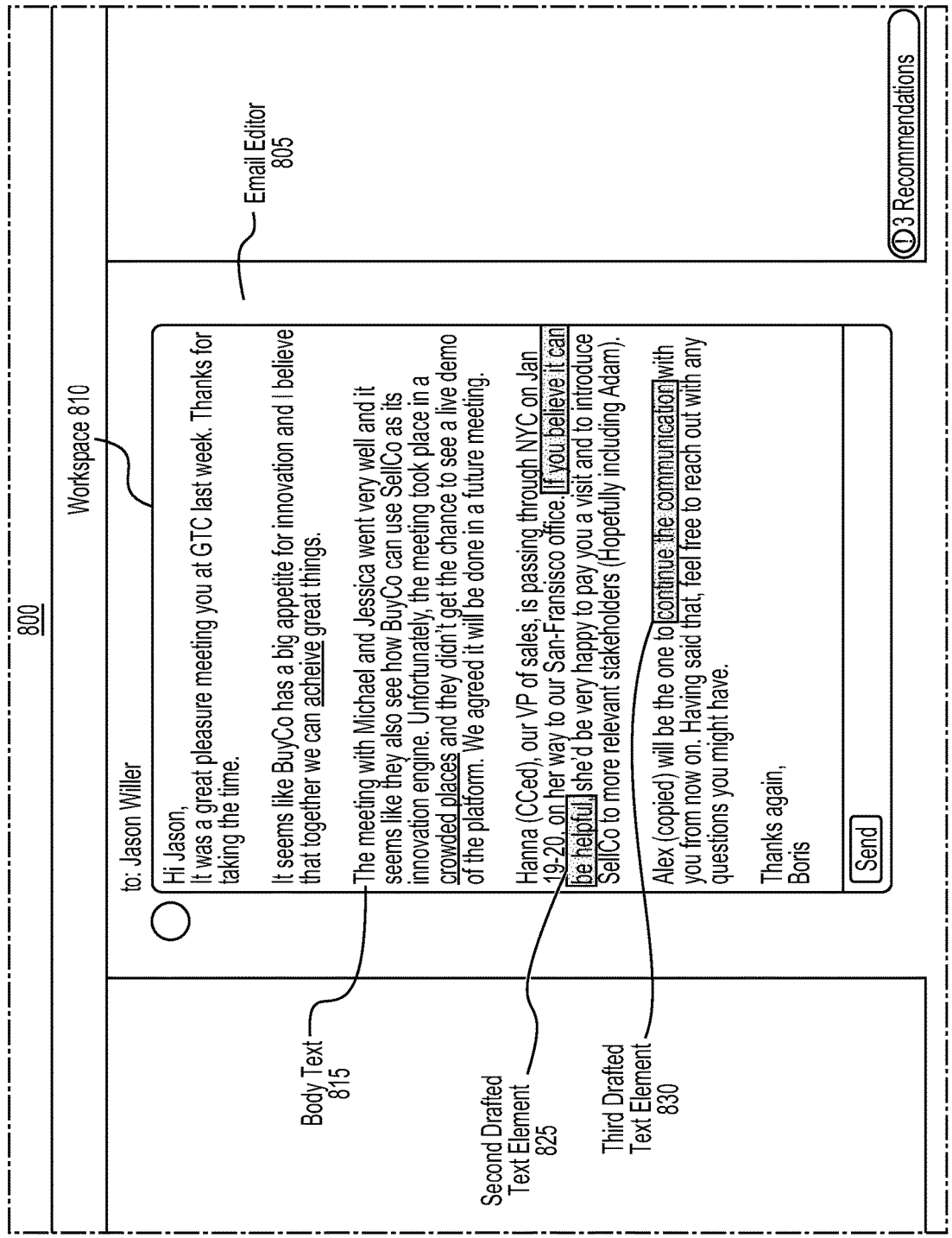

FIGS. 8a-8d illustrate another example of functionality that may be included in the disclosed writing assistant. As shown in FIG. 8a, the writing assistant can identify a first drafted text element 820 in preexisting body text 815 in workspace 810. Drafted element 820 may include portions of two or more sentences or a group of words within a sentence. The writing assistant may automatically highlight the first drafted text element on the display, or a user may manually highlight the element to be edited by the writing assistant. As shown in FIG. 8b, the writing assistant may generate text output options 835a and 835b that re-write the first drafted text element 820, fit the context of the body text 815, can be placed in the same location as the first drafted text element 820, and convey a meaning associated with the first drafted text element. As shown in FIG. 8*c*, the user can select one of the text output options (e.g., option 835*b*). As shown in FIG. 8*d*, the writing assistant may automatically replace first drafted text element 802 with the selected text output option 835*b*.

The writing assistant can repeat this procedure for multiple drafted text elements, as shown in FIG. 8*a* (e.g., for an automatically or manually identified second drafted text element 825 and third drafted text element 830). In FIG. 8*a*, the second drafted text element 825 and third drafted text element 830 occur after the first drafted text element 820. However, because of the iterative nature of this embodiment, the second or third drafted text elements could have occurred before the first drafted text element. This procedure can continue with third, fourth, fifth, etc., text elements and is not limited to the identified text elements described in this example. Additionally, the described process may be iterative, so that once the writing assistant parses through the document once, even if the user makes suggested changes, the writing assistant may detect additional drafted text elements to be revised, which may be located anywhere within the modified document.

For example, a user may highlight one or more sub-sentence elements or sentences in an existing text, and in response, the writing assistant may generate one or more alternative text options for possible substitution for any of the highlighted text. The text output options may be synonymous or not synonymous with the first drafted text element, or a portion thereof. They can also be generated as a replacement for the first drafted text element, or a portion thereof, or to agree with at least one contextual element associated with text in the document other than the first drafted text element. The text output options can include complete sentences and may include more or fewer words that the drafted text element. In some cases, the generated text output options may include no words from the first drafted text element. The text output options may also include one or more changes relative to the first drafted text element, a change in verb tense, an addition of at least one clause, or a substitution of one or more synonyms relative to the first drafted text element. The changes relative to the first drafted text element can include, for example, a style modification, a grammar modification, or a modification of words included in the first drafted text element.

As in previously described examples, the writing assistant can receive a user selection of a text output option and automatically insert the selected text output option into the document text in place of at least a portion of the first drafted text element. If there are two or more text output options, then the writing assistant can use the selected text output option to further refine and update the text output options (e.g., based on user selection of a GUI control associated with a text output option refinement process).

Various controls may be used to initiate and/or control the presently disclosed writing assistant system. For example, as discussed in the sections above, one or more GUIs associated with the writing assistant may include virtual buttons (e.g., icons, etc.), menus (e.g., drop down menus), among other virtual control elements that a user can interact with to control various aspects of the writing assistant. For example, a virtual control button may be included to initiate operation of the writing assistant. As shown in FIG. 4D, fields and buttons may be included in a GUI to select controllable style parameters and set values for the control parameters. Other buttons may control selection and insertion of a generated text output option into a workspace. Various other virtual buttons, fields, menus, etc. may be included for accomplishing any other tasks associated with the writing assistant.

In some cases, other types of user interface elements may be used to control one or more aspects of the writing assistant. Such interface elements may include, for example, a keyboard 902, as shown in FIG. 9*a*, a mouse or other pointing device, electronic pencil, etc. that may include one or more controls adapted to enable a user to interact with the writing assistant.

As shown in FIG. 9*a*, keyboard 902 may include a button 904 ("Assist") that when pressed may initiate the writing assistant. For example, continuing with the example of FIG. 4 above, a user may wish to make a call to the writing assistant at any time while drafting an email or other type of electronic text-based document. Before or after entering text into a workspace 912, a user may initiate the writing assistant functionality by pressing button 904, which may result in a user input field 914 being shown on the GUI display, as shown in FIG. 9*b*. User input field 914 may include any or all of the functionality described above relative to other user input fields. For example, in response to one or more words being entered into user input field 914, the writing assistant may generate and display one or more text output options associated with the one or more words entered into field 914.

Other controls may be included on keyboard 902. For example, a button 906 ("Style") may be used to cause the writing assistant to display one or more GUI elements associated with selection of available style parameters and associated style parameter values. For example, in some cases, after initiating operation of the writing assistant, a user press button 906 to set values for various style parameters to be used globally by the writing assistant in generating text output options. Style button 906 may also be used to select style parameters to be applied more locally. For example, a user may select/identify a particular text output option generated by the writing assistant (e.g., by highlighting the text output option or clicking on a virtual button, etc. associated with the text output option) and press Style button 906 in order to select and/or change one or more values associated with available style parameters for the particular text output option.

In other cases, a user may highlight text in a document (with or without the writing assistant being active) and press Style button 906 in order to select/set available style parameter values for the highlighted text. For example, a user may highlight a word, phrase, sentence, etc., and then press button 906. In response, the writing assistant may automatically be initiated, and a GUI may be displayed to enable the user to set various style parameter values associated with the highlighted text. In response to a selection/change in style parameter values and/or in response to any suitable user input (e.g., pressing one or more virtual buttons, pressing the Enter key, etc.), the writing assistant may generate one or more text output options generated based on the selected style parameter values as potential substitutes for the highlighted text.

In some examples, pressing button 906 may cause the writing assistant to display a GUI, as shown in FIG. 9*c*, for enabling a user to select or modify one or more style parameter values. Once displayed, the user may select an available style parameter or enter a value for a particular style parameter using various control elements associated with the GUI. For example, a user may place a cursor within any of input boxes 918*a*-918*d* in order to enter a specific value associated with each style parameter or to activate a drop-down menu of available values, which can then be selected. Alternatively, a user may use +/− buttons 916a-916d (or any other suitable control) to increase or decrease particular style parameter values. While the GUI of FIG. 9c shows style parameters including Politeness, Formality, Emotion, and Conciseness, any other style parameter value may be used by the described writing assistant. For example, in some cases a Length parameter for controlling a length of generated text output options may be grouped together with other style parameters.

Additionally or alternatively, one or more other control elements may be used for controlling various features of the writing assistant. For example, as shown in FIG. 9a, a keyboard 902 may include directional arrow keys 908 and a scroll wheel 910. Other input devices, such as a mouse or electrical pencil may include similar features such as a rotating wheel, up/down buttons, touch sensitive "buttons", etc. Returning to the style parameter example, keys 908 and wheel 910 may be used to select/change style parameter values. For example, when a style parameter control GUI, such as the GUI shown in FIG. 9c, is made available to a user, the user may select a particular style parameter to update by pressing the left or right directional keys 908 to cycle through the available style parameters. Once the desired style parameter is reached, the user may turn the scroll wheel 910 to change the value of the style parameter (e.g., turning left to decrease the value and turning right to increase the value). After selecting a desired value for a style parameter, the user may press wheel 910 (or hit the Enter key) to update the style parameter with the selected value.

Alternatively, in some cases, directional keys 908 may be omitted, and wheel 910 may be used to control a combination of features. In the style parameter example, a user may turn wheel 910 left or right to cycle through the available style parameters shown in the GUI of FIG. 9c. Once the desired style parameter is reached, a press to wheel 910 may enable a value selection function for the style parameter. In such a case, turning wheel 910 to the left may decrease the value and turning wheel 910 to the right may increase the value. After selecting a desired value for a style parameter, the user may press wheel 910 (or hit the Enter key) to update the style parameter with the selected value.

Keys 908 and wheel 910 (and any other included control elements) may be used to interact with any features and functions associated with the disclosed writing assistant. For example, keys 908 and/or wheel 910 may be used to scroll through available menu items or GUI elements, select various options or parameter values, etc. While the example keyboard 902 shown in FIG. 9a includes controls 904, 906, 908, and 910 included in a dedicated region of the keyboard, any suitable arrangement of the controls may be used. In some cases, buttons 904, 906, and 908 (and wheel 910) may be distributed over different areas of keyboard 902. In some cases, the described functionality associated with buttons 904, 906, and 908 (and wheel 910) may be associated with one or more other buttons of keyboard 902, such as an of the Function keys, directional arrow keys, etc.

One aspect of the writing assistant may include the generation of natural language that may be controlled or influenced by multiple pieces of text that should be naturally and smoothly incorporated into a refined text passage or text output option. There may be various techniques for assembling a writing assistant application consistent with the presently disclosed examples and embodiments. In some cases, the disclosed writing assistant may be assembled and/or configured using machine learning techniques and/or by incorporating one or more trained models. In order to provide the described functionality, the disclosed writing assistant and model(s) on which the writing assistant is based may be trained, for example, to predict text within a document from a large corpus, conditioned upon text appearing before and/or after textual elements. For example, in order to train the model(s), one or more large text corpus documents (such as one or more of several publicly available corpus documents) may be segmented into sentences. Such sentences may be randomly selected and revealed to the model(s) to serve as context for predicting the text in the other sentences within the document (e.g., sentences that appear in close proximity to a randomly selected sentence). The model(s) may thus learn to generate words conditioned on the multiple pieces of text provided by the user and to generate words, sentences, etc. that fit within context established by text in a document.

As one example of training a model on which the disclosed writing assistant may be based (e.g., a training method for autoregressive left-to-right language generators) may include selective masking of various portions of a corpus document. In some cases, such documents used for training may include just a few sentences or paragraphs. In other cases, however, such documents may be thousands or hundreds of thousands of pages long and may offer many examples of word usages, context dependencies, etc. When constructing a training set using a training document, portions of the document may be labeled to obtain two parts (e.g., a prefix and a suffix). In some cases, such splits may be introduced at the end of a sentence within the training document. The prefix begins at the beginning of the training example and ends at the beginning of the suffix, which ends at the end of the example. The training example may then be re-ordered to place the suffix tokens (e.g., text portions) at the beginning of the sequence, followed by a sequence-start token, the prefix tokens and a sequence-end token. With this technique, the model(s) may be trained to predict the tokens of the prefix while being exposed to the tokens of the suffix.

Another aspect of a method for training model(s) associated with the disclosed writing assistant may include training techniques to control a desired length of the generated text, while ensuring that the generated text does not end abruptly, but rather concludes in a natural way. One way to do this is to train the model to predict text within a document from a large corpus conditioned upon the length of ground-truth text in addition to other signals, such as preceding text.

For the same autoregressive setting discussed above, this may be accomplished by assigning each token with a positional embedding prior to re-ordering each training example, such that the suffix tokens encode their true position in the full text, and therefore indicate the generation length as well. Optionally, the positional embeddings can be randomly shifted by a small amount. To handle cases where the generation is not conditioned on the suffix, the generation length may be encoded in the positional embeddings of the start-sequence token. The model(s) may thus learn to generate tokens conditioned on the length and position of text that should be generated.

Another aspect of training for the model(s) associated with the disclosed writing assistant may be directed to enabling the model(s) to determine a desired position of generated text within a predetermined text (e.g., such that the generated text is incorporated naturally and smoothly within the preexisting text). Such capabilities may be provided by training a model to predict text within a document from a large corpus conditioned upon the preceding text and additional information regarding the position of the missing text. In addition to the method described in the previous section, after converting the tokens into a continuous representation, a representation denoting the original index of each token may be added. The model(s) may thus learn to generate words conditioned on the length and position of text that should be generated.

Another aspect of model training may be directed to the generation of natural language that conveys a desired meaning. The desired meaning could be indicated by, among other things, the following: natural language phrases or sentences that express the desired meaning or intent for the meaning of the generated text; keywords that express the desired meaning or intent for the meaning of the generated text; any indication of semantic objects and relations that should be included in the generated text, such as entities (e.g. people, locations, events, etc.), relations between events (e.g. temporal, spatial, cause-effect, etc.), relations between entities (e.g. organizational, family, etc.), relations between entities and events (e.g. winner-lottery, seller-purchase, etc.).

Below is a description of a method for training a language model to capture relations between weak semantic signals and surface text. The model may be trained to predict masked spans of text in a large corpus conditioned upon the textual context and upon semantic signals automatically extracted from the masked text, which may simulate signals (in user input or extracted from the input) that indicate the desired meaning of the generated text at prediction time. The model may thus learn to generate text that expresses the meaning indicated by the input at prediction time. Semantic signals that could be extracted from the masked text may include, but are not limited to, surface semantic phenomenon, representations of semantic meaning, and/or heuristics for transforming sentences into broken or simple forms, including but not limited to, Machine Translation into Simple English, insertion of grammatical mistakes, etc. Surface semantic phenomena may include, but are not limited to, a bag of words (e.g., a set of meaning-carrying words that are used in a particular sentence), synonyms, and paraphrases of a particular sentence, that could be generated, among other methods, by back-translation. Representations of semantic meaning may include, but are not limited to, extraction of semantic frames and roles (e.g., [frame: purchase; roles: {buyer: 'john'; seller: 'Tod'; object: 'car'}]); extraction of entities (e.g., persons, events, locations, etc.); extraction of sentiments (e.g. positive, negative); extraction of dependency parsing, extraction of discourse relations between phrases (e.g., contrast, example, elaboration, etc.); word senses; word embeddings; extraction of speech act illocution or intent (e.g. 'propose meeting', 'agree to suggestion', etc.); and learned latent semantic representation.

One level of semantic meaning that may be considered is the clause level. In use, it would be desirable for the model(s) of the writing assistant to generate text conveying the same or similar meaning as the user input (or selected, preexisting text). In order to accomplish this, a semantic representation may need to capture the meaning of the user input clause-by-clause and to capture the relation between the clauses (e.g., equality, entailment, description, etc.). In addition, semantic equality can be provided at a higher resolution. For example, it may be required that the properties of the entities will be maintained between the user input and the generated text, e.g. the gender or age of the subject. In order to accomplish this, the semantic representation of the entities for the properties to be conserve may be queried.

In some examples, learning to condition on a semantic representation may be accomplished in two steps: supervised and unsupervised. In the supervised step, a dataset of annotated examples may be leveraged to train a model ("Semantic Reader") on a few Natural Language Understanding tasks which capture semantics (such as Semantic Role Labeling, Semantic Proto-Roles, Coreference, Entity Linking, etc). Once trained, the Semantic Reader may be applied to a large corpus producing predictions for the different semantic tasks. In the unsupervised step, another model (e.g., a "Semantic Generator") may be trained to generate masked text conditioned on the output of the Semantic Reader.

In addition, the Semantic Reader can be applied again to the output of the Semantic Generator for training examples in the unsupervised step, and the Semantic Generator may be trained to minimize reconstruction loss on the output of the Semantic Reader. Optionally, the Semantic Reader weights may be updated as well.

Another training method for the disclosed writing assistant models may include determining the desired meaning of generated text. Such a determination may be accomplished by using sampling methods from the language model guided by certain constraints and derived from the following metrics (among others): diversity of vocabulary, diversity of syntactic structures, the semantic similarity to the input, style, coherence, and fluency. Text generation based on a language model may require sampling from a provided probability distribution. The desired output should be likely and must rank high in terms of the above metrics. Finding an desired solution may be intractable for any reasonable generation length, so a sub-optimal algorithm may be employed that can provide an approximation. An automatic evaluation of the abovementioned metrics may be used to guide the sampling from the language model.

Another method for determining the desired meaning of generated text may involve training the language model with reinforcement learning where the model's reward is derived from any of the abovementioned metrics, for example. While training a model to predict a masked word, the model trained up to this step may be used to generate text as well. Errors from the text generation step may be propagated into the model trained to predict a masked word.

Another method of for training the model(s) of the writing assistant to determine or generate a desired meaning of generated text may include enriching text generation by using external knowledge bases. Such external knowledge bases may relate to (among other things): geographical KB-spatial relations; organizational KB such as CRM; demographic kB; ontologies; physical properties KB; Wikipedia; historical knowledge; and event graphs. Such external knowledge bases may be used, for example, to ensure semantic coherence of the generated text. For example, an agent could be in Paris and France at the same time but not in Paris and England. For this use, both in the language model training phase and in the text generation phase, we can verify that the generated text doesn't contradict the external knowledge (i.e., for text generated we will extract facts and verify that they are aligned with information from the external knowledge base). Additionally, the external knowledge bases can be used to improve the quality of the generated text by augmenting it with information from an external knowledge base or appropriately replacing certain information or object references. For example, when the generated text should refer to an entity that exists in the external knowledge base, we can replace the user's reference with an alternative reference to the same entity or add information on that entity found in the knowledge base.

Another method for generating text with the desired meaning may include using a semantically infused language model for text generation. For example, a neural network-based language model may be trained to contain contextual relations between abstract semantic features in text, in contrast with prior systems, where models can only be trained to learn contextual relations between surface-level words. For example, the presently disclosed writing assistant may include model(s) trained to learn contextual relations between words and word senses and between words and the properties of the abstract concepts invoked by the text. To achieve this, a model may be trained to predict the semantic features of masked tokens in text conditioned by their surrounding context. Using a semantically infused language model to generate text may improve its semantic coherence and plausibility. Such methods may allow us to endow the language model with a semantic signal given unlabeled text only, which may result in an ability to harness information from massive amounts of raw text.

The disclosed system and method may allow for endowment of a language model with a semantic signal given unlabeled text only, thus enjoying the ability to harness information from massive amounts of raw text. The disclosed trained language models, infused with such semantic knowledge gained from pretraining, may achieve enhanced performance on natural language tasks with merely a fraction of parameters compared with other systems. Types of semantic signals that could be infused into language models using the following described technology may include: using the method described above to learn contextual relations between surface-level words and additional semantic features, including word senses; real-world properties of concepts invoked by the text (e.g. size, color, etc.); entity types (e.g., organization, person, animal, feeling, etc.); entity links (what different words refer to the same entity described in the text); the sentiment (e.g. positive, negative, neutral); discourse relations between phrases (e.g. contrast, example, elaboration, etc.); and multiword expressions (the sense of multiple words taken together). Word senses can include a system and method for the generation of a semantically infused language model that captures contextual relations between words and word senses and supersenses. The model may be trained to predict word senses of masked tokens in a corpus given the textual context. The 'correct' word senses may be derived from an ontology or a lexical knowledge base such as Wordnet.

An additional component of the system and method may include enforcing prediction coherency. Having extended the pretraining setting to a multitask one, where semantic information is predicted in parallel to surface-level word information, we developed a global consistency constraint validation procedure. We effectively enforce the predictions of the different semantic tasks to be consistent with one another. For example, an independently predicted pair of word and sense for a masked position should be plausible (e.g., the predicted word could have that sense, a predicted part-of-speech label should be consistent with an independently predicted parse tree structure, etc.). The process may increase the accuracy of semantic information prediction.

Additionally, the system and method may allow for infusing a language model with semantic features through a model's loss function. We formulate the loss function when training a masked language model such that the model is rewarded to some extent for predicting hypernyms and synonyms of the masked words, and not merely for precisely predicting the word. Specifically, our loss function is "forgiveing" in an exponentially decaying manner as a function of the distance of the predicted words from the masked word in the WordNet graph. For example, it punishes predictions of WordNet synonyms, hypernyms, or hyponyms of the masked words much less than it punishes predictions of unrelated words.

Additionally, the system and method may allow for saving time and money by using micro BERT models, and then scaling up. We developed a gradual pretraining strategy where various hyperparameter ablations are performed on significantly smaller and cheaper models, and only then leading experiments are performed on common expensive models.

Automated (or semi-automated) text generation holds great promise for society, by helping people write better and more productively. In order to unlock this potential, however, text generators need to evolve to become more controllable. Impressive as it is, text generated by prior systems is far from perfect. In particular, the prior models' output tends to diverge from the human-written input as the generation progresses. Sooner or later, the prior generators go off-topic, lose coherence, or contradict the preceding text. Such behaviors are a major problem for a user trying to convey a message or express an idea.

There is no natural way for a user to restrict this tendency to diverge in the outputs of prior language generation systems. This divergence, for example, is inherent to their left-to-right, extrapolating method of operation. Metaphorically speaking, the user can give these models a starting point and a vague sense of direction, but not a final destination, let alone a route to follow.

The disclosed writing assistant is designed to enable a user to effectively control the "route" used by the writing assistant in generating its text output options. And as described in the sections above, if a user does not feel that the system has reached the intended "final destination" by offering a text output option that conveys an intended meaning, information, etc., the user can provide additional or different directions about the route until the writing assistant metaphorically reaches the intended final destination. Such control is not offered by prior language generation systems.

To provide this type of controllability, the disclosed writing assistant may be based upon an interpolating language model. That is, given a human-written beginning (prefix) and human-written ending (suffix), the writing assistant can generate synthetic text (body) that fits between them with a desired length. Thus, the writing assistant may offer at least two new "knobs" for tuning its output: the suffix, for keeping the generated text on topic, and the length, for controlling the amount of text inserted between the prefix and the suffix.

In some cases, the writing assistant may be trained relative to publicly available text. For example, one or more models associated with the disclosed writing assistant may be trained on OpenWebText, a freely-available clone of OpenAI's WebText dataset. In order to train the model to generate text conditioned on a prefix and a suffix, the order of the text may be manipulated in different training examples.

What follows is a more technical description of an exemplary implementation of aspects of the writing assistant. For example, in some cases, the disclosed writing assistant may be based on a model with 24 layers with 16 attention heads and 1024-dimensional hidden states, which amounts to 345 million parameters. The same vocabulary and BPE tokenization scheme may be employed. One goal may include providing a generative model of natural language allowing for sampling according to the conditional distribution:

$$P(x_{p+1}, \ldots, x_{n-s}|x_1, \ldots, x_p; x_{n-s+1}, \ldots, x_n)$$

where $(x_i)_{i=1}^n$ is a sequence of tokens, $(x_i)_{i=1}^p$ is the prefix, $(x_i)_{i=n-s+1}^n$ is the suffix and $(x_i)_{i=p+1}^{n-s}$ is the body. For comparison, certain prior systems sample from $P(x_{p+1}, \ldots, x_n|x_1, \ldots, x_p)$, conditioned only on the prefix tokens, with some also sampling on additional metadata fields.

The disclosed writing assistant may adopt an autoregressive formulation of language modeling, decomposing the probability of a sequence $(x_i)_{i=1}^n$ into a product of the conditional probabilities of generating each token given the previous tokens $$P(x_{p+1}, \ldots, x_{n-s}|x_1, \ldots, x_p; x_{n-s+1}, \ldots, x_n) = \Pi_{i=p+1}^{n-s} P(x_i|x_1, \ldots, x_{i-1}; x_{n-s+1}, \ldots, x_n)$$

To condition the output on the suffix, the input sequences can be arranged such that the first s tokens are the suffix, followed by the prefix, separated by <begin> and <end> tokens. In order for the model to properly "stitch" the generated text to the suffix, the starting position of the suffix may be indicated, thereby dictating the sequence length. This can be done by assigning the suffix (prefix) tokens with positional embeddings corresponding to their original positions at the end (beginning) of the sequence, rather than their position in the rearranged sequence.

The model may be trained to minimize the cross-entropy loss when predicting the input sequence. In some cases, backpropagating the loss on the suffix tokens, corresponding to the first s tokens in the input sequence, may be avoided. The training sequences may be generated as follows:

1. For each document in OpenWebText, we can sample $[N/n_{max}]$ sequences of consecutive sentences (Sentok may be used, in some cases, for sentence segmentation), where N is the total document length. The sampled sequence length n, including two special tokens (<begin> and <end>), is uniformly distributed in $[n_{min}, n_{max}]$. We set the minimum and maximum sequence lengths as $n_{min}=32$ and $n_{max}=512$ tokens respectively.
2. For each sequence, we can extract a suffix containing m sentences from the end, such that m is uniformly distributed in $[1, \min(M-1, m_{max})]$, where M is the total number of sentences in the sequence. Thus, at least one sentence is reserved for the prefix. We trained with at most $m_{max}=3$ sentences in the suffix. To train the model to be able to predict given only a prefix, we didn't extract a suffix for 10% of the sequences.
3. The final input sequence may be composed by concatenating the extracted suffix tokens, a <begin> token, the prefix tokens and finally an <end> token.
4. The first s+1 tokens, corresponding to the entire suffix and the <begin> token, may be assigned positions n−s +δ to n+δ (inclusive). The remaining tokens, corresponding to the prefix and the <end> token, are assigned positions 1 to n−s−1 (inclusive). The random shift δ is introduced to soften the length constraint, effectively allowing the model some leeway at inference time. We sampled the position shift uniformly in [0,0.1×n].

The model may be refined using Adafactor and certain hyperparameters. For example, a learning rate schedule may be used with a linear warmup over the first 10,000 steps to a maximum learning rate of $3 \times 10^{-4}$ followed by linear decay over the remaining steps. The model may be trained for 800,000 steps with a batch size of 512, corresponding to approximately 20 epochs over OpenWebText. Training, in some examples, took roughly 3 days on a 128-core TPUv3 pod. At the end of training, the loss on both the training set and a held-out set continued to decrease, so further training may improve the model's performance.

As additional context for the disclosed writing assistant and its capabilities, the ability to learn from large unlabeled corpora has allowed neural language models to advance the frontier in natural language understanding. However, existing self-supervision techniques operate at the word form level, which serves as a surrogate for the underlying semantic content. The disclosed writing assistant is based on techniques employing weak-supervision directly at the word sense level. In some cases, a model on which the writing assistant may be based may be referred to as SenseBERT, which is a model pre-trained to predict not only the masked words (as described above) but also their WordNet supersenses. As a result, the disclosed writing assistant may be based on a lexicalsemantic level language model, without the use of human annotation. SenseBERT may achieve significantly improved lexical understanding, as compared to prior systems.

One starting point for the disclosed model and its training may include the use of self-supervision, which may allow the network to learn from massive amounts of unannotated text. As noted above, one self-supervision strategy may include masking some of the words in an input sentence and then training the model to predict them given their context. Other strategies for self-supervised learning may include, for example, unidirectional, permutational, or word insertion-based methods.

The disclosed writing assistant may be based on models that apply weak-supervision directly on the level of a word's meaning. By infusing word-sense information into a pre-training signal (e.g., a BERT pre-training signal), the model may be explicitly exposed to lexical semantics when learning from a large unannotated corpus. The resultant sense-informed model may be referred to as Sense-BERT. For example, a masked-word sense prediction task may be added as an auxiliary task in BERTs pretraining Thereby, jointly with a standard wordform level language model, a semantic level language model may be trained that predicts the missing word's meaning. This method does not require sense annotated data. Self-supervised learning from unannotated text may be facilitated by using WordNet, an expert constructed inventory of word senses, as weak supervision.

The disclosed models and their training may focus on a coarse-grained variant of a word's sense, referred to as its WordNet supersense, in order to mitigate an identified brittleness of fine-grained word-sense systems, caused by arbitrary sense granularity, blurriness, and general subjectiveness. Word-Net lexicographers organize all word senses into 45 supersense categories, 26 of which are for nouns, 15 for verbs, 3 for adjectives and 1 for adverbs. Disambiguating a word's supersense has been studied as a fundamental lexical categorization task. In the disclosed embodiments, the masked word's allowed supersenses list from WordNet may be employed as a set of possible labels for the sense prediction task. The labeling of words with a single supersense (e.g., 'sword' has only the supersense noun.artifact) is straightforward. The network may be trained to predict this supersense given the masked word's context. As for words with multiple supersenses (e.g., 'bass' can be: noun,food; noun,animal; noun, artifact; noun, person; etc.), the model may be trained to predict any of these senses, leading to a simple yet effective soft-labeling scheme.

Compared to prior systems, the disclosed models on which the writing assistant may be based may significantly outperform those systems by a large margin on a supersense variant of the SemEval Word Sense Disambiguation (WSD) data set standardized in Raganato et al. (2017). Notably, SenseBERT receives competitive results on this task without funetuning; i.e., when training a linear classifier over the pretrained embeddings, which serves as a testament for its self-acquisition of lexical semantics.

Furthermore, SenseBERTBASE surpasses prior systems in the Word in Context (WiC) task (Pilehvar and Camacho-Collados, 2019) from the SuperGLUE benchmark (Wang et al., 2019), which directly depends on word-supersense awareness.

In some examples, a single SenseBERTLARGE model has achieved state of the art performance on WiC with a score of 72.14, improving the score of certain prior systems by 2.5 points. For example, certain BERT models trained with current word-level self-supervision, burdened with the implicit task of disambiguating word meanings, often fails to grasp lexical semantics, exhibiting high supersense misclassification rates. The weakly-supervised word-sense signal used in the presently disclosed models, for example, may allow SenseBERT to significantly bridge this gap.

Moreover, SenseBERT may exhibit an improvement in lexical semantics ability (reflected by the Word in Context task score) even when compared to models with WordNet infused linguistic knowledge.

Further details regarding a method for integrating word sense-information within SenseBERT's pre-training is described. The input to BERT is a sequence of words $\{x^j \in \{0,1\}^{D_W}\}_{j=1}^{N}$ where 15% of the words are replaced by a [MASK] token. Here N is the input sentence length, $D_W$ is the word vocabulary size and $x^{(j)}$ is a 1-hot vector corresponding to the $j^{th}$ input word. For every masked word, the output of the pretraining task is a word-score vector $y^{words} \in \mathbb{R}^{D_W}$ containing the per-word score. BERT's architecture can be decomposed to (1) an internal Transformer encoder architecture wrapped by (2) an external mapping to the word vocabulary space denoted by W.

The Transformer encoder operates over a sequence of word embeddings $v_{input}^{(j)} \in \mathbb{R}^d$ where d is the Transformer encoder's hidden dimension. These are passed through multiple attention-based Transformer layers, producing a new sequence of contextualized embeddings at each layer. The Transformer encoder output is the final sequence of contextualized word embeddings $v_{input}^{(j)} \in \mathbb{R}^d$.

The external mapping $W \in \mathbb{R}^{d \times D_W}$ is effectively a translation between the external word vocabulary dimension and the internal Transformer dimension. Original words in the input sentence are translated into the Transformer block by applying this mapping (and adding positional encoding $p^{(j)} \in \mathbb{R}^d$):

$$v_{input}^{(j)} = Wx^{(j)} + p^{(j)} \quad (1)$$

The word-score vector for a masked word at position j is extracted from the Transformer encoder output by applying the transpose: $y^{words} = W^T v_{input}^{(j)}$. The use of the same matrix W as the mapping in and out of the transformer encoder space may be referred to as weight tying.

Given a masked word in position j, BERT's original masked-word prediction pre-training task is to have the softmax of the word-score vector $y^{words} = W^T v_{input}^{(j)}$ get as close as possible to a 1-hot vector corresponding to the masked word. This may be done by minimizing the cross-entropy loss between the softmax of the word-score vector and a 1-hot vector corresponding to the masked word:

$$\mathcal{L}_{LM} = -\log p(w|context), \quad (2)$$

where w is the masked word, the context is composed of the rest of the input sequence, and the probability is computed by:

$$p(w|context) = \frac{\exp(y_w^{words})}{Z_a}, \quad (3)$$

where $y_w^{words}$ denotes the $w^{th}$ entry of the word-score vector.

Jointly with the above procedure for training the word-level language model of SenseBERT, the model may be trained to predict the supersense of every masked word, thereby training a semantic-level language model. This may be done by adding a parallel external mapping to the words supersenses space, denoted $S \in \mathbb{R}^{d \times D_s}$, where $D_s = 45$ is the size of supersenses vocabulary. Ideally, the objective is to have the softmax of the sense-score vector $y^{sense} \in \mathbb{R}^{D_s} := S^T v_{output}^{(j)}$ get as close as possible to a 1-hot vector corresponding to the word's supersense in the given context.

For each word w in our vocabulary, the WordNet word-sense inventory may be employed for constructing A(w), the set of its "allowed" supersenses. Specifically, we apply a WordNet Lemmatizer on w, extract the different synsets that are mapped to the lemmatized word in WordNet, and define A(w) as the union of supersenses coupled to each of these synsets. As exceptions, we set A(w)=∅ for the following: (i) short words (up to 3 characters), because they are often treated as abbreviations, (ii) stop words, as WordNet does not contain their main synset (e.g. 'he' is either the element helium or the hebrew language according to WordNet), and (iii) tokens that represent part-of-word.

Given the above construction, a combination of two loss terms may be employed for the supersense-level language model. The following allowed-senses term may maximize the probability that the predicted sense is in the set of allowed supersenses of the masked word w:

$$\mathcal{L}_{SLM}^{allowed} = -\log p(s \in A(w) | context) = -\log \sum_{s \in A(w)} p(s | context), \quad (4)$$

where the probability for a supersense s is given by $$p(s|context) = \frac{\exp(y_s^{senses})}{\sum_{s'} \exp(y_{s'}^{senses})}. \quad (5)$$

The soft-labeling scheme given above, which treats all the allowed supersenses of the masked word equally, may introduce noise to the supersense labels. We expect that encountering many contexts in a sufficiently large corpus may reinforce the correct labels whereas the signal of incorrect labels may diminish. To illustrate this, consider the following examples for the food context:

1. "This bass is delicious"
(supersenses: noun.food, noun.artifact, etc.)
2. "This chocolate is delicious"
(supersenses: noun.food, noun.attribute, etc.)
3. "This pickle is delicious"
(supersenses: noun.food, noun.state, etc.)

Masking the marked word in each of the examples results in three identical input sequences, each with a different sets of labels. The ground truth label, noun.food, appears in all cases, so that its probability in contexts indicating food is increased whereas the signals supporting other labels cancel out.

While $\mathcal{L}_{SLM}^{allowed}$ pushes the network in the right direction, minimizing this loss could result in the network becoming overconfident in predicting a strict subset of the allowed senses for a given word, i.e., a collapse of the prediction distribution. This is especially acute in the early stages of the training procedure, when the network could converge to the noisy signal of the soft-labeling scheme.

To mitigate this issue, the following regularization term may be added to the loss, which may encourage a uniform prediction distribution over the allowed supersenses:

$$\mathcal{L}_{SLM}^{reg} = -\sum_{s \in A(w)} \frac{1}{|A(w)|} \log p(s \mid \text{context}), \qquad (6)$$

i.e., a cross-entropy loss with a uniform distribution over the allowed supersenses.

Overall, jointly with the regular word level language model trained with the loss in eq. 2, the semantic level language model may be trained with a combined loss of the form:

$$\mathcal{L}_{SLM} = \mathcal{L}_{SLM}^{allowed} \mathcal{L}_{SLM}^{reg}. \qquad (7)$$

Though in principle two different matrices could have been used for converting in and out of the Tranformer encoder, the BERT architecture employs the same mapping W. This approach, referred to as weight tying, has been shown to yield theoretical and practical benefits. Intuitively, constructing the Transformer encoder's input embeddings from the same mapping with which the scores are computed improves their quality as it makes the input more sensitive to the training signal.

Following this approach, and inserting our newly proposed semantic-level language model matrix S in the input in addition to W, as shown in FIGS. 10a and 10b, such that the input vector to the Transformer encoder (eq. 1) is modified to obey:

$$v_{input}^{(j)} = (W + SM)x^{(j)} + p^{(j)}, \qquad (8)$$

where $p^{(j)}$ are the regular positional embeddings as used in BERT, and $M \in \mathbb{R}^{D_s \times D_w}$ is a static 0/1 matrix converting between words and their allowed WordNet supersenses A(w).

The above strategy for constructing $v_{input}^{(j)}$ may allow for the semantic level vectors in S to come into play and shape the input embeddings even for words which are rarely observed in the training corpus. For such a word, the corresponding row in W is potentially less informative, because due to the low word frequency the model did not have sufficient chance to adequately learn it. However, since the model learns a representation of its supersense, the corresponding row in S is informative of the semantic category of the word. Therefore, the input embedding in eq. 8 can potentially help the model to elicit meaningful information even when the masked word is rare, allowing for better exploitation of the training corpus.

At the pre-processing stage, when an out-of vocabulary (OOV) word is encountered in the corpus, it may be divided into several in-vocabulary subword tokens. For the self-supervised word prediction task (eq. 2), masked sub-word tokens may be straightforwardly predicted. In contrast, word-sense supervision may be meaningful only at the word level. We compare two alternatives for dealing with tokenized OOV words for the supersense prediction task (eq. 7).

In the first alternative, called 60K vocabulary, we augment BERT's original 30K-token vocabulary (which roughly contained the most frequent words) with an additional 30K new words, chosen according to their frequency in Wikipedia. This vocabulary increase may allow us to see more of the corpus as whole words for which supersense prediction is a meaningful operation. Additionally, in accordance with the discussion above, our sense-aware input embedding mechanism can help the model extract more information from lower frequency words. For the cases where a sub-word token is chosen for masking, we may only propagate the regular word level loss and may not train the supersense prediction task.

The above addition to the vocabulary may result in an increase of approximately 23M parameters over the 110M parameters of BERTBASE and an increase of approximately 30M parameters over the 340M parameters of BERT$_{LARGE}$ (due to different embedding dimensions d =768 and d =1024, respectively).

It is worth noting that similar vocabulary sizes in leading models have not resulted in increased sense awareness. As a second alternative, referred to as average embedding, we may employ BERT's regular 30K-token vocabulary and employ a whole-word-masking strategy. Accordingly, all of the tokens of a tokenized OOV word may be masked together. In this case, the supersense prediction task may be trained to predict the WordNet supersenses of this word from the average of the output embeddings at the location of the masked sub-words tokens.

Words that have a single supersense may serve as good anchors for obtaining an unambiguous semantic signal. These words teach the model to accurately map contexts to supersenses, such that it is then able to make correct context-based predictions even when a masked word has several supersenses. We therefore favor such words in the masking strategy, choosing, for example, 50% of the single-supersensed words in each input sequence to be masked. We may stop if 40% of the overall 15% masking budget is filled with single-supersensed words (which rarely happens), and in any case the choice of the remaining words to complete this budget may be randomized. As in the original BERT, 1 out of 10 words chosen for masking may be shown to the model as themselves rather than being replaced with [MASK].

A SenseBERT pretrained model as described above may have an immediate non-trivial bi-product. The pre-trained mapping to the supersenses space, denoted S, may act as an additional head predicting a word's supersense given context, as shown in FIG. 10.

A semantic-level language model may be attained that predicts the missing word's meaning jointly with the standard word-form level language model. The resultant mapping is shown in FIGS. 11a and 11b, which illustrates a UMAP dimensionality reduction of the rows of S, which corresponds to the different supersenses. A clustering according to the supersense part of speech is apparent in FIG. 11a. Finer-grained semantic clusters may further be identified, as shown for example in FIG. 11b.

SenseBERT's semantic language model may allow prediction of a distribution over supersenses rather than over words in a masked position. FIGS. 12a and 12b show the supersense probabilities assigned by SenseBERT in several contexts, demonstrating the model's ability to assign semantically meaningful categories to the masked position.

SenseBERT enjoys an ability to view raw text at a lexical semantic level. FIG. 12b shows example sentences and their supersense prediction by the pretrained model. Where a vanilla BERT would see only the words of the sentence "Dan cooked a bass on the grill", SenseBERT would also have access to the supersense abstraction: "[Person] [created] [food] on the [artifact]". This sense-level perspective can help the model extract more knowledge from every training example, and to generalize semantically similar notions which do not share the same phrasing.

The disclosed models and writing assistant have been shown to offer significant performance improvements over existing systems (e.g., based on various standardized benchmark tests). Such performance increases may be achieved, for example, by the introduction of lexical semantic information into a neural language model's pre-training objective. This may result in a boosted word-level semantic awareness of the resultant model, referred to herein as SenseBERT, which considerably outperforms a vanilla BERT on a SemEval based Supersense Disambiguation task and has achieved state of the art results on the Word in Context task. Notably, this improvement was obtained without human annotation, but rather by harnessing an external linguistic knowledge source. This work indicates that semantic signals extending beyond the lexical level can be similarly introduced at the pre-training stage, allowing the network to elicit further insight without human supervision.

Training of neural language models can include showing the network a piece or pieces of text and asking the network to return a prediction of a piece or pieces of related text that are withheld from the network (e.g., masked from the network). Other techniques involve choosing the text to show and the text to predict by an input-independent and network-independent pattern (e.g., either predefined or randomly selected). Some of the described embodiments may include methods for choosing what to show and what to predict based on the input, on the state of the neural network, and on the pretraining corpus. This approach results in (1) neural language models that can reach their current abilities an order of magnitude more efficiently and (2) when given the same training resources as existing technologies, the disclosed method delivers unprecedented language understanding abilities.

The approach relates to a variety of neural language modeling objectives, including bidirectional, unidirectional, permutational and others. One example of Masked Language Modeling (MLM) includes training by masking random input text segments and learning to predict the masked segments. In the example of MLM, the disclosed training techniques can achieve the above stated improvements for MLMs using a suite of input and model informed maskings. Such maskings may include, for example:

Similar-text Masking: jointly masking similar text segments in the input. This includes different mentions of the same entity/concept, and different words that are similar to each other in various ways, such as two or more words that are declensions, inflections, conjugations, synonyms, hypernyms, hyponyms of each other, etc.

Rare-text masking: favor rare text occurrences for masking, via inverse frequency, tf-idf, or other methods for identifying rare occurrences.

Parse-tree Masking: jointly masking related parse tree constituents, e.g., a predicate and its object.

Learned Masking: this approach includes a second neural network, referred to as the "masking network" that receives the input text as well as the language modeling network's weights and learns which input text segments to mask. One objective of the masking network's training is to maximize the gradient of the MLM's regular loss, the loss itself and related variants. Intuitively, in order to speed up convergence of the LM objective, the teacher learns to present the learner with inputs that can make the highest impact on the learner loss. Theoretically, sampling the inputs while weighting by gradient size leads to an unbiased estimator of the gradient, like in the random sampling case, but which has a lower variance relative to the random sampling case—and thus can speed convergence.

Long-distance masking: Masking disjoint spans of text based on semantic relationship among them: co-referencing, cause and effect, contrastion, etc.

The above methods relate to bidirectional MLMs, but unidirectional language models, permutational models, and other neural language modeling objectives may also be improved to yield similar benefits following configuration according to the described approaches. For example, parse-tree masking or similar-text masking may contribute to unidirectional model training (e.g., when predicting a word, removing easier hints to the word's left can boost performance in unidirectional models). In permutational models, the identity of the permutation may be chosen by the above principles rather than randomly. Further, this approach can dramatically improve language modeling techniques that are based on a generator and discriminator. Currently, the tokens for replacement with generated tokens are chosen randomly; choosing them by the above described principles can dramatically speed up training and boost performance.

Another masking technique useful in training language generation models includes pointwise-mutual-information (PMI) masking. Uniformly masking tokens uniformly at random constitutes a common flaw in the pretraining of MLMs such as BERT. Such uniform masking allows an MLM to minimize its training objective by latching onto shallow local signals, which can lead to pretraining inefficiencies and suboptimal downstream performance. To address this flaw, the disclosed embodiments may incorporate PMI-Masking, a principled masking strategy based on the concept of Pointwise Mutual Information, which jointly masks a token n-gram if it exhibits high collocation over the corpus. PMI-Masking motivates, unifies, and improves upon prior more heuristic approaches that attempt to address the drawback of random uniform token masking, such as whole-word masking, entity/phrase masking, and random-span masking. Specifically, experimental results show that PMI-Masking reaches the performance of prior masking approaches in half the training time, and can significantly improve performance at the end of training.

In the couple of years since BERT was introduced, MLMs have rapidly advanced the NLP frontier. At the heart of the MLM approach is the task of predicting a masked subset of the text given the remaining, unmasked text. The text itself is broken up into tokens, each token consisting of a word or part of a word; thus "chair" constitutes a single token, but out-of-vocabulary words like "e-igen-val-ue" are broken up into several sub-word tokens. In BERT, 15% of tokens are chosen uniformly at random to be masked. The random choice of single tokens in Random-Token Masking, as will be discussed below, has significant limitations.

To see why Random-Token Masking is suboptimal, consider the special case of sub-word tokens. Given the masked sentence "To approximate the matrix, we use the eigenvector corresponding to its largest e[mask]-val-ue", an MLM will quickly learn to predict "igen" based only on the context "e[mask]-val-ue", rendering the rest of the sentence redundant. The question is whether the network will also learn to relate the broader context to the four tokens comprising "eigenvalue". When they are masked together, the network is forced to do so, but such masking occurs with vanishingly small probability. One might hypothesize that the network would nonetheless be able to piece such meaning together from local cues; however, we observe that it often struggles to do so.

This can be established via a controlled experiment, in which the size of the vocabulary is reduced, thereby breaking more words into sub-word tokens. The extent to which such vocabulary reduction degrades regular BERT relative to so-called Whole-Word Masking BERT (WW-BERT), a version of BERT that jointly masks all sub-word tokens comprising an out-of-vocabulary word during training, can be determined. Vanilla BERT's performance degrades much more rapidly than that of WWBERT as the vocabulary size shrank. The intuitive explanation is that Random-Token Masking is wasteful; it overtrains on easy sub-word tasks (such as predicting "igen") and undertrains on harder whole-word tasks (predicting "eigenvalue").

The advantage of Whole-Word Masking over Random-Token Masking is relatively modest for standard vocabularies, because out-of-vocabulary words are rare. However, the tokenization of words is a very special case of a much broader statistical linguistic phenomenon of collocation: the co-occurrence of series of tokens at levels much greater than would be predicted simply by their individual frequencies in the corpus. There are millions of collocated word n-grams—multi-word expressions, phrases, and other common word combinations—whereas there are only tens of thousands of words in frequent use. So it is reasonable to hypothesize that Random-Token Masking generates many wastefully easy problems and too few usefully harder problems because of multi-word collocations, and that this affects performance even more than the rarer case of tokenized words. It can be shown that this is indeed the case.

The idea of masking across spans longer than a single word has been considered. Knowledge Masking which jointly masks tokens comprising entities and phrases, as identified by external parsers, has been proposed. While extending the scope of Whole-Word Masking, the restriction to specific types of correlated n-grams, along with the reliance on imperfect tools for their identification, has limited the gains achievable by this approach. With a similar motivation in mind, SpanBERT introduced Random-Span Masking, which masks spans of lengths sampled from a geometric distribution at random positions in the text. Random-Span Masking was shown to consistently outperform Knowledge Masking, is simple to implement, and inspired subsequent prominent MLMs. However, while increasing the chances of masking collocations, Random-Span Masking is likely to partially mask them, potentially wasting resources on spans that provide little signal.

The present disclosure offers a principled approach to masking spans that consistently offer high signal, unifying the intuitions behind the above approaches while also outperforming them. This approach, dubbed PMI-Masking, uses Point-wise Mutual Information (PMI) to identify collocations, which can then be masked jointly. At a high level, PMI-Masking consists of two stages. First, given any pre-training corpus, a set of n-grams can be identified that exhibit high co-occurrence probability relative to the individual occurrence probabilities of their components. This notion can be formalized by proposing an extended definition of Pointwise Mutual Information from bigrams to longer n-grams. Second, these collocated n-grams can be treated as single units; the masking strategy selects at random both from these units and from standard tokens that do not participate in such units. FIG. 13 shows that (1) PMI-Masking dramatically accelerates training, matching the end-of-pretraining performance of existing approaches in roughly half of the training time; and (2) PMI-Masking improves upon previous masking approaches at the end of pretraining.

MLMs are sensitive to tokenization. This section describes an experiment that motivates the PMI-Masking approach. BERT's ability to learn effective representations for words consisting of multiple sub-word tokens was examined, treating this setting as an easily controlled analogue for the multi-word colocation problem. The experiment seeks to assess the performance gain obtained from always masking whole words as opposed to masking each individual token uniformly at random. Performance across a range of vocabulary sizes was compared, using the same WordPiece Tokenizer (huggingface) that produced the original vocabulary that consists of—30K tokens. As the 30K-token vocabulary was decreased to 10K and 2K tokens, the average length of a word over the pretraining corpus increased from 1.08 tokens to 1.22 and 2.06 tokens, respectively. Thus, by reducing the vocabulary size, the frequency of multi-token words was increased by a large factor.

Table 1 below presents the performance of BERT models trained with these vocabularies, measured as score on the SQuAD2.0 development set. The downstream performance of Random-Token Masking substantially degraded as vocabulary size decreased and the number of spans of sub-word tokens increased. One reason for such degradation might be the model seeing less text as context (512 input tokens cover less text when more words are tokenized to multiple tokens). This probably does play a role; however, for models with the same vocabularies trained via Whole-Word Masking, this degradation was significantly attenuated. It appears that this degradation occurred primarily because of the random masking strategy, which allows the model to use "shortcuts" and minimize its loss without learning the distribution of the entire multi-token word.

TABLE 1

Score on SQuAD2.0 development set of $BERT_{BASE}$ models trained with different masking strategies (Random-Token; Whole-Word) and different vocabulary sizes (30K; 10K; 2K).

|  | 1.08 tokens per word (30K vocabulary) | 1.22 tokens per word (10K vocabulary) | 2.06 tokens per word (2K vocabulary) |
| --- | --- | --- | --- |
| Random-Token Masking | 79.3 | 77.8 | 72.8 |
| Whole-Word Masking | 79.7 | 79.5 | 77.6 |

Shortcuts may be just as problematic in the case of inter-word collocations. In fact, for the regular 30K-token vocabulary, divided words are rare, so inter-word collocations would pose a larger problem than intra-word collocations in the common setting. One possible mitigation might be to expand the vocabulary to include multi-word collocations. However, there are millions of these, and such vocabulary sizes are currently infeasible. Even if it was possible to get around the practical size issue, this approach may suffer from generalization problems: the frequency of each multi-word collocation can be lower than the sample complexity for learning a meaningful representation. An alternative, more practical approach is to leave the vocabulary as it is, but jointly mask co-located words, with the intention of cutting off local statistical "shortcuts" and allowing the model to improve further by learning from broader context. This is the approach taken relative to the disclosed embodiments. Such a masking approach and its potential advantages, shown experimentally, are discussed below.

Masking Correlated n-Grams

Various masking approaches can be implemented as baselines. Given text tokenized into a sequence of tokens, Masked Language Models are trained to predict a set fraction of "masked" tokens, where this fraction is called the 'masking budget' and is traditionally set to 15%. The modified input is inserted into the Transformer-based architecture of BERT, and the pretraining task is to predict the original identity of each chosen token. Several alternatives have been proposed for choosing the set of tokens to mask.

Random-Token Masking: The original BERT implementation selects tokens for masking independently at random: 80% of the 15% chosen tokens are replaced with [MASK], 10% are replaced with a random token, and 10% are kept unchanged.

Whole-Word Masking: The sequence of input tokens is segmented into units corresponding to whole words. Tokens for masking are then chosen by sampling entire units at random until the masking budget is met. Following this approach, for 80%/0%/10% of the units, all tokens are replaced with [MASK]tokens/random token/the original tokens, respectively.

Random-Span Masking: Contiguous random spans are selected iteratively until the 15% token budget is spent. At each iteration, a span length (in words) is sampled from a geometric distribution L~Geo(0.2), and the spans for masking are capped at 10 words. Then, the starting point for the span to be masked is randomly selected. Replacement with [MASK], random, or original tokens is done as above, where spans constitute the units.

PMI: From Bi-Grams to n-Grams

One aim is to define a masking strategy that targets correlated sequences of tokens in a more principled way. To do so, techniques for extracting collocations can be leveraged. For example, the notion of Pointwise Mutual Information, which quantifies how often two events occur, can be compared with what would be expected if they were independent. Defining the probability of any n-gram as the number of its occurrences in the corpus divided by the number of all the n-grams in the corpus, PMI leverages these probabilities to give a natural measure of collocation of bi-grams: how predictable is the bigram $\omega_1\omega_2$, given the unigram probabilities of $\omega_1$ and $\omega_2$. Formally, given two tokens $\omega_1$ and $\omega_2$, the PMI of the bigram "$\omega_1\omega_2$" is $$PMI(w_1 w_2) = \log \frac{p(w_1 w_2)}{p(w_1)p(w_2)}.$$

PMI is qualitatively different from pure frequency: a relatively frequent bigram may not have a very high PMI score, and vice versa. For example, the bigram "book is" appears 34772 times in a pretraining corpus but is ranked around position 760K in the PMI ranking for bi-grams over the corpus, while the bigram "boolean algebra" appears 849 times in the corpus, but is ranked around position 16K in the PMI ranking.

What about contiguous spans of more than two tokens? For a given n-gram, how strongly its components indicate one another can be measured using a measure that captures correlations among more than two variables. A standard and direct extension of the PMI measure to more than two variables, referred to as 'specific correlation' or 'Naive-$PMI_n$,' here, is based on the ratio between the n-gram's probability and the probabilities of its component unigrams:

$$\text{Naive-}PMI_n(w_1, \ldots, w_n) = \log \frac{p(w_1, \ldots, w_n)}{\prod_{j=1}^{n} p(w_j)}.$$

As in the bivariate case, this measure compares the actual empirical probability of the n-gram in the corpus with the probability it would have if its components occurred independently. However, the above definition suffers from an inherent flaw: an n-gram's Naive-$PMI_n$ will be high if it contains a segment with high PMI, even if that segment is not particularly correlated with the rest of the n-gram. Consider for example the case of trigrams:

$$\text{Naive-}PMI_3(w_1 w_2 w_3) = \log \frac{p(w_1 w_2)}{p(w_1)p(w_2)} \cdot \frac{p(w_1 w_2 w_3 \mid w_1 w_2)}{p(w_3)}$$
$$= PMI(w_1 w_2) + \log \frac{p(w_1 w_2 w_3)}{p(w_1 w_2)p(w_3)}$$

where in the first equality $p(\omega_1\omega_2\omega_3) = p(\omega_1\omega_2)p(\omega_1\omega_2\omega_3 \mid \omega_1\omega_2)$ and in the second we write the conditional probability $p(\omega_1\omega_2\omega_3 \mid \omega_1\omega_2) = p(\omega_1\omega_2\omega_3)$. When $PMI(\omega_1\omega_2)$ is high, the Naive-$PMI_3$ measure of the trigram "$\omega_1\omega_2\omega_3$" will start at this high baseline. The added term of log $p(\omega_1\omega_2\omega_3)/p(\omega_1\omega_2)p(\omega_3)$ quantifies the actual added information of "$\omega_3$" to this correlated bigram, i.e., it quantifies how far $p(\omega_1\omega_2\omega_3)$ is from being separable w.r.t. the segmentation into "$\omega_1\omega_2$" and "$\omega_3$". For example, since the PMI of the bigram "Kuala Lumpur" is very high, the Naive-$PMI_n$ of the trigram "Kuala Lumpur is" is misleadingly high, placing it at position 43K out of all trigrams in the WIKIPEDIA+BOOKCORPUS dataset. It is in fact placed much higher than obvious collocations such as the trigram "editor in chief", which is ranked at position 210K out of all trigrams.

In order to filter out n-grams whose high PMI is a result of a high PMI for a sub-span, we propose a measure of distance from separability with respect to all of an n-gram's possible segmentations rather than with respect only to the segmentation into single tokens:

$$PMI_n(w_1, \ldots, w_n) = \min_{\sigma \in seg(w_1, \ldots, w_n)} \log \frac{p(w_1, \ldots, w_n)}{\prod_{s \in \sigma} p(s)},$$

where seg($w_1, \ldots, \omega_n$) is the set of all contiguous segmentations of the n-gram "$\omega_1, \ldots, \omega_n$", and any segmentation σ∈seg(ω$_1$, . . . , ω$_n$) is composed of sub-spans which together give "ω$_1$, . . . , ω$_n$". Intuitively, this measure effectively discards the contribution of high PMI segments; the minimum in the equation above implies that an n-gram's collocation score is given by its weakest link, i.e., by the segmentation that is closest to separability. When ranked by the above PMI$_n$ measure, the tri-gram "Kuala Lumpur is" is demoted to position 1.6M, since the segmentation into "Kuala Lumpur" and "is" yields unrelated segments, while the trigram "editor in chief" is upgraded to position 33K since its segmentations yield correlated components. This definition is not only conceptually cleaner, but also leads to improved performance.

PMI-Masking

Treating highly collocating n-grams as units for masking may be implemented by assembling a masking vocabulary in parallel to the 30K-token vocabulary. Specifically, a pretraining corpus for compiling a list of collocations may be employed. Word n-grams of lengths 2-5 having over 10 occurrences in the corpus may be considered, and the highest ranking collocations over the corpus, as measured via our proposed PMI$_n$ measure (equation above) may be included. Noticing that the PMI$_n$ measure is sensitive to the length of the n-gram, we assemble per-length rankings for each n ∈{2, 3, 4, 5}, and integrate these rankings to compose the masking vocabulary. To make the method impactful, we chose the masking vocabulary size such that approximately half of pretraining corpus tokens were identified as part of some correlated n-gram, resulting in sizes of around 800K.

After composing the masking vocabulary, we treat its entries as units to be masked together. All input tokens not identified with entries from the masking vocabulary are treated independently as units for masking according to the Whole-Word Masking scheme. If one masking vocabulary entry contains another entry in a given input, we treat the larger one as the unit for masking, e.g., if the masking vocabulary contains the n-grams "the United States", "air force", and "the United States air force", the latter will be one unit for masking when it appears. In the case of overlapping entries, we choose one at random as a unit for masking and treat the remaining tokens as independent units, e.g., if the input text contains "by the way out" and the masking vocabulary contains the n-grams "by the way" and "the way out", we can choose either "by the way" and "out" or "by" and "the way out" as units for masking.

After we segment the sequence of input tokens into units for masking, we then choose tokens for masking by sampling from units for masking uniformly at random until 15% of the tokens (the standard tokens of the 30K-token vocabulary) in the input are selected. As in the prior methods, replacement with [MASK](80%), random (10%), or original (10%) tokens is done at the unit level.

Experimental Setup

To evaluate the impact of PMI-Masking, we trained Base-sized BERT models with each of the masking schemes presented above. Rather than relying on existing implementations for baseline masking schemes, which vary in training specifics, we reimplemented each scheme within the same framework used to train our PMI-Masked models. For control, we trained within the same framework models with Naive-PMI-Masking and Frequency-Masking, following the procedure described above for PMI-Masking, but ranking by the Naive-PMIn measure and by pure-frequency, respectively. Described below, we compare our PMI-Masking to internally-trained masking schemes (Table 2) as well as with externally released models (Table 3).

Pre-Training

We trained uncased models with a 30K-sized vocabulary that we constructed over WIKIPEDIA+BOOKCORPUS via the WordPiece Tokenizer used in BERT. We omitted the Next Sentence Pre-diction task, as it was shown to be superfluous, and trained only on the Masked Language Model task during pretraining We trained with a sequence length of 512 tokens, batch size of 256, and a varying number of steps. For pretraining, after a warmup of 10,000 steps, we used a linear learning rate decay, therefore models that ran for a different overall amount of steps are not precisely comparable at a given checkpoint. We set remaining hyperparameters to values similar to those used in the original BERT pretraining.

We performed the baseline pretraining over the original corpus used to train BERT: the 16 GB WIKIPEDIA+BOOKCORPUS dataset. PMI-Masking achieved even larger performance gains relative to our baselines when training over more data, by adding the 38 GB OPEN-WEBTEXT dataset, an open-source recreation of the WebText corpus. When using a pretraining corpus, we compose our PMI$_n$-based masking vocabulary accordingly.

Evaluation

We evaluate our pretrained models on two question answering benchmarks: the Stanford Question Answering Dataset (SQuAD) and the ReAding Comprehension from Examinations (RACE), as well as on the General Language Understanding Evaluation (GLUE) benchmark. Additionally, we report the Single-Token perplexity of our pretrained models.

SQuAD has served as a major question answering benchmark for pretrained models. It provides a paragraph of context and a question, and the task is to answer the question by extracting the relevant span from the context. We focus on the latest more challenging variant, SQuAD2.0, in which some questions are not answered in the provided context.

RACE is a large-scale reading comprehension dataset with more than 28,000 passages and nearly 100,000 questions. The dataset was collected from English examinations in China designed for middle and high school students. Each passage is associated with multiple questions; for each, the task is to select one correct answer from four options. RACE has significantly longer context than other popular reading comprehension datasets and the proportion of questions that requires reasoning is very large.

GLUE is a collection of 9 datasets for evaluating natural language understanding systems. Tasks are framed as either single-sentence classification or sentence-pair classification tasks.

Single-Token perplexity We evaluate an MLM's ability to predict single-tokens by measuring perplexity over a held out test set of 110K tokens from OPENWEBTEXT. For each test example, a single token for prediction is masked and the remainder of the input tokens are unmasked.

For every downstream task, we swept 8 different hyper-parameter configurations (batch sizes ∈{16, 32} and learning rates ∈{1e-5, 2e-5, 3e-5, 5e-5}. We report the best median development set score over five random initializations per hyper-parameter. When applicable, the model with this score was evaluated on the test set. The development set score of each configuration was attained by fine-tuning the model over 4 epochs (SQuAD2.0 and RACE) or 3 epochs (all GLUE tasks except RTE and STS—10 epochs) and performing early stopping based on each task's evaluation metric on the development set. In FIGS. 13 and 14, where we evaluate many pretraining checkpoints per model, we report the score for only one random initialization, with batch size 32 and learning rate 3e−5.

Experimental Results

We evaluated the different masking strategies in two key ways. First, we measured their effect on downstream performance throughout pretraining to assess how efficiently they used the pretraining phase. Second, we more exhaustively evaluated downstream performance of different approaches at the end of pretraining. We examined how the advantage of PMI-Masking is affected by amount of examples seen during pretraining (training steps x batch size x sequence length) and by the size of the pretraining corpus.

Evaluating Downstream Performance Throughout Pretraining

By examining the model's downstream performance after each 200K steps of pretraining, we demonstrate that PMI-Masking sped up MLM training. FIG. 13 investigates the standard BERT setting of pretraining on the Wikipedia+BookCorpus dataset for 1M training steps with batch size 256. It shows that the PMI-Masking method outperformed a variety of prior approaches, as well as the baseline pure frequency based masking, on the SQuAD2.0 development set for all examined checkpoints (these patterns are consistent on RACE). PMI-Masking achieved the score of Random-Span Masking, the best of the existing approaches, after roughly half as many steps of pretraining We ran a second experiment that increased the number of steps from 1M to 2.4M, on the same pretraining corpus. We observed that while PMI-masking learned much more quickly, it eventually reached a plateau, and Random-Span Masking caught up after enough training steps. FIG. 14 shows these results.

Additionally, we increased the amount of training data by adding the OpenWebText corpus (~3.5× more data). FIG. 14 demonstrates that the plateau previously observed in PMI-Masking's performance was due to limited training data. When training for 2.4M training steps on the Wikipedia+BookCorpus+OpenWebText dataset, PMI-masking reached the same score that Random-Span Masking did at the end of training after roughly half of the pretraining, and continued to improve. Thus, PMI-Masking conclusively outperformed Random-Span masking in a scenario where data was not a bottleneck, as is ideally the case in MLM pretraining.

Evaluating Downstream Performance After Pre-Training

Table 2 shows that after pretraining was complete, PMI-Masking outperformed prior masking approaches in downstream performance on the SQuAD2.0, RACE, and GLUE benchmarks. In agreement with FIG. 14, for longer pretraining (2.4M training steps), the absolute advantage of PMI-Masking over Random-Span Masking is boosted across all tasks when pretraining over a larger corpus (adding OPENWEBTEXT). Table 2 also shows that Naive-PMI Masking, based on the straightforward extension in to the standard bivariate PMI, significantly falls behind our more nuanced definition, and is mostly on par with Random-Span Masking.

TABLE 2

Dev/Test performance on the SQuAD, RACE, and GLUE benchmarks of BERT Base sized models. Reported are EM (exact match) and F1 scores for SQuAD2.0, accuracy for RACE (publicly available test set), and the average score for GLUE

| BERT Base with different maskings | SQuAD2.0 EM | SQuAD2.0 F1 | RACE Acc. | GLUE Avg |
|---|---|---|---|---|
| 1M training steps on WIKIPEDIA + BOOKCORPUS(16G): | | | | |
| Random-Token Masking | 76.4/— | 79.6/— | 67.8/66.2 | 83.1/— |
| Random-Span Masking | 77.1/— | 80.3/— | 68.6/66.9 | 83/— |
| Naive-PMI-Masking | 78.2/— | 81.3/— | 69.7/67.8 | 84.1/— |
| PMI-Masking | 78.5/— | 81.4/— | 70.1/68.4 | 84.1/— |
| 2.4M training steps on WIKIPEDIA + BOOKCORPUS(16G) | | | | |
| Random-Span Masking | 79.7/80.0 | 82.7/82.8 | 71.9/69.5 | 84.8/79.7 |
| Naive-PMI-Masking | 80.3/— | 83.2/— | 71.7/69.8 | 84.5/80.00 |
| PMI-Masking | 80.2/80.9 | 83.3/83.6 | 72.3/70.9 | 84.7/80.3 |
| 2.4M training steps on WIKIPEDIA + BOOKCORPUS + OPENWEBTEXT(54G): | | | | |
| Random-Span Masking | 80.1/80.4 | 83.2/83.3 | 74.0/72.2 | 85.1/80.1 |
| Naive-PMI-Masking | 80.4/— | 83.3/— | 73.9/71.4 | 85.6/80.3 |
| PMI-Masking | 80.9/82.0 | 83.9/84.9 | 75.0/73.3 | 86.0/80.8 |

We also compared our PMI-Masking Base-sized models to published Base-sized models (Table 3), and again saw PMI-Masking increase both pretraining efficiency and end-of-training downstream performance. Others have trained their 'AMBERT' model over a vocabulary of n-grams in parallel to the regular word/subword level vocabulary, performing the hard task of n-gram prediction in parallel to the easy Random-Token level prediction task during pretraining This approach yielded a model with 75% more parameters than the common Base size of our PMI-Masking model. By using the PMI-masking scheme on a regular BERT architecture and vocabulary, we attained a significantly higher score on the RACE benchmark, despite training over a corpus 3 times smaller and showing the model 2 times fewer examples during pretraining.

TABLE 3

A comparison of the RACE scores of our PMI-Masked models with comparable published Base-sized models. The number of examples reflects the amounts of text examined during training. AMBERT was trained over WIKIPEDIA + OPENWEBTEXT (47G), SpanBERT over WIKIPEDIA + BOOKCORPUS (16G), and RoBERTa over WIKIPEDIA + BOOKCORPUS + OPENWEBTEXT + STORIES + CCNEWS.

| PMI vs Prior BASE MLMs | Corpus size | Batch × Steps = Examples | RACE dev/test |
|---|---|---|---|
| PMI vs n-grams in vocabulary | | | |
| AMBERT (Zhang & Li, 2020) | 47G | 1024 × 0.5M = 512G | 68.9†/66.8† |
| PMI-Masking | 16G | 256 × 1M = 256M | 70.1/68.4 |
| PMI vs Random-Span Masking | | | |
| SpanBERT$_{BASE}$ (Joshi et al., 2020) | 16G | 256 × 2.4M = 614.4M | 70.5/68.7 |
| PMI-Masking | 16G | 256 × 2.4M = 614.4M | 72.3/70.9 |
| PMI vs Random-Token Masking with 3× more data and 6× more training examples | | | |
| RoBERTa$_{BASE}$ (Liu et al., 2019) | 160G | 8K × 0.5M = 4G | 74.9/73 |
| PMI-Masking | 54G | 256 × 2.4M = 614.4M | 75.0/73.3 |

We fine-tuned these models on the RACE development set via the same fine-tuning procedure we employed for our PMI-Masking models, and evaluated the best performing model on the publicly available RACE test set. A PMI-Masking Base-sized model scored more than 2 points higher than the SpanBERTBASE trained by Random-Span Masking over the same pretraining corpus when shown the same number of examples. Remarkably, a PMI-Masking Base-sized model also scored higher than the RoBERTaBASE trained by Random-Token Masking even though RoBERTa was given access to a pretraining corpus 3 times larger and shown 6 times more training examples.

We also note that the measure of Single-Token perplexity is not indicative of downstream performance, when reported for models trained with different masking schemes. Comparing Table 4 with the downstream evaluation of the same models in Table 2, it is clear that the ability to predict single tokens from context is not correlated with performance. This reinforces our observation that by minimizing their training objective, standard MLMs, which mask tokens randomly, tend to emphasize easy tasks that do not reflect the knowledge required for downstream understanding.

TABLE 4

The Single-Token perplexity of MLMs trained for 1M steps over KIKI + BOOKCORPUS Single-Token Perplexity

| | |
|---|---|
| Random-Token Masking | 4.8 |
| Random-Span Masking | 8.2 |
| Naive-PMI-Masking | 17.8 |
| PMI-Masking | 85.6 |

Bidirectional language models hold the potential to unlock greater signal from the training data than unidirectional models (such as GPT). BERT-based MLMs are historically the first (and still the most prominent) implementation of bidirectional language models, but they come at a price. A hint of this price is the fact that "single-token perplexity", which captures the ability to predict single tokens and which has a natural probabilistic interpretation in the autoregressive unidirectional case, ceases to correlate with downstream performance across different MLMs (see Table 4). This means that the original MLM task, which is focused on single token prediction, should be reconsidered.

The results described above point to the inefficiency of random-token masking, and offer PMI-masking as an alternative with several potential advantages: (i) it is a principled approach, based on a nuanced extension of binary PMI to the n-ary case; (ii) it surpasses RoBERTa (which uses vanilla random token masking) on the challenging reading comprehension RACE dataset with 6 times less training over a corpus smaller by 3 times; (iii) it dominates the more naive, heuristic approach of random span masking at any point during pretraining, matches its end-of-training performance halfway during its own pretraining, and at the end of training improves on it by 1-2 points across a variety of downstream tasks. Perhaps due to their conceptual simplicity, unidirectional models were the first to break the 100B parameter limit with the recent GPT3. Bidirectional models will soon follow, and the disclosed embodiments can accelerate their development by offering a way to significantly lower their training costs while boosting performance.

As described in the sections above, the disclosed automated writing assistant tool can offer text suggestions to a user based on user input. In some cases, the output of the writing assistant can also be provided based on a particular location of a document where a user would like to insert text. For example, a user can identify a location in a document, provide input text, and the writing assistant will auto generate one or more text options as insertion suggestions to be located at the designated location in a document. The text options convey the meaning and/or ideas associated with the user's input text and are also developed based on the context of the text surrounding the designated location. As a result, after insertion, the inserted text blends seamlessly with the surrounding text.

More specifically, in some embodiments, a writing assistant tool in a word processing interface is configured to provide to a user suggestions for words, phrases, one or more sentences, paragraphs, etc. that could be inserted in a particular location among text. The user, for example, can provide the writing assistant tool with the desired location for text insertion and, in response, receive from the writing assistant tool text suggestions for insertion at the desired location. In some cases, the text suggestions are generated solely based on the existing text surrounding the desired location (e.g., without reliance upon additional text input from the user). In other cases, however, the writing assistant generates the text suggestion options based on free-text input from the user that indicates the desired meaning or concepts to be conveyed by the text output suggestions to be generated by the writing assistant.

FIGS. 15-19 provide an example of the text insertion feature of the writing assistant tool. As shown in FIG. 15, a user can position a cursor, writing caret, etc. at an insertion location 1510 within a document where a text insertion is desired. In some cases, the writing assistant may generate one or more text insertion options based solely on the user's identification of the insertion location 1510. In such cases, content for the text insertion options can be derived from surrounding text in the document, other text in the document, or information sources outside of the document (e.g., Internet web pages, documents, etc.).

In other cases, as shown in FIG. 16, a user may enter free text to convey information, one or more ideas, context indicators, etc. to be used by the writing assistant tool in generating the text insertion suggestions. As shown in FIG. 16, the user provides input text to the smartpaste interface 1610. The smartpaste interface may be activated by drop-down menu, hot button, pinned menu option, etc. when cursor is placed at location 1510. In other cases, the smartpaste interface may be activated by highlighting text and indicating that the text is to be used by the smartpaste feature as input text (e.g., by right-clicking and selecting a menu item), or may be activated through any other suitable user input technique. In this example, the user enters the phrase, "Baidu's Apollo platform logs 1M+autonomous miles driven" into the smartpaste interface.

In response, as shown in FIG. 17, the writing assistant tool returns one or more text output options developed based on the input text provided by the user and the context of the text surrounding the desired insertion location 1510. The text insertion suggestions generated as output of the writing assistant tool may be provided in an output window 1710. Where more than one insertion suggestion is provided, a scroll bar 1720 may be used to navigate relative to the insertion suggestions.

The writing assistant tool interface organizes and identifies the text input and insertion suggestions in the smartpaste interface to assist the user in interacting with the smartpaste feature. For example, the user's original input text can be maintained and shown to the user in highlighted region 1730. Additionally, the text of the original document impacted by the output insertion suggestions provided in output window 1710 can be designated with highlighted region 1740. Further, within output window 1710, which separates the document text from the output suggestions of the smartpaste component of the writing assistant tool, the various text output options can be separated from one another by spacing and/or may be shown over different background colors/shading, etc. As shown, insertion suggestion 1750 is shown on a shading background different from a shading background associated with insertion suggestion 1760.

Each of the text insertion suggestions is generated by the writing assistant tool such that the text insertion could be inserted in the designated location in the document while maintaining the fluency, coherency, and grammatical correctness of the surrounding text with the text insertion. The textual insertion suggestions may be separate from the surrounding text (e.g., the words, phrases, sentences, etc. of the text insertion suggestion operates as a stand-alone insertion that does not overlap with, replace, or incorporate text surrounding the designated insertion location). In other cases, however, the text insertion suggestions may implicate the text surrounding the designated insertion location. For example, as shown in FIG. 17, rather than generating text insertion suggestion 1750 as a stand-alone sentence to be inserted at location 1510 in place of text input 1730, insertion suggestion 1750 includes new text 1770, "while Baidu's Apollo platform logs 1M+autonomous miles driven," which is provided as an integrated portion of the original sentence preceding location 1510. In some cases, the text insertion suggestions may partially or fully replace existing text in the document, may be contiguous within the existing text, may include two or more new text insertions distributed among the original text, etc.

As shown in FIG. 17, new text 1770 in text insertion option 1750 may be designated differently relative to preexisting text from the document. For example, new text 1770 may be highlighted differently relative to preexisting text, may be shown in different colors, may include a different font, may be bolded, italicized, etc. to differentiate the newly proposed text from preexisting text. Such features may enable the user to more quickly identify the text insertion suggestion that best conveys an intended meaning while also evaluating the consistency of newly proposed text with surrounding preexisting text in the document.

Maintaining the user's input text in a highlighted region 1730 (or through any other suitable technique, such as a separate interface window, etc.) may assist the user in efficiently interacting with the smartpaste feature of the writing assistant tool. For example, after providing text input to the smartpaste interface 1610, and after reviewing the text insertion options generated by the writing assistant tool, the user may determine that none of the generated insertion options operates within the document as intended by the user. In such cases, the user can continue editing the text input to the smartpaste interface (e.g., the text highlighted in window 1730). The user can add words, move words, or delete words included in the input text. In response to updates to the user input text, the writing assistant tool automatically generates one or more updated text insertion suggestions and displays the updated suggestions in window 1710. The user can select from among the updated text insertion suggestions or may continue the process by continuing to revise the input text in order to generate new text insertion options.

In addition to editing the user input text in order to generate new insertion options, the user can also select one of the text insertion suggestions that most closely conveys the intended meaning with the desired level of formality, sentence complexity, tone, etc. In response, as described in the above, the writing assistant can generate one or more new text insertion options based on the user's selection. This process of refining the generated text insertion options based on user-selection of a best generated suggestion among a group of suggestions may continue until the system generates a text insertion suggestion suitable for the user.

As noted, the writing assistant tool displays an input component (user interface element) where users can write free text which indicates the meaning of the word or phrase the user is intending to add to the document. Upon adding input, the writing assistant will update the suggestions list such that the meaning of the words or phrases displayed will be semantically related to the new input text (while still satisfying the condition of preserving fluency, grammar and coherence of the surrounding text of the document together with the inserted text). Semantic relations between the input text and the output words/phrases/sentences listed in the suggestions may include or satisfy one or more of the following conditions: synonymity or near-synonymity between input text and output words/phrases/sentences;

input text that describes the output word/phrase/sentence; output word/phrases/sentences is a language translation of the input text (e.g., Chinese to English, etc.); the input text represents an example of the output word/phrases/sentences or vice versa; the input text describes a category to which aspects of the output word/phrases/sentences belong; the input text represents a specific instance represented by the output word/phrases/sentences; the input text includes multiple concepts that are all related to the output word/phrases/ sentences; or the input text includes a sentence with a mask on a specific word or section of the sentence, and the output word/phrases/sentences are statistically probable to appear in place of the mask.

Figure 18:
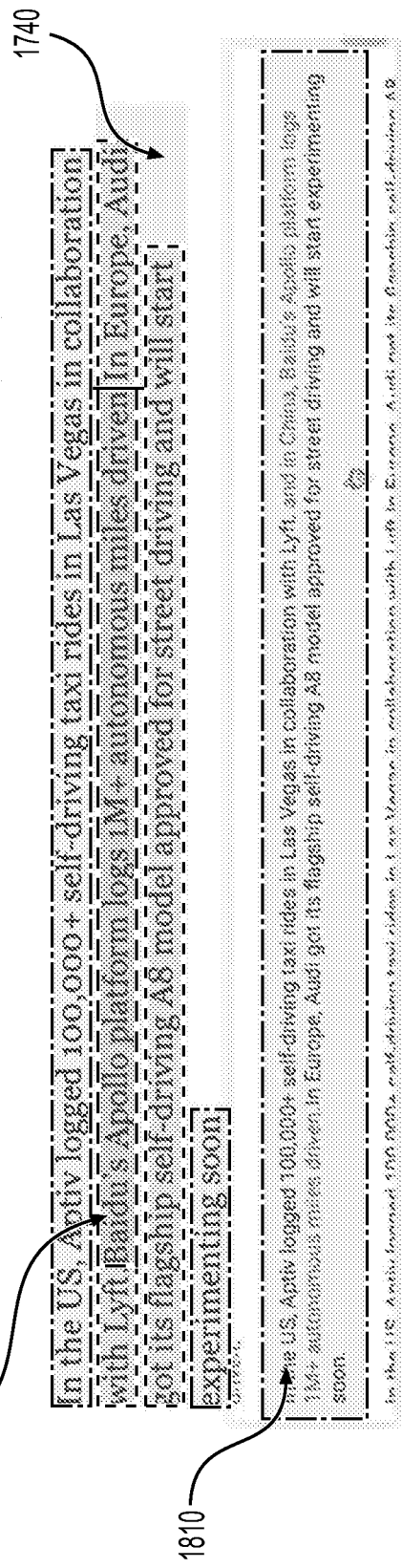

FIGS. 18 and 19 illustrate example options for selecting from among the text insertion suggestions generated by the writing assistant tool. For example, in FIG. 18, the user did not select the first text insertion selection 1750, but rather has scrolled to an alternative text insertion selection 1810. To select the text insertion selection 1810, the user can click on selection 1810, double click on selection 1810, access a drop down menu, select from among a displayed menu, click a physical or virtual hot button, etc. In response, the writing assistant can replace the preexisting text of region 1740 and the user input text shown in window 1730 with the selected text insertion suggestion 1810. Such a selection may result in a revised text passage, as shown in FIG. 19. From there, the user can continue editing the document as normal or may re-initiate the smartpaste feature of the writing assistant or may initiate any of the other features associated with the described writing assistant.

In addition to the insertion suggestion process shown by FIGS. 15-19, the text insertion feature may optionally include other functions and features. For example, in some cases, rather than providing text insertion suggestions for a location designated by the user, the writing assistant tool may be prompted (e.g., through user input received via one or more menu items, button presses/clicks, etc.) to automatically parse a document and offer suggestions for text insertion locations. In some cases, such suggestions may be made without any additional text input by the user, and the text insertion suggestions can include supplemental text derived from surrounding preexisting text in the document or from informational sources outside the document. In other cases, a user may activate the smartpaste feature and may enter input text, and in response, the writing assistant will automatically identify a recommended insertion location in the document for receiving a text option generated based on the user input. Notably, the recommended insertion location automatically generated for insertion of text generated based on the user input may correspond to a current location of cursor in the document or may be different from a current cursor location. In this way, a user can freely enter text into a smartpaste interface window, and the writing assistant will automatically generate one or more text insertion options that convey the meaning associated with the user input and that agree with and/or integrate with preexisting text surrounding a text insertion location automatically identified by the writing assistant as an appropriate location for the text insertion(s). In some cases, the writing assistant identifies more than one suggested location for a particular text insertion or for text insertions generated based on user input text. In some cases, each insertion suggestion provided by the writing assistant tool may be associated with a different recommended insertion location within the document.

In addition to activating the smartpaste feature of the writing assistant tool via a menu item, etc., this feature may also be generated through use of a wildcard symbol. For example, users can initiate the smartpaste feature described above, along with any or all described interaction capabilities, by adding a wildcard symbol to the text while writing (e.g., by typing certain characters defined as a wildcard symbol or by using a keyboard shortcut). In some cases, the entry of the wildcard symbol or keyboard shortcut may prompt the writing assistant to provide a user input window for receiving text input from the user. As or after the user enters text into the user input window, the writing assistant can respond by offering one or more text insertion suggestions for replacing the wildcard symbol or for replacing or integrating with text surrounding and including the wildcard symbol.

In other cases, the wildcard symbol (or keyboard shortcut) may be used as a placeholder for one or more words, phrases, sentences, etc. to be generated by the writing assistant based on preexisting text surrounding the wildcard symbol (or in any location in the document). For example, after entering the wildcard symbol, the writing assistant tool can generate text insertion suggestions for words/phrases/ sentences that can replace the wildcard symbol. The writing assistant tool can dynamically update one or more of the text insertion suggestions as the user continues to write and change the context of the text around the wildcard symbol. At any time, the user can also add free-text input to guide the meaning of the text insertion suggestions or the updated text insertion suggestions generated for substitution in place of the wildcard symbol.

The writing assistant tool also includes a capability to automatically identify one or more insertion locations within an electronic document for text input by a user. For example, a user may input a piece of text (e.g., via entry directly into the electronic document (in some cases along with highlighting, a wildcard symbol, a keyboard shortcut, or other identifier that the text being entered is a candidate for an automatic insertion recommendation), via an input window, etc.) or may select text from one or more electronic documents. In response, the writing assistant can identify an appropriate location in the electronic document for the user input text and can automatically insert the user input text into the identified location. The assistant will automatically identify the locations in the document where the content can appropriately be inserted such that the document after the insertion preserves its fluency and coherence.

The assistant may split the input into separate pieces of content and may insert each piece of content to different appropriate locations in the document. When inserting the content, the assistant may paraphrase the content, add connecting words, paraphrase existing sentences in the document, split existing sentences in the document and make other transformation necessary for the insertion to preserve the fluency of the document text and the meaning of the original text together with the inserted content.

Additionally, when the user provides text into a word processing interface (e.g., through highlighting, entry into a text window, etc.), the writing assistant will automatically generate one or more options for incorporating the entered text smoothly and fluently within the surrounding context such that the meaning of the entered text together with the surrounding context is preserved. This capability of the writing assistant provides users with a new opportunity for incorporating the meaning of copied text into a document rather than merely copying surface level words comprising the copied text into the document.

The different insertion suggestions generated by the writing assistant can include changes to the pasted or entered text, changes to the insertion location of the pasted/entred text within the surrounding context, changes to the surrounding context, addition of words between the pasted/entered text and the context, or all of the above. The interaction may be available to the user after each paste/entry, by pressing a small button that appears next to the pasted text, or through other user interface elements.

The user can choose among multiple incorporation suggestions displayed by the assistant, and the suggested incorporation will be realized inside the word processing interface. Several examples below are provided to illustrate a few variations of input/pasted text and surrounding context possible through use of the writing assistant tool.

The style of the pasted/entered text may be matched to the style of the existing document. For example:
  Context: Aaron S. Daggett fought in battles in the American Civil War.
  After pasting text: Aaron S. Daggett fought in battles in the American Civil War. Daggett got the Purple Heart for his courage in the battles.
  Suggested incorporation: Daggett was awarded the Purple Heart for his bravery during American Civil War battles.

When text is entered or pasted within a sentence, the sentence may be paraphrased to include the semantic meaning from both the pasted snippet and the original sentence. For example:
  Context: This track, AC electrified, is normally used by freight trains.
  After pasting text: This track, AC electrified, no normal passenger use is normally used by freight trains.
  Suggested incorporation: This track, which is AC electrified, is normally used by freight trains and thus has no normal passenger use.

When text is entered or pasted before, after, or between sentences, the pasted text may be fused together with the previous or next sentence to create a new single sentence out of the two sentences. For example:
  Context: This is the band's best selling album, with more than 600.000 copies sold in Japan.
  After pasting text: This is the band's best selling album, with more than 600.000 copies sold in Japan. huge success in Japan, reaching number three in the national charts.
  Suggested incorporation: This is the band's best selling album, reaching number three in the national charts in Japan with more than 600.00 copies sold.

The text of entered/pasted text or the text before or after entered/pasted text may be paraphrased to convert names already mentioned into pronouns to avoid repetition of names. For example:
  Context: Meriwether Lewis convinced Congress to raise money for the expedition.
  After pasting text: Meriwether Lewis convinced Congress to raise money for the expedition. President Jefferson worked together with Meriwether Lewis.
  Suggested incorporation: He and President Jefferson worked together.

The pasted/entered text may be paraphrased and/or connecting words may be added to pasted/entered text between sentences according to the meaning of the two sentences (e.g.: and, but, therefore, despite, etc.). For example:
  Context: Jessica Lewis is justly famous for her protest against the city of San Diego.
  After pasting text: Jessica Lewis is justly famous for her protest against the city of San Diego. Few people know of this activist's contributions to natural science.
  Suggested incorporation: However, not many people know of this activist's contributions to natural science.

Entered/pasted text may be translated to match the language of the pasted/entered text with the language used in the surrounding context, or vice versa. For example:
  Context: In Spain, going back to normal is slow and careful. In Spain, going back to normal is slow and careful.
  After pasting text: In Spain, going back to normal is slow and careful. In Spain, going back to normal is slow and careful. ha dado paso este martes a restricciones de movimientos en los lugares más afectados por los rebrotes de la Covid-19.
  Suggested incorporation: Movement restrictions have been ordered on Tuesday in the places most affected by the outbreaks of Covid-19.

One or more features of the writing assistant tool, as described in the present disclosure, may be automatically initiated based on detected comments in a document. For example, in some cases, upon detecting a document reviewer comment or in response to a user identifying a document reviewer comment in an electronic document, the writing assistant tool may automatically generate one or more text options for resolving issues implicated by the document reviewer comment(s) (among other writing assistant tool features).

A writing assistant in a word processing interface may allow a user to initiate writing assistance features based on comments humans added to a document. Based on the textual content of the comment and on the text in the document to which the comment relates, the writing assistant tool can display a button (or other UI element) on or associated with the comment that suggests initiating an appropriate assistance feature that can help the user resolve the comment. If the user chooses to initiate the feature by clicking the button, the feature's parameters and inputs will automatically be configured according to the content of the comment and the span of text to which the comment relates.

The examples described below are just a few examples of the automatic comment issue resolution feature of embodiments of the writing assistant tool. In some cases, comments suggesting a stylistic change to a span of text can trigger a suggestion to use the span paraphrasing feature of the writing assistant tool relative to the span of text identified by a comment or otherwise implicated by the comment even if the comment does not specifically identify all of the text implicated by the comment. The writing assistant tool can automatically generate one or more text options in compliance with detected suggestions associated with one or more comments. In one example, the style associated with the generated one or more text options may be determined based on the content of a reviewer comment. For example, a comment such as 'this sentence sounds too casual' can trigger a suggestion to use the span paraphrasing feature with the style control set to enhance formality. Or, a comment such as 'this is too wordy' can trigger a span paraphrasing feature with style control set to making the span more concise.

Comments suggesting to use a different word can trigger a suggestion to use the word paraphrasing feature on the corresponding word to generate one or more suggested replacements (each including one or more words).

Comments suggesting adding certain content can trigger a suggestion to use the content insertion feature with the input text from the comment, such that the one or more text options generated by the writing assistant tool may incorporate the comment input text in a manner that the one or more text options agree with both the text input meaning and the meaning, grammar, and fluency of the surrounding context.

Comments suggesting to add content based on a suggested correction or change needed may trigger a suggestion to use the guided generation feature in an appropriate location to generate one or more text output options that satisfy the suggestion. For example, a comment such as 'you need to explain what this means,' 'please clarify,' 'expand,' etc. can trigger a suggestion to initiate the guided generation feature to generate one or more text output options that expand on or clarify the meaning of text implicated by the comment.

Additionally, the writing assistant may allow users to add triggers for initiation of assistance features ex-ante. For example, a document reviewer that reviews a document written by a user will be able to select a text span and add a comment that includes a suggestion to use any of the features offered by the writing assistant. For example, the document reviewer may highlight a certain span of text relative to the comment and include a designation in the comment (e.g., using a menu associated with the writing assistant tool) to use the span paraphrasing feature of the writing assistant tool to make the span of text more concise. The user will then see the reviewer's comment, and the writing assistant can present to the user a button (or other UI element) that when activated initiates the writing assistant feature specified by the reviewer. In some cases, the writing assistant may also provide to the user one or more UI elements (e.g., a style knob for formality, a style knob for conciseness, etc.) to enable the user to select a style parameter value to be used in generation of one or more text output options in satisfaction of the reviewer's comments. The style knobs or other UI elements presented to the user may be selected by the writing assistant tool for display based on the content of the reviewer's comment. For example, a request to make a passage more concise may trigger display to the user of a style knob controlling the length of the one or more generated text output options provided by the writing assistant tool.

Figure 20:
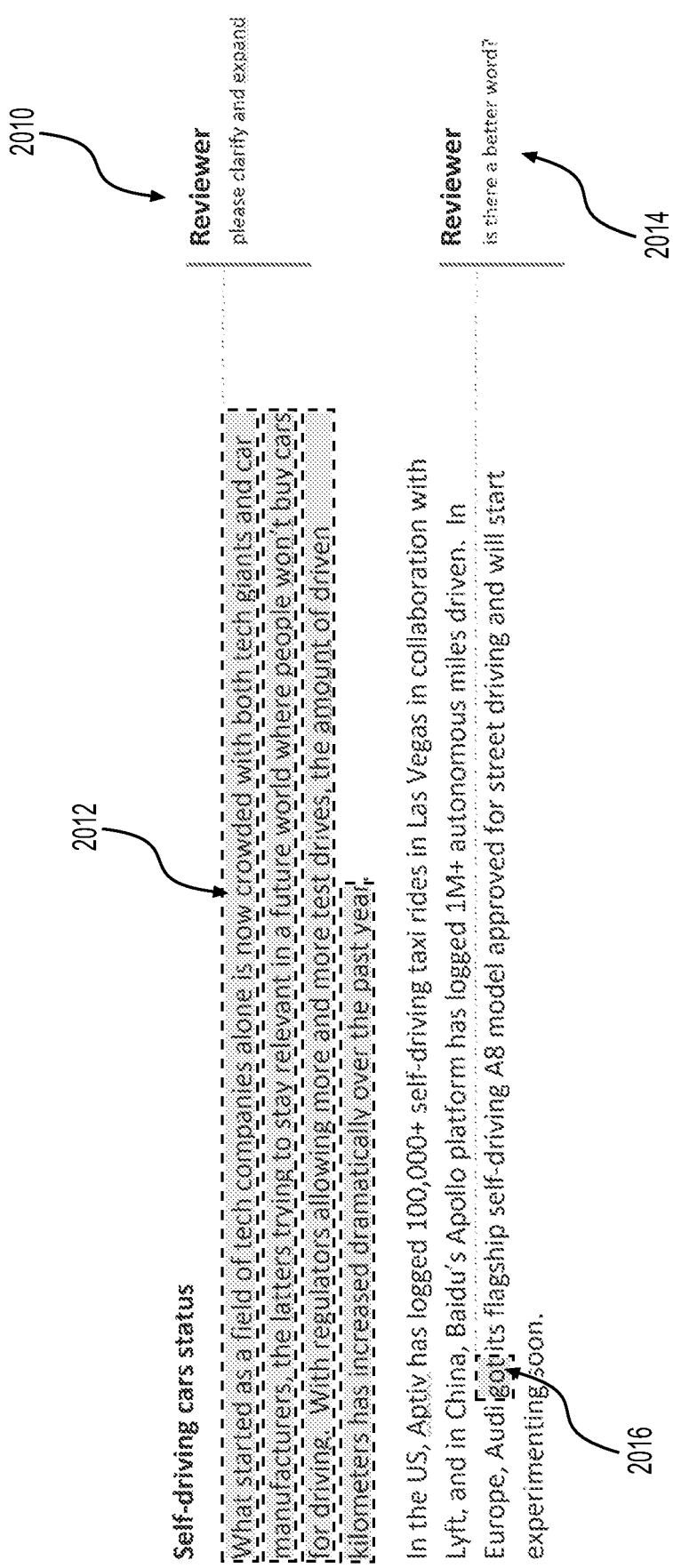

FIGS. 19-23 provide illustrations associated with a representative example of the comment auto-resolution feature of the disclosed writing assistant tool. For example, FIG. 19 shows a segment of an electronic document that a reviewer may see upon reviewing a document. As part of the review of the document, the reviewer may enter comments, such as comments 2010 and 2014, as shown in FIG. 20. Comment 2010 makes a request to 'please clarify and expand' relative to highlighted text 2012, and comment 2014 asks 'is there a better word' relative to highlighted text 2016.

Figure 21:
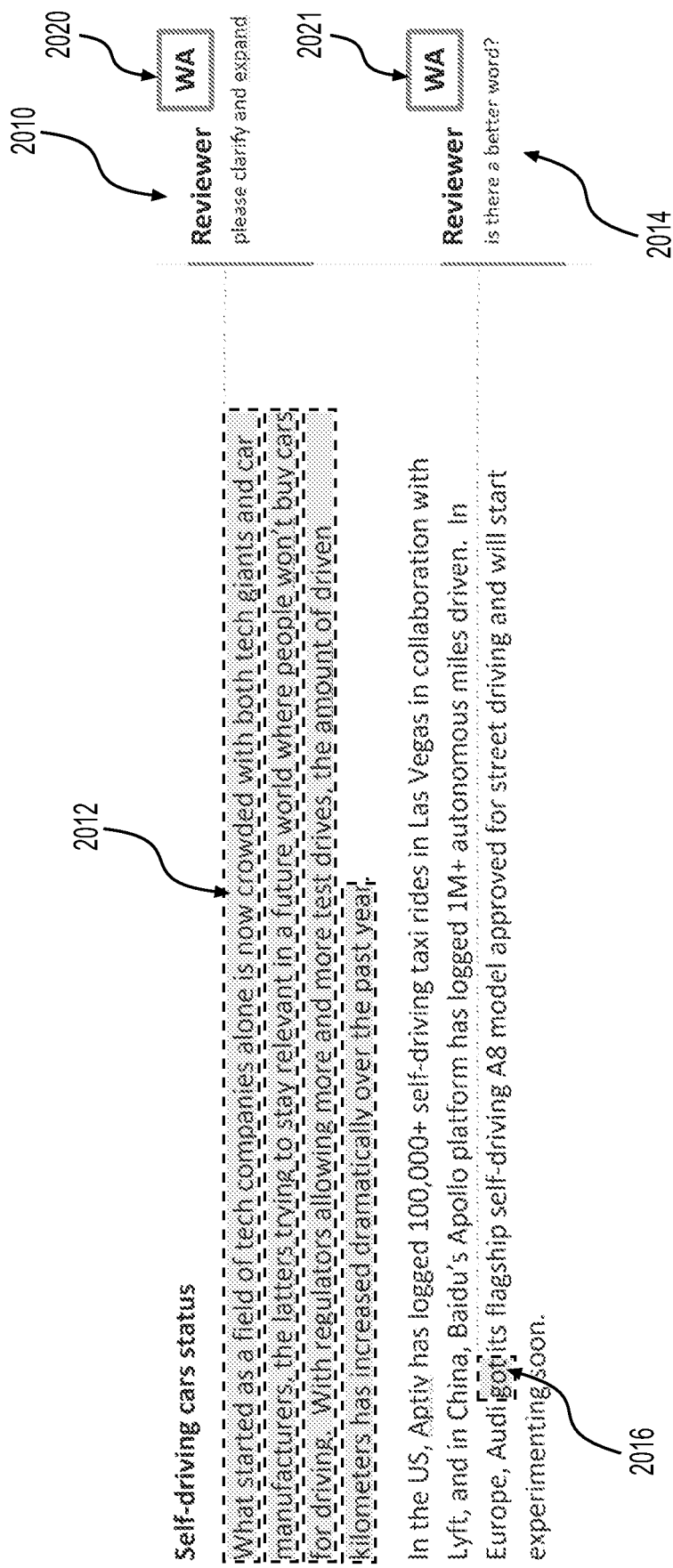

In response to the reviewer comments stored in the electronic document, the writing assistant tool can present to the user (e.g., an author of the document responsible for implementing edits recommended by the reviewer) interface elements 2020 and 2021, as shown in FIG. 21. Activating either of the interface elements 2020 or 2021 (e.g., by clicking on an area of a display screen associated with the interface elements) can initiate the comment auto-resolution feature of the writing assistant tool. For example, clicking on interface element 2020 may prompt the writing assistant tool to generate one or more text output options in accordance with the reviewer's comment. In this case, the one or more text output options should both clarify the meaning of the test implicated by comment 2010 and add to or expand upon that text.

Figure 22:
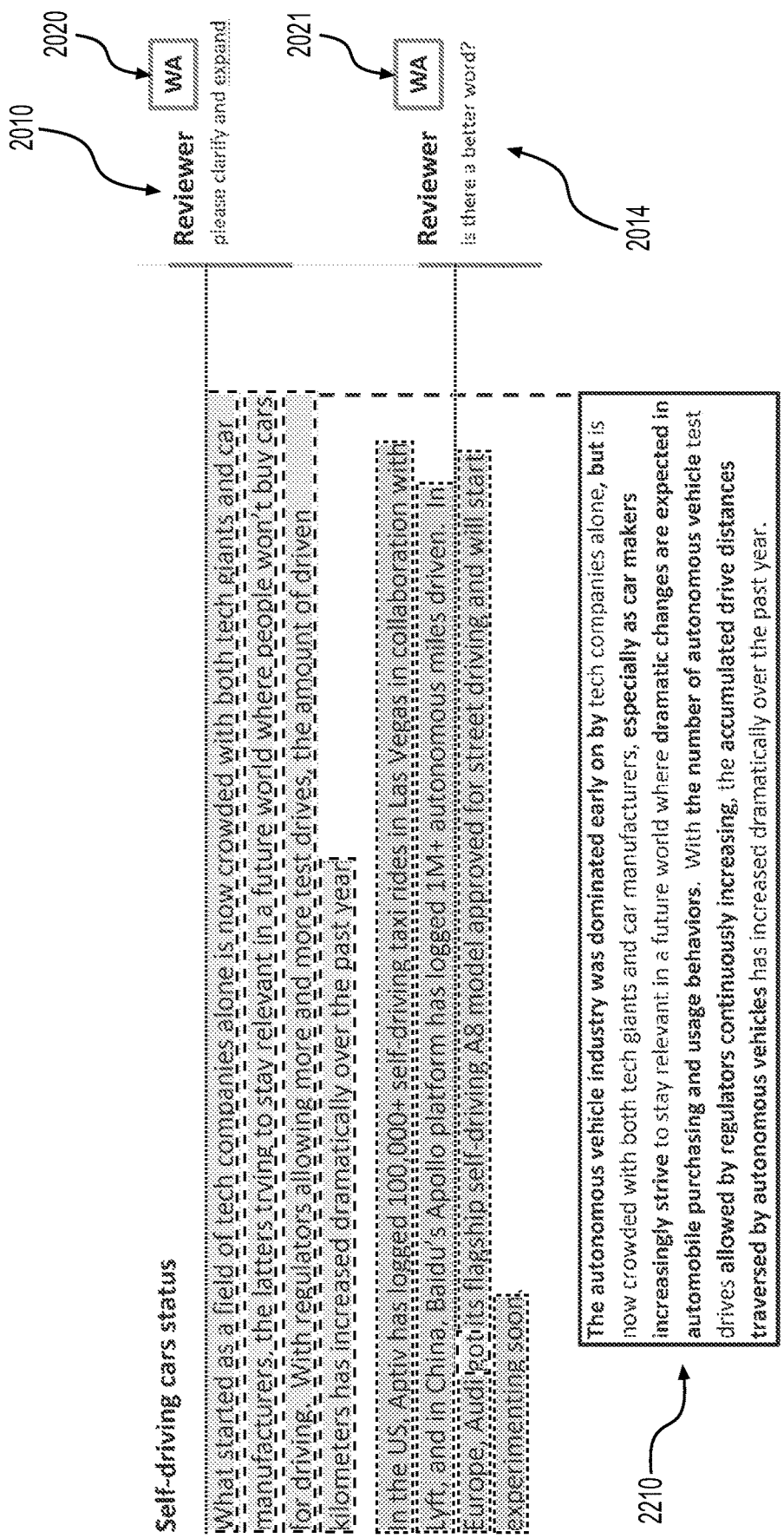

An example of a text output option that the writing assistant may generate in response to comment 2010 (and activation of the writing assistant tool using interface element 2020) is shown in FIG. 22. Specifically, text output option 2210 is referenced to the text implicated by comment 2010. In one example, preexisting text may be shown in non-bold text, and suggested text additions may be shown in bold. In some cases, text deletions may also be designated (e.g., using strikethrough notation). If more than one text output option is generated, the user can scroll through the options and select the text output option that best replaces the text implicated by comment 2010. Or, as described above, one of the text output options may be selected by the user, and the writing assistant can generate one or more refined text output options based on the selection. As shown, text output option 2210 includes revisions that both clarify and expand on aspects of the text implicated by comment 2010.

Figure 23:
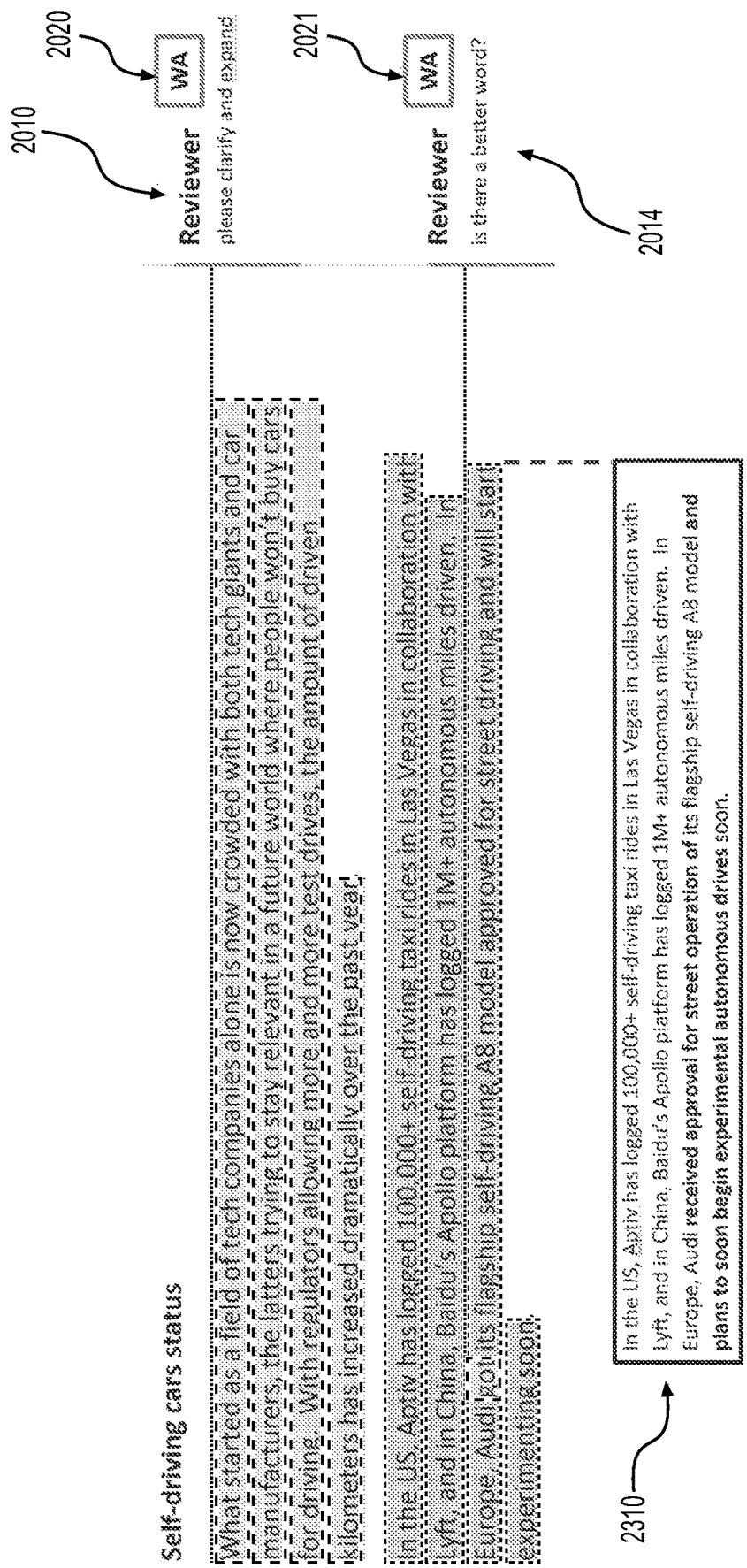

FIG. 23 provides an example of a text output option that the writing assistant may generate in response to comment 2014 (and activation of the writing assistant tool through activation of interface element 2021). Text output option 2310 is referenced to the text implicated by comment 2014. As shown, text output option 2310 includes revisions that replace the word 'got' with 'received' and also includes other suggested clarifying revisions to the text implicated by comment 2014.

In some embodiments, the disclosed writing assistant tool may include a capability that helps a user determine whether a text input or a text identified by a user is properly written and context-fitting. The functionality may include acquiring and displaying to the user examples of text passages in which the input or identified text is used in similar contexts. For example, a writing assistant in a word processing interface may allow the user to select a span of text that one or more words (e.g., several words—the 'phrase') within a sentence. In response, the writing assistant tool can automatically acquire and display to the user a list of example sentences (or phrases) sourced from a remote source (e.g., the Internet) that contain the phrase or a similar version of the phrase identified by the user and where the phrase is used in a syntactically and semantically similar manner as the text identified by the user. The example sentences or phrases may also be similar in structure and/or in meaning to a sentence in which the phrase identified by the user is contained.

The list of acquired example sentences/phrases may be organized and shown to the user in any suitable manner. In some cases, the example sentences/phrases may be organized according to a trustworthiness rating associated with the source from where each sentence/phrase was acquired or based on which each sentence/phrase was derived. For example, certain language authorities, such as the Oxford English Dictionary, peer-reviewed journals, etc., may have a higher trustworthiness rating than other sources, such as magazine or newspaper articles, which, in turn, may have a higher trustworthiness rating than sources such as personal blogs, social media entries, etc.

In other cases, the acquired example sentences/phrases may be ranked according to the syntactic and/or semantic similarity between a phrase identified by the user in the original sentence and the same or similar phrase in the example sentences/phrases. In other cases, the acquired example sentences/phrases may be ranked according to their syntactic and/or semantic similarity to a sentence identified by the user. In either case, the example sentences/phrases may be displayed to the user based on these similarity rankings.

Other information may also be provided to the user. For example, in some cases, a total number of acquired or available sentence/phrase examples automatically identified by the writing assistant tool may be provided to the user, even if not all of the acquired or available sentence/phrase examples are displayed to the user. In some cases, the sentence/phrase examples may be made available to the user in a navigable page format. For example, a user may scroll through a first page listing sentence/phrase examples. If the user wishes to review additional examples, the user can click on a page selector interface element (e.g., a "next page" or "#" icon) linked to another page of acquired sentence/phrase examples. Sentence/phrase examples determined to have higher similarity or relevance to the user-identified text may be provided on lower numbered pages than examples having a lower similarity or relevance to the user-identified text.

In some cases, the user may also be provided with an identification of the source from which each example sentence/phrase was acquired or derived. Further, in some cases, hyperlinks to each source may also be provided to the user so that the user may quickly navigate to the external source, for example, to review additional text that may further inform the meaning, context, usage, etc. of an example sentence/phrase.

Like other functionality associated with the disclosed writing assistant tool, a user can cause an update to the list of sentence/phrase examples acquired by the writing assistant tool. For example, the user may identify a short phrase within a particular text passage of an electronic document, and in response, as described, the writing assistant tool will acquire one or more sentence/phrase examples highlighting similar usages of the identified short phrase. In some cases, however, the acquired example sentence/phrase list may not be sufficient for the user to confirm a particular usage of the short phrase. To generate an updated or refined list of sentence/phrase examples, the user may revise the selection to include a longer portion of the particular text passage. In response, the writing assistant tool will regenerate the list of sentence/phrase examples based on the same or different examples acquired from one or more external sources.

The user may also cause the writing assistant tool to generate an updated or refined list of sentence/phrase examples by revising the text passage from which the user-identified phrase is drawn. The revised text may be added to or subtracted from the original text passage at a location outside of the user-identified phrase or, alternatively, within or partially within the user-identified phrase. In other words, any textual modifications the user makes to a text passage included in an electronic document may further inform the meaning, context, etc. of words or phrases included within the text passage or withing the electronic document more generally. Thus, after such modifications to a text passage in an electronic document, the writing assistant tool can automatically generate an updated or refined list of sentence/phrase examples even without the user changing or re-identifying a particular word/phrase for which usage examples are desired.

Additionally, users can iteratively modify the phrase that will be used to find example sentences/phrases by unselecting words in the phrase, including words in the middle of the phrase. In such a case, the writing assistant will search for, identify, and acquire examples that include the phrase selections even if they are not contiguous in the highlighted text.

FIG. 24 provides an example of the text usage validation functionality of the writing assistant tool according to exemplary disclosed embodiments. For example, an electronic document may include a text passage 2402. Within text passage 2402, a user may wish to validate the usage of a particular word or phrase (contiguous or non-contiguous within text passage 2402). In this example, the user highlights phrase 2410, which includes the word "logged." Highlighting this word, in combination with activation of the text validation function of the writing assistant tool (e.g., using a user interface element, menu entry, keyboard shortcut, etc.) causes the writing assistant tool to access one or more databases (e.g., accessible via the Internet, an organizational knowledge base, or any other network) to identify and acquire text usage examples that include sentences or phrases that include the same or similar word or phrase as included in highlighted phrase 2410, especially where the example sentences/phrases use the highlighted phrase in a manner similar to text passage 2402. The acquired sentence/phrases may be presented to the user in a text window 2412. As shown in the example of FIG. 24, two example sentences have been acquired and displayed in response to the user highlighting the term "logged" in text passage 2402. The first example, 2412, includes the word "log" used in a similar context as in text passage 2402. The second acquired example, 2416, includes the word "logged" used in a context similar to text passage 2402.

The acquired sentence examples 2414 and 2416 may be displayed in order of similarity or relevance to the highlighted phase 2410, as used in text passage 2402. The order may also indicate a level of trustworthiness of each source. For each acquired example, a source of the example sentence/phrase may be identified (e.g., Webster's New World Dictionary and Bicycling Magazine). The source identifiers may be hyperlinked so that a user can quickly and efficiently navigate to the source where the example was acquired.

Embodiments of the disclosed writing assistant tool may also be configured to automatically re-purpose electronic documents. Such re-purposing may include revising one or more formatting, stylistic, grammatical, tone, length characteristics, etc., of an existing electronic document drafted for one platform or audience to adhere to standards associated with another platform or audience. For example, a document drafted as a magazine article may be automatically revised by the writing assistant for re-purposing as one or more blog entries, one or more tweets, one or more email communications, etc.

In operation, the writing assistant tool can allow the user to select text (e.g., from an existing document) and select a target style/format (e.g., by selecting from a preset list of styles/formats). Based on the selections, the writing assistant tool will automatically generate a new version of the selected text in accordance with the selected target style/format. In some cases, the conversion to the new style/format may include a down-conversion of the original document. For example, conversion of an article to one or more blog entries or tweets may include automatic summarizing and/or paraphrasing of the original text to shorten the original text, while preserving key meanings and messages. Other automatic revisions may include reducing a level of formality or complexity of the original text; omitting secondary or less important points or information; replacing one or more words with simpler words conveying the same or similar meaning; etc.

In other cases, the conversion to the new style/format may include an up-conversion of the original document or documents. For example, text from one or more blog entries may be automatically assembled together to produce a longer, more formal article. Such an up-conversion may include more operations than simply stitching the selected portions of original text into a single document. Rather, based on the training and capabilities described above, the writing assistant tool can: organize the selected portions of original text into a logical order; revise any or all of the original text segments; supplement any or all of the original text segments with additional words or text; develop one or more linking phrases, transitional phrases, clauses, or sentences; change one or more words associated with the original text segments; or any combination of these operations. In this way, the writing assistant tool can automatically generate logical organizations of selected text segments that flow together in a coherent and fluent manner from the perspective of the reader.

Various techniques may be used for identifying source text segments for use by the writing assistant tool in generating text output re-purposing the identified text segments within a new document. For example, documents including source text segments may be selected from an interface window that lists files in a directory. Files shown in a directory may be dragged and dropped into a project window in order to identify to the writing assistant documents for re-purposing. In addition to loading full documents, one or more text segments within any number of electronic documents may be identified to the writing assistant tool for re-purposing. For example, a user may cut and paste text segments from one or more existing electronic documents into a new document or a project window, etc. Alternatively or additionally, text segments from various different documents may be selected (e.g., by highlighting the text segments, surrounding the text segments with a selection box, double clicking on sentences or paragraphs, etc.), and the selected text segments may be used by the writing assistant tool to generate a text output constituting re-purposed versions of the selected text segments.

The writing assistant tool can generate output text within any of the documents in which an identified text segment appears (e.g., at the beginning or end of the document). Alternatively, the writing assistant tool can create a new document to receive the generated text output.

Similarly, various techniques may be used for indicating to the writing assistant tool a desired style, format, etc. to apply to the generated output text. In some cases, the writing assistant tool may include one or more drop down menus listing various stylistic and/or formatting options for use in generating the re-purposed output text. Such options may include, for example, an indicator of a type of document the user wishes to generate (e.g., a Tweet, blog, informal article, professional article, email communication, social media entry, etc.). The menu items may also enable the user to control various stylistic characteristics of the output text. For example, the menu items may enable the user to select a level of formality (e.g., with a slider bar, etc.), a word complexity level, an average sentence length, a document length, an average paragraph length, a reading level of the intended audience, etc. In some cases, the user may also select a language for the text output. That is, even where the source text segments are in English, any other supported language, or a combination of English and any other supported language, the user can select a language for use in generating the output text (e.g., English, Chinese, Japanese, Italian, German, etc.).

Additionally or alternatively, the writing assistant tool may include a selection of templates for various document types (e.g., article, blog, email, tweet, etc.) that a user can select and that include predefined values for various stylistic parameters (e.g., level of formality, document length, sentence length, among others). The menu options provided by the writing assistant tool may be accessed through a fixed menu of icons provided in a user interface window (e.g., a toolbar) or may be accessed by right-clicking within a document or by hovering over portions of the document (e.g., a text output window). Such menu items and options may also be accessed using keyboard shortcuts or any other suitable input technique.

In some cases, the writing assistant tool can automatically identify an appropriate template and stylistic parameter values, etc., to use in generating the text output based on one or more documents identified to the writing assistant tool by a user. For example, if the user wishes to generate a blog article based on several sections of text included in various source documents, the user may input to the writing assistant tool one or more blog article examples for the writing assistant to use as models for generating the text of the desired blog article. The writing assistant tool can analyze the one or more example documents input by the user and develop a template/stylistic parameter values that mimic one or more of the example documents or average characteristics of the example documents (e.g., average overall length, average sentence length, average formality level, average audience reading level, paragraph length, overall document structure, etc.).

Any suitable technique can be used for identifying/inputting the example documents to the writing assistant tool. For example, one or more example documents may be loaded, dragged and dropped, etc. to a project window of the writing assistant tool (e.g., document style paint window of the writing assistant tool). The example document(s) may be selected from a directory window, or text from all or part of the example document may be copy and pasted into, e.g., a project window/document editor associated with the writing assistant tool.

FIG. 25 provides a high-level conceptual representation of the document merging and re-purposing functionality of the writing assistant tool according to exemplary disclosed embodiments. Through any of the techniques described above, a user may identify source documents for re-purposing as a newly generated document. In this example, a user has identified four documents to the writing assistant tool: Tweet1.doc (2510), Tweet2.doc (2512), Tweet3.doc (2514), and Blog1.doc (2516). Using the selected documents, the writing assistant tool analyzes the text segments included in each of the documents; determines facts, meanings, and contexts associated with the text segments; determines a logical organization for conveyance of some or all of the facts, meanings, and contexts of the text segments; and generates a re-purposed output text in document 2518. As described above, the writing assistant tool can generate the text in document 2518 based on templates, stylistic characteristic values, example documents, etc. selected by a user (e.g., using menu options, style paint functionality, keyboard shortcuts, etc.). Notably, the text generated in document 2518 preserves the meaning and context of the selected text segments, while introducing new words and omitting or changing other words. The generated text also includes linking phrases to provide fluency for the passage.

The re-purposing functionality of the writing assistant tool can operate in conjunction with any other disclosed feature or capability of the writing assistant tool. For example, in some cases, the re-purposing feature may also offer a smartpaste feature through which a user can have the writing assistant tool generate new text output suggestions for insertion at various locations of the generated, re-purposed text output. Users may also supplement, revise, or edit the generated text output using any of the features described herein after the output text has been generated. In some embodiments, the writing assistant tool may maintain a link to text segments identified by a user as input to the text re-purposing component of the writing assistant tool. In such cases, after generation of re-purposed text, a user may edit one or more of the linked, input text segments and, in response, the writing assistant tool can automatically generate an updated version of the text output generated by the re-purposing component.

In addition to the pre-defined templates described above, the writing assistant tool may also develop personalized templates based on interactions with a user and learned characteristics of the user. For example, the writing assistant tool, through interactions with a user, may offer suggestions for the generation of certain types of templates. For example, if the user interacts regularly with the writing assistant tool to develop certain types of documents (e.g., email correspondence, marketing materials, information notices, technical support correspondence, news articles, etc.) the writing assistant may prompt the user to create a template associated with one or more types of documents. As part of the template generation process, the writing assistant tool can identify certain document components commonly included by the user in regularly generated documents (e.g., salutation, information fields, executive summaries, etc.) and can automatically generate template fields to correspond with commonly encountered document components.

In some cases, the generated templates may include text with blank fields that the user can fill in. The templates may automatically be personalized such that the text (both the text surrounding the blank fields and text generated based on user input provided in the template fields) can be generated by the writing assistant tool to emulate a particular user's writing style or a writing style adopted by the user's organization.

The text can also be generated such that it fits a context of a particular type of communication. For example, a user can initiate an interaction with the writing assistant tool to write an introduction email. The user will specify that the function/intent of the email is an introduction, and the writing assistant tool will automatically generate a unique template for an introduction, written in a style that sounds like the user's writing, and in a level of formality that fits the level of familiarity between the user and the addressee (determined, e.g., based on metadata). The user will then be able to fill in the blank fields of the introduction template generated by the writing assistant tool, such as the name of the introduced person and the role, qualifications, etc. of the introduced person.

The section above describes the ability of the writing assistant tool to re-purpose text segments identified from within a single text file or identified across multiple text files. The re-purposed text can be generated in accordance with a document type specifier and one or more style indicators input by a user.

More broadly, the writing assistant tool can be used to quickly and efficiently assemble and integrate text from one or more source files. After assembly and initial text integration of text extracted from the source files, any of the features of the writing assistant tool disclosed herein can then be used to assist the user in revising the integrated text.

For example, a user may identify two or more source files including text to be used in generating an integrated output text. As described above, the source files may be identified in any suitable manner. Source file names can be identified (e.g., by clicking) on file names or icons in a directory display list. Source file names or icons can be dragged and dropped into a project window associated with the writing assistant tool, files can be copy and pasted into a project window, etc.

The writing assistant tool may then begin integrating text from the identified source files. For example, the writing assistant tool analyzes text from the identified source files and identifies concepts conveyed by the text from each of the plurality of different source files. The writing assistant tool can then determine a logical order to be used in the output, integrated text. The logical order may include grouping of text referencing or describing similar subject matter, ordering of text chronologically, order of text based on logical building blocks of information, etc. Next, the integrated output text can be generated. As described herein, the output text is generally not simply an amalgamation of text from various sources, but rather the writing assistant tool can convey the concepts associated with the source text while including one or more text elements not included in the text of source files. The text elements may represent various types of changes that the writing assistant tool can generate relative to the source text. For example, words from the source text may be changed, words not appearing in the source text may be added, etc. Additionally, the writing assistant tool can add phrases, transitional phrases, linking phrases, etc. to integrate the source text into fluent text that flows together in a logical order.

The writing assistant tool can generate the integrated text in accordance with one or more style indicators, which can be specified by the user or which may be automatically derived based on analysis of text included in any of the source documents or based on text in any example document identified by the user. The one or more style indicators may include one or more of a document length, and average sentence length, an average paragraph length, a level of formality, a reading level of an intended audience, a language selection, or any other suitable style parameter.

Once the writing assistant tool has generated the integrated output text based on the loaded source files, any of the disclosed features of the writing assistant tool can be used to further revise and refine the generated output text. In one example, among many, the user can identify a location in the generated output text (e.g., a cursor location between words or sentences, a highlighted text passage in the output text, etc.) where the user would like to make a revision. In some cases, the writing assistant tool can generate one or more revision options for consideration by the user based solely on an identification by the user of a desired location for a revision. For example, an identified location between two sentences may prompt the writing assistant tool to generate one or more revision options that include combining the two sentences into a single sentence (e.g., using transitional phrases, clauses, introduced punctuation, etc.). In other cases, the writing assistant tool can receive text input from the user that can be used in guiding the suggested revision options automatically generated by the writing assistant tool.

Based on the context associated with the integrated output text generated by the writing assistant tool and further based on a meaning associated with the text input from the user, the writing assistant tool can generate one or more revision options. These options can be shown to the user via a display, and the user can select a text revision option from among the one or more text revision options generated by the writing assistant tool. In response, the writing assistant tool can generate an updated output text by causing the selected text revision option to be included in the generated output text at a location that includes the identified location.

The disclosed writing assistant tools can be associated with or may include various types of user interfaces to facilitate user interaction with the writing assistant tool. For example, the writing interface tool may include a variety of interactive virtual buttons, text entry and display windows, text entry fields, etc. that a user may engage with in order to take advantage of any of the described features or functionality of the writing assistant tool. In some cases, the writing assistant tool, including associated user interfaces, may be incorporated into a stand-alone text editor application. In other cases, the writing assistant tool may be integrated with a commercially available text editor (e.g., as a plug-in), third party text editors, an online text editor, mobile apps, social media applications, email editors, etc. Further the writing assistant tool, including associated user interfaces, may operate on various types of computing devices, such as desktops, laptops, tablets, mobile devices, among others.

Regardless of the operating platform, and in addition to any of the features described herein, the disclosed writing assistant tool can assist a user in generating various pieces of text, including words, phrases, sentences, paragraphs, or entire documents. The writing assistant tool can also assist users in re-writing text generated by the user or text generated by the writing assistant tool. That is, a user can identify any piece of text within a document and request that the writing assistant tool generate one or more re-write suggestions for the identified text. In response, the writing assistant tool may generate one or more pieces of text (e.g., words, phrases, sentences, paragraphs, etc.) that: convey the same or similar meaning as the original text, are fluent and grammatically correct, improve one or more aspects of the identified text (e.g., fluency, readability, vocabulary, clarity, conciseness, etc.), and/or fit naturally and seamlessly within the context of surrounding text in the document.

As described above, users can view the generated re-write suggestions, copy them (and paste them), select a suggestion as guidance for the writing assistant tool to develop refined re-write suggestions, and/or select a suggestion for insertion into the text of a document. In one example, a user can request (e.g., through highlighting text in a document) that the writing assistant tool provide re-write suggestions for the sentence, "That was the scariest thing I've ever done." In response, the writing assistant tool may generate re-write suggestions such as:

"I've never done anything more scary."
"My scariest experience was doing that."
"That was the scariest thing I have done in my life." or
"That was the scariest thing I have ever done."

Figure 26:
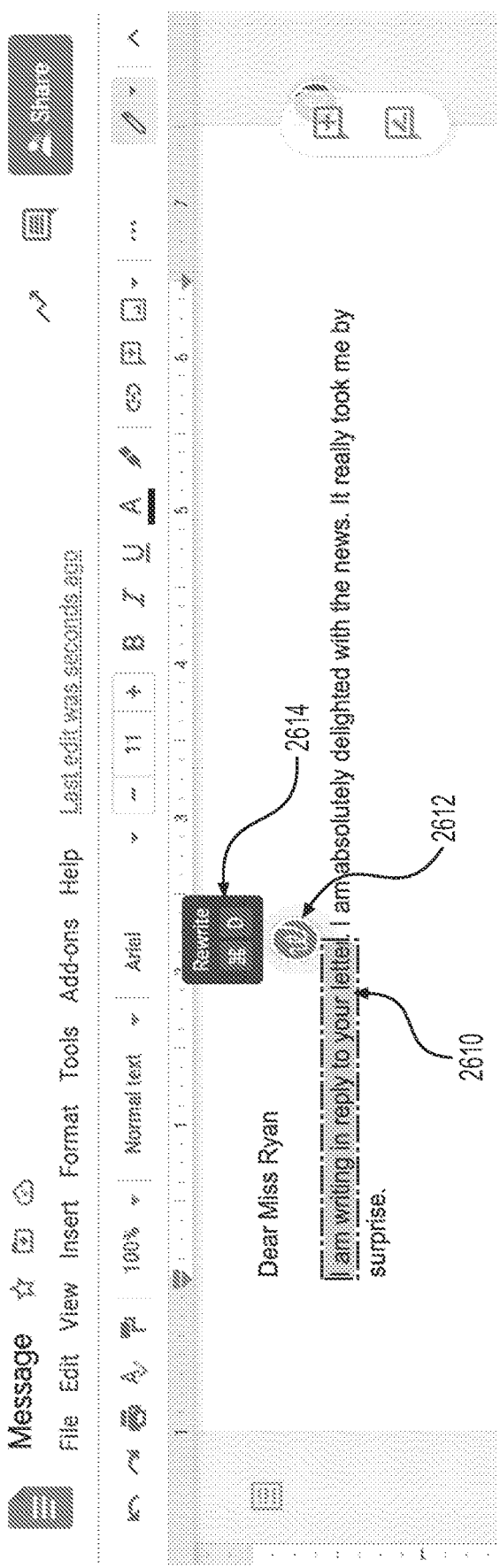

FIG. 26 provides a representation of one example of a user interface associated with the writing assistant tool and illustrates one technique for interacting with the writing assistant tool. For example, in order to initiate the writing assistant tool in a text editor, a user can highlight a word, phrase, sentence, etc. to identify the text for which the user would like to view re-write suggestions. In FIG. 26, the user has highlighted sentence 2610, "I am writing in reply to your letter." Next, the user can right click the text and select a writing assistant menu item (e.g., from a drop down menu), click a virtual activate button within the text edit window, click a menu item on a toolbar, press a shortcut key on a keyboard (or any other suitable activation technique) to activate the writing assistant functionality. In the example, of FIG. 26, highlighting sentence 2610 may prompt the writing assistant tool to display a virtual button 2612. The user can click on button 2612 to activate the functionality of the writing assistant tool. Additionally, in some cases, highlighting sentence 2610 may cause the interface of the writing assistant tool to display a window 2614, which may include additional activation options, etc. In some instances, window 2614 may include one or more identifiers of keyboard shortcuts to activate the writing assistant tool (e.g., CTRL+key; ALT+key; fn key idntifier; ⌘+key; etc.) In this case, clicking on button 2612 or a entering a keyboard shortcut, such as ⌘+D, as indicated in window 2614, may cause the writing assistant tool to show on the display a writing assistant menu 2710 (FIG. 27), which may include one or more virtual buttons, menu icons, etc. associated with various features of the writing assistant tool.

Figure 27:
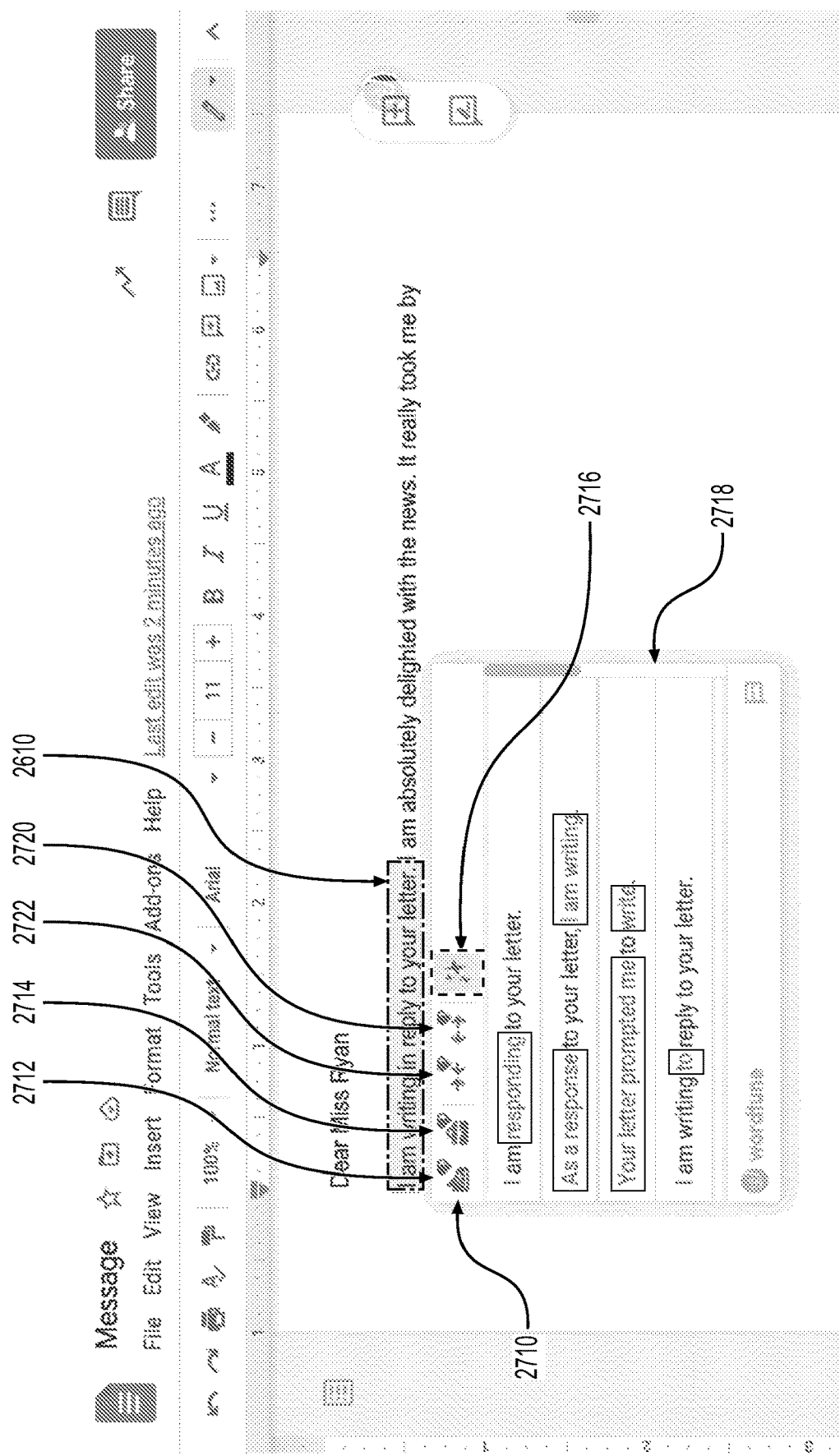

In some cases, as shown in FIG. 27, the writing assistant menu 2710 may show buttons/icons associated with the re-write functionality and may also include other types of virtual control buttons (e.g., formality level controls, such as a "casual tone" button 2712 or a "formal tone" button 2714; text output length controls, such as a "long" button 2720 or a "short" button 2722; buttons for navigating through text output suggestions; buttons for requesting generation of refined, updated re-write suggestions; buttons for selecting a text suggestion for replacement of the highlighted text; etc.). While menu 2710 is shown as including virtual buttons, any other suitable controls may be included, such as slider bars, radio buttons, etc. for controlling parameters such as text output length, level of formality, conciseness, etc.

In response to selection of text and activation of the writing assistant tool, the tool can generate one or more text output suggestions (re-write suggestions in this example). For example, as shown in FIG. 27, four different re-write suggestions 2718 have been generated by the writing assistant tool as potential re-writes of the highlighted text 2610. If the user is satisfied with any of the generated re-write suggestions, the user can select a re-write suggestion from the list (e.g., by clicking or double clicking on the suggestion), and the writing assistant tool will automatically replace text 2610 with the selected re-write suggestion. On the other hand, in some cases, if the user would like to see additional re-rewrite suggestions, the user can click on re-write suggestion button 2716. In response, the writing assistant tool will generate a new list of re-write suggestions different from previously generated suggestions. In some cases, the user may highlight/select one of the re-write suggestions from the list and click re-write button 2716 to generate a new list of refined re-write suggestions using the selected re-write suggestion as the basis for the refined list. The user may also select more than one of the re-write suggestions from the list and click the re-write button 2716 to generate a new list of refined re-write suggestions combining different elements from the more than one selected re-write suggestions.

In addition to generating re-write suggestions for complete sentences, the writing assistant tool can also generate re-write suggestions for parts of sentences (any span re-write). For example, the user can ask for re-writes of the phrase, "I'll never forget" in the sentence, "It's an experience I'll never forget." In response, the writing assistant tool may generate re-write suggestions such as:

"that I'll always remember" or
"I won't ever forget"

Figure 28:
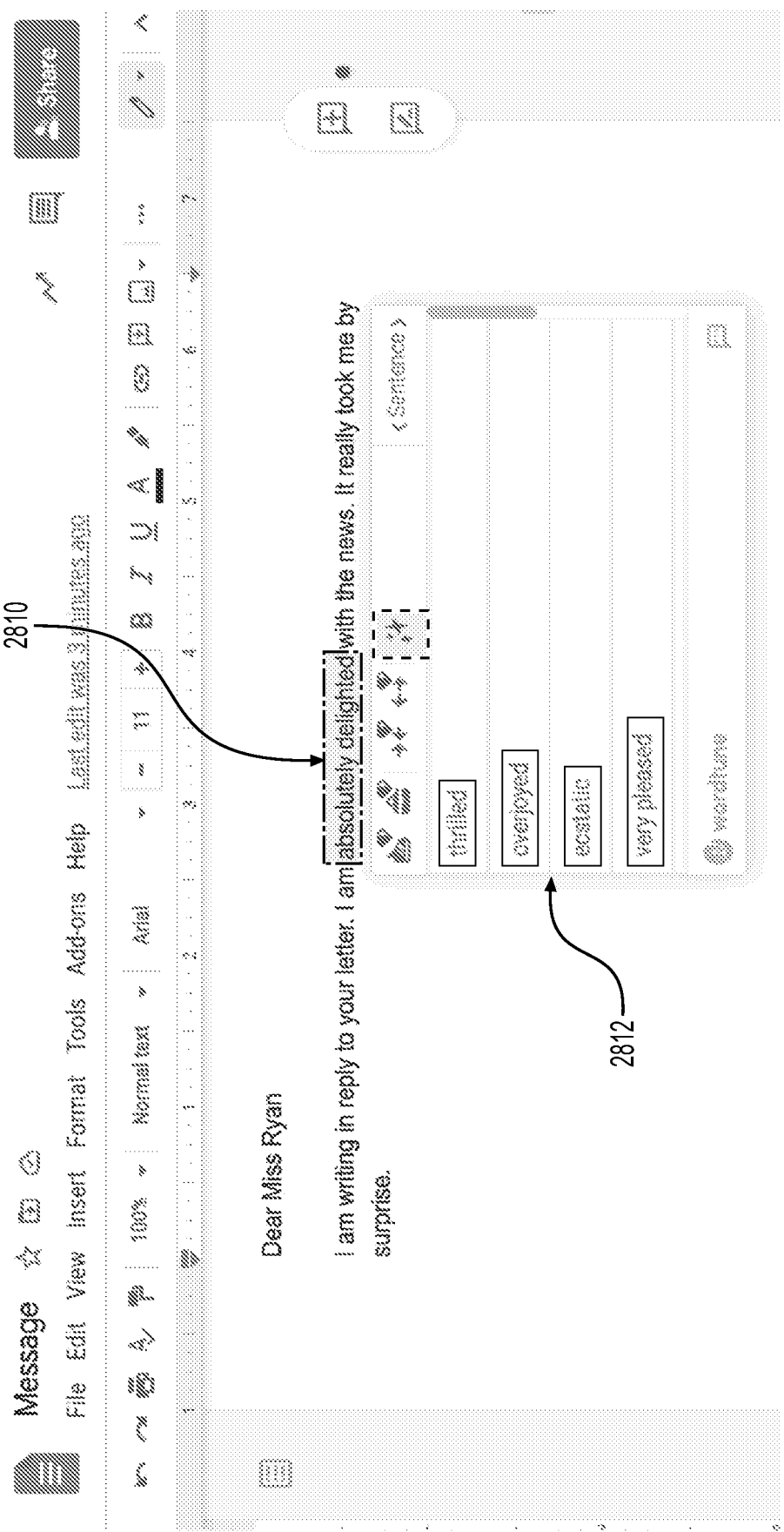

In the example shown in FIG. 28, the user has highlighted the phrase "absolutely delighted" (2810) within the sentence, "I am absolutely delighted with the news." In response, the writing assistant tool can automatically generate one or more re-write suggestions 2812 as potential replacements for phrase 2810. Notably, in this case, the writing assistant tool has generated both one-word and two-word re-write suggestions for the two-word phrase, "absolutely delighted." Specifically, re-write suggestions 2812 include:
 "thrilled"
 "overjoyed"
 "ecstatic" and
 "very pleased."
While the re-write suggestions include different numbers of words, each conveys a similar meaning as the original phrase 2810. Further, each suggestion fits with the context of the surrounding text in the document.

Figure 29:
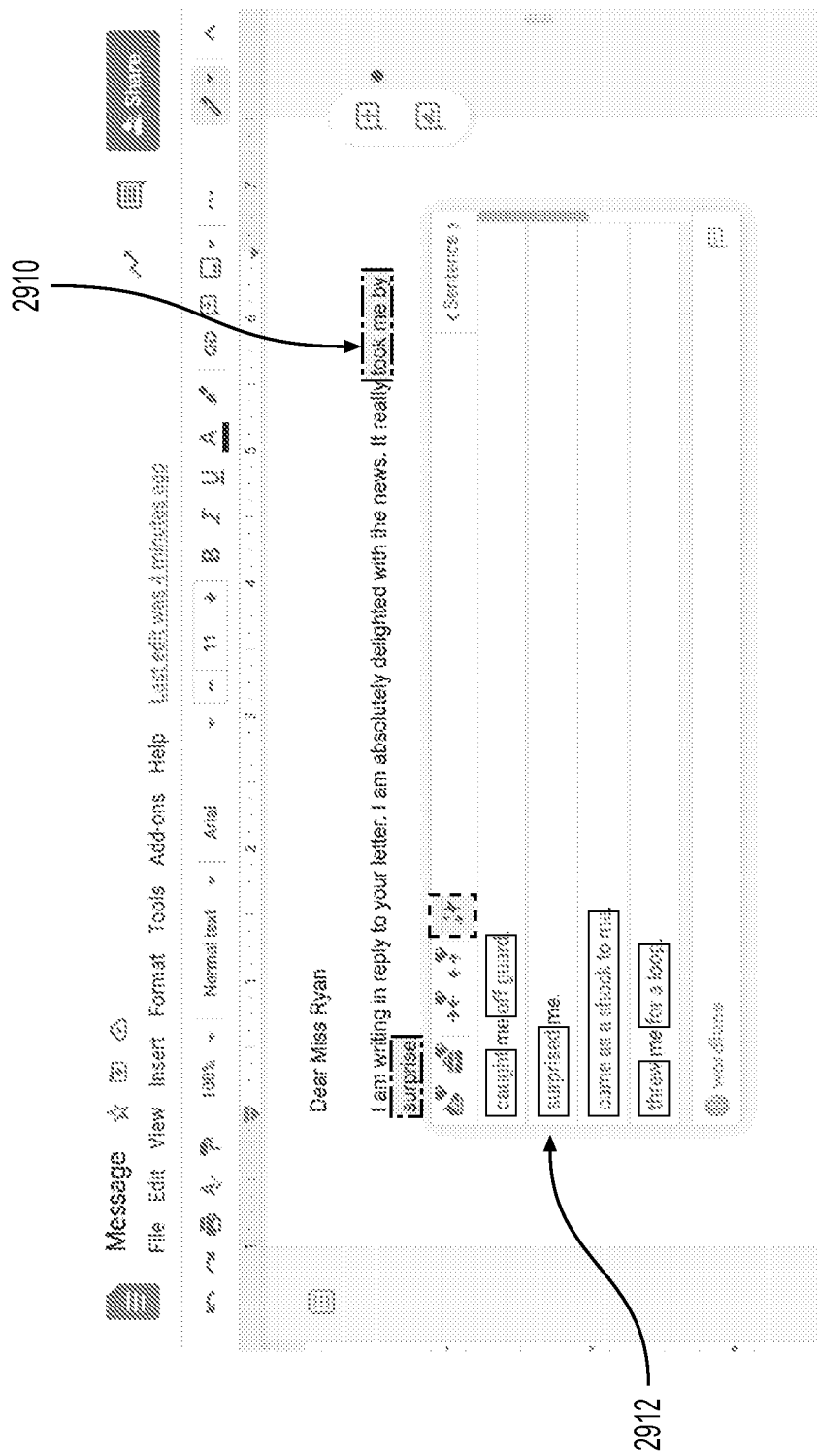

FIG. 29 provides another example of the writing assistant tool's ability to generate re-write suggestions for portions of sentences. In this example, the user has highlighted the phrase "took me by surprise" (2910) within the sentence, "It really took me by surprise." In this case, the writing assistant tool has generated four re-write suggestions 2912, including:
 "caught me off guard"
 "surprised me"
 "came as a shock to me" and
 "threw me for a loop."
Here, each of the re-write suggestions includes a different number of words, yet each conveys a similar meaning as the original phrase 2910. And, each suggestion fits with the context of the surrounding text in the document.

The writing assistant tool can also include translation re-write suggestion functionality. For example the writing assistant tool can generate re-write suggestions in one language based on text segments that are written in one or more different languages. In this way, the writing assistant tool provides not only a capability for in-line translation, but also an ability to interact with a user in multiple different languages and seamlessly generate re-write suggestions in English or another default language. In generating re-write suggestions (in English, for example), the writing assistant tool can determine the meaning associated with highlighted phrases written in English or another language, such that in generating the re-write suggestions, the suggestions will convey the same or similar meaning to the original text regardless of the language in which the original text is drafted. Additionally, the translated re-write suggestions maintain consistency with the context of the text surrounding the user's highlighted text, regardless of the language used to draft the surrounding language.

In one example, a user can highlight the sentence, "The צבעוניים lights were on." and activate the writing assistant tool to generate re-write suggestions for the highlighted sentence, which includes one portion drafted in Hebrew and another portion drafted in English. In response, the writing assistant tool may generate re-write suggestions such as:
 "There were colorful lights on."
 "A colorful light show was taking place." or
 "Bright colors lit up the room."

Figure 30:
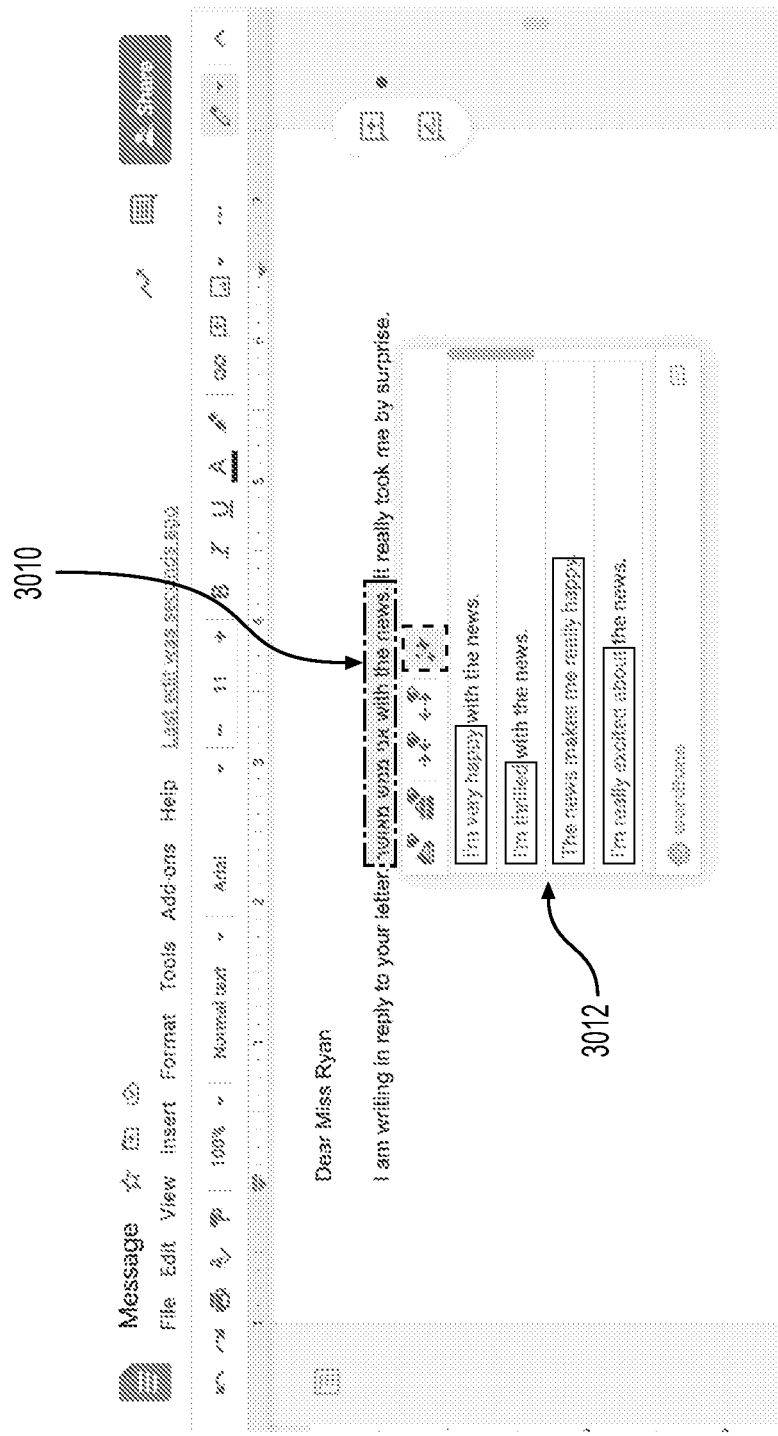
Figure 31:
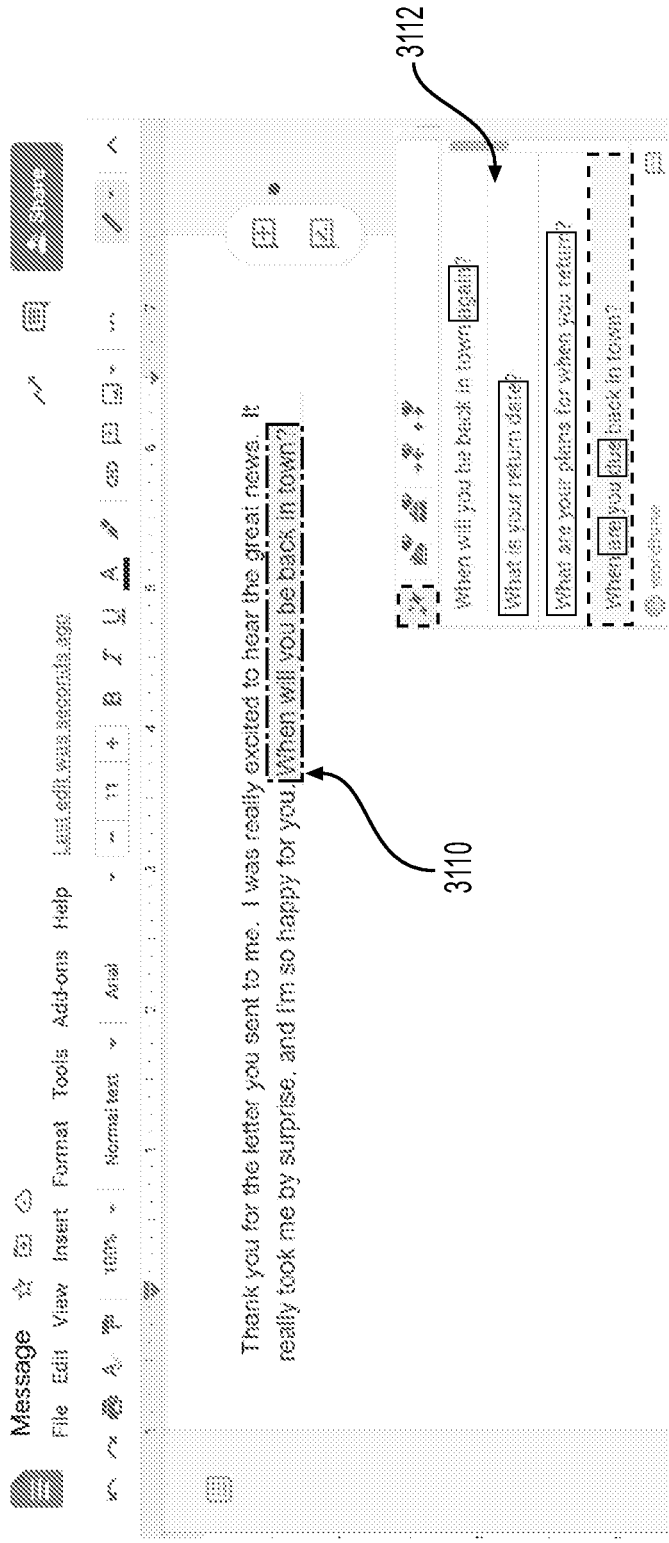

In another example, as shown in FIG. 30, the writing assistant tool can provide re-write suggestions in English based on highlighted text that is either fully or partially in a language other than English. In the example, the user has highlighted the sentence "אני ממש מאושר with the news." (3010). In response, the writing assistant tool has generated four re-write suggestions 3012, which are expressed fully in English despite a portion of the original highlighted text being drafted in Hebrew. Re-write suggestions 3012 include:
 "I'm very happy with the news."
 "I'm thrilled with the news."
 "The news makes me really happy." and
 "I'm really excited about the news."

In the examples above, the user can activate the writing assistant tool to generate re-write suggestions based on a highlighted passage within an original text. On the other hand, however, in some cases the writing assistant tool can be activated even before entering text for which a user wishes to view re-write suggestions. In such cases, for example, the user may activate the writing assistant tool, and the tool may effectively "stand by" until text is available for generating re-write suggestions. Then, as the user enters text, the writing assistant tool can automatically generate one or more re-write suggestions for that text and can periodically update the re-write suggestions as the user continues to enter text. In this way, the writing assistant tool allows users to obtain re-write suggestions for words, phrases, sentences, or even longer passages as such text is typed.

The generated re-write suggestions can be refreshed/updated based on any suitable trigger. In some cases, the writing assistant tool can update the re-write suggestions each time a new word is added to text for which a user desires re-write suggestions. In other cases, the re-write suggestions can be updated periodically (e.g., at 1 s, 2 s, 5 s intervals, etc.) during a period of time in which a user is detected as entering characters/words within text for which the writing assistant tool is to generate re-write suggestions.

As an illustration of this functionality, after activating the writing assistant tool, the user can type the words, "I finish," and in response, the writing assistant tool can generate re-write suggestions such as:
 "I am done." and
 "That's it."
Rather than selecting either of the generated re-write suggestions as substitutes for the entered text, however, the user can continue typing by adding the word "school" to form the phrase, "I finish school." In response, the writing assistant tool can automatically update the previously generated re-write suggestions (as the user types or after the user has finished typing the next word—i.e., "school"). The updated re-write suggestions may include:
 "I graduate from college" and
 "I finish my education."
The user can continue typing, and the writing assistant tool will continue to update the re-write suggestions. For example, the user can type the words, "next week" to form the sentence, "I finish school next week." Either after typing the word "next," after typing the word "week," or while the user is typing, the writing assistant can generate updated re-write suggestions such as:
 "I will graduate next week." and
 "My school year ends next week."
The writing assistant tool can also provide similar updates relative to changes a user makes in original text from which the writing assistant tool has generated one or more re-write suggestions. For example, returning to FIG. 29, in order to generate re-write suggestions in this case, the user highlighted the phrase, "took me by surprise" and activated the writing assistant tool, which responded by generated re-writing suggestions 2912. If none of the re-write suggestions 2912 meets the user's needs or intent, the user can revise the highlighted text 2910. Detected changes in the highlighted text 2910 will prompt the writing assistant tool to update the generated re-write suggestions 2912 as the user types (e.g., after each new word is added, after detection of deleted characters or words, or based on any other detected change to the highlighted text.). With respect to the example of FIG. 29, the user may revise highlighted text to read, "was totally unexpected." In response, the writing assistant tool may update re-write suggestions to include:

"caught me by surprise."
"came as a surprise."
"surprised me." and
"took me by surprise."

In the examples above, the writing assistant tool, including the re-write suggestion functionality, is initiated on-demand. That is, for each text segment for which the user wishes to receive re-write suggestions, the user can activate the writing assistant to access an interaction through a re-write window (such as the window of FIG. 29 including re-write suggestions 2912).

In other cases, however, the writing assistant tool can be maintained in an "always on" state such that the writing assistant tool need not be activated each time a user wishes to receive re-write suggestions for a particular text segment. For example, referring to FIG. 31, the writing assistant tool can provide a window 3112 or side panel in the interface that remains active as a user edits a document. Window 3112, can display re-write suggestions, e.g., for the text segment with which the user is currently engaged. In some cases, the writing assistant tool may generate re-write suggestions (and subsequent updated re-write suggestions) for a sentence currently being typed by the user, for a sentence in which the user's caret is currently located, and/or for a span of text currently selected by the user. For example, after typing the sentence 3110 ("When will you be back in town?), the user may highlight the sentence, and the writing assistant tool will generate re-write suggestions within active window 3112. Alternatively, as the user types the sentence 3110 (and any other sentence within the document), the writing assistant tool may automatically generate re-write suggestions within active window 3112 and can automatically generate updated re-write suggestions within active window 3112, e.g., after each word added to the sentence. When the user begins a new sentence or moves the cursor to another location in the document, the writing assistant tool can automatically generate re-write suggestions in active window 3112 based on a sentence or phrase in which the cursor is re-located or based on words a user adds to a new sentence. It should be noted that relative to this or any other embodiment described herein, for any re-write suggestion, updated re-write suggestion, refined re-write suggestion, etc. generated by the writing assistant tool, the user can select from among the generated re-write suggestions, and the writing assistant tool can replace the original text (to which the re-write suggestion relates) with the selected re-write suggestion.

The writing assistant tool may also offer a batch re-write suggestion function that can assist a user in efficiently navigating through longer text passages to view/consider re-write suggestions offered by the writing assistant tool for one or more segments of a longer text passage. For example, in one mode of operation, a user may highlight a longer text passage, such as a complete paragraph, or more, and in response, the writing assistant tool can generate re-write suggestions for the entire paragraph or text selection. In some cases, however, such an approach may result in a user being satisfied with the re-write suggestions generate for some portions of the text passage, but less inclined to select re-write suggestions for other portions of the text passage. Thus, generating re-write suggestions for an entire passage, while useful in some cases, may not provide the most efficient pathway to the refined text that a user seeks in other cases.

To assist users in efficiently revising longer passages of text, the writing assistant tool can provide an interaction capability that allows the user to quickly navigate through a text passage and receive re-write suggestions relative to portions of the original text (e.g., on a paragraph-by-paragraph basis, on a sentence-by-sentence basis, or relative to any other suitable division of the original text). The examples below are described relative to a batch re-write process proceeding on a sentence-by-sentence basis. It should be understood, however, the described sentence-by-sentence progression could also be a phrase-by-phrase, multi-sentence-by-multi-sentence, paragraph-by-paragraph progression without departing from the scope of the invention.

In one example, after activating the writing assistant tool relative to a paragraph, for example, the writing assistant tool will automatically generate and display re-write suggestions for the first sentence in the paragraph. To efficiently navigate through the selected paragraph and view re-write suggestions for any sentence in the paragraph, the user can navigate between the sentences (e.g., using directional keys (up, down, left, right), by scrolling a mouse wheel, etc.). For each new sentence to which the user navigates, the writing assistant tool will display re-write suggestions generated for that sentence. Notably, the generation of the re-write suggestions may be performed after the user navigates to a new sentence in the selected paragraph. In other cases, the re-write suggestions for each sentence in the selected paragraph may be generated upon selection of the paragraph and activation of the writing assistant tool such that the re-write suggestions are immediately available and can be immediately displayed to a user as the user navigates through a selected paragraph.

Alternatively, the writing assistant tool can split the selected text into multiple portions of text such that each portion includes of two or more consecutive sentences that convey a coherent unit of meaning. The same batch interaction described above can then be used to allow the user to quickly navigate through a text passage and receive re-write suggestions on a portion-by-portion basis.

The re-write suggestions for each particular sentence and/or portion in the selected paragraph are sensitive to the context surrounding that sentence, in that the re-write suggestions are generated by the writing assistant tool to convey the meaning of the original sentence given the context. Of course, this means that the re-write suggestions generated and displayed to the user can change as the user navigates through the selected paragraph and selects any of the re-write suggestions offered by the writing assistant tool (or otherwise makes edits to any part of the paragraph text). To reduce latency and/or to account for changes in context caused by edits/re-writes to sections of the paragraph, once the user selects a re-write suggestion to replace text in the paragraph (or makes other edits to the paragraph), the writing assistant tool can automatically generate updated re-write suggestions other sections of the paragraph. This can be done in a background process, for example, not visible to the user. Thus, after editing the paragraph, accepting a re-write suggestion, etc., the user can navigate to a new sentence in the paragraph, and the writing assistant tool may already have a set of re-write suggestions generated for the new sentence location. The set of re-write suggestions for the new sentence location may account for changes in context due to revisions made to the paragraph prior to navigating to the new sentence location.

Figure 32:
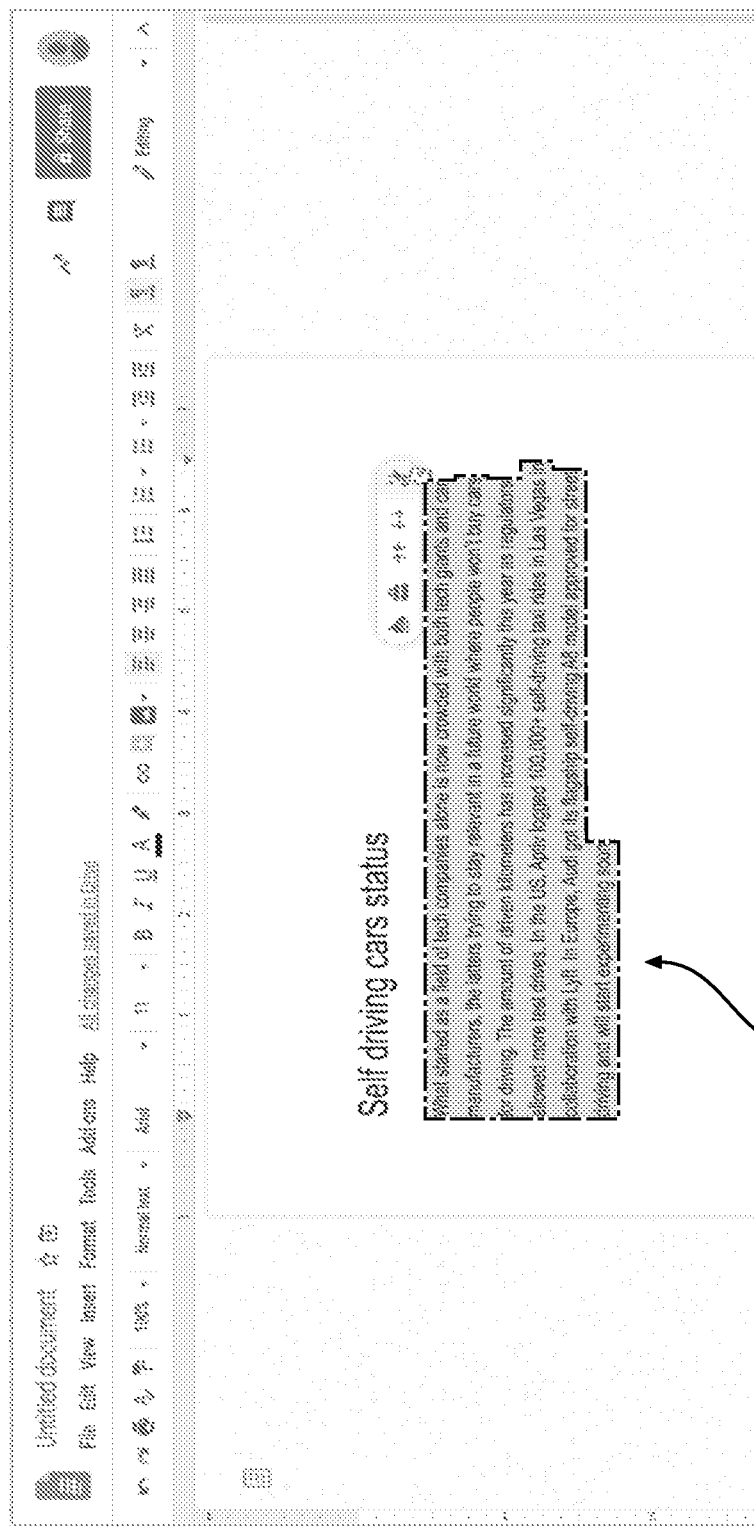
Figure 33:
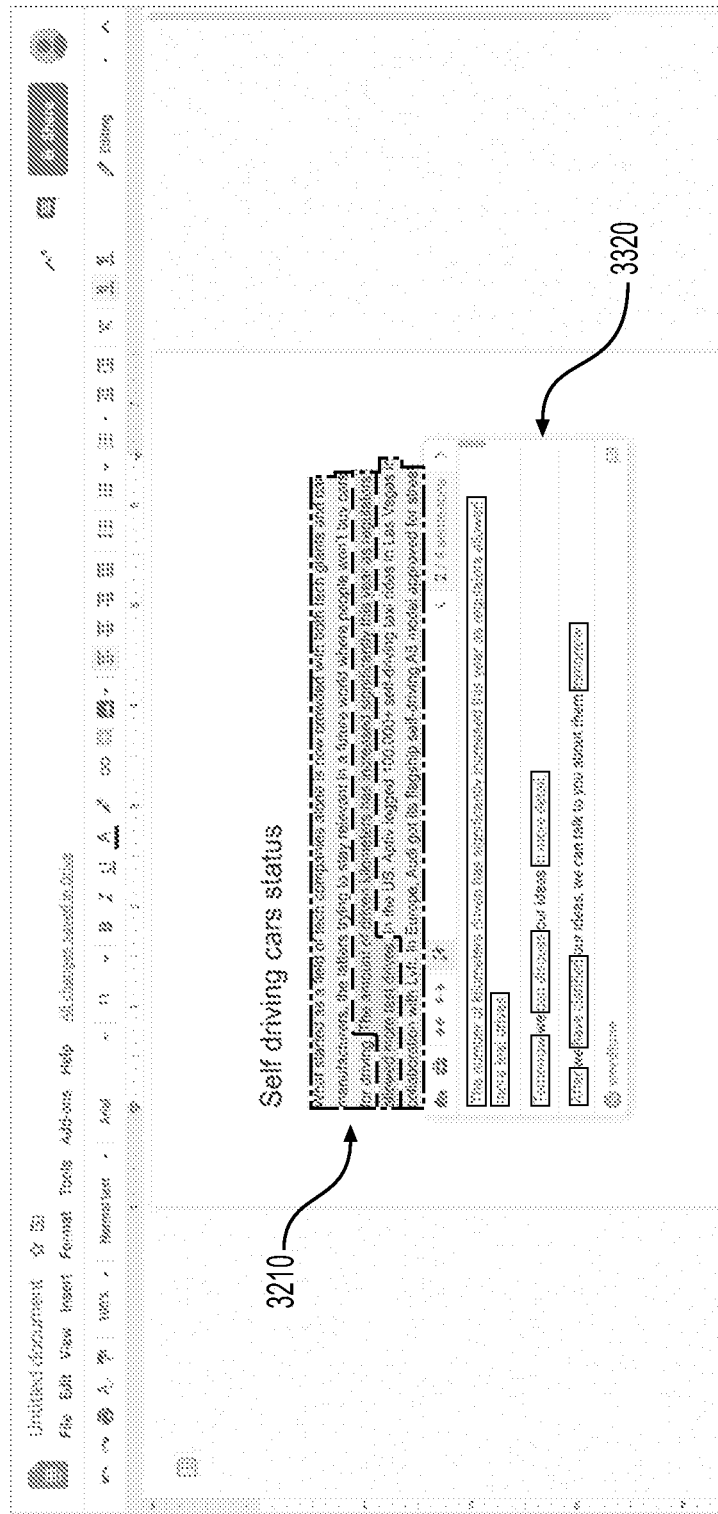

FIGS. 32 and 33 provide an example of the batch re-write capability of the writing assistant tool. For example, as shown in FIG. 32, the user can select the text of paragraph 3210 and activate the writing assistant tool to generate re-write suggestions for the sentences of paragraph 3210. FIG. 33 illustrates one example of how a user may then navigate through the paragraph on a sentence-by-sentence basis such that the user can view the re-write suggestions generated for each sentence. Specifically, as shown in FIG. 33, the user has navigated to the second sentence in paragraph 3210, and the writing assistant tool has displayed in window 3320 three different re-write suggestions for the second sentence of the paragraph. The user can select any of the suggested re-write suggestions as replacements for the second sentence, can edit the second sentence to generate updated re-write suggestions in window 3320, or the user can simply navigate to a new sentence location in the paragraph to view the set of re-write suggestions generated for the sentence at the new location.

Figure 34:
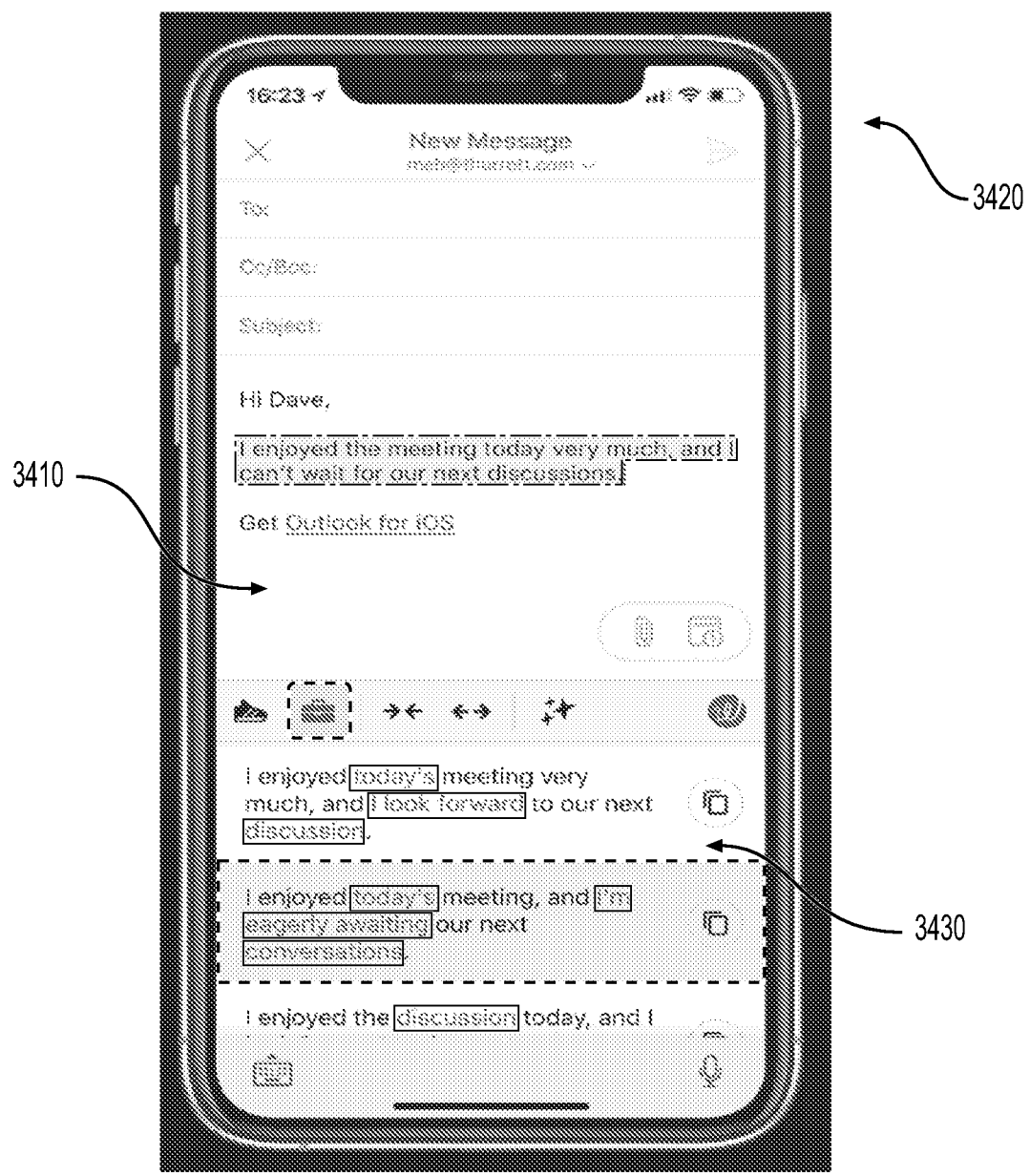

As noted above, the disclosed writing assistant tool may be configured to operate on a wide range of computing devices and in conjunction with a wide range of text-based applications. In some cases, the writing assistant tool can operate on a mobile device and can provide re-write suggestions for sentences (or phrases) typed by the user in any text-based application, text-window, text-based editor, etc. accessible on the mobile device. In some cases, as shown in FIG. 34, the writing assistant tool may automatically be made available in conjunction with activation of any text window or application on the mobile device involving the entry of text. As shown in FIG. 34, the user is typing text into a text entry window 3410 associated with an email editor operating on mobile device 3420. In this example, as the user enters text into window 3410, the writing assistant tool can generate re-write suggestions for any of the text entered into window 3410 and display the re-write suggestions in a writing assistant window 3430. In some cases, as described above, the writing assistant tool can generate re-write suggestions for the sentence in which the user is currently typing, for a sentence in which a cursor is currently located, a highlighted text segment, etc. In the example of FIG. 34, the re-write suggestions generated by the writing assistant tool are provided in window 3430 shown above the virtual mobile keyboard of mobile device 3420.

Figure 35:
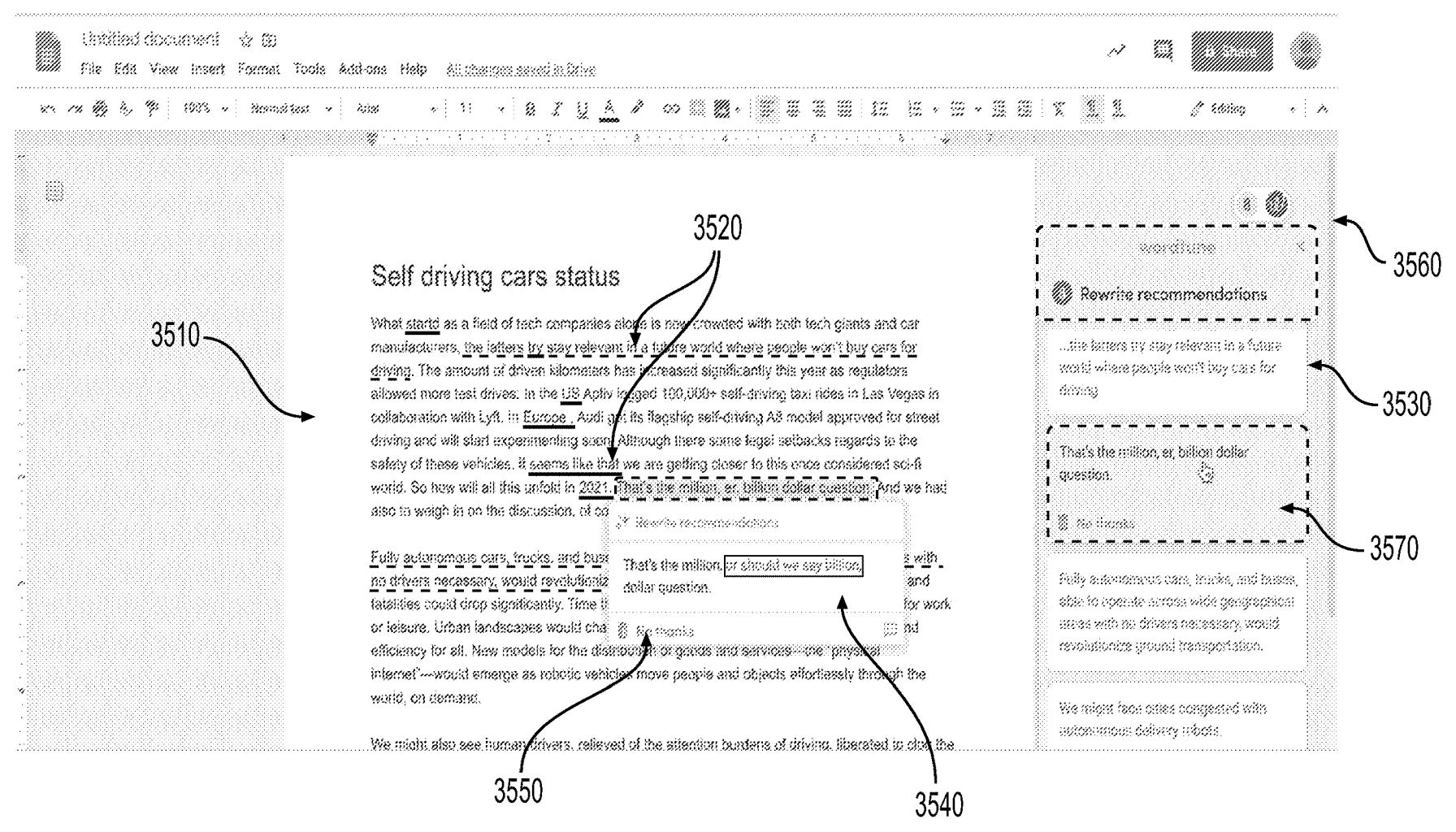

The writing assistant tool may also be configured to parse an entire document (or any selected portion of a document) and identify to a user text segments within the document that are candidates for re-write suggestions. For example, as shown in FIG. 35, the writing assistant tool has parsed a document 3510 and identified several candidates for re-write suggestions. These candidates may be identified to the user using any suitable technique. In some cases, the writing assistant tool can annotate the text with one or more types of notations to identify re-write candidates. As shown in FIG. 35, for example, certain text segments, such as segments 3520, are identified with underlining to indicate to the user that re-write suggestions exist or could be generated relative to the underlined text segments. Other indicators, such as highlighting, virtual buttons, etc., may be associated with text segments in the document that the writing assistant tool identifies as candidates for re-write suggestions.

In other cases, the writing assistant tool and its associated user interface may include a window 3530 that provides a list of identified candidates for re-write. As illustrated in FIG. 35, window 3530 may include a list of the text segments that the writing assistant tool underlined in the document to identify those text segments as candidates for re-write suggestions. Each item on the list may be clickable, and clicking on any of the listed items will direct the user to the applicable text segment 3520. The writing assistant tool may also indicate in window 3530 the number of candidates identified for generation of potential re-write suggestions. For example, as shown at the top of window 3530, the writing assistant tool may include an icon (e.g., a circle, etc.) including the number of re-write candidates identifed (in this case, ). The writing assistant tool may also more specifically identify the number of candidates identified for re-write suggestions. For example, in the "wordtune" segment of window 3530, as shown in FIG. 35, the writing assistant tool has indicated that there are "  Rewrite recommendations".

In either case, the writing assistant tool facilitates navigation through those text segments for which re-write suggestions exist or could be generated. For example, a user can click on any of the underlined text segments 3520 in the document text, and in response, the writing assistant tool may highlight the selected text segment and generate a re-write suggestion window 3540 to display to the user generated re-write suggestions for the selected text segment. In the example of FIG. 35, the user has selected the sentence, "That's the million, er, billion dollar question." In response, the writing assistant tool has highlighted the selected sentence and opened re-write suggestion window 3540. In the window 3540, the writing assistant tool displays one or more re-write suggestions for the selected sentence (in this case: "That's the million, or should we say billion, dollar question."). If the user wishes to accept any of the displayed re-write suggestions, the user can select one of the displayed suggestions (e.g., by clicking or double clicking on the suggestion, by dragging and dropping, by clicking on a virtual button associated with each suggestion, or using any other suitable technique). If the user is not interested in any of the re-write suggestions displayed in window 3540, the user can, for example, click on the "No thanks" icon 3550.

With respect to window 3530, the user can scroll through the re-write candidates using scroll bar 3560. Each re-write candidate may be displayed in a separate bubble 3570, and to view the re-write suggestions for any of the re-write candidates, a user can click on its corresponding bubble 3570 (or use any other suitable selection technique). In response, the writing assistant tool can generate a re-write suggestion window, such as window 3540 to display re-write suggestions generated for the selected re-write candidate.

The writing assistant tool may identify potential re-write candidates from the original text based on any suitable criteria. In some cases, the tool may convey to the user the criteria employed. For example, in some cases, the writing assistant tool may proactively identify re-write candidates and generate corresponding re-write suggestions for specific spans of text that are determined by the writing assistant tool to be improvable. Such recommendations may, for example, provide re-write suggestions that make the text more fluent, make the text sound more like text written by a native English speaker, improve readability (e.g., by simplifying a sentence structure, splitting longer sentences, using more commonly used words or language), incorporate a more diverse and accurate vocabulary, and/or change the tone and style of the text to better fit the context and the user's goals (as determined by the writing assistant tool).

The sections above describe various features and functionality of the writing assistant tool made possible by the described AI-based language analysis and generation models. Such models offer opportunities for applications beyond the described writing assistant tool. For example, the trained models and language analysis capabilities described above can also drive the operation of various reading assistant tools, described in the sections that follow.

In general, embodiments of the reading assistant tool may be used to improve the efficiency with which users can read, review, digest, comprehend, and/or analyze text-based documents. The reading assistant tool can operate on virtually any types of electronic, text-based documents, including: PDF files, WORD documents, EXCEL documents, online articles or documents in HTML format, Google docs, plain text files, PowerPoint documents, email communications, among other types of text-based documents. In certain embodiments, a user can load one or more documents (or identify one or more document links, such as a URL address, document shortcut, etc.) to the reading assistant tool interface. In response, the reading assistant tool can generate an output that includes various types of summary elements automatically generated based analysis of the loaded/identified document(s). In some cases, the summary elements can be supplemented based on information available from sources other than the loaded/identified documents (e.g., information sources accessible by via the Internet or other network). The reading assistant tool can analyze text from text documents, generate a textual summarization of information conveyed by the text documents, by, among other things, inferring relationships between facts, events and entities referenced or implicated by the text documents.

To enrich the loaded/identified documents, the generated summary elements can be incorporated into the text documents to which they relate in order to facilitate/expedite reading and understanding of the document text.

FIG. 36 represents an example operation flow associated with a reading assistant tool according to exemplary disclosed embodiments. For example, step 3610 includes acquiring text on which the reading assistant tool is to operate. As described above, the text may be acquired from various types of text files loaded or identified through an interface of the reading assistant tool.

Next, at step 3620, the reading assistant tool can analyze and enrich the acquired text. For example, using AI-based models, trained neural networks, etc. as described above, the reading assistant tool can analyze the acquired text to do any of the following actions: identify and/or recognize entities described in the acquired text (even those identified by pronouns); summarize facts, information, argument, points, etc. associated with the acquired text; draw on external knowledge sources (e.g., databases, documents, etc. available via the Internet or other network) to augment information etc. conveyed by the acquired text; identify relationships between various types of entities associated with the acquired text; identify and/or extract keywords and key concepts from the acquired text; among other suitable tasks.

Based on the results of the reading assistant tool's analysis in step 3620, the reading assistant tool can generate various types of outputs at step 3630 to assist a user in working with/understanding the acquired text. For example, the reading assistant tool can generate summary snippets based on segments of the acquired text. The summary segments may convey key information or points associated with segments of the acquired text, while including one or more modifications to those segments. The modifications may include changing words, omitting words, substituting words, simplifying language complexity, removing phrases, adding words or phrases, etc.

In some cases, the reading assistant tool may generate an entities and relations graph, which graphically (or textually in some cases) identifies entities referenced in the acquired text and represents relationships between those entities. Information relating to the graphed relationships may be derived from the acquired text or may be augmented based on access to external knowledge sources (e.g., Internet databases, documents, etc.).

Step 3630 may include a semantic search capability and/or query-oriented summaries. For example, a user can enter text into an input field (e.g., a query box, etc.), and the reading assistant tool can find words and phrases in the document that correlate with the contextual meaning of the input text. In other cases, based on the input text, the reading assistant tool can generate or update one or more summary elements to emphasize certain semantic meanings, entities, relationships, facts, arguments, etc. conveyed by the source text to which the summary elements relate.

At step 3630, the reading assistant tool may also offer content-based completion functionality. An interface associated with the reading assistant tool may offer text suggestions as the user inputs text. These text suggestions can be based on both the context and content of source text from one or more text documents loaded into or identified to the reading assistant tool (or based on externally accessible sources).

At step 3630, the reading assistant tool may also offer side-by-side read and write capability. For example, any of the summary elements generated based on the text analysis performed in step 3620 may be shown in an interface of the reading assistant tool in a side-by-side relation to source text to which the summary elements relate. The interface of the reading assistant tool may also provide a text editor window such that the user can draft text while having proximate access to the source text and summary elements relating to the source text.

Returning to step 3610, an interface of the reading assistant tool may include any suitable interface for loading or identifying text documents. For example, activation of the reading assistant tool may cause a window, such as window 3710 shown in FIG. 37 to be shown on a display. Window 3710 may include an active area 3720 to facilitate identification of source text documents to the reading assistant tool. For example, a user may drag and drop text files into active area 3720 to load documents into the reading assistant tool. Alternatively or additionally, a user may click on "browse" link to access a file system associated with one or more storage devices and may select one or more text files from the file system for loading into the reading assistant tool. Further, a user may type or copy and paste an address, such as a URL, into address field 3740 in order to identify to the reading assistant tool one or more documents to access and load. Any of these techniques can be used alone or in combination to load documents into the reading assistant tool, especially as the reading assistant tool can load and operate upon multiple documents from multiple different sources or storage locations in a single session.

Upon loading one or more text documents, the reading assistant tool can analyze the loaded text documents (step 3620) and can generate one or more summaries relative to the loaded text documents. The generated summaries can be shown to the user in any suitable format. FIG. 38 provides a block diagram representation of a generic summary window 3810 that may be included in an interface associated with the disclosed reading assistant tool. Window 3810 may be arranged with various different layouts and may include various combinations types and combinations of display windows, scroll bars, summary snippet bubbles, text entry fields, virtual buttons, toolbars, drop down menus, etc. In the particular example shown in FIG. 38, interface window 3810 includes an analysis panel 3820, a text review panel 3830, a summary panel 3840, and a writing panel 3850.

Each panel type, along with its exemplary associated functions and features, is discussed in more detail below. In general, however, analysis panel 3810 may provide one or more portals to results of analysis performed by the reading assistant tool in step 3620. Such results may include: information relating to identified entities and entity relationships; compressed text summaries; information extracted from external knowledge sources; keyword and concept extraction; among others.

Text review panel 3830 may include a reproduction of at least a portion of the text analyzed in one or more source text documents loaded into the reading assistant tool. Text shown in the text review panel 3830 may include highlighting, underlining, bolding, or other types of emphases to indicate what portions contributed to summaries, such as summary snippets 3860 included in summary panel 3840. Writing panel 3850 can receive text entered by a user, text copy and pasted (or drag and dropped) from text review panel 3830 or from text snippets 3840, for example.

Interface window 3810 may include various other types of information or functionality. For example, interface window 3810 may identify a document's meta-datum (e.g., a document title 3870) to identify the file name or other document identifier associated with the particular source text file (or a project text file including text from multiple source text files) under review.

FIG. 39 provides an example of a summary interface window 3910 that may be generated by the reading assistant tool. In this example, window 3910 includes a text review panel 3920 that includes a reproduction of a portion of a source text document (i.e., and article entitled, "Seven Legal Questions for Data Scientists") loaded into the reading assistant tool. The name of the source text document is also shown in title field 3930.

After analyzing the source text document and generating one or more summaries relative to the document, the reading assistant tool can show the generated summaries on a display. In the example of FIG. 39, a number of summaries field 3940 indicates how many summaries the reading assistant tool generated during the analysis phase, and the summaries can be shown in a summary window 3950. In this example, the summaries are shown in summary snippet boxes 3960, however, any other suitable format (e.g., text bubbles, bulleted outline, etc.) may be used to show the generated summaries on a display.

Each summary generated may be based upon at least some portion of the text in a source text document loaded into the reading assistant tool. In the example of FIG. 39, the reading assistant tool may be equipped to identify to the user a portion or portions of the source text document(s) that contributed to the generation of a particular summary. For example, as shown in FIG. 39, text relating to a particular summary can be highlighted, underlined, bolded, etc. to indicate that it relates to at least one generated summary. A highlights toggle bar 3970 may be provided to enable the user to toggle on and off the highlighting of text used in generating one or more summaries.

Links between generated summaries and the associated text based on which they were generated may be indicated in any suitable manner. For example, as shown in FIG. 39, a generated summary, including a summary snippet 3980 shown in summary snippet box 3960, may be displayed next to its corresponding text in a source document (e.g., the text based on which the summary snippet was generated). In this example, the reproduced text from the source text document is shown in text review panel 3920 with highlighted text 3982. The proximity of summary snippet 3980 to highlighted text 3982 can indicate to a user that highlighted text 3982 contributed to the generation of summary snippet 3980. In some cases, especially where the density of generated summary snippets is higher, other indicators, such as lead lines, color coding, etc. may be used to indicate relationships between generated summaries and text used to generate the summaries.

Interface window 3910 may include various tools and controls to assist a user in efficiently reviewing and understanding content included in the source text documents loaded into the reading assistant tool. For example, as indicated by the number of summaries field 3940, in the example of FIG. 39, the reading assistant tool has generated 21 summaries based on its analysis of at least the loaded source text document partially reproduced in text review panel 3920. To review the generated summaries, the user can interact with a scroll bar (not shown). For example, dragging a scroll bar downward may cause the text shown in text review panel, as well as the generated summaries shown in summary review panel 3950 to migrate upwards on the display screen to bring additional text from source document and additional generated summaries into view on the display. In this way, a user can quickly scroll through the generated summaries and develop a good understanding of the source document through review of the generated summaries alone. Should the user wish to clarify any details or to gain further context relative to any particular generated summary, the side-by-side display of source text (optionally with highlighting) and corresponding summaries may enable the user to quickly access the text in the source document most pertinent to a particular summary. And, if the user wishes to review the complete text of the source document, it is available and shown in the text review panel 3920. To further illustrate the original text to which a generated summary relates, the reading assistant tool may include a highlight bar 3990 identifying a portion of the original text for which one or more summaries were generated.

As noted above, a component of the analysis performed by the reading assistant tool in step 3620 is the identification of entities referenced by source text documents and the determination of relationships among those entities as conveyed by the source text documents (and optionally as augmented by external knowledge sources). Through analysis of the source text documents, for example, the reading assistant tool can automatically create a knowledge graph of entities (e.g. a person, organization, event, process, task, etc.) mentioned/referenced in unstructured text in source text documents. The knowledge graph may include, among other things, entities, relations between entities, information about the entities, and instances of each entity in the text. The different instances of each entity are extracted and associated with the entity even if the entity was diversely and implicitly referenced (including reference by a pronoun, semantic frames where the entity has a semantic role not explicitly stated, etc.). The knowledge graph can also be generated or augmented based on access to external knowledge sources (e.g., accessible Internet sources, private knowledge bases, or knowledge bases local to the reading assistant tool). Using such sources can provide further information on the entities and the relations among the entities.

In some cases, the knowledge graph refers to the entity relationships identified and maintained internal to the models/networks associated with the reading assistant tool. In other cases, the knowledge graph may be provided to a user. For example, a user may click on a knowledge graph portal (such as the "Entities and Relationships" active region/clickable area/button shown in FIG. 38), and the reading assistant tool may show on the display the results of its entity and relationships analysis relative to the source text documents. In some cases, the knowledge graph may be represented to a user in a graphical format (e.g., entities identified in boxes or bubbles that may be arranged, connected by lines, associated with symbols, etc. to convey information about relationships, hierarchies, etc. among the identified entities). In other cases, the knowledge graph may be represented to the user in a text-based format (e.g., list, outline, etc.).

Other features or functionality of the reading assistant tool can also enable the user to interact with loaded source text documents, especially with respect to entities identified or referenced in the source text documents. For example, in some embodiments, the user can select a span of text in a loaded source text document, and in response, the reading assistant can display to the user the entities referenced in the selected span of text. Additionally or alternatively, the reading assistant tool can enable the user to view or navigate to other instances of the same entity or to other related entities in the source text document. Further, the reading assistant tool can enable the user to view information about the entity that the tool extracted from the source text document or acquired from external sources.

FIG. 40 provides another example of a summary window interface 4010 provided by an embodiment of the described reading assistant tool. Summary window interface 4010 includes a text review panel 4020 shown in side-by-side relationship to a summary review panel 4030. In this example, three summaries, including summary snippets 4040, have been generated based on text from the source document currently shown in the text review panel 4020. As an additional feature, a highlight bar 4050 may be configured to identify (e.g., using color coding, line thickness, etc.) portions of the source text for which the reading assistant tool has generated at least one summary.

In some cases, as described above, the reading assistant tool can automatically generate one or more summaries based on loaded source text without additional input from a user. In other cases, however, the reading assistant tool may provide a guided summarization feature with which the user may guide the summaries generated by the reading assistant tool through supplemental input provided to the reading assistant tool. For example, after (or in some cases before) the reading assistant tool automatically generates one or more summaries based on loaded source text, a user may provide supplemental text input to the reading assistant tool (e.g., via a text input window). The reading assistant tool can update generated text summaries (or generate new text summaries) based on the text input provided by the user.

The text input provided by a user can be free text input. The text input, for example, can specify a subject or theme of interest; identify, indicate, or reference, among other things: entities (e.g a particular person, organization, event, process, task), entity types (e.g. 'organizations', 'managers', 'meetings', 'requests'), topics (e g 'finance', 'sales', 'people'), or concepts (e.g. 'positive,' good; 'happy,' etc.). In response to receiving the free text input from the user, the reading assistant tool can generate one or more summaries based on the loaded source text as well as the text input received from the user. The reading assistant tool can further highlight instances in one or more loaded source documents related to the free text entered by the user. The reading assistant tool can also select information from the loaded source text that pertains to the subject or theme, etc., of the user's text input even if none of the input text, or its morphological modifications, is found in verbatim in the text spans containing the information). The reading assistant tool can then include the selected information into one or more generated summaries, and the summaries can be organized based on the subject, theme, etc. conveyed by the user's input text.

FIG. 41 provides a block diagram representation of the process flow of the guided summarization feature of some embodiments of the disclosed reading assistant tool. At step 4110, the reading assistant tool receives text input from the user. At step 4120, the reading assistant tool analyzes the loaded source text documents and identifies sections of the source text relevant to the subject, theme, concept, etc. implicated by the user's text input. At step 4130, the reading assistant tool generates one or more summaries based on both the user's text input and the text of the source text documents. At step 4140, the reading assistant tool shows to the user (e.g., through an interface window on a display) the locations in the source text documents of text sections relevant to the user's input. The reading assistant tool also shows to the user the summaries generated based on the source text and the user's text input.

FIG. 42 illustrates an example of the guided summarization functionality of embodiments of the disclosed reading assistant tool. For example, interface window 4210 shows an output of the reading assistant tool before receiving text input from the user, and interface window 4220 shows an output of the reading assistant tool after receiving text input from the user. Specifically, as shown in the example of FIG. 42, the interface of the reading assistant tool may include a user text entry field 4230. As shown in interface window 4210, user text entry field 4230 is blank and only includes the reading assistant tool's prompt, "Summarize according to . . . ". With no user text input to guide the summarization function, the reading assistant tool analyzes the loaded source text documents and generates summaries 4250. In this case, two summary snippets are shown, and scroll bar 4251 shows a current location relative to the source text document and locations of all summaries generated relative to the source text document. The two currently displayed summaries 4250, generated without text input from the user, read:

"In qualifying plans with high deductibles, individuals can contribute pre-tax money to a Health Savings Account. As deductibles rise, more plans are becoming eligible for HSAs."

"Unspent money can be invested in the account and earn interest. HSA deposits are estimated to reach $75B in 2020."

Interface window 4220 represents how the reading assistant tool can rely upon user text input to guide the summaries generated relative to the source text document. For example, as shown in user text entry window 4230', the user has entered the phrase, "Health expenses." In response, and based on the user's text input, the reading assistant tool generates new summaries (e.g., updated summaries) relative to the source document text. For example, relative to the same section of the source text document shown in both windows 4210 and 4220, the reading assistant tool, in response to receiving the user text input, has generated a new summary 4260. Not only is there one less summary relative to the same text passage, but the summary 4260 differs from the summaries 4250. Specifically, summary 4260 reads:

"Health Savings Accounts allow contributing pre-tax money to a health expenses account."

Notably, the newly generated summary 4260 conveys a meaning similar to a portion of the first of summaries 4250, but summary 4260 more prominently features the subject "health expenses" of the user's entered text. In addition, the reading assistant tool has linked the concept "health expenses" with "HSAs" and has referred to HSAs as "health expenses accounts" rather than "health savings accounts," to which the HSA acronym refers. Of course, a primary use for an HSA is to cover health expenses, which is the relationship gleaned by the reading assistant tool based on its training and/or its analysis of the source text documents. This connection provides one example of the reading assistant tool's capability for linking subjects, entities, concepts, etc. even where there is not a literal textual link for the connection.

As shown in FIG. 42, the reading assistant tool can also identify to the user the locations of summaries, relative to the source document text, that are particularly relevant to the user's entered text. For example, in the example represented in FIG. 42, the reading assistant tool has added in interface window 4220 highlighted tick marks 4270 to indicate where, relative to the source text, the reading assistant tool generated summaries relevant to the user's entered text, "Health expenses." And, as shown in window 4230', the current location of scroll bar 4251' is shown as overlapping with one highlighted summary (i.e., the location relative to the source text of generated summary 4260).

FIG. 43 illustrates an example of another feature of some embodiments of the reading assistant tool. Specifically, in some cases, the reading assistant tool may be equipped with the ability to assist the user in drafting text by analyzing user-entered text and then suggesting supplements to the entered text, providing text re-write suggestions, etc. As the basis for the supplement and/or re-write suggestions, the reading assistant tool can draw upon facts, information, concepts, etc. referenced in one or more source text documents loaded into the reading assistant tool. The reading assistant tool can also draw upon facts, information, concepts, etc. referenced in one or more external databases as the basis for the supplement and/or re-write suggestions.

The reading assistant tool offers an integrated flow for composing a written document while a user interacts with the reading assistant. For example, as shown in FIG. 43, the reading assistant tool may include an interface window 4310, which includes a source text review panel 4320, a summary review panel 4340, and a text composition panel 4350. As an aside, the panels of interface window 4310 may all be re-sized by the user depending on which section the user is most interested, in which section the user is currently working, etc. Text review panel 4320 and summary review panel 4340 can operate similarly to text review panel and summary review panel described relative to FIG. 42. For example, based on analysis of the loaded source text document, represented in text review panel 4320, the reading assistant tool can generate one or more summaries, such as summary snippet 4380, based on the source text and based on any entered user input text (optionally entered via user text entry field 4382).

In the example of FIG. 43, text composition window 4350 may be used by the user as a text editor to draft document text. In some cases, the user can copy and paste into text composition window 4350 text obtained from text review panel 4320 and/or from summary review panel 4340. In addition, the user can also introduce free text edits into text composition window 4350. As the user enters free text, the reading assistant tool can analyze the user's entered text and, similar to the functionality of the writing assistant tool described herein, can provide suggestions to the user for re-writing portions of user-entered text or for supplementing the user-entered text. The reading assistant tool's suggestions are based on both the text entered by the user and also on the loaded document source text and/or summary text generated by the reading assistant tool.

FIG. 43 represents an example of this functionality. Specifically, in text composition window 4350, the user has entered text 4360. Text 4360 may include sections copy and pasted from text review panel 4320 and/or from summary review panel 4340. Text 4360 may also include free text entered by the user. In this example, as the user was composing the last sentence shown in text passage 4360, the reading assistant tool offered suggestion 4370 for completing the sentence. That is, the user had entered the phrase, "The percentage of workers with HSAs increased," and in response, the reading assistant tool suggested the phrase, "by 280% in the past decade" to complete the sentence. The reading assistant's suggestion was based on concepts conveyed in both the user's entered text and in the source document text or summary text. For example, entry of the phrase "The percentage of workers with HSAs increased" prompted the reading assistant tool to refer to the facts, entities, relationships, etc. established for the source text document based on the analysis of that document to determine if the source document or relevant summaries contained any information relating to the percentage of workers with HSAs. Based on the user's entered text and its prior analysis of the source text document and generation of corresponding summaries, the reading assistant tool identified the fact that 23% of workers in 2019 had an HSA, compared to just 6% in 2009, which equates to a 280% increase. Thus, the reading assistant's suggestion for completing the user's sentence was drawn from facts and context conveyed by the user's text, as well as facts and context associated with the source document text/relevant summary. Notably, however, the text suggestion offered by the reading assistant tool was not framed in terms of the underlying percentages of workers with HSAs data, as included in the source text/summary. Rather, because the user's text referenced an "increase," the reading assistant tool was able to link the concept of an "increase" to an increase amount (i.e., 280%) in the underlying percentages between 2009 and 2019. The reading assistant tool was also able to link a difference in years (i.e., 2009 to 2019) to the concept of a "decade" and a comparison of a current time (e.g., 2020) to the years identified in the source text/summary to determine that 2009 to 2019 represents the decade before the current year. In view of these links and determined relationships, the reading assistant tool expressed the suggested sentence ending not in the literal facts/text appearing in the source text/summary, but rather in terms of a more complex concept, "in the past decade," which accurately, but differently, conveys the meaning/information included in the source text/summary.

To assist the user, the reading assistant tool can identify the source text or summary text serving as the basis for suggested re-write options or suggested text supplements. In the example of FIG. 43, suggestion 4370 includes highlighting to identify the generated suggestion to the user. The reading assistant tool can also display the text from one or more summary snippets, such as snippet 4380 (or text from the source document) on which the suggestion was based. In the example of FIG. 43, suggestion 4370 is shown in proximity to snippet 4380 (and optionally associated text from the source document) to identify to the user the information used as the basis for suggesting the phrase, "by 280% in the past decade." The user can accept the text re-write or text supplement suggestion using any suitable technique, such as any of the techniques described relative to the disclosed writing assistant tool.

The reading assistant tool can also offer the user the option to select a box 4390 to automatically link the text suggestion to the source text from which is was derived (an auto-citation function). The text suggestions offered by the reading assistant tool may include facts, direct quotes, paraphrased information, summarized information, etc. derived from the loaded source text documents and/or derived from externally one or more accessible documents or knowledge bases (e.g., via the Internet). The reading assistant's text completion and generation suggestions can also be modulated according to a currently active page of the source document, based on currently active summaries (e.g., those source document pages and summaries currently shown in an interface window associated with the reading assistant tool), or based on current text selections from the source document made by the user.

The reading assistant tool may also offer other functions. In some cases, the reading assistant tool can provide summaries relative to non-text objects included in text documents. For example, the reading assistant tool can summarize objects such as charts, graphs and tables that may appear in text-based documents. The summaries of such objects may be prepared based on analysis and summarization of text determined by the reading assistant tool to be associated with or directly describing the non-text objects. Such text may appear, for example, in the body of text documents containing non-text objects; in legends of non-text objects such as graphs, charts, etc.; in axis labels of graphs, tables, etc. Additionally, information used in generated summaries of non-text objects may also be derived using object recognition technology.

The reading assistant tool can also provide a document segmentation feature (e.g., document chunking). For example, the reading assistant tool can split a document into subsections of various lengths, based on both (a) the formatting and layout of the document; and (b) the semantic structure and discourse of the content. Given a target length, the system can detect the best splitting positions that will generate the most coherent chunks of text. The system operates on written documents of various types, including, but not limited to, PDF files, Office documents and online articles in HTML format. The chunking functionality can allow the user to get summary snippets corresponding to meaningfully split subsections of documents.

The systems and methods described above are presented in no particular order and can performed in any order and combination. For example, various embodiments of the writing assistant may include a combination of all of the features and functionality described above, or in some cases, the writing assistant may offer any subset of described features and/or functionality.

The above-described systems and method can be executed by computer program instructions that may also be stored in a computer readable medium that can direct a computer, other programmable data processing apparatus, or other devices to function in a particular manner, such that the instructions stored in the computer readable medium produce instructions which when implemented cause the writing assistant to perform the above-described methods.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the above-described methods.

It will be understood from the foregoing description that modifications and changes may be made in various embodiments of the present invention without departing from the invention described in this specification. The descriptions in this specification are for purposes of illustration only and are not to be construed in a limiting sense. The scope of the present invention is limited only by the language of the following claims.

What is claimed is:

1. A non-transitory computer readable medium including instructions that when executed by one or more processing devices cause the one or more processing devices to perform a method including:
   receiving from a user an identification of a plurality of different text segments;
   receiving from the user an indication of a type of document to generate based upon the plurality of different text segments;
   analyzing, using one or more machine learning models, the plurality of different text segments;
   identifying concepts conveyed by the plurality of different text segments;
   determining an ordering for the identified concepts to be used in generating an output text;
   generating the output text based on the determined ordering for the identified concepts and using the one or more machine learning models, wherein the generated output text conveys each of the identified concepts and includes one or more text elements not included in any of the plurality of different text segments, wherein generating the output text is further based on a personalized template automatically generated based on one or more prior interactions with the user; and
   causing the generated output text to be shown on a graphical user interface.

2. The non-transitory computer readable medium of claim 1, wherein the one or more text elements include one or more words introduced to a set of all words represented by the plurality of different text segments.

3. The non-transitory computer readable medium of claim 1, wherein the one or more text elements include one or more transitional phrases bridging text derived from two or more of the plurality of different text segments.

4. The non-transitory computer readable medium of claim 1, wherein the one or more text elements include one or more phrases added to at least one of the plurality of different text segments.

5. The non-transitory computer readable medium of claim 1, wherein the plurality of different text segments are included in a plurality of different document files, and receiving from the user an identification of the plurality of different text segments includes an identification of document file names that include the plurality of different text segments.

6. The non-transitory computer readable medium of claim 5, wherein the document file names are identified by one of dragging and dropping file names or file icons into a project window or user selection from among a list of filenames in a directory.

7. The non-transitory computer readable medium of claim 1, wherein the plurality of different text segments are included in a single electronic document, and receiving from the user an identification of the plurality of different text segments includes an identification of text passages to extract from the single electronic document.

8. The non-transitory computer readable medium of claim 7, wherein the identification of text passages to extract is made by the user with a highlighting tool.

9. The non-transitory computer readable medium of claim 7, wherein the identification of text passages to extract is made by the user with a copy and paste function.

10. The non-transitory computer readable medium of claim 1, wherein the method further includes receiving from the user an indication of a type of document associated with the generated output text.

11. The non-transitory computer readable medium of claim 10, wherein the type of document includes at least one of an email, tweet, blog entry, or article.

12. The non-transitory computer readable medium of claim 1, wherein the method further includes receiving from the user one or more style indicators for use in generating the output text.

13. The non-transitory computer readable medium of claim 12, wherein the one or more style indicators include one or more of a document length, and average sentence length, an average paragraph length, a level of formality, a reading level of an intended audience, or a language selection.

14. A non-transitory computer readable medium including instructions that when executed by one or more processing devices cause the one or more processing devices to perform a method including:
 causing a user interface element to be shown as part of a text editor interface on a display, wherein the user interface element is configured to provide user access to one or more functions associated with an automated writing assistance tool;
 detecting user interaction with the user interface element and, in response, causing a re-write suggestion window to be shown on the display;
 generating one or more text re-write suggestions as the user enters a text segment into the text editor interface, wherein the one or more text re-write suggestions are generated based on the text segment and are intended to replace a first portion of the text segment;
 causing the generated one or more text re-write suggestions to be shown in the re-write suggestion window;
 detecting one or more edits to the text segment entered into the text editor interface, the one or more edits being associated with a second portion of the text segment, the second portion being different from the first portion; and
 causing, in response to the detected one or more edits, at least one change to the one or more text re-write suggestions.

15. The non-transitory computer readable medium of claim 14, wherein the detected one or more edits include an addition of a word to the text segment.

16. The non-transitory computer readable medium of claim 14, wherein the first portion of the text segment corresponds to a first sentence of an electronic document and wherein the second portion of the text segment corresponds to a second sentence of the electronic document.

17. The non-transitory computer readable medium of claim 16, wherein the detected one or more edits include at least one of an addition of a word to at least a portion of the second sentence of the electronic document, removal of a word from at least a portion of the second sentence of the electronic document, or a revision to at least a portion of the second sentence of the electronic document.

18. The non-transitory computer readable medium of claim 14, wherein the detected edits include an addition of a word to the text segment.

19. The non-transitory computer readable medium of claim 14, wherein the method further includes detecting a user selection of a re-write suggestion from among the one or more text re-write suggestions and, in response, replacing the first portion of the text segment with the selected re-write suggestion.

20. A non-transitory computer readable medium including instructions that when executed by one or more processing devices cause the one or more processing devices to perform a method including:
 causing a text segment re-write suggestion window to be shown on a display as part of a text editor user interface, wherein the text editor user interface includes a first area allowing text entry by a user, and a second area including the text segment re-write suggestion window;
 detecting entry of text into the text editor user interface; and
 in response to the detected entry of text into the first area of the text editor user interface, generating a plurality of text re-write suggestions associated with the entered text and causing the plurality of text re-write suggestions to be displayed in the text segment re-write suggestion window, each of the plurality of text re-write suggestions being associated with a corresponding portion of the entered text.

21. The non-transitory computer readable medium of claim 20, wherein the method further includes generating one or more updated text re-write suggestions in response to detected additions made to the text entered into the first area of the text editor user interface.

22. A non-transitory computer readable medium including instructions that when executed by one or more processing devices cause the one or more processing devices to perform a method including:
 detecting, in a text editing window associated with an electronic document, a user selection of a text passage in the electronic document, wherein the text passage includes a plurality of sentences;
 analyzing each of the plurality of sentences in response to detection of the user selection of the text segment;
 generating a plurality of re-write suggestions for the plurality of sentences, the plurality of re-write suggestions including at least a first re-write suggestion for a first sentence of the plurality of sentences and a second re-write suggestion for a second sentence of the plurality of sentences;
 detecting user interaction with a user input device; and
 in response, navigating among the plurality of sentences and displaying a corresponding one of the plurality of re-write suggestions in correspondence with the navigation among the plurality of sentences.

23. The non-transitory computer readable medium of claim 22, wherein the navigation among the plurality of sentences occurs on a sentence-by-sentence basis or on a paragraph-by-paragraph basis.

24. The non-transitory computer readable medium of claim 22, wherein the user interaction with the user input device includes at least one press of a directional key or rotation of a scroll wheel.

25. The non-transitory computer readable medium of claim 22, wherein the method further includes detecting a user selection of a re-write suggestion from among the plurality of re-write suggestions associated with a particular sentence among the plurality of sentences and, in response, replacing the particular sentence with the selected re-write suggestion.

26. The non-transitory computer readable medium of claim 22, wherein replacement of the particular sentence with the selected re-write suggestion causes a change in one or more re-write suggestions generated relative to another sentence.

27. The non-transitory computer readable medium of claim 22, wherein the method further includes detecting one or more edits to at least one of the plurality of sentences of the text passage and, in response, causing at least one change to one or more re-write suggestions generated relative to the plurality of sentences.

28. The non-transitory computer readable medium of claim 22, wherein the method further includes detecting one or more edits to text in the electronic document and, in response, causing at least one change to plurality of re-write suggestions generated for the plurality of sentences.

29. A non-transitory computer readable medium including instructions that when executed by one or more processing devices cause the one or more processing devices to perform a method including:

receiving from a user an identification of a plurality of different text segments, wherein the plurality of different text segments are included in a plurality of different document files, and receiving from the user an identification of the plurality of different text segments includes an identification of document file names that include the plurality of different text segments;

receiving from the user an indication of a type of document to generate based upon the plurality of different text segments;

analyzing, using one or more machine learning models, the plurality of different text segments;

identifying concepts conveyed by the plurality of different text segments;

determining an ordering for the identified concepts to be used in generating an output text;

generating the output text based on the determined ordering for the identified concepts and using the one or more machine learning models, wherein the generated output text conveys each of the identified concepts and includes one or more text elements not included in any of the plurality of different text segments; and causing the generated output text to be shown on a graphical user interface.

\* \* \* \* \*